United States Patent
Murakami et al.

(10) Patent No.: US 8,588,787 B2
(45) Date of Patent: Nov. 19, 2013

(54) NEIGHBORING CELL PROCESSING DEVICE, WIRELESS BASE STATION DEVICE, NEIGHBORING CELL PROCESSING METHOD AND DATA STRUCTURE

(75) Inventors: Kenichi Murakami, Osaka (JP); Yoshiyuki Shimada, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/578,840

(22) PCT Filed: May 23, 2011

(86) PCT No.: PCT/JP2011/061724
§ 371 (c)(1),
(2), (4) Date: Aug. 14, 2012

(87) PCT Pub. No.: WO2011/148883
PCT Pub. Date: Dec. 1, 2011

(65) Prior Publication Data
US 2013/0012212 A1  Jan. 10, 2013

(30) Foreign Application Priority Data

| | | |
|---|---|---|
| May 28, 2010 | (JP) | 2010-123113 |
| Sep. 7, 2010 | (JP) | 2010-200027 |
| Sep. 9, 2010 | (JP) | 2010-201878 |
| Sep. 21, 2010 | (JP) | 2010-211069 |
| Sep. 21, 2010 | (JP) | 2010-211070 |
| Oct. 4, 2010 | (WO) | PCT/JP2010/067373 |
| Oct. 7, 2010 | (WO) | PCT/JP2010/067628 |
| Oct. 7, 2010 | (WO) | PCT/JP2010/067630 |
| Nov. 12, 2010 | (JP) | 2010-254035 |
| Feb. 23, 2011 | (WO) | PCT/JP2011/053995 |

(51) Int. Cl.
*H04W 36/00* (2009.01)

(52) U.S. Cl.
USPC ......... 455/439; 455/436; 455/550.1; 370/331

(58) Field of Classification Search
USPC .................. 455/439, 436, 550.1; 370/331
See application file for complete search history.

(56) References Cited

U.S. PATENT DOCUMENTS

| 6,125,280 A | 9/2000 | Grandhi et al. |
| 6,957,074 B2 * | 10/2005 | Wang et al. ............. 455/456.1 |

(Continued)

FOREIGN PATENT DOCUMENTS

| JP | 11-331931 | 11/1999 |
| JP | 2000-333232 | 11/2000 |

(Continued)

OTHER PUBLICATIONS

Japanese Office Action dated Sep. 11, 2013 that issued for the corresponding Japanese patent application No. 2010-200027 and its English-language translation.

*Primary Examiner* — Danh Le
(74) *Attorney, Agent, or Firm* — Drinker Biddle & Reath LLP

(57) ABSTRACT

A neighboring cell processing device includes: a measurement information acquisition unit 11 for acquiring measurement information which indicates a result of measurement of radio signals transmitted from a plurality of wireless base station devices other than a target wireless base station device, based on information provided from at least either of wireless terminal devices or wireless base station devices; and a neighboring cell information generation unit 12 for generating, based on the measurement information acquired by the measurement information acquisition unit 11, neighboring cell information which indicates one or a plurality of wireless base station devices located in the neighborhood of the target wireless base station device, among the plurality of wireless base station devices other than the target wireless base station device.

15 Claims, 139 Drawing Sheets

(56) References Cited

U.S. PATENT DOCUMENTS

| | | | | |
|---|---|---|---|---|
| 8,185,118 B2* | 5/2012 | Voyer et al. | ............... | 455/439 |
| 2004/0192341 A1* | 9/2004 | Wang et al. | ............... | 455/456.1 |
| 2009/0247162 A1* | 10/2009 | Yasuoka et al. | ............... | 455/436 |
| 2010/0085904 A1* | 4/2010 | Hamaue et al. | ............... | 370/311 |
| 2011/0080825 A1* | 4/2011 | Dimou et al. | ............... | 370/216 |
| 2011/0149913 A1* | 6/2011 | Park et al. | ............... | 370/332 |
| 2011/0244859 A1* | 10/2011 | Tsuda | ............... | 455/436 |
| 2012/0064899 A1* | 3/2012 | Musiige | ............... | 455/445 |
| 2012/0214513 A1* | 8/2012 | Hashimoto et al. | ............... | 455/456.2 |

FOREIGN PATENT DOCUMENTS

| | | |
|---|---|---|
| JP | 2001-54158 | 2/2001 |
| JP | 2006-270207 | 10/2006 |
| JP | 2008-153963 | 7/2008 |
| JP | 2008-219645 | 9/2008 |
| JP | 2009-182538 | 8/2009 |
| WO | 2008/060236 | 5/2008 |
| WO | 2008/090914 | 7/2008 |
| WO | 2009/022971 | 2/2009 |
| WO | 2009/125799 | 10/2009 |
| WO | 2009/147923 | 12/2009 |

* cited by examiner

FIG. 18

| HANDOVER ROUTE | HANDOVER INTERVAL |
|---|---|
| A⇒C⇒D/D⇒C⇒A | 20 sec |
| B⇒C⇒A/A⇒C⇒B | 5 sec |
| B⇒C⇒D/D⇒C⇒B | 2 sec |
| ⋮ | ⋮ |

FIG. 22

| MODE | CONNECTABLE TERMINALS |
|---|---|
| CLOSED ACCESS MODE | ONLY REGISTERED TERMINALS |
| OPEN ACCESS MODE | ALL TERMINALS (LIKE NORMAL MACRO CELL) |
| HYBRID ACCESS MODE | ALL TERMINALS<br><br>HOWEVER, MEMBERS (REGISTERED TERMINALS) MAY BE TREATED PREFERENTIALLY OVER NON-MEMBERS (UNREGISTERED TERMINALS) |

FIG. 29

| HANDOVER ROUTE | HANDOVER INTERVAL |
|---|---|
| A⇒B⇒C／C⇒B⇒A | 20 sec |
| A⇒B⇒D／D⇒B⇒A | 6 sec |
| A⇒C⇒B／B⇒C⇒A | 2 sec |
| A⇒C⇒D／D⇒C⇒A | 20 sec |
| A⇒D⇒B／B⇒D⇒A | 8 sec |
| A⇒D⇒C／C⇒D⇒A | 4 sec |
| ⋮ | ⋮ |

FIG. 31

| MODE | CONNECTABLE TERMINALS |
|---|---|
| CLOSED ACCESS MODE | ONLY REGISTERED TERMINALS |
| OPEN ACCESS MODE | ALL TERMINALS (LIKE NORMAL MACRO CELL) |
| HYBRID ACCESS MODE | ALL TERMINALS<br>HOWEVER, MEMBERS (REGISTERED TERMINALS) MAY BE TREATED PREFERENTIALLY OVER NON-MEMBERS (UNREGISTERED TERMINALS) |

FIG. 38

| BASE STATION (CELL) | CELL ID | CARRIER FREQUENCY |
|---|---|---|
| 101A | 1111 | f1 |
| 101B | 2222 | f1 |
| 101C | 3333 | f1 |
| 101D | 4444 | f2 |
| 101E | 5555 | f2 |

FIG. 39

| MEASURED BASE STATION (CELL) | CELL ID | RECEPTION LEVEL |
|---|---|---|
| 101A | 1111 | 10 |
| 101B | 2222 | 8 |
| 101C | 3333 | 3 |
| 101D | 4444 | 4 |

FIG. 40

| RANK | CELL ID | CARRIER FREQUENCY | RECEPTION LEVEL |
|---|---|---|---|
| 1st | 2222 | f1 | 8 |
| 2nd | 4444 | f2 | 4 |
| 3rd | 3333 | f1 | 3 |

FIG. 41

| CELL ID | CARRIER FREQUENCY | RECEPTION LEVEL |
|---------|-------------------|-----------------|
| 2222    | f1                | 8               |
| 4444    | f2                | 4               |

FIG. 45

| MEASUREMENT | DETECTED BASE STATION (CELL) |
|---|---|
| 1st | 101B, 101C, 101D |
| 2nd | 101B, 101C, 101D, 101E |
| 3rd | 101B, 101D |
| 4th | 101B |

FIG. 46

| MEASURED BASE STATION (CELL) | NUMBER OF TIMES OF DETECTION | DETECTION RATE |
|---|---|---|
| 101B | 4 | 1.00 |
| 101C | 2 | 0.50 |
| 101D | 3 | 0.75 |
| 101E | 1 | 0.25 |

FIG. 47

| RANK | CELL ID | CARRIER FREQUENCY | NUMBER OF TIMES OF DETECTION | DETECTION RATE |
|---|---|---|---|---|
| 1st | 2222 | f1 | 4 | 1.00 |
| 2nd | 4444 | f2 | 3 | 0.75 |
| 3rd | 3333 | f1 | 2 | 0.50 |
| 4th | 5555 | f2 | 1 | 0.25 |

FIG. 48

| CELL ID | CARRIER FREQUENCY | NUMBER OF TIMES OF DETECTION | DETECTION RATE |
|---|---|---|---|
| 2222 | f1 | 4 | 1.00 |
| 4444 | f2 | 3 | 0.75 |
| 3333 | f1 | 2 | 0.50 |

FIG. 49

| MEASUREMENT | MEASUREMENT TIME | DETECTED BASE STATION (CELL) |
|---|---|---|
| 1st | 2010/6/14 15:12 | 101B, 101C, 101D |
| 2nd | 2010/6/14 23:50 | 101B, 101C, 101D, 101E |
| 3rd | 2010/6/15 06:30 | 101B, 101D |
| 4th | 2010/6/15 16:20 | 101B |

FIG. 50

| RANK | CELL ID | LAST DETECTION TIME | ELAPSED TIME |
|---|---|---|---|
| 1st | 2222 | 2010/6/15 16:20 | 00:00 |
| 2nd | 4444 | 2010/6/15 06:30 | 09:50 |
| 3rd | 3333 | 2010/6/14 23:50 | 16:30 |
| 4th | 5555 | 2010/6/14 23:50 | 16:30 |

FIG. 51

| CELL ID | LAST DETECTION TIME | ELAPSED TIME |
|---|---|---|
| 2222 | 2010/6/15 16:20 | 00:00 |
| 4444 | 2010/6/15 06:30 | 09:50 |

FIG. 56

| MODE | CONNECTABLE TERMINALS |
|---|---|
| CLOSED ACCESS MODE | ONLY REGISTERED TERMINALS |
| OPEN ACCESS MODE | ALL TERMINALS (LIKE NORMAL MACRO CELL) |
| HYBRID ACCESS MODE | ALL TERMINALS<br><br>HOWEVER, MEMBERS (REGISTERED TERMINALS) MAY BE TREATED PREFERENTIALLY OVER NON-MEMBERS (UNREGISTERED TERMINALS) |

FIG. 59

| BASE STATION | CELL ID | CELL MODE | ACCESS MODE | CSG ID | CARRIER FREQUENCY | RAT |
|---|---|---|---|---|---|---|
| 101A | 1111 | FEMTO | CLOSED | 8888 | f1 | LTE |
| 101B | 2222 | MACRO | — | — | f1 | LTE |
| 101C | 3333 | FEMTO | HYBRID | 8888 | f1 | LTE |
| 101D | 4444 | FEMTO | CLOSED | 8888 | f3 | LTE |
| 101E | 5555 | FEMTO | OPEN | — | f2 | W-CDMA |
| 101F | 6666 | FEMTO | HYBRID | 9999 | f3 | LTE |
| 101G | 7777 | MACRO | — | — | f2 | W-CDMA |

FIG. 64

| BASE STATION | CELL ID | CELL MODE |
|---|---|---|
| 101B | 2222 | MACRO |
| 101C | 3333 | FEMTO |
| 101D | 4444 | FEMTO |
| 101E | 5555 | FEMTO |
| 101F | 6666 | FEMTO |
| 101G | 7777 | MACRO |

FIG. 65

| RANK | BASE STATION | CELL ID | CELL MODE |
|---|---|---|---|
| 1st | 101B | 2222 | MACRO |
| 1st | 101G | 7777 | MACRO |
| 2nd | 101C | 3333 | FEMTO |
| 2nd | 101D | 4444 | FEMTO |
| 2nd | 101E | 5555 | FEMTO |
| 2nd | 101F | 6666 | FEMTO |

FIG. 66

| RANK | BASE STATION | CELL ID | CELL MODE |
|---|---|---|---|
| 1st | 101B | 2222 | MACRO |
| 1st | 101G | 7777 | MACRO |

*FIG. 67*

| BASE STATION | CELL ID | CELL MODE |
|---|---|---|
| 101B | 2222 | MACRO |
| 101G | 7777 | MACRO |

FIG. 71

| BASE STATION | CELL ID | CELL MODE | ACCESS MODE |
|---|---|---|---|
| 101B | 2222 | MACRO | — |
| 101C | 3333 | FEMTO | HYBRID |
| 101D | 4444 | FEMTO | CLOSED |
| 101E | 5555 | FEMTO | OPEN |
| 101F | 6666 | FEMTO | HYBRID |
| 101G | 7777 | MACRO | — |

FIG. 72

| RANK | BASE STATION | CELL ID | CELL MODE | ACCESS MODE |
|---|---|---|---|---|
| 1st | 101B | 2222 | MACRO | — |
| 1st | 101G | 7777 | MACRO | — |
| 2nd | 101E | 5555 | FEMTO | OPEN |
| 3rd | 101C | 3333 | FEMTO | HYBRID |
| 3rd | 101F | 6666 | FEMTO | HYBRID |
| 4th | 101D | 4444 | FEMTO | CLOSED |

FIG. 73

| RANK | BASE STATION | CELL ID | CELL MODE | ACCESS MODE |
|---|---|---|---|---|
| 1st | 101B | 2222 | MACRO | — |
| 1st | 101G | 7777 | MACRO | — |
| 2nd | 101E | 5555 | FEMTO | OPEN |

FIG. 74

| BASE STATION | CELL ID | CELL MODE | ACCESS MODE |
|---|---|---|---|
| 101B | 2222 | MACRO | — |
| 101C | 3333 | FEMTO | HYBRID |
| 101E | 5555 | FEMTO | OPEN |
| 101F | 6666 | FEMTO | HYBRID |
| 101G | 7777 | MACRO | — |

FIG. 75

| BASE STATION | CELL ID | CELL MODE | ACCESS MODE | CSG ID |
|---|---|---|---|---|
| 101A | 1111 | FEMTO | CLOSED | 8888 |
| 101B | 2222 | MACRO | - | - |
| 101C | 3333 | FEMTO | HYBRID | 8888 |
| 101D | 4444 | FEMTO | CLOSED | 8888 |
| 101E | 5555 | FEMTO | OPEN | - |
| 101F | 6666 | FEMTO | HYBRID | 9999 |
| 101G | 7777 | MACRO | - | - |

FIG. 76

| RANK | BASE STATION | CELL ID | CELL MODE | ACCESS MODE | CSG ID |
|------|--------------|---------|-----------|-------------|--------|
| 1st  | 101D         | 4444    | FEMTO     | CLOSED      | 8888   |
| 2nd  | 101C         | 3333    | FEMTO     | HYBRID      | 8888   |
| 3rd  | 101B         | 2222    | MACRO     | —           | —      |
| 3rd  | 101G         | 7777    | MACRO     | —           | —      |
| 5th  | 101E         | 5555    | FEMTO     | OPEN        | —      |
| 6th  | 101F         | 6666    | FEMTO     | HYBRID      | 9999   |

FIG. 77

| RANK | BASE STATION | CELL ID | CELL MODE | ACCESS MODE | CSG ID |
|---|---|---|---|---|---|
| 1st | 101D | 4444 | FEMTO | CLOSED | 8888 |
| 2nd | 101C | 3333 | FEMTO | HYBRID | 8888 |
| 3rd | 101B | 2222 | MACRO | — | — |
| 3rd | 101G | 7777 | MACRO | — | — |

FIG. 78

| BASE STATION | CELL ID | CELL MODE | ACCESS MODE | CSG ID |
|---|---|---|---|---|
| 101B | 2222 | MACRO | — | — |
| 101C | 3333 | FEMTO | HYBRID | 8888 |
| 101D | 4444 | FEMTO | CLOSED | 8888 |
| 101E | 5555 | FEMTO | OPEN | — |
| 101G | 7777 | MACRO | — | — |

FIG. 79

| BASE STATION | CELL ID | CARRIER FREQUENCY |
|---|---|---|
| 101A | 1111 | f1 |
| 101B | 2222 | f1 |
| 101C | 3333 | f1 |
| 101D | 4444 | f3 |
| 101E | 5555 | f2 |
| 101F | 6666 | f3 |
| 101G | 7777 | f2 |

FIG. 80

| RANK | BASE STATION | CELL ID | CARRIER FREQUENCY |
|---|---|---|---|
| 1st | 101D | 4444 | f3 |
| 1st | 101F | 6666 | f3 |
| 3rd | 101E | 5555 | f2 |
| 3rd | 101G | 7777 | f2 |
| 5th | 101B | 2222 | f1 |
| 5th | 101C | 3333 | f1 |

FIG. 81

| RANK | BASE STATION | CELL ID | CARRIER FREQUENCY |
|---|---|---|---|
| 1st | 101D | 4444 | f3 |
| 1st | 101F | 6666 | f3 |

FIG. 82

| BASE STATION | CELL ID | CARRIER FREQUENCY |
|---|---|---|
| 101D | 4444 | f3 |
| 101E | 5555 | f2 |
| 101F | 6666 | f3 |
| 101G | 7777 | f2 |

FIG. 83

| RANK | BASE STATION | CELL ID | CARRIER FREQUENCY |
|---|---|---|---|
| 1st | 101B | 2222 | f1 |
| 1st | 101C | 3333 | f1 |
| 3rd | 101E | 5555 | f2 |
| 3rd | 101G | 7777 | f2 |
| 5th | 101D | 4444 | f3 |
| 5th | 101F | 6666 | f3 |

FIG. 84

| RANK | BASE STATION | CELL ID | CARRIER FREQUENCY |
|---|---|---|---|
| 1st | 101B | 2222 | f1 |
| 1st | 101C | 3333 | f1 |

FIG. 85

| BASE STATION | CELL ID | CARRIER FREQUENCY |
|---|---|---|
| 101B | 2222 | f1 |
| 101C | 3333 | f1 |

FIG. 86

| BASE STATION | CELL ID | RAT |
|---|---|---|
| 101A | 1111 | LTE |
| 101B | 2222 | LTE |
| 101C | 3333 | LTE |
| 101D | 4444 | LTE |
| 101E | 5555 | W-CDMA |
| 101F | 6666 | LTE |
| 101G | 7777 | W-CDMA |

FIG. 87

| RANK | BASE STATION | CELL ID | RAT |
|---|---|---|---|
| 1st | 101B | 2222 | LTE |
| 1st | 101C | 3333 | LTE |
| 1st | 101D | 4444 | LTE |
| 1st | 101F | 6666 | LTE |
| 5th | 101E | 5555 | W-CDMA |
| 5th | 101G | 7777 | W-CDMA |

FIG. 88

| RANK | BASE STATION | CELL ID | RAT |
|------|--------------|---------|-----|
| 1st  | 101B         | 2222    | LTE |
| 1st  | 101C         | 3333    | LTE |
| 1st  | 101D         | 4444    | LTE |
| 1st  | 101F         | 6666    | LTE |

FIG. 89

| BASE STATION | CELL ID | RAT |
|---|---|---|
| 101B | 2222 | LTE |
| 101C | 3333 | LTE |
| 101D | 4444 | LTE |
| 101F | 6666 | LTE |

FIG. 94

| MODE | CONNECTABLE TERMINALS |
|---|---|
| CLOSED ACCESS MODE | ONLY REGISTERED TERMINALS |
| OPEN ACCESS MODE | ALL TERMINALS (LIKE NORMAL MACRO CELL) |
| HYBRID ACCESS MODE | ALL TERMINALS<br><br>HOWEVER, MEMBERS (REGISTERED TERMINALS) MAY BE TREATED PREFERENTIALLY OVER NON-MEMBERS (UNREGISTERED TERMINALS) |

FIG. 97

| BASE STATION | CELL ID | ACCESS MODE | CSG ID |
|---|---|---|---|
| 101A | 1111 | HYBRID | 7777 |
| 101B | 2222 | (MACRO) | — |
| 101C | 3333 | OPEN | — |
| 101D | 4444 | HYBRID | 8888 |
| 101E | 5555 | CLOSED | 8888 |

FIG. 102

| BASE STATION | CELL ID | ACCESS MODE | CSG ID |
|---|---|---|---|
| 101B | 2222 | (MACRO) | — |
| 101C | 3333 | OPEN | — |
| 101E | 5555 | CLOSED | 8888 |

FIG. 103

| BASE STATION | CELL ID | ACCESS MODE | CSG ID |
|---|---|---|---|
| 101B | 2222 | (MACRO) | — |
| 101D | 4444 | HYBRID | 8888 |
| 101E | 5555 | CLOSED | 8888 |

FIG. 104

| BASE STATION | CELL ID | ACCESS MODE | CSG ID |
|---|---|---|---|
| 101B | 2222 | (MACRO) | — |
| 101C | 3333 | OPEN | — |
| 101D | 4444 | HYBRID | 8888 |
| 101E | 5555 | CLOSED | 8888 |

FIG. 107

| BASE STATION | CELL ID | ACCESS MODE | CSG ID |
|---|---|---|---|
| 101B | 2222 | (MACRO) | — |
| 101D | 4444 | HYBRID | 8888 |

FIG. 108

| BASE STATION | CELL ID | ACCESS MODE | CSG ID |
|---|---|---|---|
| 101E | 5555 | CLOSED | 8888 |
| 101B | 2222 | (MACRO) | — |
| 101C | 3333 | OPEN | — |

FIG. 109

| BASE STATION | CELL ID | ACCESS MODE | CSG ID |
|---|---|---|---|
| 101B | 2222 | (MACRO) | — |
| 101C | 3333 | OPEN | — |
| 101D | 4444 | HYBRID | 8888 |
| 101E | 5555 | CLOSED | 8888 |

FIG. 114

| MODE | CONNECTABLE TERMINALS |
|---|---|
| CLOSED ACCESS MODE | ONLY REGISTERED TERMINALS |
| OPEN ACCESS MODE | ALL TERMINALS (LIKE NORMAL MACRO CELL) |
| HYBRID ACCESS MODE | ALL TERMINALS<br><br>HOWEVER, MEMBERS (REGISTERED TERMINALS) MAY BE TREATED PREFERENTIALLY OVER NON-MEMBERS (UNREGISTERED TERMINALS) |

FIG. 118

| MACRO BASE STATION | FEMTO BASE STATION ||| TERMINAL ||
|---|---|---|---|---|---|
| ID | ID | POWER | ACCESS MODE | ID | WITHIN COVERAGE AREA |
| 1111 | 111 | ON | CLOSED | 123 | ○ |
| | | | | 234 | × |
| | 222 | OFF | CLOSED | 123 | ○ |
| | | | | 345 | ○ |
| | 333 | ON | OPEN | — | — |
| | 444 | ON | CLOSED | 345 | ○ |
| | | | | 567 | × |

FIG. 119

NEIGHBORING CELL INFORMATION TO TERMINAL 202A

| CELL ID |
|---------|
| 111 |
| 333 |

FIG. 120

NEIGHBORING CELL INFORMATION TO TERMINAL 202B

| CELL ID |
|---------|
| 333 |
| 444 |

FIG. 124

| MESSAGE | CONTENT |
|---|---|
| POWER STATE NOTIFICATION | START-UP OR END (FROM POWER-OFF TO POWER-ON, FROM POWER-ON TO POWER-OFF) |

FIG. 125

| MESSAGE | CONTENT |
|---|---|
| POWER STATE NOTIFICATION REQUEST | PRESENCE/ABSENCE OF POWER STATE NOTIFICATION REQUEST |

FIG. 126

| MESSAGE | CONTENT |
|---|---|
| POWER STATE | POWER STATE NOTIFICATION (START-UP, END, POWER-ON, POWER-OFF) |

FIG. 127

| MESSAGE | CONTENT |
|---|---|
| POWER STATE | POWER STATE NOTIFICATION |
| LOAD STATUS | LOAD STATUS OF BASE STATION (HIGH, MEDIUM, LOW) |
| NUMBER-OF-COMMUNICATING TERMINALS | NUMBER OF COMMUNICATING TERMINALS |

FIG. 128

| MESSAGE | CONTENT |
|---|---|
| TRANSMISSION SOURCE BASE STATION IDENTIFIER | CELL GLOBAL ID etc. |
| TRANSMISSION DESTINATION BASE STATION LIST | LIST OF TRANSMISSION DESTINATION IDENTIFIERS |
| > TRANSMISSION DESTINATION BASE STATION IDENTIFIER | CELL GLOBAL ID etc. |
| POWER STATE NOTIFICATION | IDENTIFY START-UP OR END |

FIG. 129

| MESSAGE | CONTENT |
|---|---|
| TRANSMISSION SOURCE BASE STATION IDENTIFIER | CELL GLOBAL ID etc. |
| TRANSMISSION DESTINATION BASE STATION LIST | LIST OF TRANSMISSION DESTINATION IDENTIFIERS |
| > TRANSMISSION DESTINATION BASE STATION IDENTIFIER | CELL GLOBAL ID etc. |
| POWER STATE NOTIFICATION REQUEST | PRESENCE/ABSENCE OF POWER STATE NOTIFICATION |

FIG. 130

| MESSAGE | CONTENT |
|---|---|
| TRANSMISSION SOURCE BASE STATION IDENTIFIER | CELL GLOBAL ID etc. |
| TRANSMISSION DESTINATION BASE STATION IDENTIFIER | CELL GLOBAL ID etc. |
| POWER STATE | POWER STATE NOTIFICATION (START-UP, END, POWER-ON, POWER-OFF) |

FIG. 131

| MESSAGE | CONTENT |
|---|---|
| TRANSMISSION SOURCE BASE STATION IDENTIFIER | CELL GLOBAL ID etc. |
| TRANSMISSION DESTINATION BASE STATION IDENTIFIER | CELL GLOBAL ID etc. |
| POWER STATE | POWER STATE NOTIFICATION |
| LOAD STATUS | LOAD STATUS OF BASE STATION (HIGH, MEDIUM, LOW) |
| NUMBER-OF-COMMUNICATING TERMINALS | NUMBER OF COMMUNICATING TERMINALS |

FIG. 132

| MESSAGE | CONTENT |
|---|---|
| LIST OF BASE STATIONS | LIST OF BASE STATIONS |
| > BASE STATION IDENTIFIER | CELL GLOBAL ID etc. |
| > POWER STATE | POWER STATE NOTIFICATION |
| > LOAD STATUS | LOAD STATUS OF BASE STATION (HIGH, MEDIUM, LOW) |
| > NUMBER-OF-COMMUNICATING TERMINALS | NUMBER OF COMMUNICATING TERMINALS |

FIG. 134

TOTAL NEIGHBORING CELL INFORMATION

| CELL ID |
|---------|
| 111 |
| 333 |
| 444 |

NEIGHBORING CELL PROCESSING DEVICE, WIRELESS BASE STATION DEVICE, NEIGHBORING CELL PROCESSING METHOD AND DATA STRUCTURE

TECHNICAL FIELD

The present invention relates to neighboring cell processing devices, wireless base station devices, neighboring cell processing methods, and data structures. More particularly, the present invention relates to neighboring cell processing devices, wireless base station devices, neighboring cell processing methods, and data structures in a communication system in which wireless terminal devices perform movement operations to communicate with a plurality of wireless base station devices.

BACKGROUND ART

<Background Art 1>

In conventional mobile communication systems, communication services have been provided by wireless base station devices (hereinafter also referred to as macro base stations) each forming a cell having a radius ranging from several hundreds of meters to several tens of kilometers, i.e., an area in which wireless terminal devices are allowed to communicate with the wireless base station device.

In recent years, with a dramatic increase in the number of subscribers of mobile communication services and an increase in communication traffic due to data communication, it is desired to distribute the subscribers and the communication traffic over cells of smaller radii, and to reliably provide the users with a certain level of communication speed. Further, as a countermeasure against dead zones caused by skyscrapers, it is desired to install wireless base station devices in office floors and ordinary households.

In association with these requirements, downsizing of wireless base station devices has progressed due to remarkable improvement in throughput of various devices used in the wireless base station devices, and downsized base stations have attracted attention.

Such small-size base stations (hereinafter also referred to as "femto base stations") form femto cells. Since the radius of each femto cell is as small as about 10 meters, it is considered that the femto base stations are used in places, such as homes and underground malls, which are outside macro cells foamed by macro base stations and where it is difficult to install macro base stations.

Further, since a large number of femto base stations are installed in a specific area, it is difficult to connect the femto base stations directly to a core network. Therefore, it is considered that a large number of femto base stations installed in a specific area are connected to a gateway device such as a HeNB-GW, and then the femto base stations are connected to the core network via the HeNB-GW.

In the above configuration, when installing femto base stations, if configuration of each femto base station is performed by a telecommunication carrier or a purchaser of the femto base station, considerable labor and cost are required. Further, every time a new femto base station is installed and thereby the number of femto base stations increases, not only configuration of the newly installed femto base station but also reconfiguration of already-installed neighboring femto base stations need to be performed.

In order to solve the above problems, for example, Patent Literature 1 disclosed technique as follows. That is, a new cell measures signal intensities of different channels used by already-existing cells. Then, the new cell forms a list of candidate channels corresponding to channels having relatively high signal intensities, and transmits this list to a mobile switching center of a cellular network. The mobile switching center determines which candidate channels correspond to beacons used in the existing cells, and transmits, to the new cell, configuration information relating to the existing cells. Then, the new cell automatically receives the configuration information relating to the neighboring cells. If the mobile switching center determines that none of the identified neighbors (neighboring cells) reaches a maximum value N, the mobile switching center requests the new cell to transmit an additional candidate channel (i.e., a candidate channel having a lower signal intensity).

<Background Art 2>

In conventional mobile communication systems, communication services have been provided by wireless base station devices (hereinafter also referred to as macro base stations) each forming a cell having a radius ranging from several hundreds of meters to several tens of kilometers, i.e., an area in which wireless terminal devices are allowed to communicate with the wireless base station device.

In recent years, with a dramatic increase in the number of subscribers of mobile communication services and an increase in communication traffic due to data communication, it is desired to distribute the subscribers and the communication traffic over cells of smaller radii, and to reliably provide the users with a certain level of communication speed. Further, as a countermeasure against dead zones caused by skyscrapers, it is desired to install wireless base station devices in office floors and ordinary households.

In association with these requirements, downsizing of wireless base station devices has progressed due to remarkable improvement in throughput of various devices used in the wireless base station devices, and downsized base stations have attracted attention.

Such small base stations (hereinafter also referred to as "femto base stations") form femto cells. Since the radius of each femto cell is as small as about 10 meters, it is considered that the femto base stations are used in places, such as homes and underground malls, which are outside macro cells formed by macro base stations and where it is difficult to install macro base stations.

Further, since a large number of femto base stations are installed in a specific area, it is difficult to connect the femto base stations directly to a core network. Therefore, it is considered that a large number of femto base stations installed in a specific area are connected to a gateway device such as a HeNB-GW, and then the femto base stations are connected to the core network via the HeNB-GW.

In the above configuration, when installing femto base stations, if configuration of each femto base station is performed by a telecommunication carrier or a purchaser of the femto base station, considerable labor and cost are required. Further, every time a new femto base station is installed and thereby the number of femto base stations increases, not only configuration of the newly installed femto base station but also reconfiguration of already-installed neighboring femto base stations need to be performed.

In order to solve the above problems, for example, Patent Literature 1 discloses a technique as follows. That is, a new cell measures signal intensities of different channels used by already-existing cells. Then, the new cell forms a list of candidate channels corresponding to channels having relatively high signal intensities, and transmits this list to a mobile switching center of a cellular network. The mobile switching center determines which candidate channels correspond to beacons used in the existing cells, and transmits, to the new cell, configuration information relating to the existing cells. Then, the new cell automatically receives the configuration information relating to the neighboring cells. If the mobile switching center determines that none of the identified neighbors (neighboring cells) reaches a maximum value N, the mobile switching center requests the new cell to transmit an additional candidate channel (i.e., a candidate channel having a lower signal intensity).

<Background Art 3>

In conventional mobile communication systems, communication services have been provided by wireless base station devices (hereinafter also referred to as macro base stations) each forming a cell having a radius ranging from several hundreds of meters to several tens of kilometers, i.e., an area in which wireless terminal devices are allowed to communicate with the wireless base station device.

In recent years, with a dramatic increase in the number of subscribers of mobile communication services and an increase in communication traffic due to data communication, it is desired to distribute the subscribers and the communication traffic over cells of smaller radii, and to reliably provide the users with a certain level of communication speed. Further, as a countermeasure against dead zones caused by skyscrapers, it is desired to install wireless base station devices in office floors and ordinary households.

In association with these requirements, downsizing of wireless base station devices has progressed due to remarkable improvement in throughput of various devices used in the wireless base station devices, and downsized base stations have attracted attention.

Such small base stations (hereinafter also referred to as "femto base stations") form femto cells. Since the radius of each femto cell is as small as about 10 meters, it is considered that the femto base stations are used in places, such as homes and underground malls, which are outside macro cells formed by macro base stations and where it is difficult to install macro base stations.

Further, since a large number of femto base stations are installed in a specific area, it is difficult to connect the femto base stations directly to a core network. Therefore, it is considered that a large number of femto base stations installed in a specific area are connected to a gateway device such as a HeNB-GW, and then the femto base stations are connected to the core network via the HeNB-GW.

In the above configuration, when installing femto base stations, if configuration of each femto base station is performed by a telecommunication carrier or a purchaser of the femto base station, considerable labor and cost are required. Further, every time a new femto base station is installed and thereby the number of femto base stations increases, not only configuration of the newly installed femto base station but also reconfiguration of already-installed neighboring femto base stations need to be performed.

In order to solve the above problems, for example, Patent Literature 1 discloses a technique as follows. That is, a new cell measures signal intensities of different channels used by already-existing cells. Then, the new cell forms a list of candidate channels corresponding to channels having relatively high signal intensities, and transmits this list to a mobile switching center of a cellular network. The mobile switching center determines which candidate channels correspond to beacons used in the existing cells, and transmits, to the new cell, configuration information relating to the existing cells. Then, the new cell automatically receives the configuration information relating to the neighboring cells. If the mobile switching center determines that none of the identified neighbors (neighboring cells) reaches a maximum value N, the mobile switching center requests the new cell to transmit an additional candidate channel (i.e., a candidate channel having a lower signal intensity).

<Background Art 4>

In conventional mobile communication systems, communication services have been provided by wireless base station devices (hereinafter also referred to as macro base stations) each forming a cell having a radius ranging from several hundreds of meters to several tens of kilometers, i.e., an area in which wireless terminal devices are allowed to communicate with the wireless base station device.

In recent years, with a dramatic increase in the number of subscribers of mobile communication services and an increase in communication traffic due to data communication, it is desired to distribute the subscribers and the communication traffic over cells of smaller radii, and to reliably provide the users with a certain level of communication speed. Further, as a countermeasure against dead zones caused by skyscrapers, it is desired to install wireless base station devices in office floors and ordinary households.

In association with these requirements, downsizing of wireless base station devices has progressed due to remarkable improvement in throughput of various devices used in the wireless base station devices, and downsized base stations have attracted attention.

Such small base stations (hereinafter also referred to as "femto base stations") form femto cells. Since the radius of each femto cell is as small as about 10 meters, it is considered that the femto base stations are used in places, such as homes and underground malls, which are outside macro cells formed by macro base stations and where it is difficult to install macro base stations.

Further, since a large number of femto base stations are installed in a specific area, it is difficult to connect the femto base stations directly to a core network. Therefore, it is considered that a large number of femto base stations installed in a specific area are connected to a gateway device such as a HeNB-GW, and then the femto base stations are connected to the core network via the HeNB-GW.

In the above configuration, when installing femto base stations, if configuration of each femto base station is performed by a telecommunication carrier or a purchaser of the femto base station, considerable labor and cost are required. Further, every time a new femto base station is installed and thereby the number of femto base stations increases, not only configuration of the newly installed femto base station but also reconfiguration of already-installed neighboring femto base stations need to be performed.

In order to solve the above problems, for example, Patent Literature 1 discloses a technique as follows. That is, a new cell measures signal intensities of different channels used by already-existing cells. Then, the new cell forms a list of candidate channels corresponding to channels having relatively high signal intensities, and transmits this list to a mobile switching center of a cellular network. The mobile switching center determines which candidate channels correspond to beacons used in the existing cells, and transmits, to the new cell, configuration information relating to the existing cells. Then, the new cell automatically receives the configuration information relating to the neighboring cells. If the mobile switching center determines that none of the identified neighbors (neighboring cells) reaches a maximum value N, the mobile switching center requests the new cell to transmit an additional candidate channel (i.e., a candidate channel having a lower signal intensity).

<Background Art 5>

In conventional mobile communication systems, communication services have been provided by wireless base station devices (hereinafter also referred to as macro base stations) each forming a cell having a radius ranging from several hundreds of meters to several tens of kilometers, i.e., an area in which wireless terminal devices are allowed to communicate with the wireless base station device.

In recent years, with a dramatic increase in the number of subscribers of mobile communication services and an increase in communication traffic due to data communication, it is desired to distribute the subscribers and the communication traffic over cells of smaller radii, and to reliably provide the users with a certain level of communication speed. Further, as a countermeasure against dead zones caused by skyscrapers, it is desired to install wireless base station devices in office floors and ordinary households.

In association with these requirements, downsizing of wireless base station devices has progressed due to remarkable improvement in throughput of various devices used in the wireless base station devices, and downsized base stations have attracted attention.

Such small base stations (hereinafter also referred to as "femto base stations") form femto cells. Since the radius of each femto cell is as small as about 10 meters, it is considered that the femto base stations are used in places, such as homes and underground malls, which are outside macro cells formed by macro base stations and where it is difficult to install macro base stations.

Further, since a large number of femto base stations are installed in a specific area, it is difficult to connect the femto base stations directly to a core network. Therefore, it is considered that a large number of femto base stations installed in a specific area are connected to a gateway device such as a HeNB-GW, and then the femto base stations are connected to the core network via the HeNB-GW.

In the above configuration, when installing femto base stations, if configuration of each femto base station is performed by a telecommunication carrier or a purchaser of the femto base station, considerable labor and cost are required. Further, every time a new femto base station is installed and thereby the number of femto base stations increases, not only configuration of the newly installed femto base station but also reconfiguration of already-installed neighboring femto base stations need to be performed.

In order to solve the above problems, for example, Patent Literature 1 discloses a technique as follows. That is, a new cell measures signal intensities of different channels used by already-existing cells. Then, the new cell forms a list of candidate channels corresponding to channels having relatively high signal intensities, and transmits this list to a mobile switching center of a cellular network. The mobile switching center determines which candidate channels correspond to beacons used in the existing cells, and transmits, to the new cell, configuration information relating to the existing cells. Then, the new cell automatically receives the configuration information relating to the neighboring cells. If the mobile switching center determines that none of the identified neighbors (neighboring cells) reaches a maximum value N, the mobile switching center requests the new cell to transmit an additional candidate channel (i.e., a candidate channel having a lower signal intensity).

CITATION LIST

Patent Literature

[PTL 1] Japanese Laid-Open Patent Publication No. 11-331931

SUMMARY OF THE INVENTION

Problems to be Solved by the Invention

<Problem 1>

Regarding <Background Art 1>, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from femto base stations registered in the neighboring cell information, autonomously or according to an indication from a femto base station, and notifies the femto base station of the result of the measurement. In this case, if a femto base station that is not suitable as a handover destination is registered in the neighboring cell information, the wireless terminal device performs an unnecessary measurement operation, and unnecessary handover occurs.

The present invention is made to solve the above Problem 1, and an object of the present invention is to provide a neighboring cell processing device, a wireless base station device, and a neighboring cell processing method, which allow generation of appropriate neighboring cell information, and thereby realize efficient operation in a wireless communication system.

<Problem 2>

Regarding <Background Art 2>, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from femto base stations registered in the neighboring cell information, autonomously or according to an indication from a femto base station, and notifies the femto base station of the result of the measurement. In this case, if a femto base station that is not suitable as a handover destination is registered in the neighboring cell information, the wireless terminal device performs an unnecessary measurement operation, and unnecessary handover occurs.

The present invention is made to solve the above Problem 2, and an object of the present invention is to provide a neighboring cell processing device, a wireless base station device, and a neighboring cell processing method, which allow generation of appropriate neighboring cell information, and thereby realize efficient operation in a wireless communication system.

<Problem 3>

Regarding <Background Art 3>, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from femto base stations registered in the neighboring cell information, autonomously or according to an indication from a femto base station, and notifies the femto base station of the result of the measurement. In this case, if a femto base station that is not suitable as a handover destination is registered in the neighboring cell information, the wireless terminal device performs an unnecessary measurement operation, and unnecessary handover occurs.

The present invention is made to solve the above Problem 3, and an object of the present invention is to provide a neighboring cell processing device, a wireless base station device, and a neighboring cell processing method, which allow generation of appropriate neighboring cell information, and thereby realize efficient operation in a wireless communication system.

<Problem 4>

Regarding <Background Art 4>, in the mobile communication system, for example, based on neighboring cell information in which one or a plurality of wireless base station devices are registered, a wireless terminal device measures the reception powers of radio signals transmitted from the wireless base station devices registered in the neighboring cell information, autonomously or according to an indication from a wireless base station device, and notifies the wireless base station device of the measurement result. In this case, if a wireless base station device that is not suitable as a handover destination is registered in the neighboring cell information, the wireless terminal device performs an unnecessary measurement operation, and unnecessary handover occurs.

The present invention is made to solve the above Problem 4, and an object of the present invention is to provide a neighboring cell processing device, a wireless base station device, and a neighboring cell processing method, which allow generation of appropriate neighboring cell information, and thereby realize efficient operation in a wireless communication system.

<Problem 5>

Regarding <Background Art 5>, a femto base station operates in any of open, hybrid, and closed access modes, for example. When the femto base station operates in the closed access mode, only registered members (terminals) are allowed to access the femto base station. When the femto base station operates in the closed access mode, the femto base station provides services to only the registered members. When the femto base station operates in the hybrid mode, the femto base station provides services to both the registered members and unregistered members (non-members). When the femto base station operates in the open access mode, the femto base station operates in the same manner as a macro base station.

Meanwhile, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from femto base stations registered in the neighboring cell information, autonomously or according to an indication from a femto base station, and notifies the femto base station of the result of the measurement. In this case, if a femto base station which is not suitable as a handover destination, such as a femto base station in the closed access mode in which the wireless terminal device is not registered, or a femto base station which is powered off, is registered in the neighboring cell information, the wireless terminal device performs an unnecessary measurement operation, and unnecessary handover occurs.

The present invention is made to solve the above Problem 5, and an object of the present invention is to provide a neighboring cell processing device, a wireless base station device, a neighboring cell processing method, and a data structure, which allow generation of appropriate neighboring cell information, and thereby realize efficient operation in a wireless communication system.

Solution to the Problems (1-1) In order to solve the above problem 1, the present invention relates to a neighboring cell processing device in a communication system in which wireless terminal devices are communicable with a plurality of wireless base station devices by performing movement operation, and the neighboring cell processing device includes: a movement information acquisition unit for acquiring movement information indicating a movement operation history of the wireless terminal devices, based on information from at least either of the wireless terminal devices or the wireless base station devices; a neighboring cell information generation unit for generating, based on the movement info, nation acquired by the movement information acquisition unit, neighboring cell information indicating one or a plurality of wireless base station devices located in the neighborhood of a target wireless base station device, among a plurality of wireless base station devices other than the target wireless base station device; and a neighboring cell information transmission unit for transmitting the neighboring cell information generated by the neighboring cell information generation unit, to the target wireless base station device or to wireless terminal devices communicable with the target wireless base station device.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

The "movement" of a wireless terminal device in the present invention includes not only handover which is an inter-base-station movement (inter-cell movement) operation performed by a wireless terminal device communicating with a wireless base station device but also an inter-base-station movement (inter-cell movement) operation performed by a wireless terminal device in the idle state.

(1-2) Preferably, the neighboring cell information generation unit ranks the plurality of wireless base station devices other than the target wireless base station device, based on the movement information acquired by the movement information acquisition unit, and generates neighboring cell information based on a result of the ranking.

This configuration allows generation of detailed neighboring cell information, and achieves further improvement in the efficiency of operation in the wireless communication system. For example, by preferentially selecting, as a destination of movement, a higher-rank wireless base station device in the ranking, the success rate of the movement operation can be increased.

(1-3) More preferably, the neighboring cell information generation unit generates neighboring cell information which indicates N (N: integer not smaller than 1) wireless base station devices from the highest rank among the ranked wireless base station devices.

In this configuration, for example, when the number of wireless base station devices that can be included in the neighboring cell information to be notified to the wireless terminal devices is limited, it is possible to notify the wireless terminal devices of appropriate neighboring cell information by including N wireless base station devices in the neighboring cell information.

(1-4) More preferably, the neighboring cell information generation unit generates neighboring cell information which further indicates the ranking of the ranked wireless base station devices.

This configuration allows generation of more detailed neighboring cell information, and achieves further improvement in the efficiency of operation in the wireless communication system. For example, based on the ranking of the wireless base station devices in the neighboring cell information, a wireless base station device performs determination of measurement order, selection of wireless base station devices as measurement targets, and the like, thereby realizing efficient measurement operation.

(1-5) Preferably, the neighboring cell information generation unit generates neighboring cell information which indicates one or a plurality of wireless base station devices to be candidate(s) for a destination of movement of a wireless terminal device communicating with the target wireless base station device, among the plurality of wireless base station devices other than the target wireless base station device.

This configuration causes the movement operation in a cell of an installed wireless base station device to be in the optimum state. Further, by performing optimization of the neighboring cell information, the number of neighboring cells to be candidates for a destination of movement of a wireless terminal device during communication can be reduced, thereby avoiding occurrence of unnecessary movement operation.

(1-6) Preferably, the neighboring cell information generation unit generates neighboring cell information which indicates one or a plurality of wireless base station devices to be target(s) of measurement by the wireless terminal devices, among the plurality of wireless base station devices other than the target wireless base station device.

In this way, by performing optimization of the neighboring cell information, the number of neighboring cells to be the targets of measurement by the wireless terminal devices can be reduced, thereby preventing the wireless terminal devices from performing unnecessary measurement operations.

(1-7) Preferably, the neighboring cell information generation unit generates neighboring cell information which indicates one or a plurality of wireless base station devices which transmit radio signal(s) whose reception level(s) are to be measured by the wireless terminal devices, among the plurality of wireless base station devices other than the wireless base station device.

In this way, by performing optimization of the neighboring cell information, the number of neighboring cells to be the targets of reception level measurement by the wireless terminal devices can be reduced, thereby preventing the wireless terminal devices from performing unnecessary measurement operations.

(1-8) More preferably, the neighboring cell information generation unit generates neighboring cell information which indicates one or a plurality of wireless base station devices which transmit radio signal(s) whose reception level(s) are to be measured by a wireless terminal device not communicating with the target wireless base station device, among the plurality of wireless base station devices other than the target wireless base station device.

This configuration reduces the number of neighboring cells to be the targets of periodical power measurement instructed by broadcast information or the like from a wireless base station device, thereby preventing each wireless terminal device from performing unnecessary measurement operation. In particular, power consumption of a wireless terminal device in the idle state can be reduced, resulting in remarkable effects.

(1-9) More preferably, the neighboring cell information generation unit generates initial neighboring cell information, based on a result of measurement in which a wireless terminal device communicating with the target wireless base station device has measured, in a plurality of frequencies, the reception levels of the radio signals transmitted from the wireless base station devices other than the target wireless base station device.

This configuration allows prompt construction of appropriate neighboring cell information, and prompt realization of highly-efficient operation in the wireless communication system.

(1-10) More preferably, the neighboring cell processing device further includes a power measurement indication unit. In a case where the target wireless base station device operates in a hybrid mode in which the wireless terminal devices are registerable and both the registered wireless terminal devices and unregistered wireless terminal devices are allowed to access the target wireless base station device, the power measurement indication unit instructs the unregistered wireless terminal devices to measure, in the plurality of frequencies, the reception levels of the radio signals transmitted from the wireless base station devices other than the target wireless base station device.

This configuration prevents the power of a wireless terminal device owned by a registered user from being consumed, thereby providing appropriate communication services.

(1-11) More preferably, the neighboring cell processing device further includes a power measurement indication unit. In a case where the target wireless base station device operates in a hybrid mode in which the wireless terminal devices are registerable and both the registered wireless terminal devices and unregistered wireless terminal devices are allowed to access the target wireless base station device, the power measurement indication unit instructs the registered wireless terminal devices to measure, in the plurality of frequencies, the reception levels of the radio signals transmitted from the wireless base station device other than the target wireless base station device.

This configuration prevents the power of a wireless terminal device owned by an unregistered user who is usually not able to quickly charge the wireless terminal device from being consumed, thereby providing appropriate communication services.

(1-12) Preferably, in a case where the target wireless base station device operates in a hybrid mode in which the wireless terminal devices are registerable and both the registered wireless terminal devices and unregistered wireless terminal devices are allowed to access the target wireless base station device, the neighboring cell information generation unit weights the movement information of the registered wireless terminal devices and the movement information of the unregistered wireless terminal devices, and generates the neighboring cell information based on a result of the weighting.

This configuration allows generation of appropriate neighboring cell information in accordance with the distinction between a registered wireless terminal device and an unregistered wireless terminal device.

(1-13) Preferably, the movement information acquisition unit acquires movement information indicating a movement operation history of the wireless terminal devices in a certain period of time from the present to a certain point in the past.

This configuration prevents, for example, a wireless base station device which has already been powered off from remaining high in the ranking.

(1-14) Preferably, at least any of the plurality of wireless base station devices in the communication system is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

(1-15) Preferably, the movement information acquisition unit acquires movement information indicating the number of times of movement of the wireless terminal devices between the target wireless base station device and each of the plurality of wireless base station devices other than the target wireless base station device.

In this way, by using the number of times of movement as a criterion for determining which wireless base station devices should be included in the neighboring cell information and for ranking the wireless base station devices, it is possible to generate more appropriate neighboring cell information.

(1-16) More preferably, the movement information acquisition unit acquires movement information indicating the number of times of movement of the wireless terminal devices from the target wireless base station device to the plurality of wireless base station devices other than the target wireless base station device, and the number of times of movement of the wireless terminal devices from the plurality of wireless base station devices other than the target wireless base station device to the target wireless base station device.

In this way, based on the number of times of bidirectional movement between two wireless base station devices, elimination of wireless base station devices from the neighboring cell information is determined, and ranking of wireless base station devices is performed, thereby generating more appropriate neighboring cell information.

(1-17) More preferably, the neighboring cell information generation unit generates the neighboring cell information in which at least wireless base station device(s) whose number of times of movement indicated in the movement information is equal to or smaller than a predetermined value is eliminated from among the plurality of wireless base station devices other than the target wireless base station device.

This configuration allows appropriate elimination of a wireless base station device which has not been often selected as a handover destination, from the neighboring cell information.

(1-18) More preferably, the neighboring cell information generation unit ranks the plurality of wireless base station devices other than the target wireless base station device, based on the movement information acquired by the movement information acquisition unit. In the ranking, a wireless base station device whose number of times of movement indicated in the movement information is relatively large is ranked higher than a wireless base station device whose number of times of movement indicated in the measurement information is relatively small.

This configuration allows appropriate ranking of the wireless base station devices in accordance with how often the wireless base station devices have succeeded in the movement operation.

(1-19) More preferably, the movement information acquisition unit acquires movement information indicating a movement operation history of the wireless terminal devices. The movement operation history corresponds to a certain number of times of recent movement of the wireless terminal devices between the target wireless base station device and each of the plurality of wireless base station devices other than the target wireless base station device.

This configuration prevents, for example, a wireless base station device which has already been powered off from remaining high in the ranking.

(1-20) Preferably, the movement information acquisition unit acquires movement information indicating the success rate of movement operations of the wireless terminal devices between the target wireless base station device and each of the plurality of wireless base station devices other than the target wireless base station device.

In this way, by using the movement operation success rate as a criterion for determining which wireless base station devices should be included in the neighboring cell information and for ranking the wireless base station devices, it is possible to generate more appropriate neighboring cell information. The movement operation success rate is the number of movement completion notifications/the number of movement requests.

(1-21) More preferably, the movement information acquisition unit acquires movement information indicating the success rate of movement operations of the wireless terminal devices from the target wireless base station device to the plurality of wireless base station devices other than the target wireless base station device, and the success rate of movement operations of the wireless terminal devices from the plurality of wireless base station devices other than the target wireless base station device to the target wireless base station device.

In this way, based on the success rate of bidirectional movement operations between two wireless base station devices, elimination of wireless base station devices from the neighboring cell information is determined, and ranking of wireless base station devices is performed, thereby generating more appropriate neighboring cell information.

(1-22) More preferably, the neighboring cell information generation unit generates the neighboring cell information in which at least wireless base station device(s) whose success rate of the movement operation indicated in the movement information is equal to or lower than a predetermined value is eliminated from among the plurality of wireless base station devices other than the target wireless base station device.

This configuration allows appropriate elimination of a wireless base station device which has not often succeeded in the movement operation, from the neighboring cell information.

(1-23) More preferably, the neighboring cell information generation unit ranks the plurality of wireless base station devices other than the target wireless base station device, based on the movement information acquired by the movement information acquisition unit. In the ranking, a wireless base station device whose success rate of movement operation indicated in the movement information is relatively high is ranked higher than a wireless base station device whose success rate of movement operation indicated in the measurement information is relatively low.

This configuration allows appropriate ranking of the wireless base station devices in accordance with how often the wireless base station devices have been selected as movement destinations.

(1-24) Preferably, with respect to a first wireless base station device and a second wireless base station device among the plurality of wireless base station devices other than the target wireless base station device, the movement information acquisition unit acquires, when a wireless terminal device moves between the target wireless base station device and the second wireless base station device via the first wireless base station device, movement information indicating a sojourn time from when the wireless terminal device moves to the first wireless base station device to when the wireless terminal device moves to the target wireless base station device or the second wireless base station device.

In this way, by using the sojourn time of a wireless terminal device in a wireless base station device through which the wireless terminal device has traveled during the movement operation, as a criterion for determining which wireless base station devices should be included in the neighboring cell information and for ranking the wireless base station devices, it is possible to generate more appropriate neighboring cell information.

(1-25) More preferably, the neighboring cell information generation unit generates the neighboring cell information in which at least the first wireless base station device corresponding to a sojourn time indicated in the movement information, which is equal to or shorter than a predetermined value, is eliminated from among the plurality of wireless base station devices other than the target wireless base station device.

This configuration allows appropriate elimination of a wireless base station device through which a wireless terminal device need not travel during its movement operation, from the neighboring cell information.

(1-26) More preferably, the neighboring cell information generation unit ranks the plurality of wireless base station devices other than the target wireless base station device, based on the movement information acquired by the movement information acquisition unit. In the ranking, a wireless base station device corresponding to a relatively long sojourn time indicated in the movement information is ranked higher than a wireless base station device corresponding to a relatively short sojourn time indicated in the measurement information.

This configuration allows appropriate ranking of the wireless base station devices in accordance with the degree of necessity that a wireless terminal device should travel through the wireless base station devices during its movement operation.

(1-27) More preferably, with respect to a first wireless base station device and a plurality of second wireless base station devices other than the first wireless base station device among the plurality of wireless base station devices other than the target wireless base station device, the movement information acquisition unit acquires, when a wireless terminal device moves between the target wireless base station device and each of the second wireless base station devices via the first wireless base station device, movement information indicating sojourn times from when the wireless terminal device moves to the first wireless base station device to when the wireless base station device moves to the target wireless base station device and the second wireless base station devices, respectively.

This configuration prevents the first wireless base station device which is needed as a route of a movement operation when part of wireless base station devices in the wireless communication system are the movement destinations or movement sources, from being erroneously eliminated from the neighboring cell information, and from being ranked low in the neighboring cell information.

(1-28) More preferably, the neighboring cell information generation unit generates the neighboring cell information in which at least the first wireless base station device corresponding to a sojourn time indicated in the movement information, which is equal to or shorter than a predetermined value with respect to all the second wireless base station devices, is eliminated from among the plurality of wireless base station devices other than the target wireless base station device.

This configuration prevents the first wireless base station device which is needed as a route of a movement operation when part of wireless base station devices in the wireless communication system are the movement destinations or movement sources, from being erroneously eliminated from the neighboring cell information.

(1-29) More preferably, the movement information acquisition unit further acquires movement information indicating whether or not a wireless terminal device communicating with the target wireless base station device is communicable with the second wireless base station devices.

In this way, by acquiring, as movement information, information of other content in addition to the information of the movement operation history, it is possible to generate more appropriate neighboring cell information.

(1-30) More preferably, the neighboring cell information generation unit generates the neighboring cell information in which at least the first wireless base station device is eliminated from among the plurality of wireless base station devices other than the target wireless base station device, the first wireless base station device corresponding to a sojourn time indicated in the movement information, which is equal to or shorter than a predetermined value, and being in a case where a wireless terminal device communicating with the target wireless base station device is communicable with the second wireless base station devices.

This configuration avoids the situation that not-neighboring cells are recognized as if they are neighboring each other, which causes a wireless terminal device to be out of the coverage area.

(1-31) Further, the present invention relates to a wireless base station device including the neighboring cell processing device described in any of the above (1-1) to (1-30).

This configuration eliminates the need to perform optimization of neighboring cell information of each wireless base station device by, for example, a gateway device or a host device, thereby achieving dispersion of the processing load in the wireless communication system, and reduction in the communication traffic between the wireless base station device and the gateway device or the host device.

(1-32) In order to solve the above problem 1, the present invention relates to a neighboring cell processing method in a communication system in which wireless terminal devices are communicable with a plurality of wireless base station devices by performing movement operation, and the neighboring cell processing method includes the steps of: acquiring movement information indicating a movement operation history of the wireless terminal devices, based on information from at least either of the wireless terminal devices or the wireless base station devices; generating, based on the acquired movement information, neighboring cell information indicating one or a plurality of wireless base station devices located in the neighborhood of a target wireless base station device, among the plurality of wireless base station devices other than the target wireless base station device; and transmitting the generated neighboring cell information to the target wireless base station device or to wireless terminal devices communicable with the target wireless base station device.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

(2-1) In order to solve the above problem 2, an aspect of the present invention relates to a neighboring cell processing device in a communication system in which wireless terminal devices are communicable with a plurality of wireless base station devices by performing movement operation, and the neighboring cell processing device includes: a measurement information acquisition unit for acquiring measurement information which indicates a result of measurement of radio signals transmitted from the plurality of wireless base station devices other than a target wireless base station device, based on information provided from at least either of the wireless terminal devices or the wireless base station devices; a neighboring cell information generation unit for generating, based on the measurement information acquired by the measurement information acquisition unit, neighboring cell information which indicates one or a plurality of wireless base station devices located in the neighborhood of the target wireless base station device, among the plurality of wireless base station devices other than the target wireless base station device; and a neighboring cell information transmission unit for transmitting the neighboring cell information generated by the neighboring cell information generation unit, to the target wireless base station device or to wireless terminal devices communicable with the target wireless base station device.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

The "movement" of a wireless terminal device in the present invention includes not only handover which is an inter-base-station movement (inter-cell movement) operation performed by a wireless terminal device communicating with a wireless base station device but also an inter-base-station movement (inter-cell movement) operation performed by a wireless terminal device in the idle state.

(2-2) Preferably, the neighboring cell information generation unit ranks the plurality of wireless base station devices other than the target wireless base station device, based on the measurement information acquired by the measurement information acquisition unit, and generates neighboring cell information based on a result of the ranking.

This configuration allows generation of detailed neighboring cell information, and achieves further improvement in the efficiency of operation in the wireless communication system. For example, by preferentially selecting, as a destination of movement, a higher-rank wireless base station device in the ranking, the success rate of the movement operation can be increased.

(2-3) More preferably, the neighboring cell information generation unit generates neighboring cell information which indicates N (N: integer not smaller than 1) wireless base station devices from the highest rank among the ranked wireless base station devices.

In this configuration, for example, when the number of wireless base station devices that can be included in the neighboring cell information to be notified to the wireless terminal devices is limited, it is possible to notify the wireless terminal devices of appropriate neighboring cell information by including N wireless base station devices in the neighboring cell information.

(2-4) More preferably, the neighboring cell information generation unit generates neighboring cell information which further indicates the ranking of the ranked wireless base station devices.

This configuration allows generation of more detailed neighboring cell information, and achieves further improvement in the efficiency of operation in the wireless communication system. For example, based on the ranking of the wireless base station devices in the neighboring cell information, a wireless base station device performs determination of measurement order, selection of wireless base station devices as measurement targets, and the like, thereby realizing efficient measurement operation.

(2-5) Preferably, the measurement information acquisition unit acquires, based on the information provided from at least either of the wireless terminal devices or the wireless base station devices, measurement information which indicates a result of measurement in which at least either of the wireless terminal devices or the wireless base station devices have measured the reception levels of the radio signals transmitted from the plurality of wireless base station devices other than the target wireless base station device.

In this way, by using the reception level as a criterion for determining which wireless base station devices should be included in the neighboring cell information and for ranking the wireless base station devices, it is possible to generate more appropriate neighboring cell information.

(2-6) More preferably, the neighboring cell information generation unit ranks the plurality of wireless base station devices other than the target wireless base station device, based on the measurement information acquired by the measurement information acquisition unit. In the ranking, a wireless base station device whose reception level indicated in the measurement information is relatively high is ranked higher than a wireless base station device whose reception level indicated in the measurement information is relatively low.

This configuration allows appropriate ranking of the wireless base station devices in accordance with the actually-measured reception levels thereof.

(2-7) More preferably, the neighboring cell information generation unit generates the neighboring cell information in which at least wireless base station device(s) whose reception level indicated in the measurement information is lower than a predetermined value is eliminated from among the plurality of wireless base station devices other than the target wireless base station device.

This configuration allows appropriate elimination of a wireless base station device whose actually-measured reception level is low, from the neighboring cell information.

(2-8) Preferably, the measurement information acquisition unit acquires, based on the information provided from at least either of the wireless terminal devices or the wireless base station devices, measurement information which indicates the number of times at least either of the wireless terminal devices or the wireless base station devices have detected the presence of the wireless base station devices, based on the radio signals transmitted from the plurality of wireless base station devices other than the target wireless base station device.

In this way, by using the number of times each wireless base station device has been detected, as a criterion for determining which wireless base station devices should be included in the neighboring cell information and for ranking the wireless base station devices, it is possible to generate appropriate neighboring cell information.

(2-9) More preferably, the neighboring cell information generation unit ranks the plurality of wireless base station devices other than the target wireless base station device, based on the measurement information acquired by the measurement information acquisition unit. In the ranking, a wireless base station device whose number of times of detection indicated in the measurement information is relatively large is ranked higher than a wireless base station device whose number of times of detection indicated in the measurement information is relatively small.

This configuration allows appropriate ranking of the wireless base station devices in accordance with how often the presence of each wireless base station device has been detected. That is, it is possible to generate appropriate neighboring cell information by recognizing powered-on wireless base station devices and powered-off wireless base station devices.

(2-10) More preferably, the neighboring cell information generation unit generates the neighboring cell information in which at least wireless base station device(s) whose number of times of detection indicated in the measurement information is smaller than a predetermined value is eliminated from among the plurality of wireless base station devices other than the target wireless base station device.

This configuration allows appropriate elimination of a wireless base station device which has not been often detected, from the neighboring cell information. That is, it is possible to generate appropriate neighboring cell information by recognizing powered-on wireless base station devices and powered-off wireless base station devices.

(2-11) Preferably, the measurement information acquisition unit acquires, based on the information provided from at least either of the wireless terminal devices or the wireless base station devices, measurement information which indicates a detection rate at which at least either of the wireless terminal devices or the wireless base station devices detect the presence of the wireless base station devices, based on the radio signals transmitted from the plurality of wireless base station devices other than the target wireless base station device.

In this way, by using the detection rate of each wireless base station device as a criterion for determining which wireless base station devices should be included in the neighboring cell information and for ranking the wireless base station devices, it is possible to generate more appropriate neighboring cell information. The detection rate is a ratio of the number of times a wireless terminal device has detected the presence of wireless base station devices to the number of times the wireless terminal device has performed measurement.

(2-12) More preferably, the neighboring cell information generation unit ranks the plurality of wireless base station devices other than the target wireless base station device, based on the measurement information acquired by the measurement information acquisition unit. In the ranking, a wireless base station device whose detection rate indicated in the measurement information is relatively high is ranked higher than a wireless base station device whose detection rate indicated in the measurement information is relatively low.

This configuration allows appropriate ranking of the wireless base station devices in accordance with how often the presence of each wireless base station device has been detected. That is, it is possible to generate appropriate neighboring cell information by recognizing powered-on wireless base station devices and powered-off wireless base station devices.

(2-13) More preferably, the neighboring cell information generation unit generates the neighboring cell information in which at least wireless base station device(s) whose detection rate indicated in the measurement information is lower than a predetermined value is eliminated from among the plurality of wireless base station devices other than the target wireless base station device.

This configuration allows appropriate elimination of a wireless base station device which has not been often detected, from the neighboring cell information. That is, it is possible to generate appropriate neighboring cell information by recognizing powered-on wireless base station devices and powered-off wireless base station devices.

(2-14) Preferably, the measurement information acquisition unit acquires, based on the information provided from at least either of the wireless terminal devices or the wireless base station devices, measurement information which indicates a measurement time at which the latest measurement result was obtained, the latest measurement result providing a reason for addition or remaining of each of the wireless base station devices to/in the neighboring cell information.

In this way, by using the elapsed time from the measurement time as a criterion for determining which wireless base station devices should be included in the neighboring cell information and for ranking the wireless base station devices, it is possible to recognize a wireless base station device which is less likely to exist at present, thereby generating appropriate neighboring cell information.

(2-15) More preferably, the neighboring cell information generation unit ranks the plurality of wireless base station devices other than the target wireless base station device, based on the measurement information acquired by the measurement information acquisition unit. In the ranking, a wireless base station device for which an elapsed time from the measurement time is relatively long is ranked lower than a wireless base station device for which an elapsed time from the measurement time is relatively short.

This configuration allows appropriate ranking of the wireless base station devices in accordance with the possibility of presence of each wireless base station device at present.

(2-16) More preferably, the neighboring cell information generation unit generates the neighboring cell information in which at least wireless base station device(s) for which an elapsed time from the measurement time is equal to or longer than a predetermined value is eliminated from among the plurality of the wireless base station devices other than the target wireless base station device.

This configuration allows appropriate elimination of a wireless base station device which is less likely to exist at present, from the neighboring cell information.

(2-17) Preferably, at least one of the plurality of wireless base station devices in the communication system is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

(2-18) Preferably, the neighboring cell information generation unit generates neighboring cell information which indicates one or a plurality of wireless base station devices to be candidate(s) for a destination of movement of a wireless terminal device communicating with the target wireless base station device, among the plurality of wireless base station devices other than the target wireless base station device.

This configuration allows the movement operation in a cell of an installed wireless base station device to be in the optimum state. Further, by performing optimization of the neighboring cell information, the number of neighboring cells to be candidates for a destination of movement of a wireless terminal device during communication can be reduced, thereby preventing occurrence of unnecessary movement operation.

(2-19) Preferably, the neighboring cell information generation unit generates neighboring cell information which indicates one or a plurality of wireless base station devices to be target(s) of measurement by the wireless terminal devices, among the plurality of wireless base station devices other than the target wireless base station device.

In this way, by performing optimization of the neighboring cell information, the number of neighboring cells to be the targets of measurement by a wireless terminal device can be reduced, thereby preventing the wireless terminal device from performing unnecessary measurement operation.

(2-20) Preferably, the neighboring cell information generation unit generates neighboring cell information which indicates one or a plurality of wireless base station devices which transmit radio signal(s) whose reception level(s) are to be measured by the wireless terminal devices, among the plurality of wireless base station devices other than the wireless base station device.

In this way, by performing optimization of the neighboring cell information, the number of neighboring cells to be the targets of reception level measurement by a wireless terminal device can be reduced, thereby preventing the wireless terminal device from performing unnecessary measurement operation.

(2-21) More preferably, the neighboring cell information generation unit generates neighboring cell information which indicates one or a plurality of wireless base station devices which transmit radio signal(s) whose reception level(s) are to be measured by a wireless terminal device not communicating with the target wireless base station device, among the plurality of wireless base station devices other than the target wireless base station device.

This configuration reduces the number of neighboring cells to be the targets of periodical power measurement instructed by broadcast information or the like from a wireless base station device, thereby preventing each wireless terminal device from performing unnecessary measurement operation. In particular, power consumption of a wireless terminal device in the idle state can be reduced, resulting in remarkable effects.

(2-22) Preferably, the neighboring cell information generation unit ranks the plurality of wireless base station devices other than the target wireless base station device, based on the measurement information acquired by the measurement information acquisition unit, and generates neighboring cell information based on a result of the ranking, and the neighboring cell information generation unit generates initial neighboring cell information, based on a result of measurement in which a wireless terminal device communicating with the target wireless base station device has measured, in a plurality of frequencies, the reception levels of the radio signals transmitted from the wireless base station devices other than the target wireless base station device.

This configuration allows prompt construction of appropriate neighboring cell information, and prompt realization of highly-efficient operation in the wireless communication system.

(2-23) More preferably, the neighboring cell processing device further includes a power measurement indication unit. In a case where the target wireless base station device operates in a hybrid mode in which the wireless terminal devices are registerable and both the registered wireless terminal devices and unregistered wireless terminal devices are allowed to access the target wireless base station device, the power measurement indication unit instructs the unregistered wireless terminal devices to measure, in the plurality of frequencies, the reception levels of the radio signals transmitted from the wireless base station devices other than the target wireless base station device.

This configuration prevents the power of a wireless terminal device owned by a registered user from being consumed, thereby providing appropriate communication services.

(2-24) More preferably, the neighboring cell processing device further includes a power measurement indication unit In a case where the target wireless base station device operates in a hybrid mode in which the wireless terminal devices are registerable and both the registered wireless terminal devices and unregistered wireless terminal devices are allowed to access the target wireless base station device, the power measurement indication unit instructs the registered wireless terminal devices to measure, in the plurality of frequencies, the reception levels of the radio signals transmitted from the wireless base station device other than the target wireless base station device.

This configuration prevents the power of a wireless terminal device owned by an unregistered user who is usually not able to quickly charge the wireless terminal device from being consumed, thereby providing appropriate communication services.

(2-25) Preferably, in a case where the target wireless base station device operates in a hybrid mode in which the wireless terminal devices are registerable and both the registered wireless terminal devices and unregistered wireless terminal devices are allowed to access the target wireless base station device, the neighboring cell information generation unit weights measurement information indicating the result of measurement by the registered wireless terminal devices and measurement information indicating the result of measurement by the unregistered wireless terminal devices, and generates the neighboring cell information based on a result of the weighting.

This configuration allows generation of appropriate neighboring cell information in accordance with the distinction between a registered wireless terminal device and an unregistered wireless terminal device.

(2-26) Preferably, the measurement information acquisition unit acquires measurement information indicating the result of measurement in a certain period of time from the present to a certain point in the past.

This configuration prevents, for example, a wireless base station device which has already been powered off from remaining high in the ranking.

(2-27) Further, the present invention relates to a wireless base station device including the neighboring cell processing device according to any of the above (2-1) to (2-26).

This configuration eliminates the need to perform optimization of neighboring cell information of each wireless base station device by, for example, a gateway device or a host device, thereby achieving dispersion of the processing load in the wireless communication system, and reduction in the communication traffic between the wireless base station device and the gateway device or the host device.

(2-28) In order to solve the above problem 2, an aspect of the present invention relates to a neighboring cell processing method in a communication system in which wireless terminal devices are communicable with a plurality of wireless base station devices by performing movement operation, and the neighboring cell processing method includes the steps of: acquiring measurement information which indicates a result of measurement of radio signals transmitted from the plurality of wireless base station devices other than a target wireless base station device, based on information provided from at least either of the wireless terminal devices or the wireless base station devices; generating, based on the acquired measurement information, neighboring cell information which indicates one or a plurality of wireless base station devices located in the neighborhood of the target wireless base station device, among the plurality of wireless base station devices other than the target wireless base station device; and transmitting the generated neighboring cell information to the target wireless base station device or to wireless terminal devices communicable with the target wireless base station device.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

(3-1) In order to solve the above problem 3, an aspect of the present invention relates to a neighboring cell processing device in a communication system in which wireless terminal devices are communicable with a plurality of wireless base station devices by performing movement operation, and the neighboring cell processing device includes: an attribute information acquisition unit for acquiring attribute information indicating the attributes of at least the plurality of wireless base station devices other than a target wireless base station device; a neighboring cell information generation unit for generating, based on the attribute information acquired by the attribute information acquisition unit, neighboring cell information indicating one or a plurality of wireless base station devices located in the neighborhood of the target wireless base station device, among the plurality of wireless base station devices other than the target wireless base station device; and a neighboring cell information transmission unit for transmitting the neighboring cell information generated by the neighboring cell information generation unit, to the target wireless base station device or to wireless terminal devices communicable with the target wireless base station device.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

The "movement" of a wireless terminal device in the present invention includes not only handover which is an inter-base-station movement (inter-cell movement) operation performed by a wireless terminal device communicating with a wireless base station device but also an inter-base-station movement (inter-cell movement) operation performed by a wireless terminal device in the idle state.

(3-2) Preferably, the neighboring cell information generation unit ranks the plurality of wireless base station devices other than the target wireless base station device, based on the attribute information acquired by the attribute information acquisition unit, and generates neighboring cell information based on a result of the ranking.

This configuration allows generation of detailed neighboring cell information, and achieves further improvement in the efficiency of operation in the wireless communication system. For example, by preferentially selecting, as a destination of movement, a higher-rank wireless base station device in the ranking, the success rate of the movement operation can be increased.

(3-3) More preferably, the neighboring cell information generation unit generates neighboring cell information which indicates N (N: integer not smaller than 1) wireless base station devices from the highest rank among the ranked wireless base station devices.

In this configuration, for example, when the number of wireless base station devices that can be included in the neighboring cell information to be notified to the wireless terminal devices is limited, it is possible to notify the wireless terminal devices of appropriate neighboring cell information by including N wireless base station devices in the neighboring cell information.

(3-4) More preferably, the neighboring cell information generation unit generates neighboring cell information which further indicates the ranking of the ranked wireless base station devices.

This configuration allows generation of more detailed neighboring cell information, and achieves further improvement in the efficiency of operation in the wireless communication system. For example, based on the ranking of the wireless base station devices in the neighboring cell information, a wireless base station device performs determination of measurement order, selection of wireless base station devices as measurement targets, and the like, thereby realizing efficient measurement operation.

(3-5) Preferably, the neighboring cell information generation unit determines whether or not each of the plurality of wireless base station devices other than the target wireless base station device should be registered in the neighboring cell information, based on whether or not the attributes indicated in the attribute information match a predetermined attribute.

This configuration allows appropriate registration or elimination of wireless base station devices in or from the neighboring cell information, based on the attributes of the wireless base station devices.

(3-6) Preferably, the attribute information acquisition unit acquires attribute information which further indicates the attribute of the target wireless base station device, and the neighboring cell information generation unit generates the neighboring cell information, based on the attribute of the target wireless base station device and the attributes of the plurality of wireless base station devices other than the target wireless base station device, which are indicated in the attribute information acquired by the attribute information acquisition unit.

In this way, by using the information indicating the attribute of the target base station in addition to the information indicating the attributes of the plurality of wireless base station devices other than the target base station, as a criterion for determining which wireless base station devices should be included in the neighboring cell information and for ranking the wireless base station devices, it is possible to generate more appropriate neighboring cell information.

(3-7) Preferably, at least one of the plurality of wireless base station devices in the communication system is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

(3-8) Preferably, the attribute information acquisition unit acquires attribute information indicating whether each of at least the plurality of wireless base station devices other than the target wireless base station device is a macro base station or a femto base station.

In this way, by using the information indicating the distinction between a macro base station and a femto base station, as a criterion for determining which wireless base station devices should be included in the neighboring cell information and for ranking the wireless base station devices, it is possible to generate appropriate neighboring cell information.

(3-9) More preferably, the neighboring cell information generation unit ranks the plurality of wireless base station devices other than the target wireless base station device, based on the attribute information acquired by the attribute information acquisition unit. In the ranking, the wireless base station devices which are macro base stations are ranked higher than the wireless base station devices which are femto base stations.

In this way, in the wireless communication system in which macro base stations and femto base stations coexist, by raising the priority of the macro base stations that are not likely to be powered off, it is possible to appropriately perform ranking based on the distinction between a macro base station and a femto base station.

(3-10) More preferably, the neighboring cell information generation unit ranks the plurality of wireless base station devices other than the target wireless base station device, based on the attribute information acquired by the attribute information acquisition unit. In the ranking, the wireless base station devices which are femto base stations are ranked higher than the wireless base station devices which are macro base stations.

This configuration allows appropriate ranking based on the distinction between a macro base station and a femto base station under the situation that the femto base stations should be preferentially registered in the neighboring cell information in the wireless communication system in which the macro base stations and the femto base stations coexist.

(3-11) More preferably, the neighboring cell information generation unit generates the neighboring cell information in which at least wireless base station device(s) whose attribute indicated in the attribute information is a macro base station or wireless base station device(s) whose attribute indicated in the attribute information is a femto base station is eliminated from among the plurality of wireless base station devices other than the target wireless base station device.

This configuration allows appropriate elimination of wireless base station devices from the neighboring cell information in accordance with the distinction between a macro base station and a femto base station.

(3-12) More preferably, at least two of the plurality of wireless base station devices in the communication system are femto base stations which are configurable to operate in any of the following access modes: an open access mode in which all the wireless terminal devices are allowed to access the femto base stations; a closed access mode in which the wireless terminal devices are registerable and the registered wireless terminal devices are allowed to access the femto base stations; and a hybrid mode in which the wireless terminal devices are registerable and both the registered wireless terminal devices and unregistered wireless terminal devices are allowed to access the femto base stations. The attribute information acquisition unit acquires attribute information which further indicates the access mode (any of the open access mode, the closed access mode, and the hybrid mode) in which each of the wireless base station devices as femto base stations operates.

In this way, by using the information indicating the distinction between a macro base station and a femto base station and distinction of access modes as a criterion for determining which wireless base station devices should be included in the neighboring cell information and for ranking the wireless base station devices, it is possible to generate more appropriate neighboring cell information.

(3-13) More preferably, the neighboring cell information generation unit ranks the plurality of wireless base station devices other than the target wireless base station device, based on the attribute information acquired by the attribute information acquisition unit. In the ranking, the wireless base stations devices are ranked in descending order as follows: the wireless base station device which is a macro base station, the wireless base station device which is a femto base station and operates in the open access mode, the wireless base station device which is a femto base station and operates in the hybrid mode, and the wireless base station device which is a femto base station and operates in the closed access mode.

This configuration allows appropriate ranking of the wireless base station devices in accordance with the distinction between a macro base station and a femto base station and the distinction of access modes.

(3-14) More preferably, the neighboring cell information generation unit generates neighboring cell information in which, among four types of wireless base station devices including: the wireless base station device which is a macro base station, the wireless base station device which is a femto base station and operates the open access mode, the wireless base station device which is a femto base station and operates in the hybrid mode, and the wireless base station device which is a femto base station and operates in the closed access mode, at least one, or two, or three types of wireless base station devices are eliminated from among the plurality of wireless base station devices other than the target wireless base station device.

This configuration allows appropriate elimination of wireless base station devices from the neighboring cell information in accordance with the distinction between a macro base station and a femto base station and the distinction of access modes.

(3-15) Preferably, at least two of the plurality of wireless base station devices in the communication system are configurable to operate in any of the following access modes: an open access mode in which all the wireless terminal devices are allowed to access the wireless base station devices; a closed access mode in which the wireless terminal devices are registerable and the registered wireless terminal devices are allowed to access the wireless base station devices; and a hybrid mode in which the wireless terminal devices are registerable and both the registered wireless terminal devices and unregistered wireless terminal devices are allowed to access the wireless base station devices. The attribute information acquisition unit acquires attribute information which indicates the access mode (any of the open access mode, the closed access mode, and the hybrid mode) in which each of the plurality of wireless base station devices other than the target wireless base station device operates.

In this way, by using the information indicating the distinction of access modes as a criterion for determining which wireless base station devices should be included in the neighboring cell information and for ranking the wireless base station devices, it is possible to generate appropriate neighboring cell information.

(3-16) More preferably, the neighboring cell information generation unit ranks the plurality of wireless base station devices other than the target wireless base station device, based on the attribute information acquired by the attribute information acquisition unit. In the ranking, the wireless base station devices are ranked in descending order as follows: the wireless base station devices operating in the open access mode, the wireless base station devices operating in the hybrid mode, and the wireless base station devices operating in the closed access mode.

This configuration allows appropriate ranking of the wireless base station devices in accordance with the distinction of access modes.

(3-17) More preferably, the neighboring cell information generation unit generates the neighboring cell information in which, among three types of wireless base station devices including: the wireless base station device operating in the open access mode, the wireless base station device operating in the hybrid mode, and the wireless base station device operating in the closed access mode, at least one or two types of wireless base station devices are eliminated from among the plurality of wireless base station devices other than the target wireless base station device.

This configuration allows appropriate elimination of wireless base station devices from the neighboring cell information in accordance with the distinction of access modes.

(3-18) More preferably, each of the wireless base station devices, when operating in the closed access mode or the hybrid mode, belongs to a set CSG (Closed Subscriber Group), and allows wireless terminal devices that belong to the same CSG to access the wireless base station device. The attribute information acquisition unit acquires attribute information which indicates the access mode (any of the open access mode, the closed access mode, and the hybrid mode) in which each of the target wireless base station device and the plurality of wireless base station devices other than the target wireless base station device operates, and further indicates a CSG to which each of the target wireless base station device and the plurality of wireless base station devices other than the target wireless base station device belongs.

In this way, by using the distinction of access modes and match/mismatch of CSGs with respect to the target base station and the plurality of wireless base station devices other than the target base station, as a criterion for determining which wireless base station devices should be included in the neighboring cell information and for ranking the wireless base station devices, it is possible to generate more appropriate neighboring cell information.

(3-19) More preferably, the neighboring cell information generation unit ranks the plurality of wireless base station devices other than the target wireless base station device, based on the attribute information acquired by the attribute information acquisition unit. In the ranking, wireless base station devices which belong to the same CSG as the target wireless base station device are ranked higher than wireless base station devices which belong to a CSG different from the CSG to which the target wireless base station device belongs.

This configuration allows appropriate ranking of the wireless base station devices in accordance with match/mismatch of CSGs.

(3-20) More preferably, the neighboring cell information generation unit ranks the plurality of wireless base station devices other than the target wireless base station device, based on the attribute information acquired by the attribute information acquisition unit. When the target wireless base station device operates in the closed access mode, the wireless base station devices are ranked in descending order as follows: the wireless base station device which operates in the closed access mode and belongs to the same CSG as the target wireless base station device; the wireless base station device which operates in the hybrid mode and belongs to the same CSG as the target wireless base station device; the wireless base station device which operates in the open access mode; and the wireless base station device which operates in the hybrid mode and belongs to a CSG different from the CSG to which the target wireless base station device belongs.

This configuration allows appropriate ranking of the wireless base station devices in accordance with the distinction of access modes and match/mismatch of CSGs.

(3-21) More preferably, the attribute information acquisition unit acquires attribute information which further indicates whether each of the plurality of wireless base station devices other than the target wireless base station device is a macro base station or a femto base station. The neighboring cell information generation unit ranks the plurality of wireless base station devices other than the target wireless base station device, based on the attribute information acquired by the attribute information acquisition unit. When the target wireless base station device is a femto base station operating in the closed access mode, the wireless base station devices are ranked in descending order as follows: the wireless base station device which is a femto base station, operates in the closed access mode, and belongs to the same CSG as the target wireless base station device; the wireless base station device which is a femto base station, operates in the hybrid mode, and belongs to the same CSG as the target wireless base station device; the target wireless base station device which is a macro base station; the wireless base station device which is a femto base station, and operates in the open access mode; and a wireless base station device, which is a femto base station, operates in the hybrid mode, and belongs to a CSG different from the CSG to which the target wireless base station device belongs.

This configuration allows appropriate ranking of the wireless base station devices in accordance with the distinction between a macro base station and a femto base station, the distinction of access modes, and match/mismatch of CSGs.

(3-22) More preferably, when the target wireless base station device operates in the closed access mode, the neighboring cell information generation unit generates the neighboring cell information in which, among four types of wireless base station devices including: the wireless base station device which operates in the closed access mode and belongs to the same CSG as the target wireless base station device; the wireless base station device which operates in the hybrid mode and belongs to the same CSG as the target wireless base station device; the wireless base station device which operates in the open access mode; and the wireless base station device which operates in the hybrid mode and belongs to a CSG different from the CSG to which the target wireless base station device belongs, at least one, two, or three types of wireless base station devices are eliminated from among the plurality of wireless base station devices other than the target wireless base station device.

This configuration allows appropriate elimination of wireless base station devices from the neighboring cell information in accordance with the distinction of access modes and match/mismatch of CSGs.

(3-23) More preferably, the attribute information acquisition unit acquires attribute information which further indicates whether each of the plurality of wireless base station devices other than the target wireless base station device is a macro base station or a femto base station. When the target wireless base station device is a femto base station operating in the closed access mode, the neighboring cell information generation unit generates the neighboring cell information in which, among five types of wireless base station devices including: the wireless base station device which is a femto base station, operates in the closed access mode, and belongs to the same CSG as the target wireless base station device; the wireless base station device which is a femto base station, operates in the hybrid mode, and belongs to the same CSG as the target wireless base station device; the target wireless base station device which is a macro base station; the wireless base station device which is a femto base station, and operates in the open access mode; and the wireless base station which is a femto base station, operates in the hybrid mode, and belongs to a CSG different from the CSG to which the target wireless base station device belongs, at least one, two, three or four types of wireless base station devices are eliminated from among the plurality of wireless base station devices other than the target wireless base station device.

This configuration allows appropriate elimination of wireless base station devices from the neighboring cell information in accordance with the distinction between a macro base station and a femto base station, the distinction of access modes, and match/mismatch of CSGs.

(3-24) Preferably, the attribute information acquisition unit acquires attribute information indicating the frequencies of the radio signals transmitted from at least the plurality of wireless base station devices other than the target wireless base station device.

In this way, by using the information indicating the carrier frequencies of wireless base station devices, as a criterion for determining which wireless base station devices should be included in the neighboring cell information and for ranking the wireless base station devices, it is possible to generate appropriate neighboring cell information.

(3-25) More preferably, the attribute information acquisition unit acquires attribute information indicating the frequencies of the radio signals transmitted from the target wireless base station device and the plurality of wireless base station devices other than the target wireless base station device. The neighboring cell information generation unit ranks the plurality of wireless base station devices other than the target wireless base station device, based on the attribute information acquired by the attribute information acquisition unit. In the ranking, a wireless base station device whose frequency indicated in the attribute information is the same as the frequency of the radio signal transmitted from the target wireless base station device is ranked higher than a wireless base station device whose frequency indicated in the attribute information is different from the frequency of the radio signal transmitted from the target wireless base station device.

This configuration allows appropriate ranking of the wireless base station devices in accordance with the distinction of the carrier frequencies of the wireless base station devices. Specifically, a wireless terminal device can be guided to a wireless base station device using the same carrier frequency as the target wireless base station device, thereby facilitating measurement in the wireless terminal device.

(3-26) More preferably, the attribute information acquisition unit acquires attribute information which indicates the frequencies of the radio signals transmitted from the target wireless base station device and the plurality of wireless base station devices other than the target wireless base station device. The neighboring cell information generation unit ranks the plurality of wireless base station devices other than the target wireless base station device, based on the attribute information acquired by the attribute information acquisition unit. In the ranking, a wireless base station device whose frequency indicated in the attribute information is different from the frequency of the radio signal transmitted from the target wireless base station device is ranked higher than a wireless base station device whose frequency indicated in the attribute information is the same as the frequency of the radio signal transmitted from the target wireless base station device.

This configuration allows appropriate ranking of the wireless base station devices in accordance with the distinction of the carrier frequencies of the wireless base station devices. Specifically, a wireless terminal device can be guided to a wireless base station device using a carrier frequency different from that of the target wireless base station device, thereby reducing interference to the target wireless base station device.

(3-27) More preferably, the neighboring cell information generation unit, in the ranking, ranks a wireless base station device whose frequency indicated in the attribute information is far from the frequency of the radio signal transmitted from the target wireless base station device, higher than a wireless base station device whose frequency indicated in the attribute information is close to the frequency of the radio signal transmitted from the target wireless base station device.

In this configuration, a wireless terminal device can be guided to a wireless base station device using a carrier frequency farthest from that of the target wireless base station device, thereby further reducing interference to the target wireless base station device.

(3-28) More preferably, the attribute information acquisition unit acquires attribute information indicating the frequencies of the radio signals transmitted from the target wireless base station device and the plurality of wireless base station devices other than the target wireless base station device. The neighboring cell information generation unit generates the neighboring cell information in which at least wireless base station device(s) whose frequency indicated in the attribute information is the same as the frequency of the radio signal transmitted from the target wireless base station device or wireless base station device(s) whose frequency is different from the frequency of the radio signal transmitted from the target wireless base station device is eliminated from among the plurality of wireless base station devices other than the target wireless base station device.

This configuration allows appropriate elimination of wireless base station devices in accordance with the distinction of carrier frequencies of the wireless base station devices. Specifically, a wireless terminal device can be guided to a wireless base station device using a carrier frequency different from that of the target wireless base station device, thereby reducing interference to the target wireless base station device. Alternatively, a wireless terminal device can be guided to a wireless base station device using the same carrier frequency as the target wireless base station device, thereby facilitating measurement in the wireless terminal device.

(3-29) Preferably, the attribute information acquisition unit acquires attribute information indicating the radio access technologies of at least the plurality of wireless base station devices other than the target wireless base station device.

In this way, by using the information indicating the radio access technologies of the wireless base station devices, as a criterion for determining which wireless base station devices should be included in the neighboring cell information and for ranking the wireless base station devices, it is possible to generate appropriate neighboring cell information.

(3-30) More preferably, the attribute information acquisition unit acquires attribute information indicating the radio access technologies of the target wireless base station device and the plurality of wireless base station devices other than the target wireless base station device. The neighboring cell information generation unit ranks the plurality of wireless base station devices other than the target wireless base station device, based on the attribute information acquired by the attribute information acquisition unit. In the ranking, a wireless base station device whose radio access technology indicated in the attribute information is the same as the radio access technology of the target wireless base station device is ranked higher than a wireless base station device whose radio access technology is different from the radio access technology of the target wireless base station device.

This configuration allows appropriate ranking of the wireless base station devices in accordance with the distinction of the carrier frequencies of the wireless base station devices. Specifically, a wireless terminal device can be guided to a wireless base station device using the same carrier frequency as the target wireless base station device, thereby achieving stable operation in the wireless communication system.

(3-31) More preferably, the attribute information acquisition unit acquires attribute information indicating the radio access technologies of the target wireless base station device and the plurality of wireless base station devices other than the target wireless base station device. The neighboring cell information generation unit ranks the plurality of wireless base station devices other than the target wireless base station device, based on the attribute information acquired by the attribute information acquisition unit. In the ranking, a wireless base station device whose radio access technology indicated in the attribute information is different from the radio access technology of the target wireless base station device is ranked higher than a wireless base station device whose radio access technology is the same as the radio access technology of the target wireless base station device.

This configuration allows appropriate ranking of the wireless base station devices in accordance with the distinction of radio access technologies of the wireless base station devices under the situation that a wireless base station device whose radio access technology is different from that of the target base station should be preferentially registered in the neighboring cell information.

(3-32) More preferably, the attribute information acquisition unit acquires attribute information indicating the radio access technologies of the target wireless base station device and the plurality of wireless base station devices other than the target wireless base station device. The neighboring cell information generation unit generates the neighboring cell information in which at least wireless base station device(s) whose radio access technology indicated in the attribute information is different from the radio access technology of the target wireless base station device or wireless base station device(s) whose radio access technology is the same as the radio access technology of the target wireless base station device is eliminated from among the plurality of wireless base station devices other than the target wireless base station device.

This configuration allows appropriate elimination of wireless base station devices from the neighboring cell information in accordance with the distinction of radio access technologies of the wireless base station devices.

(3-33) Preferably, the neighboring cell information generation unit generates neighboring cell information indicating one or a plurality of wireless base station devices to be candidate(s) for a destination of movement of a wireless terminal device communicating with the target wireless base station device, among the plurality of wireless base station devices other than the target wireless base station device.

This configuration causes the movement operation in a cell of an installed wireless base station device to be in the optimum state. Further, by performing optimization of the neighboring cell information, the number of neighboring cells to be candidates for a destination of movement of a wireless terminal device during communication can be reduced, thereby avoiding occurrence of unnecessary movement operation.

(3-34) Preferably, the neighboring cell information generation unit generates neighboring cell information indicating one or a plurality of wireless base station devices to be target(s) of measurement by the wireless terminal devices, among the plurality of wireless base station devices other than the target wireless base station device.

In this way, by performing optimization of the neighboring cell information, the number of neighboring cells to be the targets of measurement by a wireless terminal device can be reduced, thereby preventing the wireless terminal device from performing unnecessary measurement operation.

(3-35) Preferably, the neighboring cell information generation unit generates neighboring cell information indicating one or a plurality of wireless base station devices which transmit radio signal(s) to be measured by the wireless terminal devices, among the plurality of wireless base station devices other than the target wireless base station device.

In this way, by performing optimization of the neighboring cell information, the number of neighboring cells to be the targets of reception level measurement by a wireless terminal device can be reduced, thereby preventing the wireless terminal device from performing unnecessary measurement operation. In particular, power consumption of a wireless terminal device in the idle state can be reduced, resulting in remarkable effects.

(3-36) More preferably, the neighboring cell information generation unit generates neighboring cell information indicating one or a plurality of wireless base station devices which transmit radio signal(s) whose reception level(s) are to be measured by a wireless terminal device not communicating with the target wireless base station device, among the plurality of wireless base station devices other than the target wireless base station device.

This configuration reduces the number of neighboring cells to be the targets of periodical power measurement instructed by broadcast information or the like from a wireless base station device, thereby preventing each wireless terminal device from performing unnecessary measurement operation.

(3-37) Preferably, the neighboring cell information generation unit ranks the plurality of wireless base station devices other than the target wireless base station device, based on the attribute information acquired by the attribute information acquisition unit, and generates neighboring cell information based on a result of the ranking. The neighboring cell information generation unit generates initial neighboring cell information, based on a result of measurement in which a wireless terminal device communicating with the target wireless base station device has measured, in a plurality of frequencies, the reception levels of the radio signals transmitted from the wireless base station devices other than the target wireless base station device.

This configuration allows prompt construction of appropriate neighboring cell information, and prompt realization of highly-efficient operation in the wireless communication system.

(3-38) More preferably, the neighboring cell processing device further includes a power measurement indication unit. When the target wireless base station device operates in the hybrid mode in which the wireless terminal devices are registerable and both the registered wireless terminal devices and unregistered wireless terminal devices are allowed to access the target wireless base station device, the power measurement indication unit instructs the unregistered wireless terminal devices to measure, in the plurality of frequencies, the reception levels of the radio signals transmitted from the wireless base station device other than the target wireless base station device.

This configuration prevents the power of a wireless terminal device owned by a registered user from being consumed, thereby providing appropriate communication services.

(3-39) More preferably, the neighboring cell processing device further includes a power measurement indication unit. When the target wireless base station device operates in the hybrid mode in which the wireless terminal devices are registerable and both the registered wireless terminal devices and unregistered wireless terminal devices are allowed to access the target wireless base station device, the power measurement indication unit instructs the registered wireless terminal devices to measure, in the plurality of frequencies, the reception levels of the radio signals transmitted from the wireless base station devices other than the target wireless base station device.

This configuration prevents the power of a wireless terminal device owned by an unregistered user who is usually not able to quickly charge the wireless terminal device from being consumed, thereby providing appropriate communication services.

(3-40) Further, the present invention relates to a wireless base station device including the neighboring cell processing device according to any of the above (3-1) to (3-39).

This configuration eliminates the need to perform optimization of neighboring cell information of each wireless base station device by, for example, a gateway device or a host device, thereby achieving dispersion of the processing load in the wireless communication system, and reduction in the communication traffic between the wireless base station device and the gateway device or the host device.

(3-41) In order to solve the above problem 3, an aspect of the present invention relates to a neighboring cell processing method in a communication system in which wireless terminal devices are communicable with a plurality of wireless base station devices by performing movement operation, and the neighboring cell processing method includes the steps of: acquiring attribute information indicating at least the attributes of the plurality of wireless base station devices other than a target wireless base station device; generating, based on the acquired attribute information, neighboring cell information indicating one or a plurality of wireless base station devices located in the neighborhood of the target wireless base station device, among the plurality of wireless base station devices other than the target wireless base station device; and transmitting the generated neighboring cell information to the target wireless base station device or to wireless terminal devices communicable with the target wireless base station device.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

(4-1) In order to solve the above problem 4, an aspect of the present invention relates to a neighboring cell processing device in a communication system in which wireless terminal devices are communicable with a plurality of wireless base station devices by performing movement operation, and the neighboring cell processing device includes: a neighboring cell information generation unit for generating, for each of the wireless terminal devices, neighboring cell information indicating one or a plurality of wireless base station devices located in the neighborhood of the target wireless base station device, among the plurality of wireless base station devices other than the target wireless base station device; and a neighboring cell information transmission unit for transmitting the neighboring cell information generated by the neighboring cell information generation unit, to the corresponding wireless terminal device or to the target wireless base station device.

This configuration allows generation of appropriate neighboring cell information in accordance with the communication environment that varies among the wireless terminal devices. Specifically, it is possible to reduce unnecessary measurement operations by the wireless terminal devices, that is, it is possible to reduce the number of times of measurement for the cells whose presences cannot be recognized by the wireless terminal devices. Further, it is possible to reduce unnecessary movement operations by the wireless terminal devices. Accordingly, by generating appropriate neighboring cell information, improvement in the efficiency of operation in the wireless communication system can be achieved.

The "movement" of a wireless terminal device in the present invention includes not only handover which is an inter-base-station movement (inter-cell movement) operation performed by a wireless terminal device communicating with a wireless base station device but also an inter-base-station movement (inter-cell movement) operation performed by a wireless terminal device in the idle state.

(4-2) Preferably, the neighboring cell processing device further includes an information acquisition unit for acquiring, for each of the wireless terminal devices, information for generating the neighboring cell information, based on information provided from at least either of the wireless terminal device or the wireless base station devices. The neighboring cell information generation unit generates, for each of the wireless terminal devices, the neighboring cell information based on the information for each of the wireless terminal devices, which is acquired by the information acquisition unit.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

(4-3) More preferably, the information acquisition unit acquires, for each of the wireless terminal devices, measurement information indicating a result of measurement in which the wireless terminal device measures the radio signals transmitted from the plurality of wireless base station devices other than the target wireless base station device, based on information provided from at least either of the wireless terminal device or the wireless base station devices. The neighboring cell information generation unit generates, for each of the wireless terminal devices, the neighboring cell information based on the measurement information for each of the wireless terminal devices, which is acquired by the information acquisition unit.

In this way, by acquiring, as information for generating neighboring cell information, the measurement information indicating the result of measurement in which a wireless terminal device has actually measured the radio signals transmitted from the wireless base station devices, it is possible to appropriately generate neighboring cell information for each wireless terminal device.

(4-4) More preferably, the information acquisition unit acquires, for each of the wireless terminal devices, movement information indicating a movement operation history of the wireless terminal device, based on information provided from at least either of the wireless terminal device or the wireless base station devices. The neighboring cell information generation unit generates, for each of the wireless terminal devices, the neighboring cell information based on the movement information for each of the wireless terminal devices, which is acquired by the information acquisition unit.

In this way, by acquiring, as information for generating neighboring cell information, the movement information indicating the movement operation history of a wireless terminal device, it is possible to appropriately generate neighboring cell information for each wireless terminal device.

(4-5) More preferably, at least one of the plurality of wireless base station devices other than the target wireless base station device is configurable to operate in any of the following access modes: an open access mode in which all the wireless terminal devices are allowed to access the wireless base station device; a closed access mode in which the wireless base station device belongs to a set CSG, and the wireless terminal devices that belong to the same CSG are allowed to access the wireless base station device; and a hybrid mode in which the wireless base station device belongs to a set CSG, and both the wireless terminal devices that belong to the same CSG and the wireless terminal devices that belong to a different CSG are allowed to access the wireless base station device. The information acquisition unit acquires attribute information indicating the access mode (any of the open access mode, the closed access mode, and the hybrid mode) in which each of the plurality of wireless base station devices other than the target wireless base station device operates, and indicating the CSG to which each of the wireless terminal devices and the plurality of wireless base station devices other than the target wireless base station device belongs. The neighboring cell information generation unit generates the neighboring cell information, for each of the wireless terminal devices, based on the access mode (any of the open access mode, the closed access mode, and the hybrid mode) in which the wireless base station device operates, and on match/mismatch between the CSGs to which the wireless terminal devices belong and the CSGs to which the wireless base station devices belong.

In this way, by acquiring, as information for generating neighboring cell information, the attribute information indicating the access modes of the respective wireless base station devices, and the CSGs of the wireless terminal devices and the wireless base station devices, it is possible to appropriately generate neighboring cell information for each wireless terminal device.

(4-6) More preferably, the neighboring cell information generation unit generates the neighboring cell information in which at least wireless base station device(s) which operates in the closed access mode and belongs to a CSG different from the CSG of the corresponding wireless terminal device is eliminated from among the plurality of wireless base station devices other than the target wireless base station device.

This configuration allows appropriate elimination of a wireless base station device which is a wireless resource that the wireless terminal devices cannot use, from the neighboring cell information.

(4-7) Preferably, the target wireless base station device operates in the hybrid mode in which the wireless terminal devices are registerable, and both the registered wireless terminal devices and unregistered wireless terminal devices are allowed to access inc target wireless base station device. The neighboring cell information generation unit generates the neighboring cell information, for each of the wireless terminal devices registered in the target wireless base station device.

In the configuration of generating neighboring cell information for a wireless terminal device which is a member of a wireless base station device, since the CSG of the wireless terminal device as a member is already known in the wireless base station device, it is possible to easily generate neighboring cell information for each wireless terminal device. Further, by generating neighboring cell information for a wireless terminal device owned by a registered user, the power consumption of the wireless terminal device can be reduced, and thus appropriate communication services can be provided.

(4-8) Preferably, the target wireless base station device operates in the closed access mode in which the wireless terminal devices are registerable, and the registered wireless terminal devices are allowed to access the target wireless base station device. The neighboring cell information generation unit generates the neighboring cell information, for each of the wireless terminal devices registered in the target wireless base station device.

In the configuration of generating neighboring cell information for a wireless terminal device which is a member of a wireless base station device, since the CSG of the wireless terminal device as a member is already known in the wireless base station device, it is possible to easily generate neighboring cell information for each wireless terminal device. Further, by generating neighboring cell information for a wireless terminal device owned by a registered user, the power consumption of the wireless terminal device can be reduced, and thus appropriate communication services can be provided.

(4-9) Preferably, the target wireless base station device operates in the hybrid mode in which the wireless terminal devices are registerable and both the registered wireless terminal devices and unregistered wireless terminal devices are allowed to access the target wireless base station device, or in the closed access mode in which the wireless terminal devices are registerable and the registered wireless terminal devices are allowed to access the target wireless base station device. The neighboring cell processing device further includes: a power measurement indication unit for instructing the wireless terminal devices registered in the target wireless base station device to measure, in a plurality of frequencies, the reception levels of the radio signals transmitted from the wireless base station devices other than the target wireless base station device; and an information acquisition unit for acquiring measurement information for each of the wireless terminal devices, the measurement information indicating a result of measurement by the wireless terminal device. The neighboring cell information generation unit generates the neighboring cell information for each of the wireless terminal devices, based on the measurement information for each of the wireless terminal devices, which is acquired by the information acquisition unit.

In this way, by generating neighboring cell information using the results of measurement obtained in a plurality of frequencies, appropriate neighboring cell information can be promptly constructed, and thereby highly-efficient operation in the wireless communication system can be promptly realized. Further, by instructing the registered wireless terminal device to perform measurement in a plurality of frequencies, information for generating neighboring cell information can be efficiently acquired.

(4-10) Preferably, the neighboring cell information generation unit further generates total neighboring cell information to be notified to a plurality of wireless terminal devices, the total neighboring cell information indicating one or a plurality of wireless base station devices located in the neighborhood of the target wireless base station device, among the plurality of wireless base station devices other than the target wireless base station device.

In this way, by using various kinds of neighboring cell information, it is possible to achieve further improvement in the efficiency of operation in the wireless communication system.

(4-11) More preferably, the neighboring cell information generation unit generates the total neighboring cell information, based on the neighboring cell information generated for each of the wireless terminal devices.

This configuration allows appropriate generation of neighboring cell information to be notified to a specific wireless terminal device as well as other wireless terminal devices in the wireless communication system, thereby achieving further improvement in the efficiency of operation in the wireless communication system.

(4-12) More preferably, the neighboring cell information generation unit generates total neighboring cell information including one or a plurality of wireless base station devices which are indicated by each neighboring cell information generated for each of the wireless terminal devices.

In this configuration, for example, when there is no cell which can be commonly recognized by wireless terminal devices existing in different rooms in a building, it is possible to prevent the number of wireless base station devices registered in neighboring cell information to be notified to unregistered wireless terminal devices and in neighboring cell information to be broadcast from becoming zero.

(4-13) More preferably, the neighboring cell information transmission unit broadcasts the total neighboring cell information to a plurality of wireless terminal devices communicable with the target wireless base station device.

This configuration allows notification of common neighboring cell information to a specific wireless terminal device as well as other wireless terminal devices in the wireless communication system, thereby achieving further improvement in the efficiency of operation in the wireless communication system.

(4-14) More preferably, the target wireless base station device operates in the hybrid mode in which the wireless terminal devices are registerable and both the registered wireless terminal devices and unregistered wireless terminal devices are allowed to access the target wireless base station device, or in the closed access mode in which the wireless terminal devices are registerable and the registered wireless terminal devices are allowed to access the target wireless base station device. The neighboring cell information transmission unit transmits the total neighboring cell information to the wireless terminal devices which are not registered in the target wireless base station device.

This configuration allows notification of common neighboring cell information to member wireless terminal devices as well as non-member wireless terminal devices of a wireless base station device which operates in the hybrid mode or the closed access mode, thereby achieving further improvement in the efficiency of operation in the wireless communication system.

(4-15) Preferably, the neighboring cell information generation unit generates, for each of the wireless terminal devices, neighboring cell information indicating one or a plurality of wireless base station devices to be candidate(s) for a destination of movement of a wireless terminal device communicating with the target wireless base station device, among the plurality of wireless base station devices other than the target wireless base station device.

This configuration causes the movement operation in a cell of an installed wireless base station device to be in the optimum state. Further, by performing optimization of the neighboring cell information, the number of neighboring cells to be candidates for a destination of movement of a wireless terminal device during communication can be reduced, thereby avoiding occurrence of unnecessary movement operation.

(4-16) Preferably, the neighboring cell information generation unit generates, for each of the wireless terminal devices, neighboring cell information indicating one or a plurality of wireless base station devices to be measured by the wireless terminal devices, among the plurality of wireless base station devices other than the target wireless base station device.

In this way, by performing optimization of the neighboring cell information, the number of neighboring cells to be the targets of measurement by a wireless terminal device can be reduced, thereby preventing the wireless terminal device from performing unnecessary measurement operation.

(4-17) Preferably, the neighboring cell information generation unit generates, for each of the wireless terminal devices, neighboring cell information indicating one or a plurality of wireless base station devices which transmit radio signal(s) whose reception level(s) are to be measured by the wireless terminal devices, among the plurality of wireless base station devices other than the target wireless base station device.

In this way, by performing optimization of the neighboring cell information, the number of neighboring cells to be the targets of reception level measurement by a wireless terminal device can be reduced, thereby preventing the wireless terminal device from performing unnecessary measurement operation. In particular, power consumption of a wireless terminal device in the idle state can be reduced, resulting in remarkable effects.

(4-18) More preferably, the neighboring cell information generation unit generates, for each of the wireless terminal devices, neighboring cell information indicating one or a plurality of wireless base station devices which transmit radio signal(s) whose reception level(s) are to be measured by a wireless terminal device which is not communicating with the target wireless base station device, among the plurality of wireless base station devices other than the target wireless base station device.

This configuration reduces the number of neighboring cells to be the targets of periodical power measurement instructed by broadcast information or the like from a wireless base station device, thereby preventing each wireless terminal device from performing unnecessary measurement operation.

(4-19) Preferably, at least any of the plurality of wireless base station devices in the communication system is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

(4-20) Further, the present invention relates to a wireless base station device including the neighboring cell processing device according to any of the above (4-1) to (4-19).

This configuration eliminates the need to perform optimization of neighboring cell information of each wireless base station device by, for example, a gateway device or a host device, thereby achieving dispersion of the processing load in the wireless communication system, and reduction in the communication traffic between the wireless base station device and the gateway device or the host device.

(4-21) In order to solve the above problem 4, an aspect of the present invention relates to a neighboring cell processing method in a communication system in which wireless terminal devices are communicable with a plurality of wireless base station devices by performing movement operation, and the neighboring cell processing method includes the steps of: generating, for each of the wireless terminal devices, neighboring cell information indicating one or a plurality of wireless base station devices located in the neighborhood of a target wireless base station device, among the plurality of wireless base station devices other than the target wireless base station device; and transmitting the generated neighboring cell information to the corresponding wireless terminal device or to the target wireless base station device.

This configuration allows generation of appropriate neighboring cell information in accordance with the communication environment that varies among the wireless terminal devices. Specifically, it is possible to reduce unnecessary measurement operations by the wireless terminal devices, that is, it is possible to reduce the number of times of measurement for the cells whose presences cannot be recognized by the wireless terminal devices. Further, it is possible to reduce unnecessary movement operations by the wireless terminal devices. Accordingly, by generating appropriate neighboring cell information, it is possible to improve the efficiency of operation in the wireless communication system.

(5-1) In order to solve the above problem 5, an aspect of the present invention relates to a neighboring cell processing device in a communication system in which wireless terminal devices are communicable with a plurality of wireless base station devices by performing movement operation, and the neighboring cell processing device includes: a neighboring cell information generation unit for generating, for each of wireless terminal devices communicating with a target wireless base station device, neighboring cell information indicating one or a plurality of wireless base station devices with which the wireless terminal device communicating with the target wireless base station device is communicable, among the plurality of wireless base station devices other than the target wireless base station device, and a neighboring cell information transmission unit for transmitting the neighboring cell information generated by the neighboring cell information generation unit, to the corresponding wireless terminal device or to the target wireless base station device.

In this way, by generating neighboring cell information for each wireless terminal device communicating with the target base station such that wireless base station devices with which the wireless terminal device is communicable are included in the neighboring cell information, it is possible to prevent the wireless terminal device from performing unnecessary measurement operation, and further, it is possible to reduce occurrence of unnecessary handover. Further, since unsuitable wireless base station devices are not included in the neighboring cell information, the transmission band for transmitting the neighboring cell information is prevented from increasing, and the transmission time is reduced, thereby reducing interference to other wireless base station devices and other wireless terminal devices in the neighborhood of the target base station. Furthermore, each wireless terminal device, when receiving the neighboring cell information, need not receive a large amount of data, thereby avoiding an increase in power consumption. Moreover, inappropriate reduction in the number of wireless base station devices to be included in the neighboring cell information is avoided, thereby allowing the wireless terminal device to perform appropriate handover or the like.

This configuration allows automatic optimization of neighboring cell information regardless of movement and power on/off of each wireless base station device. Therefore, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

The "movement" of a wireless terminal device in the present invention includes not only handover which is an inter-base-station movement (inter-cell movement) operation performed by a wireless terminal device communicating with a wireless base station device but also an inter-base-station movement (inter-cell movement) operation performed by a wireless terminal device in the idle state.

(5-2) Preferably, the neighboring cell information generation unit generates the neighboring cell information in which at least powered-off wireless base station device(s) is eliminated from among the plurality of wireless base station devices other than the target wireless base station device.

In this way, by eliminating a powered-off wireless base station device from the neighboring cell information, a wireless base station device with which a wireless terminal device is surely not communicable can be eliminated from the neighboring cell information, thereby preventing the wireless terminal device from performing unnecessary handover operation and measurement operation.

(5-3) More preferably, when a new wireless terminal device starts to communicate with the target wireless base station device, the neighboring cell information generation unit acquires power information indicating whether one or a plurality of wireless base station devices communicable with the new wireless terminal device are powered on or off, and generates neighboring cell information for the new wireless terminal device, in which at least the powered-off wireless base station device is eliminated.

In this way, by acquiring the latest power state of a wireless base station device and then determining whether or not the wireless base station device should be registered in the neighboring cell information, it is possible to generate appropriate neighboring cell information.

(5-4) Preferably, at least one of the plurality of wireless base station devices in the communication system is configurable to operate in any of the following access modes: an open access mode in which all the wireless terminal devices are allowed to access the wireless base station device; a closed access mode in which the wireless terminal devices are registerable and the registered wireless terminal devices are allowed to access the wireless base station device; and a hybrid mode in which the wireless terminal devices are registerable and both the registered wireless terminal devices and unregistered wireless terminal devices are allowed to access the wireless base station device. The neighboring cell information generation unit generates the neighboring cell information in which at least wireless base station device(s) which operates in the closed access mode and in which the corresponding wireless terminal device is not registered is eliminated from among the plurality of wireless base station devices other than the target wireless base station device.

In this way, by eliminating a wireless base station device which does not allow a wireless terminal device to access, a wireless base station device with which the wireless terminal device is not communicable can be eliminated from the neighboring cell information, thereby preventing the wireless terminal device from performing unnecessary handover operation and measurement operation.

(5-5) Preferably, the neighboring cell processing device further includes a communication system information acquisition unit for acquiring communication system information indicating the correspondence relationships between one or a plurality of wireless base station devices located in the neighborhood of the target wireless base station device, and one or a plurality of wireless terminal devices which are communicable with the one or the plurality of wireless base station devices. The neighboring cell information generation unit generates the neighboring cell information, based on the communication system information.

This configuration allows generation of appropriate neighboring cell information based on the configuration of the communication system.

(5-6) More preferably, the communication system information is generated based on identification information of each of the wireless base station devices other than the target base station device and identification information of the target wireless base station device, the respective pieces of identification information being notified from the wireless base station devices other than the target wireless base station device, which have detected the target wireless base station device.

This configuration allows construction of appropriate communication system information, thereby achieving further improvement in the efficiency of operation in the communication system.

(5-7) More preferably, the communication system information is generated based on identification information of the target wireless base station device, which is acquired based on positional information indicating the installation location of each of the wireless base station devices other than the target wireless base station device, and based on identification information of the wireless base station device corresponding to the positional information.

This configuration allows construction of appropriate communication system information, thereby achieving further improvement in the efficiency of operation in the communication system.

(5-8) More preferably, the communication system information is generated based on power information indicating whether each of the wireless base station devices other than the target wireless base station device is powered on or off, the power information being notified from each of the wireless base station devices.

This configuration allows reflection of the power state of a wireless base station device in the communication system information, thereby generating appropriate neighboring cell information.

(5-9) More preferably, the communication system information is generated based on power information indicating that each of the wireless base station devices other than the target wireless base station device is being powered on, the power information being periodically notified from each of the wireless base station devices.

This configuration allows reflection of the power state of a wireless base station device in the communication system information, thereby generating appropriate neighboring cell information. Further, it is possible to detect that a wireless base station device is powered off due to occurrence of abnormality.

(5-10) More preferably, the communication system information acquisition unit acquires the communication system information from a management device having, stored therein, information of each of the wireless base station devices in the communication system.

In this way, in the configuration in which each wireless base station device acquires the communication system information from the management device which manages the information of the entire communication system, it is possible to perform efficient generation of neighboring cell information in the entire communication system.

(5-11) Further, another aspect of the present invention relates to a neighboring cell processing device in a communication system in a communication system in which wireless terminal devices are communicable with a plurality of wireless base station devices by performing movement operation, and the neighboring cell processing device includes: a neighboring cell information generation unit for generating neighboring cell information indicating one or a plurality of wireless base station devices located in the neighborhood of a target wireless base station device, among the plurality of wireless base station devices other than the target wireless base station device; and neighboring cell information transmission unit for transmitting the neighboring cell information generated by the neighboring cell information generation unit to the target wireless base station device, or broadcasting the neighboring cell information to wireless terminal devices communicable with the target wireless base station device. When one or a plurality of new wireless base station devices are to be added to the neighboring cell information and the addition of the one or the plurality of new wireless base station devices causes the number of wireless base station devices in the neighboring cell information to exceed a predetermined value, the neighboring cell information generation unit does not add the one or the plurality of new wireless base station devices to the neighboring cell information. When the neighboring cell information generation unit does not add the one or the plurality of new wireless base station devices to the neighboring cell information, the neighboring cell information transmission unit notifies a wireless terminal device which is communicating with the target wireless base station device and is communicable with part or all of the one or the plurality of new wireless base station devices, of part or all of the one or the plurality of new wireless base station devices, as information separated from the neighboring cell information.

In this configuration, the wireless terminal device communicating with the target wireless base station device is notified of, as neighboring cells, a sufficient number of wireless base station devices which are suitable as measurement targets and handover targets, thereby improving the efficiency of operation in the communication system.

(5-12) Further, another aspect of the present invention relates to a neighboring cell processing device in a communication system in a communication system in which wireless terminal devices are communicable with a plurality of wireless base station devices by performing movement operation, and the neighboring cell processing device includes: a neighboring cell information generation unit for generating neighboring cell information indicating one or a plurality of wireless base station devices located in the neighborhood of a target wireless base station device, among the plurality of wireless base station devices other than the wireless base station device; and a neighboring cell information transmission unit for transmitting the neighboring cell information generated by the neighboring cell information generation unit to the target wireless base station device, or broadcasting the neighboring cell information generated by the neighboring cell information generation unit to wireless terminal devices communicable with the target wireless base station device. When one or a plurality of new wireless base station devices are to be added to the neighboring cell information and the addition of the one or the plurality of new wireless base station devices causes the number of wireless base station devices in the neighboring cell information to exceed a predetermined value, the neighboring cell information generation unit eliminates, from among one or a plurality of wireless base station devices indicated in the neighboring cell information, a wireless base station device which satisfies the following condition, and adds the one or the plurality of new wireless base station devices to the neighboring cell information after the elimination:

Condition: wireless terminal devices which are allowed to access the wireless base station device are not included in wireless terminal devices communicable with the target wireless base station device.

In this configuration, the wireless terminal device communicating with the target wireless base station device is notified of the neighboring cell infon cation in which a sufficient number of wireless base station devices suitable as measurement targets and handover targets are registered, thereby improving the efficiency of operation in the communication system.

Preferably, the neighboring cell information generation unit generates neighboring cell information indicating one or a plurality of wireless base station devices which transmit radio signal(s) whose reception level(s) are to be measured by a wireless terminal device which is not communicating with the target wireless base station device, among the plurality of wireless base station devices other than the target wireless base station device.

This configuration reduces the number of neighboring cells to be the targets of periodical power measurement instructed by broadcast information or the like from a wireless base station device, thereby preventing each wireless terminal device from performing unnecessary measurement operation. In particular, power consumption of a wireless terminal device in the idle state can be reduced, resulting in remarkable effects.

Preferably, the neighboring cell information generation unit generates neighboring cell information indicating one or a plurality of wireless base station devices to be candidate(s) for a destination of movement of a wireless terminal device which is communicating with the target wireless base station device, among the plurality of wireless base station devices other than the target wireless base station device.

This configuration allows the movement operation in a cell of an installed wireless base station device to be in the optimum state. Further, by performing optimization of the neighboring cell information, the number of neighboring cells to be candidates for a destination of movement of a wireless terminal device during communication can be reduced, thereby preventing occurrence of unnecessary movement operation.

Preferably, the neighboring cell information generation unit generates neighboring cell information indicating one or a plurality of wireless base station devices to be measured by the wireless terminal devices, among the plurality of wireless base station devices other than the target wireless base station device.

In this way, by performing optimization of the neighboring cell information, the number of neighboring cells to be the targets of measurement by a wireless terminal device can be reduced, thereby preventing the wireless terminal device from performing unnecessary measurement operation.

Preferably, the neighboring cell information generation unit generates neighboring cell information indicating one or a plurality of wireless base station devices which transmit the radio signals whose reception levels are to be measured by the wireless terminal devices, among the plurality of wireless base station devices other than the target wireless base station device.

In this way, by performing optimization of the neighboring cell information, the number of neighboring cells to be the targets of reception level measurement by a wireless terminal device can be reduced, thereby preventing the wireless terminal device from performing unnecessary measurement operation.

(5-13) Preferably, at least one of the plurality of wireless base station devices other than the target wireless base station device is a femto base station.

In this way, by generating appropriate neighboring cell information in a wireless base station device around which a femto base station is located, which femto base station is often powered on/off and moved, and is allowed to set access limitation, it is possible to obtain more remarkable effect of achieving highly-efficient operation in the wireless communication system.

(5-14) Further, the present invention relates to a wireless base station device including the neighboring cell processing device according to any of the above (5-1) to (5-13).

This configuration eliminates the need to perform optimization of neighboring cell information of each wireless base station device by, for example, a gateway device or a host device, thereby achieving dispersion of the processing load in the communication system, and reduction in the communication traffic between the wireless base station device and the gateway device or the host device.

(5-15) In order to solve the above problem 5, an aspect of the present invention relates to a neighboring cell processing method in a communication system in which wireless terminal devices are communicable with a plurality of wireless base station devices by performing movement operation, and the neighboring cell processing method includes the steps of: generating, for each of wireless terminal devices communicating with the target wireless base station device, neighboring cell information indicating one or a plurality of wireless base station devices with which a wireless terminal device communicating with the target wireless base station device is communicable, among the plurality of wireless base station devices other than the wireless base station device; and transmitting the generated neighboring cell information to the corresponding wireless terminal device or to the target wireless base station device.

In this way, by generating neighboring cell information for each wireless terminal device communicating with the target base station such that wireless base station devices with which the wireless terminal device is communicable are included in the neighboring cell information, it is possible to prevent the wireless terminal device from performing unnecessary measurement operation, and further, it is possible to reduce occurrence of unnecessary handover. Further, since unsuitable wireless base station devices are not included in the neighboring cell information, the transmission band for transmitting the neighboring cell information is prevented from increasing, and the transmission time is reduced, thereby reducing interference to other wireless base station devices and other wireless terminal devices in the neighborhood of the target base station. Furthermore, each wireless terminal device, when receiving the neighboring cell information, need not receive a large amount of data, thereby avoiding an increase in power consumption. Moreover, inappropriate reduction in the number of wireless base station devices to be included in the neighboring cell information is avoided, thereby allowing the wireless terminal device to perform appropriate handover or the like.

Further, since optimization of neighboring cell information is automatically performed regardless of movement and power on/off of each wireless base station device, the efficiency of operation in the wireless communication system can be improved without manpower assistance. Further, since the neighboring cell information is automatically optimized, a special installation process for each wireless base station device is not needed, thereby reducing the time and cost required for installing the wireless base station device.

Accordingly, the efficiency of operation in the wireless communication system can be improved by generating appropriate neighboring cell information.

(5-16) Further, another aspect of the present invention relates to a neighboring cell processing method in a communication system in which wireless terminal devices are communicable with a plurality of wireless base station devices by performing movement operation, and the neighboring cell processing method includes the steps of: generating neighboring cell information indicating one or a plurality of wireless base station devices located in the neighborhood of a target wireless base station device, among the plurality of wireless base station devices other than the target wireless base station device; and transmitting the generated neighboring cell information to the target wireless base station device, or broadcasting the neighboring cell information to wireless terminal devices communicable with the target wireless base station device. In the step of generating the neighboring cell information, when one or a plurality of new wireless base station devices are to be added to the neighboring cell information and the addition of the one or the plurality of new wireless base station devices causes the number of wireless base station devices in the neighboring cell information to exceed a predetermined value, the one or the plurality of new wireless base station devices are not added to the neighboring cell information. In the step of transmitting the neighboring cell information, when the one or the plurality of new wireless base station devices are not added to the neighboring cell information in the step of generating the neighboring cell information, a wireless terminal device which is communicating with the target wireless base station device and is communicable with part or all of the one or the plurality of new wireless base station devices is notified of part or all of the one or the plurality of new wireless base station devices, as information separated from the neighboring cell information.

In this configuration, the wireless terminal device communicating with the target wireless base station device is notified of, as neighboring cells, a sufficient number of wireless base station devices which are suitable as measurement targets and handover targets, thereby improving the efficiency of operation in the communication system.

(5-17) Further, another aspect of the present invention relates to a neighboring cell processing method in a communication system in a communication system in which wireless terminal devices are communicable with a plurality of wireless base station devices by performing movement operation, and the neighboring cell processing method includes the steps of: generating neighboring cell information indicating one or a plurality of wireless base station devices located in the neighborhood of a target wireless base station device, among the plurality of wireless base station devices other than the wireless base station device; and transmitting the generated neighboring cell information to the target wireless base station device, or broadcasting the generated neighboring cell information to wireless terminal devices communicable with the target wireless base station device. In the step of generating the neighboring cell information, when one or a plurality of new wireless base station devices are to be added to the neighboring cell information and the addition of the one or the plurality of new wireless base station devices causes the number of wireless base station devices in the neighboring cell information to exceed a predetermined value, a wireless base station device which satisfies the following condition is eliminated from among one or a plurality of wireless base station devices indicated in the neighboring cell information, and the one or the plurality of new wireless base station devices are added to the neighboring cell information after the elimination:

Condition: wireless terminal devices which are allowed to access the wireless base station device are not included in wireless terminal devices communicable with the target wireless base station device.

In this configuration, the wireless terminal devices communicable with the target wireless base station device are notified of the neighboring cell information in which a sufficient number of wireless base station devices suitable as measurement targets and handover targets are registered, thereby improving the efficiency of operation in the communication system.

(5-18) In order to solve the above problem 5, an aspect of the present invention relates to a data structure of information to be exchanged among wireless base station devices, and the data structure includes power state data indicating the power states of the wireless base station devices.

This configuration allows the base stations to exchange their power states by using a logical inter-base-station interface, thereby contributing to generation of appropriate neighboring cell information.

(5-19) Further, another aspect of the present invention relates to a data structure of information to be exchanged between one or a plurality of wireless base station devices, and a host device which is communicable with the wireless base station devices. The data structure includes: transmission source base station identification data which indicates identification information of a wireless base station device as a transmission source of the information; and power state data which indicates the power state of the wireless base station device as a transmission source of the information.

This configuration allows the base stations to exchange their power states via the host device by using a logical interface between base station and carrier-network, thereby contributing to generation of appropriate neighboring cell information.

(5-20) Further, another aspect of the present invention relates to a data structure of information to be notified from a host device which is communicable with one or a plurality of wireless base station devices to the wireless base station devices. The data structure includes: base station identification data which indicates identification information of each of the wireless base station devices; and power state data which indicates the power state of the wireless base station device corresponding to the identification information.

This configuration allows notification of the power states from the host device to the base stations.

(5-21) Preferably, the power state data indicates whether each of the wireless base station devices transits from the power-on state to the power-off state, or from the power-off state to the power-on state.

This configuration allows, when transition of the power state of a base station occurs, another base station to acquire information relating to this transition.

(5-22) Preferably, the power state data indicates whether each of the wireless base station devices is in the power-on state or in the power-off state.

This configuration allows, for example, periodical acquisition of the power state of a certain base station.

(5-23) Preferably, the data structure further includes at least either of load status data indicating the load status of each of the wireless base station devices, or number-of-communicating-terminals data indicating the number of wireless terminal devices communicating with each of the wireless base station devices.

This configuration allows a base station to notify in advance another base station of its power state, its load status, and the number of terminals connected thereto, thereby avoiding unnecessary measurement operation and handover operation.

(5-24) Further, another aspect of the present invention relates to a data structure to be exchanged among wireless base station devices, and the data structure includes power state notification request data which requests each of the wireless base station devices to notify its power state.

This configuration allows a base station to autonomously request another base station to notify the power state, thereby contributing to generation of appropriate neighboring cell information.

(5-25) Further, another aspect of the present invention relates to a data structure of information to be exchanged between one or a plurality of wireless base station devices, and a host device which is communicable with the wireless base station devices. The data structure includes: transmission source base station identification data indicating identification information of a wireless base station device as a transmission source of the information; and power state notification request data which requests other wireless base station devices to notify their power states.

This configuration allows a base station to autonomously request another base station to notify the power state via the host device, thereby contributing to generation of appropriate neighboring cell information.

(5-26) Preferably, the data structure further includes transmission destination base station identification data indicating identification information of one or a plurality of wireless base station devices as destinations of the information.

In this configuration, the host device need not determine the destinations of the messages, thereby reducing the processing load in the host device.

BRIEF DESCRIPTION OF THE DRAWINGS

FIG. 18 is a diagram illustrating an example of the handover information acquired by the gateway device according to the third embodiment of the present invention (Chapter 1).

FIG. 22 is a diagram illustrating the relationship between the access modes of a femto base station and wireless terminal devices that are allowed to access the femto base station, according to a fourth embodiment of the present invention (Chapter 1).

FIG. 29 is a diagram illustrating an example of handover information acquired by a gateway device according to a fifth embodiment of the present invention (Chapter 1).

FIG. 31 is a diagram illustrating the relationship between the access modes of a femto base station and wireless terminal devices that are allowed to access the femto base station, according to a first embodiment of the present invention (Chapter 2).

FIG. 38 is a diagram illustrating an example of cell IDs and carrier frequencies of the respective wireless base station devices in the wireless communication system shown in FIG. 32.

FIG. 39 is a diagram illustrating an example of measurement information acquired by a wireless base station device.

FIG. 40 is a diagram illustrating an example of neighboring cell information generated by a wireless base station device.

FIG. 41 is a diagram illustrating another example of neighboring cell information generated by a wireless base station device.

FIG. 45 is a diagram illustrating an example of a result of measurement by a wireless terminal device 202.

FIG. 46 is a diagram illustrating an example of measurement information acquired by a wireless base station device.

FIG. 47 is a diagram illustrating an example of neighboring cell information generated by a wireless base station device.

FIG. 48 is a diagram illustrating another example of neighboring cell information generated by a wireless base station device.

FIG. 49 is a diagram illustrating an example of measurement information acquired by a wireless base station device.

FIG. 50 is a diagram illustrating an example of neighboring cell information generated by a wireless base station device.

FIG. 51 is a diagram illustrating another example of neighboring cell information generated by a wireless base station device.

FIG. 56 is a diagram illustrating the relationship between the access modes of a femto base station and wireless terminal devices that are allowed to access the femto base station, according to a first embodiment of the present invention (Chapter 3).

FIG. 59 is a diagram illustrating the attributes of the respective wireless base station devices in the wireless communication system shown in FIG. 57.

FIG. 64 is a diagram illustrating an example of attribute information acquired by a wireless base station device.

FIG. 65 is a diagram illustrating an example of neighboring cell information generated by a wireless base station device.

FIG. 66 is a diagram illustrating another example of neighboring cell information generated by a wireless base station device.

FIG. 67 is a diagram illustrating another example of neighboring cell information generated by a wireless base station device.

FIG. 71 is a diagram illustrating an example of attribute information acquired by a wireless base station device.

FIG. 72 is a diagram illustrating an example of neighboring cell information generated by a wireless base station device.

FIG. 73 is a diagram illustrating another example of neighboring cell information generated by a wireless base station device.

FIG. 74 is a diagram illustrating another example of neighboring cell information generated by a wireless base station device.

FIG. 75 is a diagram illustrating an example of attribute information acquired by a wireless base station device.

FIG. 76 is a diagram illustrating an example of neighboring cell information generated by a wireless base station device.

FIG. 77 is a diagram illustrating another example of neighboring cell information generated by a wireless base station device.

FIG. 78 is a diagram illustrating another example of neighboring cell information generated by a wireless base station device.

FIG. 79 is a diagram illustrating an example of attribute information acquired by a wireless base station device.

FIG. 80 is a diagram illustrating an example of neighboring cell information generated by a wireless base station device.

FIG. 81 is a diagram illustrating another example of neighboring cell information generated by a wireless base station device.

FIG. 82 is a diagram illustrating another example of neighboring cell information generated by a wireless base station device.

FIG. 83 is a diagram illustrating an example of neighboring cell information generated by a wireless base station device.

FIG. 84 is a diagram illustrating another example of neighboring cell information generated by a wireless base station device.

FIG. 85 is a diagram illustrating another example of neighboring cell information generated by a wireless base station device.

FIG. 86 is a diagram illustrating an example of attribute information acquired by a wireless base station device.

FIG. 87 is a diagram illustrating an example of neighboring cell information generated by a wireless base station device.

FIG. 88 is a diagram illustrating another example of neighboring cell information generated by a wireless base station device.

FIG. 89 is a diagram illustrating another example of neighboring cell information generated by a wireless base station device.

FIG. 94 is a diagram illustrating the relationship between the access modes of a femto base station and wireless terminal devices that are allowed to access the femto base station, according to a first embodiment of the present invention (Chapter 4).

FIG. 97 is a diagram illustrating in detail an example of arrangement of wireless base station devices in the wireless communication system according to the first embodiment of the present invention (Chapter 4).

FIG. 102 is a diagram illustrating an example of neighboring cell information generated by a wireless base station device.

FIG. 103 is a diagram illustrating an example of neighboring cell information generated by a wireless base station device.

FIG. 104 is a diagram illustrating an example of total neighboring cell information generated by a wireless base station device.

FIG. 107 is a diagram illustrating an example of neighboring cell information generated by a wireless base station device.

FIG. 108 is a diagram illustrating an example of neighboring cell information generated by a wireless base station device.

FIG. 109 is a diagram illustrating an example of total neighboring cell information generated by a wireless base station device.

FIG. 114 is a diagram illustrating the relationship between the access modes of a femto base station and wireless terminal devices that are allowed to access the femto base station, according to a first embodiment of the present invention (Chapter 5).

FIG. 118 is a diagram illustrating an example of communication system information in the wireless communication system according to the first embodiment of the present invention (Chapter 5).

FIG. 119 is a diagram illustrating an example of neighboring cell information generated by the macro base station in the wireless communication system according to the first embodiment of the present invention (Chapter 5).

FIG. 120 is a diagram illustrating an example of neighboring cell information generated by the macro base station in the wireless communication system according to the first embodiment of the present invention (Chapter 5).

FIG. 121 is a diagram illustrating an example of a sequence of a handover operation in the wireless communication system according to the first embodiment of the present invention (Chapter 5).

FIG. 122 is a diagram illustrating an example of a method in which a wireless base station device notifies wireless terminal devices of neighboring cell information, in the wireless communication system according to the first embodiment of the present invention (Chapter 5).

FIG. 123 is a diagram illustrating an example of a method in which a wireless base station device notifies wireless terminal devices of neighboring cell information, in the wireless communication system according to the first embodiment of the present invention (Chapter 5).

FIG. 124 is a diagram illustrating an example of power transition notification message in the wireless communication system according to the first embodiment of the present invention (Chapter 5).

FIG. 125 is a diagram illustrating an example of a power state notification request message in the wireless communication system according to the first embodiment of the present invention (Chapter 5).

FIG. 126 is a diagram illustrating an example of a power state notification message in the wireless communication system according to the first embodiment of the present invention (Chapter 5).

FIG. 127 is a diagram illustrating another example of a power state notification message in the wireless communication system according to the first embodiment of the present invention (Chapter 5).

FIG. 128 is a diagram illustrating an example of a power state notification message in the wireless communication system according to the first embodiment of the present invention (Chapter 5).

FIG. 129 is a diagram illustrating an example of a power state notification request message in the wireless communication system according to the first embodiment of the present invention (Chapter 5).

FIG. 130 is a diagram illustrating an example of a power state notification message in the wireless communication system according to the first embodiment of the present invention (Chapter 5).

FIG. 131 is a diagram illustrating another example of a power state notification message in the wireless communication system according to the first embodiment of the present invention (Chapter 5).

FIG. 132 is a diagram illustrating another example of a base station power state notification message in the wireless communication system according to the first embodiment of the present invention (Chapter 5).

Figure 133:
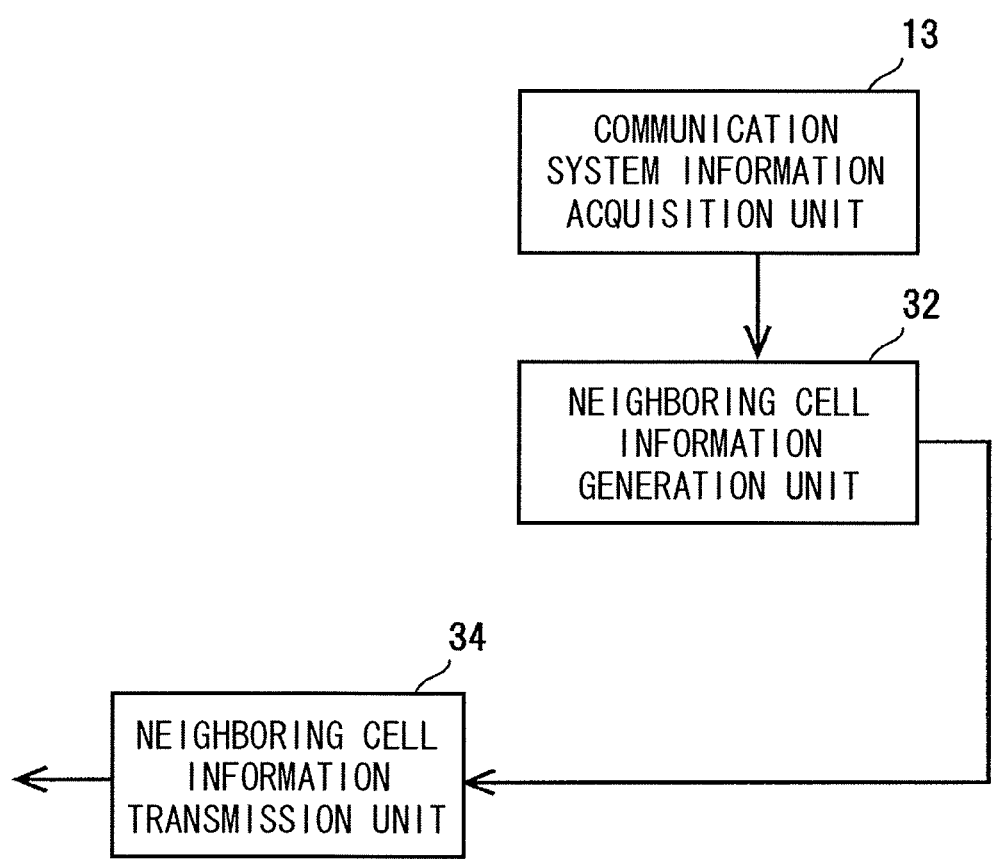

FIG. 133 is a diagram illustrating the configuration of a signal processing unit in a macro base station according to a second embodiment of the present invention (Chapter 5).

FIG. 134 is a diagram illustrating an example of neighboring cell information generated by the macro base station in the wireless communication system according to the second embodiment of the present invention (Chapter 5).

Figure 135:
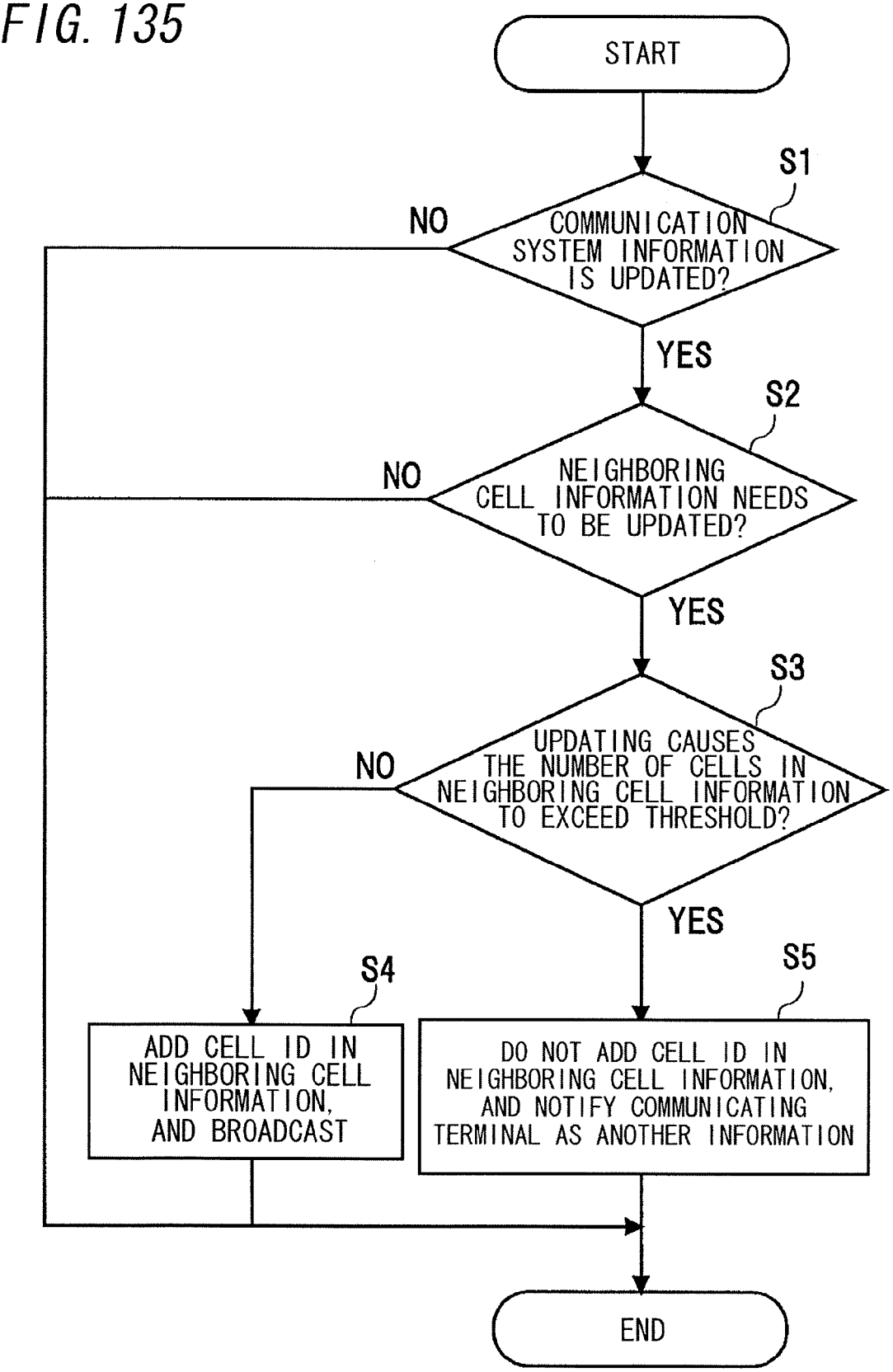

FIG. 135 is a flowchart illustrating process steps performed when the macro base station according to the second embodiment of the present invention (Chapter 5) updates neighboring cell information.

Figure 136:
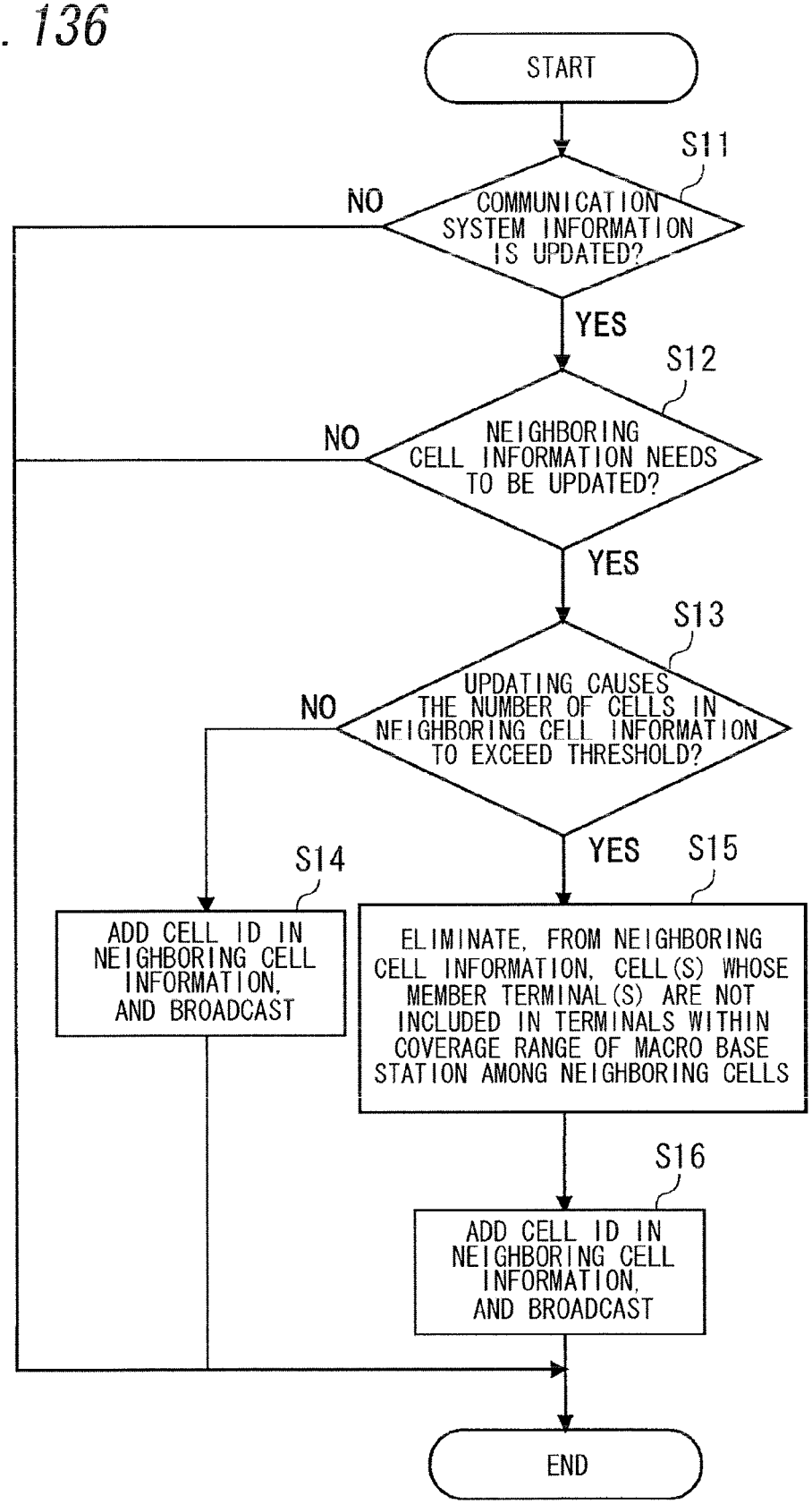

FIG. 136 is a flowchart illustrating another example of process steps performed when the macro base station according to the second embodiment of the present invention (Chapter 5) updates neighboring cell information.

Figure 137:
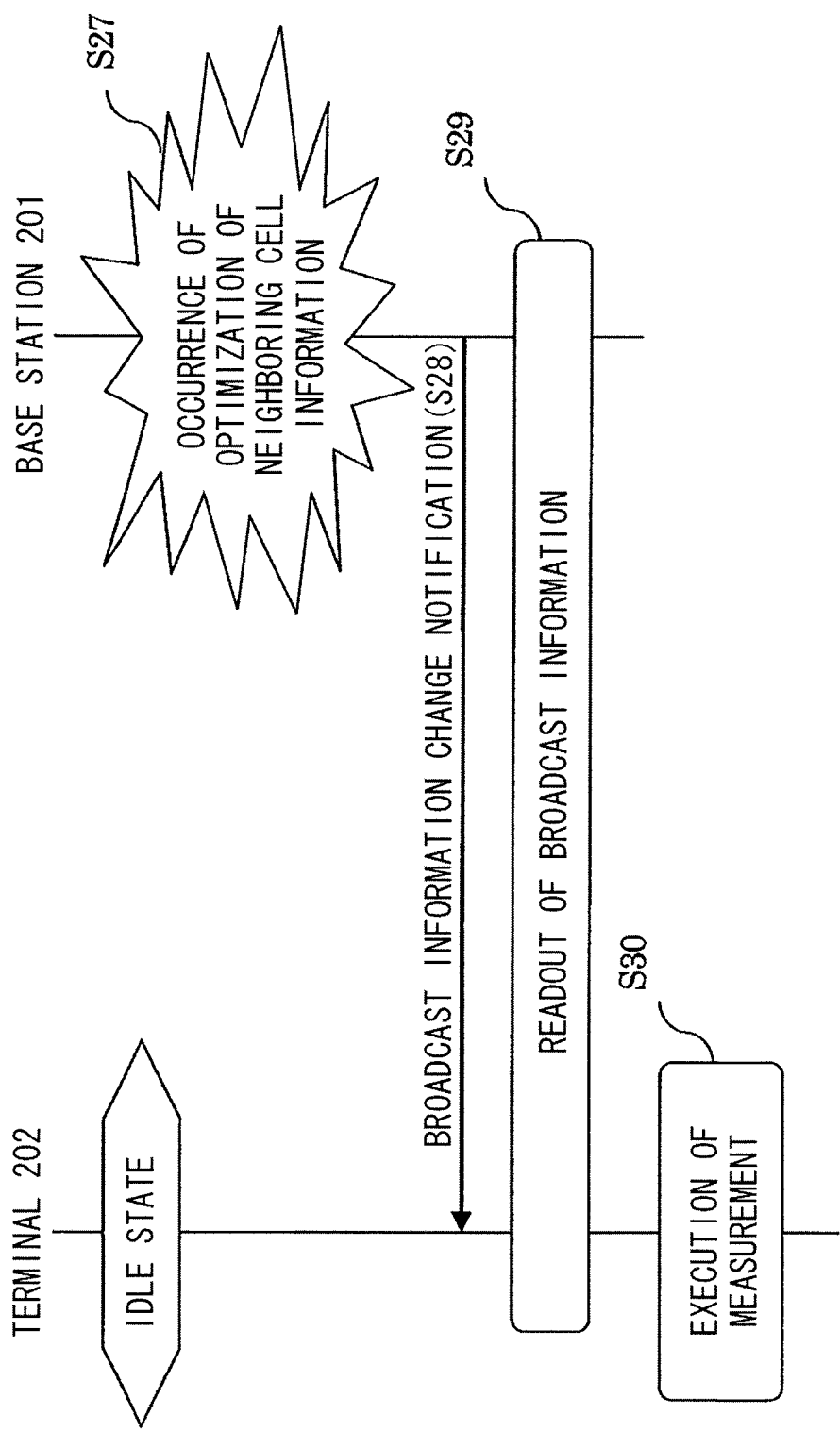

FIG. 137 is a diagram illustrating an example of a method in which a wireless base station device notifies wireless terminal devices of neighboring cell information, in the wireless communication system according to the second embodiment of the present invention (Chapter 5).

Figure 138:
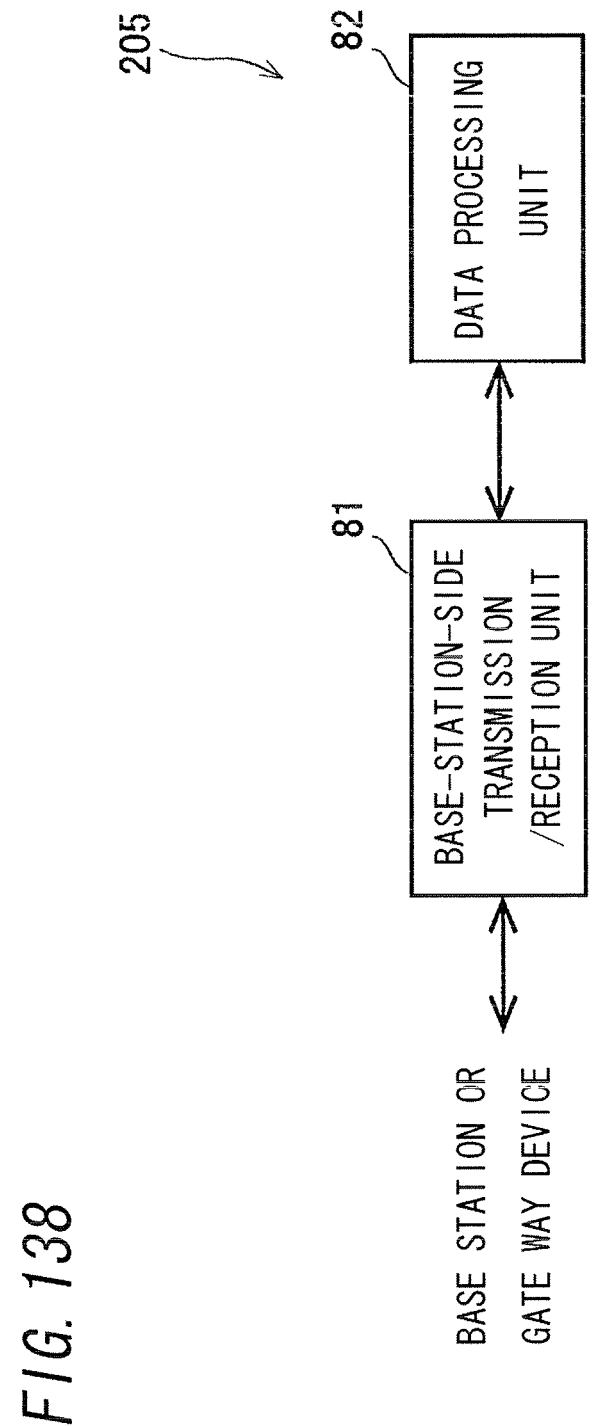

FIG. 138 is a diagram illustrating the configuration of a host device according to a third embodiment of the present invention (Chapter 5).

Figure 139:
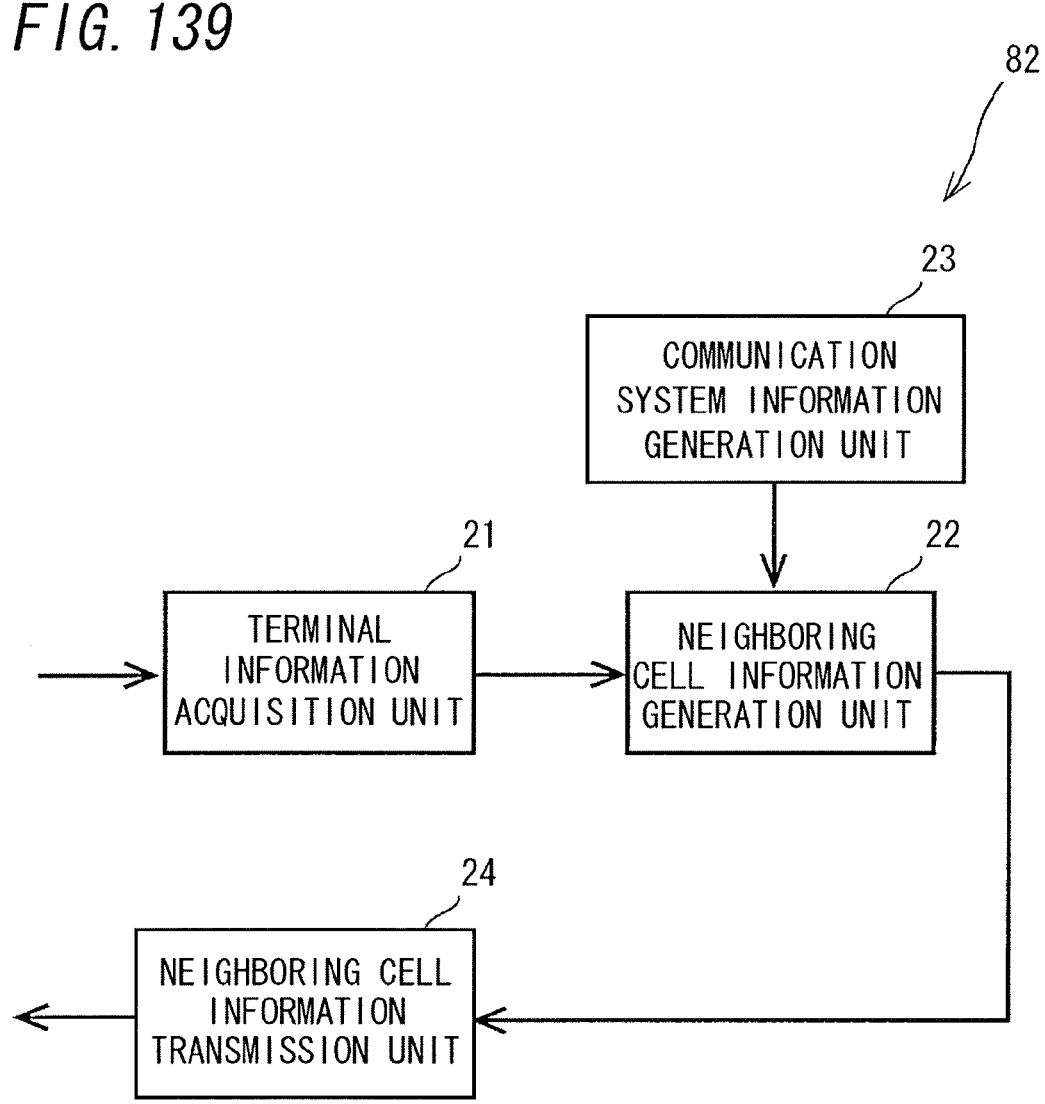

FIG. 139 is a diagram illustrating the configuration of a data processing unit in the host device according to the third embodiment of the present invention (Chapter 5).

DESCRIPTION OF EMBODIMENTS

<<Chapter 1>>

Hereinafter, embodiments of the present invention will be described with reference to the drawings. In Chapter 1, the same or corresponding components are given the same reference characters, and are not repeatedly described.

<Embodiment 1>

[Configuration and Fundamental Operation]

Figure 1:
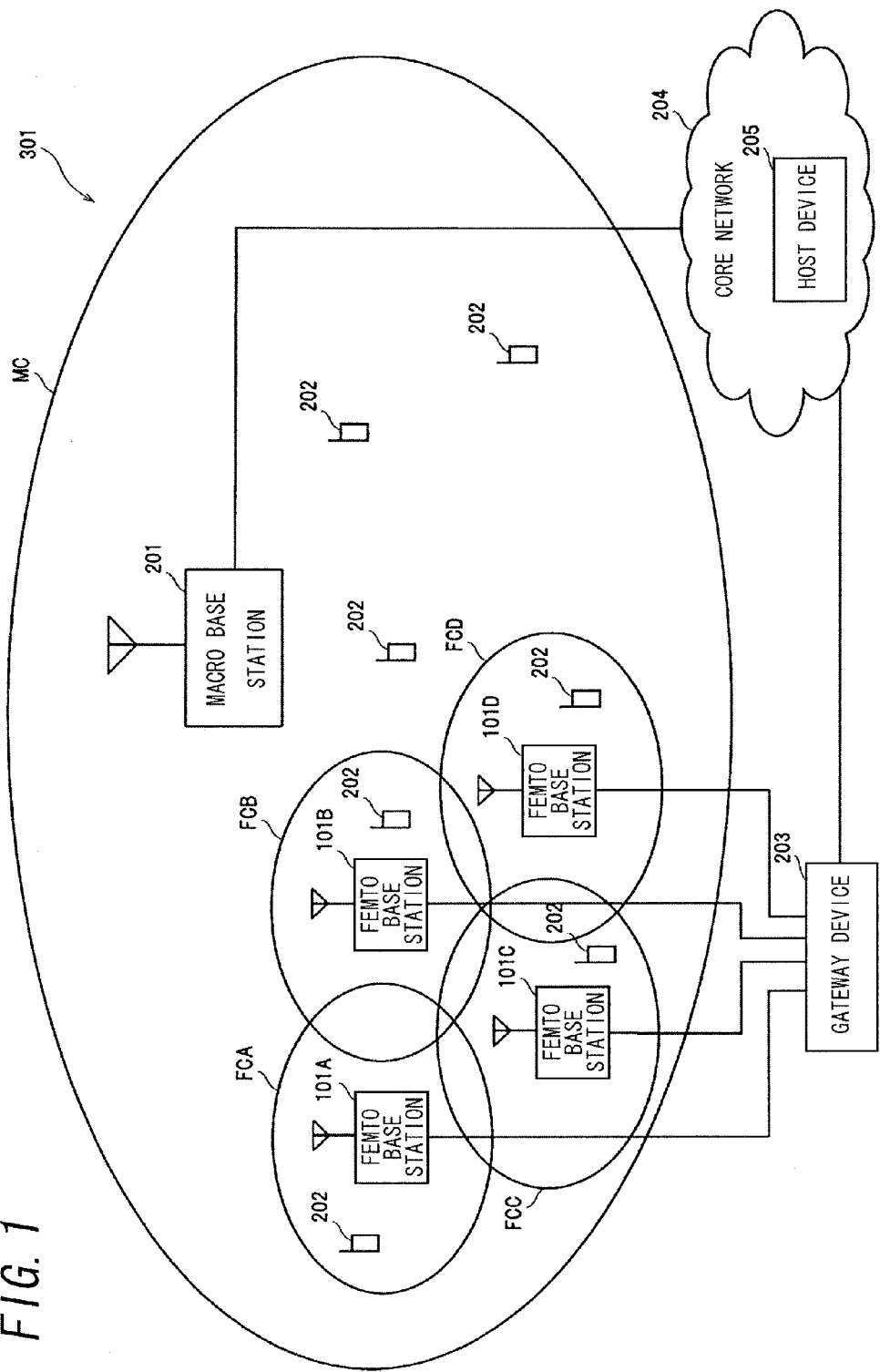
FIG. 1 is a diagram illustrating the configuration of a wireless communication system according to a first embodiment of the present invention (Chapter 1).

FIG. 1 is a diagram illustrating a configuration of a wireless communication system according to a first embodiment of the present invention.

With reference to FIG. 1, a wireless communication system 301 is a mobile communication system based on LTE (Long Term Evolution) standardized by, for example, 3GPP (Third Generation Partnership Project), and includes a macro base station 201, femto base stations (wireless base station devices) 101A, 101B, 101C, and 101D, and a gateway device 203. Further, in the present embodiment, the wireless communication system 301 includes a host device 205.

Hereinafter, each of the femto base stations 101A, 101B, 101C, and 101D is sometimes referred to as a femto base station 101. Although one macro base station and four femto base stations are representatively shown in FIG. 1, less or more macro base stations and femto base stations may be provided.

In the wireless communication system according to the first embodiment of the present invention, each of the femto base stations 101A, 101B, 101C, and 101D operates as a neighboring cell processing device. That is, each of the femto base stations 101A, 101B, 101C, and 101D solely performs optimization of neighboring cell information.

The macro base station 201 forms a macro cell MC having a radius of several kilometers. The femto base stations 101A, 101B, 101C, and 101D form femto cells FCA, FCB, FCC, and FCD, respectively, each having a radius of several tens of meters.

The macro base station 201 transmits/receives radio signals to/from wireless terminal devices 202 existing in the macro cell MC, and thus communicates with the wireless terminal devices 202.

The femto base stations 101A, 101B, 101C, and 101D are installed in places such as homes and underground malls where it is difficult for the wireless terminal devices 202 to receive a radio signal from the macro base station 201, and are allowed to communicate with the wireless terminal devices 202 existing in the femto cells FCA, FCB, FCC, and FCD, respectively, by transmitting/receiving radio signals to/from the wireless terminal devices 202.

The gateway device 203 performs, for example, a process of relaying various kinds of communication data transmitted between each of the femto base stations 101A, 101B, 101C, and 101D, and the host device 205 in the core network 204.

Figure 2:
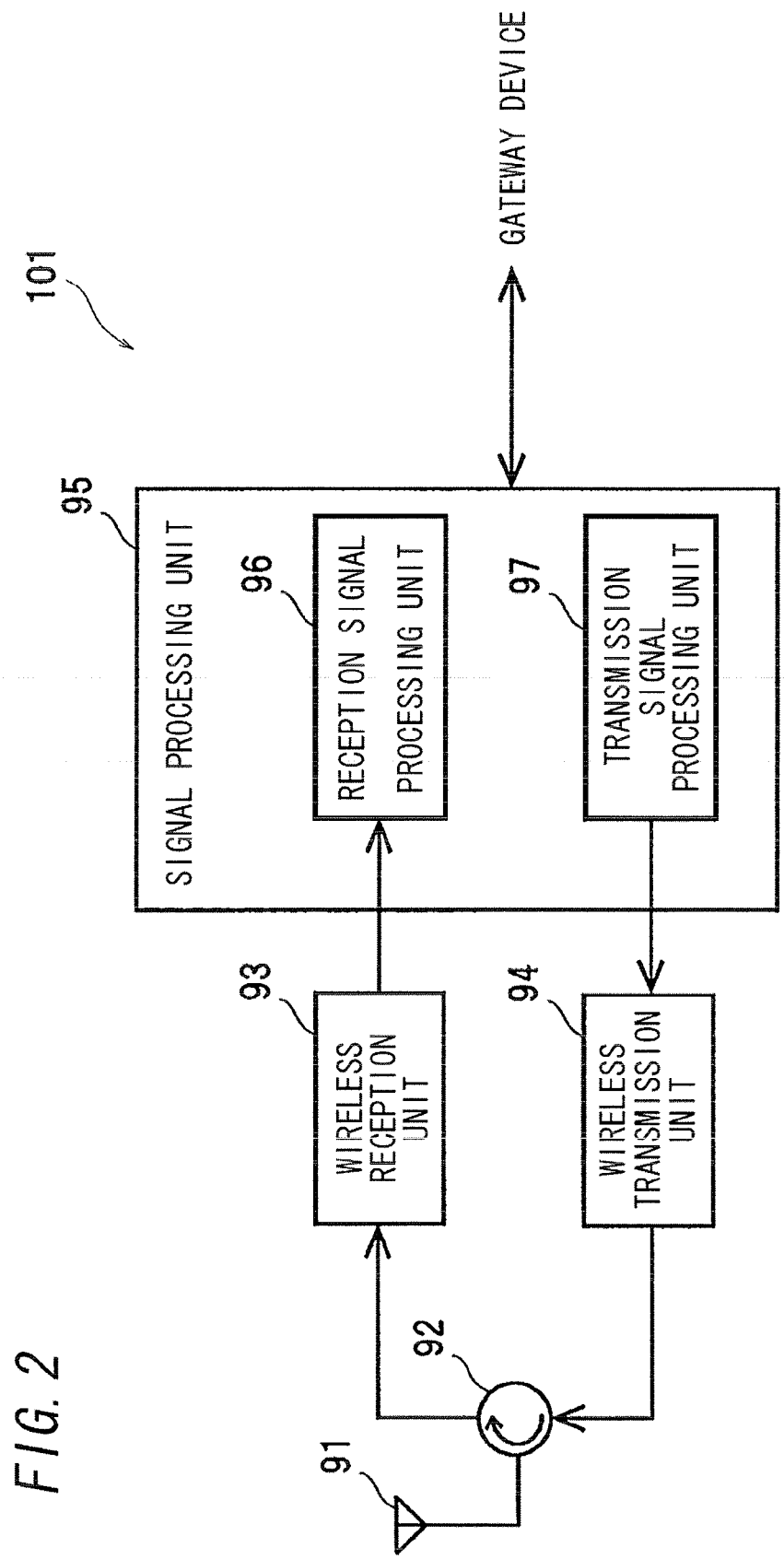
FIG. 2 is a diagram illustrating the configuration of a femto base station according to the first embodiment of the present invention (Chapter 1).

FIG. 2 is a diagram illustrating the configuration of the femto base station according to the first embodiment of the present invention.

With reference to FIG. 2, the femto base station 101 includes an antenna 91, a circulator 92, a wireless reception unit 93, a wireless transmission unit 94, and a signal processing unit 95. The signal processing unit 95 includes a reception signal processing unit 96 and a transmission signal processing unit 97. The signal processing unit 95 is implemented by a CPU (Central Processing Unit), a DSP (Digital Signal Processor), or the like.

The circulator 92 outputs a radio signal transmitted from the wireless terminal device 202 and received by the antenna 91, to the wireless reception unit 93, and outputs a radio signal provided from the wireless transmission unit 94, to the antenna 91.

The wireless reception unit 93 frequency-converts the radio signal provided from the circulator 92 into a base band signal or an IF (Intermediate Frequency) signal, converts the frequency-converted signal into a digital signal, and outputs the digital signal to the reception signal processing unit 96.

The reception signal processing unit 96 subjects the digital signal provided from the wireless reception unit 93 to signal processing such as reverse spreading in CDMA (Code Division Multiple Access), converts a part or the entirety of the processed digital signal into a predetermined frame format, and outputs the resultant signal to the gateway device 203.

The transmission signal processing unit 97 converts communication data received from the gateway device 203 into a predetermined frame format, or generates communication data, and subjects the converted or generated communication data to signal processing such as IFFT (Inverse Fast Fourier Transform) in OFDM (Orthogonal Frequency Division Multiplex), and then outputs a digital signal obtained by the signal processing to the wireless transmission unit 94.

The wireless transmission unit 94 converts the digital signal provided from the transmission signal processing unit 97 into an analog signal, frequency-converts the analog signal into a radio signal, and outputs the radio signal to the circulator 92.

Figure 3:
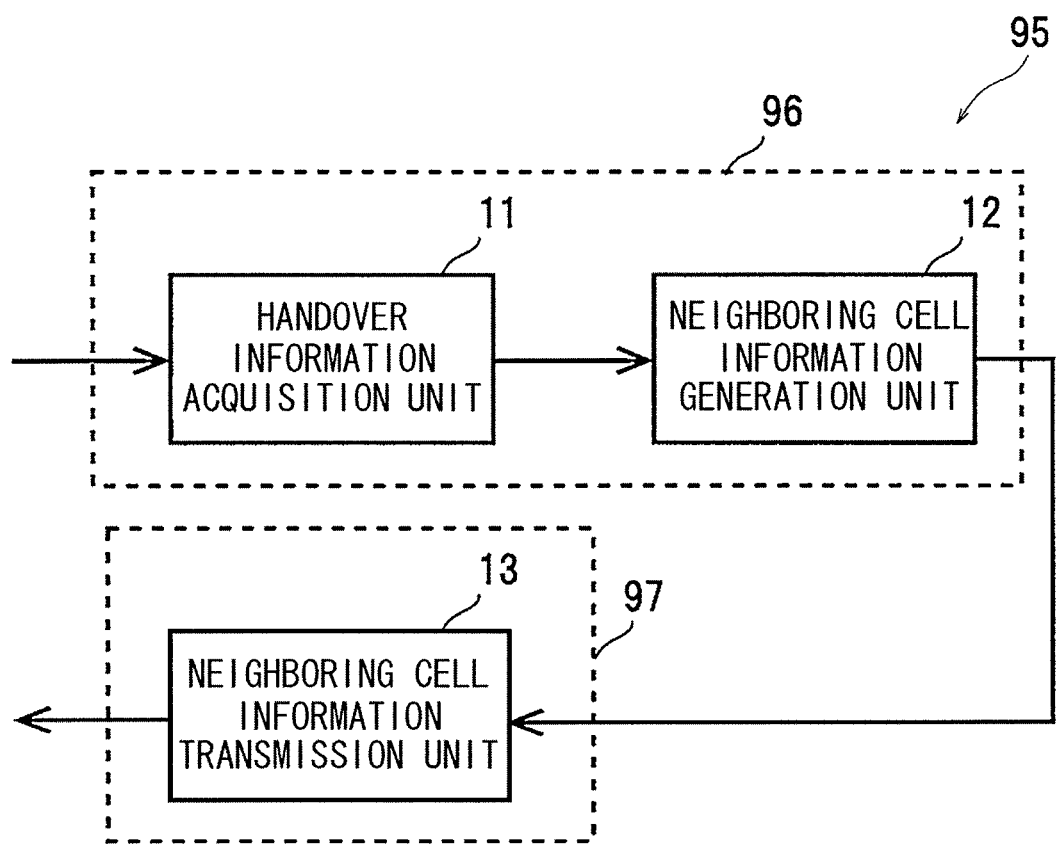
FIG. 3 is a diagram illustrating the configuration of a signal processing unit according to the first embodiment of the present invention (Chapter 1).

FIG. 3 is a diagram illustrating the configuration of the signal processing unit according to the first embodiment of the present invention.

With reference to FIG. 3, the reception signal processing unit 96 includes a handover information acquisition unit (movement information acquisition unit) 11, and a neighboring cell information generation unit 12. The transmission signal processing unit 97 includes a neighboring cell information transmission unit 13.

The handover information acquisition unit 11 acquires handover information (movement information) indicating a handover operation history (movement operation history) of the wireless terminal devices 202, based on information provided from at least either of other femto base stations 101 or the wireless terminal devices 202.

Based on the handover information acquired by the handover information acquisition unit 11, the neighboring cell information generation unit 12 generates neighboring cell information indicating one or a plurality of femto base stations 101 located in the neighborhood of a femto base station (hereinafter also referred to as "target femto base station") to which the neighboring cell information is to be given, among the plurality of femto base stations 101 other than the target femto base station, in the wireless communication system 301.

For example, the neighboring cell information generation unit 12 generates neighboring cell information indicating one or a plurality of femto base stations 101 to be candidate(s) for a handover destination of a wireless terminal device 202 which communicates with the target femto base station. In the first embodiment of the present invention, the target femto base station is the femto base station 101 according to the first embodiment.

The neighboring cell information transmission unit 13 transmits the neighboring cell information generated by the neighboring cell information generation unit 12 to wireless terminal devices 202 which are communicable with the femto base station 101, i.e., wireless terminal devices 202 existing in the femto cell formed by the femto base station 101.

[Generation of Initial Neighboring Cell Information]

Figure 4:
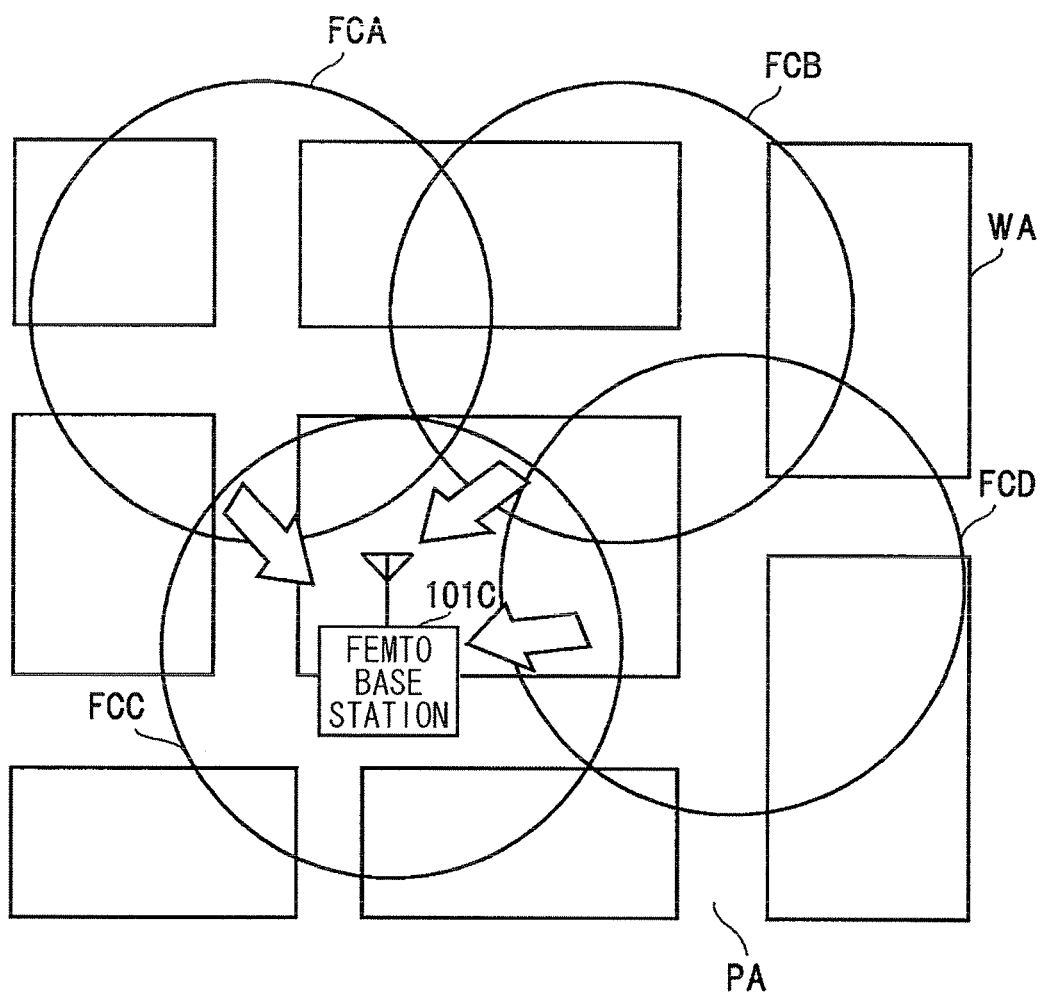
FIG. 4 is a diagram illustrating an example of a location of a femto base station, and an example of an arrangement of femto cells.

FIG. 4 is a diagram illustrating an example of an installation location of a femto base station, and an example of arrangement of femto cells.

With reference to FIG. 4, it is assumed that the femto base stations 101A, 101B, 101C, and 101D are located in, for example, an underground mall, and the femto cells FCA, FCB, FCC, and FCD are formed so as to partially overlap each other. This underground mall is partitioned by a plurality of structures WA, and thereby a plurality of passages PA are formed.

For example, when each femto base station 101 is installed and activated, the femto base station 101 searches for neighboring femto base stations 101, and generates initial neighboring cell information indicating the searched femto base stations. In FIG. 4, the femto base station 101C generates initial neighboring cell information indicating the femto base stations 101A, 101B, and 101D. In the wireless communication system 301, any method may be adopted for generating or gathering unoptimized neighboring cell information in the initial stage.

Figure 5:
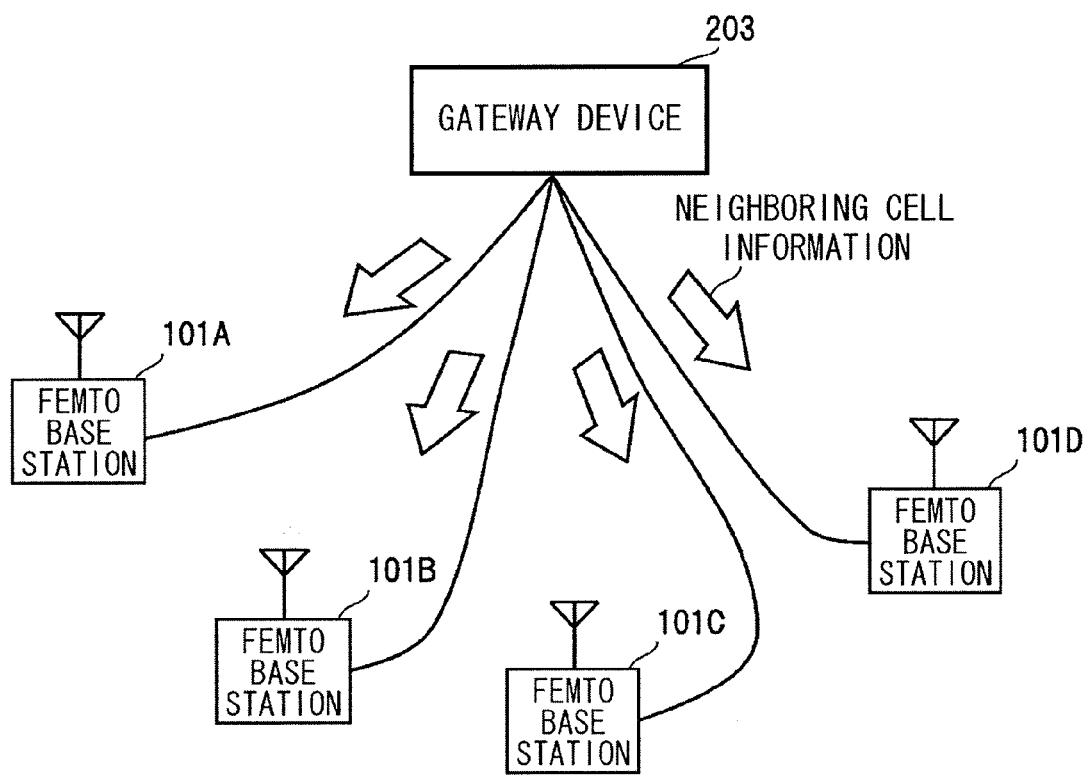
FIG. 5 is a diagram illustrating another method of generating initial neighboring cell information.

FIG. 5 is a diagram illustrating another example of a method of generating initial neighboring cell information.

With reference to FIG. 5, the femto base stations 101A, 101B, 101C, and 101D may acquire neighboring cell information from the gateway device 203 to which these femto base stations 101 are commonly connected. For example, the gateway device 203 notifies each femto base station 101 of neighboring cell information in which the target femto base station is eliminated from the subordinate femto base stations 101A, 101B, 101C, and 101D connected to the gateway device 203.

[Gathering of Handover Information]

Figure 6:
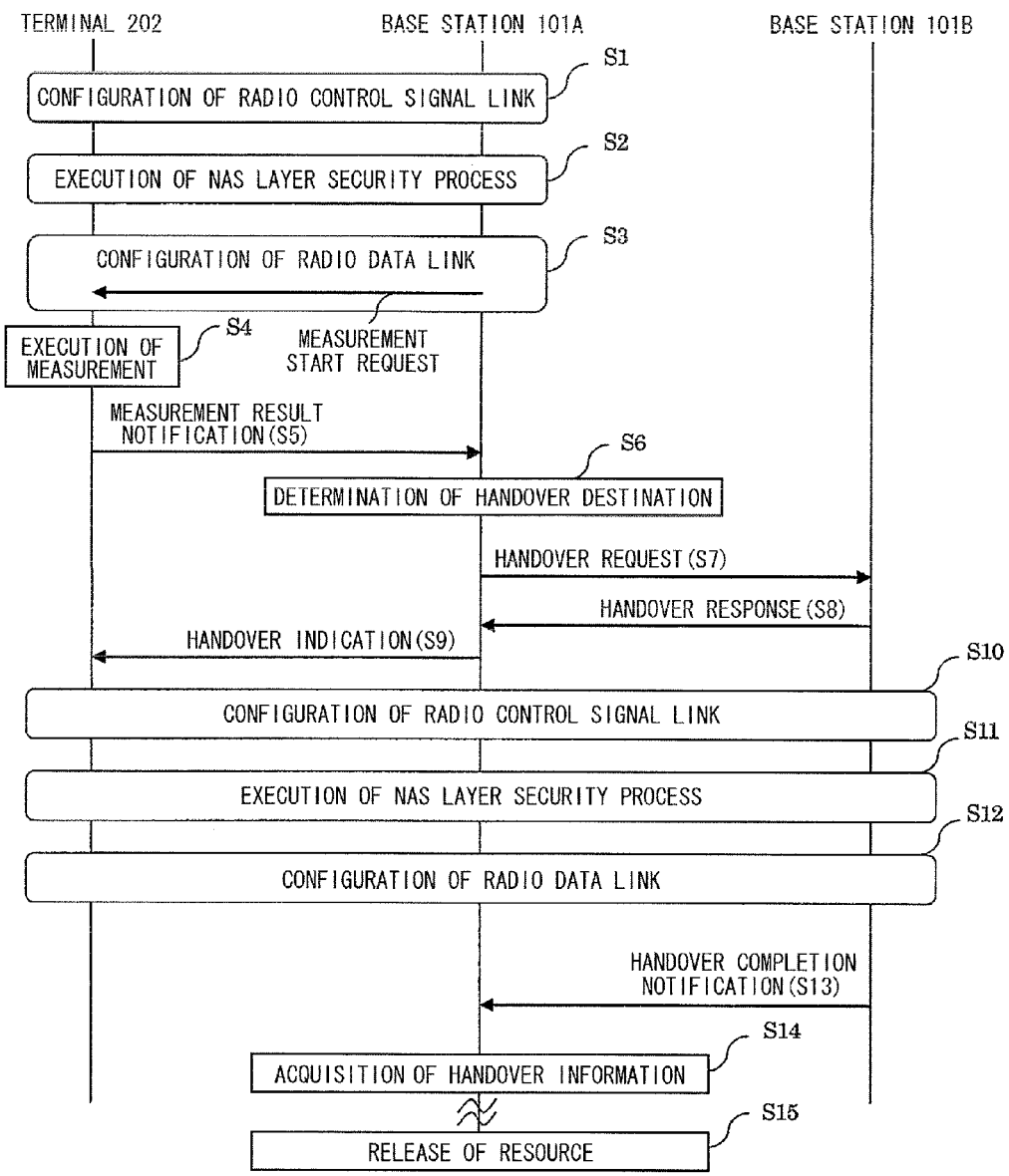
FIG. 6 is a diagram illustrating an example of a sequence from start of communication between a wireless terminal device and a femto base station to completion of handover, in the wireless communication system according to the first embodiment of the present invention (Chapter 1).

FIG. 6 is a diagram illustrating an example of a sequence from start of communication between a wireless terminal device and a femto base station to completion of handover, in the wireless communication system according to the first embodiment of the present invention.

With reference to FIG. 6, firstly, configuration of radio control signal link, i.e., various control processes in advance of transmission/reception of communication data such as IP (Internet Protocol) packets, is performed between the wireless terminal device 202 and the femto base station 101A (step S1).

Next, a security process for a NAS (Non-Access Stratum) layer, i.e., transmission/reception of information required for encryption of communication, is performed between the wireless terminal device 202 and the femto base station 101A (step S2). For example, in LTE, the wireless terminal device 202 transmits/receives information to/from the host device 205 in the core network 204, and the femto base station 101A relays the information.

Next, configuration of radio data link is performed between the wireless terminal device 202 and the femto base station 101A. For example, in the femto base station 101A, a resource allocation process for transmitting/receiving the communication data such as IP packets is performed, and thereafter, the communication data is transmitted/received between the wireless terminal device 202 and the femto base station 101A. Further, the femto base station 101A transmits, to the wireless terminal device 202, a measurement start request that causes the wireless terminal device 202 to measure the reception levels of radio signals transmitted from other femto base stations 101 (step S3). For example, in LTE, the measurement start request is included in a radio data link configuration request transmitted from the femto base station 101A to the wireless terminal device 202.

Upon receiving the measurement start request from the femto base station 101A, the wireless terminal device 202 measures the reception levels of radio signals transmitted from femto base stations 101 indicated in the neighboring cell information that the wireless terminal device 202 holds (step S4).

Then, the wireless terminal device 202 transmits, to the femto base station 101A, a measurement result notification indicating the measured reception levels (step S5).

Based on the measurement result notification provided from the wireless terminal device 202, the femto base station 101A determines whether or not the wireless terminal device 202 should perform handover. Upon determining that the wireless terminal device 202 should perform handover, the femto base station 101A determines, for example, the femto base station 101B as a handover destination (step S6).

In the wireless communication system according to the first embodiment of the present invention, "handover" means that a femto base station 101 which is a communication partner for a wireless terminal device 202 during phone call or data communication is changed to another femto base station 101.

Next, the femto base station 101A transmits a handover request to the femto base station 101B (step S7).

Upon receiving the handover request from the femto base station 101A, the femto base station 101B transmits a handover response to the handover request, to the femto base station 101A (step S8).

If the handover response received from the femto base station 101B indicates that handover is possible, the femto base station 101A transmits a handover indication to the wireless terminal device 202 (step S9).

Then, configuration of radio control signal link is performed between the wireless terminal device 202 and the femto base station 101B (step S10). At this time, canceling or the like of the radio control signal link and the radio data link is also performed between the wireless terminal device 202 and the femto base station 101A.

Next, a security process for an NAS layer is performed between the wireless terminal device 202 and the femto base station 101B (step S11).

Then, configuration of radio data link is performed between the wireless terminal device 202 and the femto base station 101B, and thereafter, communication data such as IP packets are transmitted/received between the wireless terminal device 202 and the femto base station 101B (step S12).

Next, the femto base station 101B transmits a handover completion notification to the femto base station 101A (step S13).

Upon receiving the handover completion notification from the femto base station 101B, the femto base station 101A acquires handover information, that is, updates the number of times of handover and the like that the femto base station 101A holds (step S14). Then, the femto base station 101A optimizes the neighboring cell information according to need.

When the phone call or data transmission by the wireless terminal device 202 is ended, the femto base station 101A releases the resources allocated to the wireless terminal device 202 (step S15).

Figure 7:
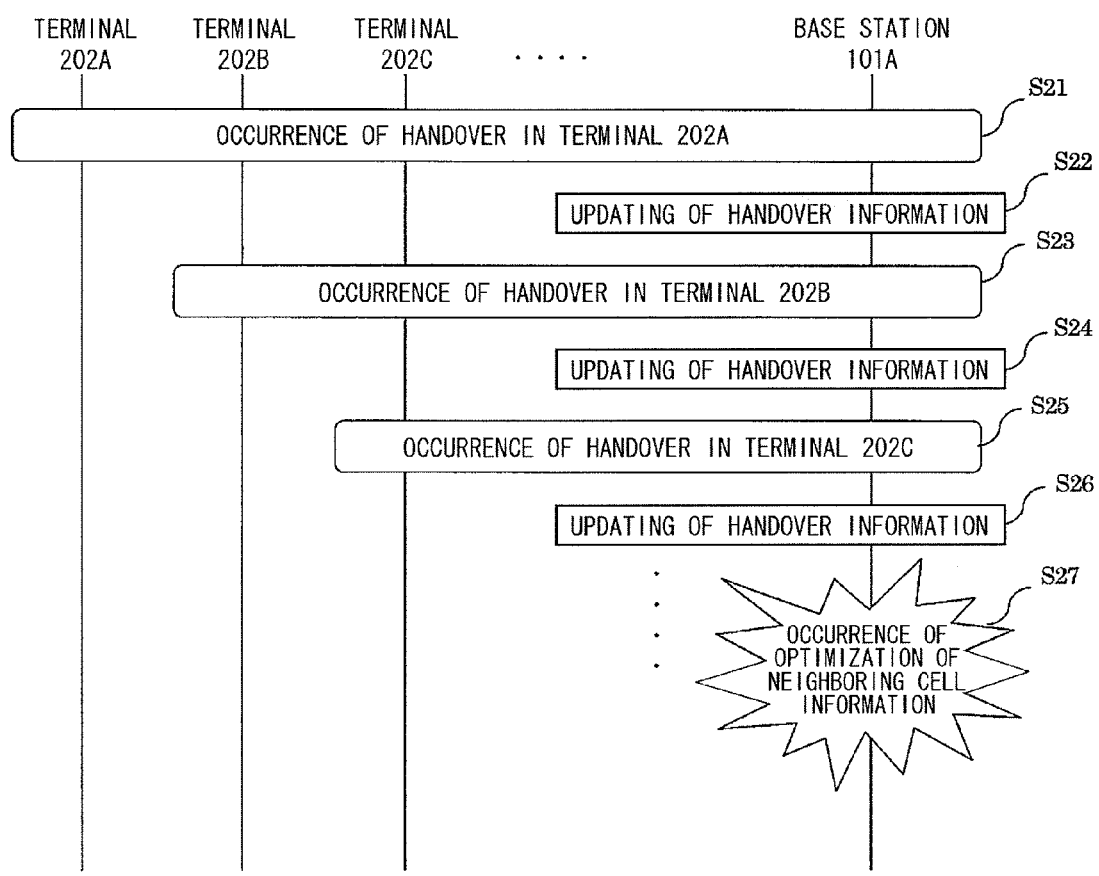
FIG. 7 is a diagram illustrating an example of a sequence in which a femto base station acquires handover information, in the wireless communication system according to the first embodiment of the present invention (Chapter 1).

FIG. 7 is a diagram illustrating an example of a sequence in which a femto base station acquires handover information, in the wireless communication system according to the first embodiment of the present invention.

With reference to FIG. 7, firstly, handover occurs in a wireless terminal device 202A with the femto base station 101A being a handover destination or a handover source (step S21).

Then, the femto base station 101A reflects, in the handover information, the content of the handover operation that has occurred in the wireless terminal device 202A, thereby updating the handover information (step S22).

Next, handover occurs in a wireless terminal device 202B with the femto base station 101A being a handover destination or a handover source (step S23).

Then, the femto base station 101A reflects, in the handover information, the content of the handover operation that has occurred in the wireless terminal device 202B, thereby updating the handover information (step S24).

Next, handover occurs in a wireless terminal device 202C with the femto base station 101A being a handover destination or a handover source (step S25).

Then, the femto base station 101A reflects, in the handover information, the content of the handover operation that has occurred in the wireless terminal device 202C, thereby updating the handover information (step S261).

Next, the femto base station 101A optimizes the neighboring cell information based on the updated handover information (step S27).

Figure 8:
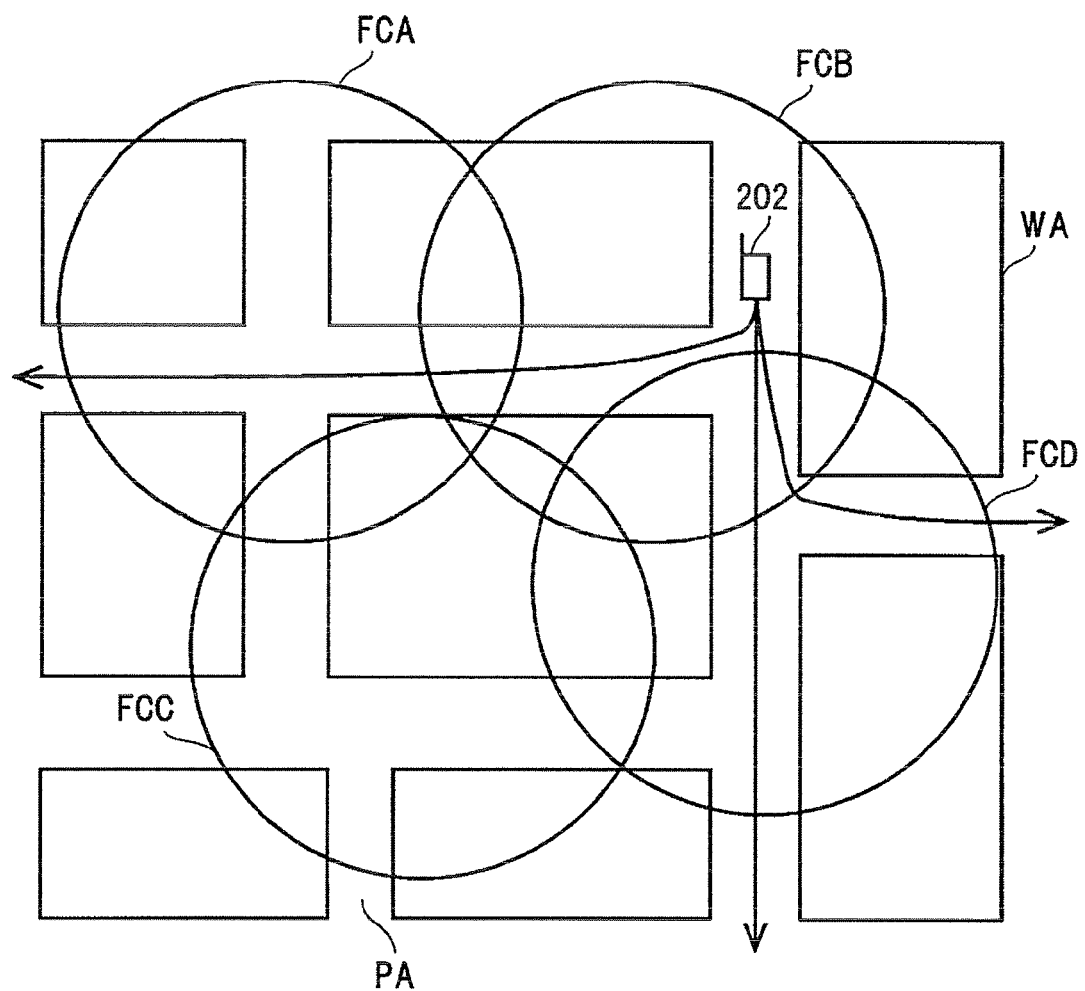
FIG. 8 is a diagram illustrating an example of routes in which a wireless terminal device moves in the installation place shown in FIG. 4.

FIG. 8 is a diagram illustrating an example of routes in which a wireless terminal device moves in the installation location shown in FIG. 4.

With reference to FIG. 8, assuming that a wireless terminal device 202 which exists in the femto cell FCB and is communicating with the femto base station 101B moves as indicated by arrows in FIG. 8, the wireless terminal device 202 performs handover from the femto base station 101B to the femto base station 101A, the femto base station 101C, and the femto base station 101D, respectively.

That is, when the wireless terminal device 202 which exists in the femto cell FCB and is communicating with the femto base station 101B moves as indicated by the arrows in FIG. 8, the communication partner for the wireless terminal device 202 is changed from the femto base station 101B to the femto base station 101A, the femto base station 101C, and the femto base station 101D, respectively.

Figure 9:
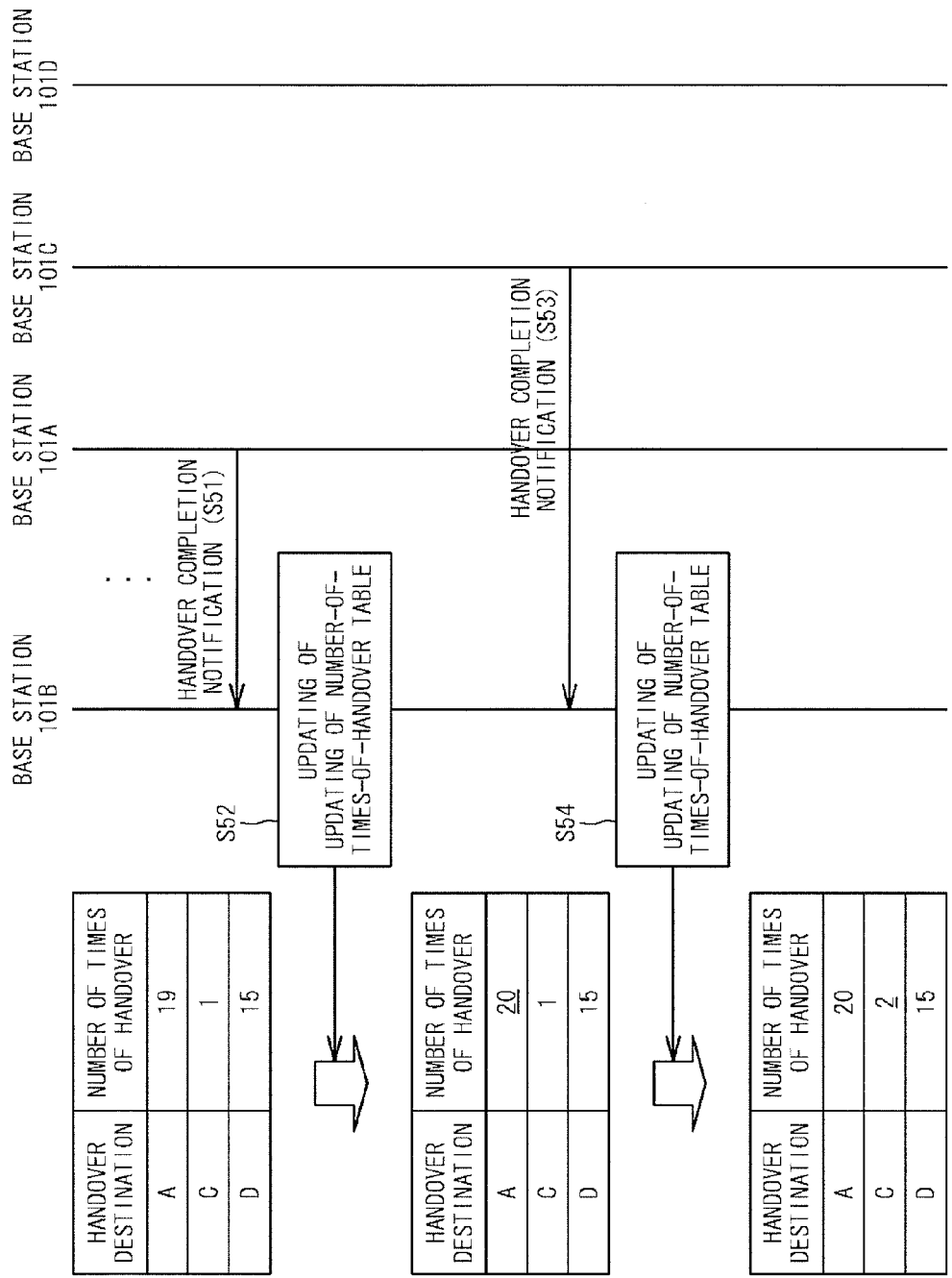
FIG. 9 is a diagram illustrating an example of a sequence in which a femto base station acquires handover information, and an example of the acquired handover information, according to the first embodiment of the present invention (Chapter 1).

FIG. 9 is a diagram illustrating an example of a sequence in which a femto base station acquires handover information, and an example of the acquired handover information, according to the first embodiment of the present invention.

With reference to FIG. 9, the femto base station 101B acquires handover information in accordance with the sequences shown in FIGS. 6 and 7. That is, the femto base station 101B counts the number of times of handover, for each femto base station as a handover destination, every time handover occurs and is completed in each wireless terminal device 202 (steps S51 and S53), and updates a number-of-times-of-handover table that the femto base station 101B holds (steps S52 and S54).

Specifically, in the femto base station 101B, a number-of-times-of-handover table is obtained, which indicates that 19 times of handover have occurred from the femto base station 101B to the femto base station 101A, one handover has occurred from the femto base station 101B to the femto base station 101C, and 15 times of handover have occurred from the femto base station 101B to the femto base station 101D.

Then, if handover from the femto base station 101B to the femto base station 101A occurs in the wireless terminal device 202, the femto base station 101A transmits a handover completion notification to the femto base station 101B (step S51).

Upon receiving the handover completion notification from the femto base station 101A, the femto base station 101B changes the number of times of handover from the femto base station 101B to the femto base station 101A, from 19 to 20, in the number-of-times-of-handover table (step S52).

Then, if handover from the femto base station 101B to the femto base station 101C occurs in the wireless terminal device 202, the femto base station 101C transmits a handover completion notification to the femto base station 101B (step S53).

Upon receiving the handover completion notification from the femto base station 101C, the femto base station 101B changes the number of times of handover from the femto base station 101B to the femto base station 101C, from 1 to 2, in the number-of-times-of-handover table (step S54).

The femto base station 101B optimizes the neighboring cell information every time it receives a handover completion notification, or at predetermined intervals. For example, the handover information acquisition unit 11 in the femto base station 101B counts the number of times of handover of the wireless terminal device 202 from the femto base station 101B to each of the femto base station 101A, the femto base station 101C, and the femto base station 101D, for a time period of about six hours to about one day, thereby acquiring handover information.

In the example shown in FIG. 9, a number-of-times-of-handover table is obtained, which indicates that, in the predetermined measurement period, 20 times of handover have occurred from the femto base station 101B to the femto base station 101A, 2 times of handover have occurred from the femto base station 101B to the femto base station 101C, and 15 times of handover have occurred from the femto base station 101B to the femto base station 101D.

In this way, the handover information acquisition unit 11 in the femto base station 101B acquires the handover information indicating the number of times of handover of the wireless terminal device 202 from the target femto base station (i.e. the femto base station 101B) to each of the femto base stations 101A, 101C, and 101D other than the femto base station 101B. In other words, the handover information acquisition unit 11 acquires the handover information indicating the number of times each of the femto base stations 101A, 101C, and 101D becomes a handover destination.

[Optimization of Neighboring Cell Information]

The neighboring cell information generation unit 12 in the femto base station 101B generates neighboring cell information in which at least the femto base station 101 whose number of times of handover indicated in the handover information is equal to or smaller than a predetermined value is eliminated from among the femto base stations 101A, 101C, and 101D.

Specifically, it is found from the number-of-times-of-handover table that the number of wireless terminal devices 202 that perform handover from the femto base station 101B to the femto base station 101C is extremely smaller than the number of wireless terminal devices 202 that perform handover from the femto base station 101B to the femto base stations 101A and 101D. Therefore, the neighboring cell information generation unit 12 assumes that the femto cell FCC does not exist in the actual routes of the wireless terminal devices 202 that move from the femto cell FCB, and determines that the femto base station 101C can be eliminated from the neighboring cell information targeted to the femto base station 101B (the target femto base station).

The above determination is specifically performed as follows. That is, the neighboring cell information generation unit 12 eliminates, from the neighboring cell information, a femto base station 101 as a handover destination whose number of times of handover is equal to or smaller than one N-th (1/N: N is a natural number not smaller than 2) of 20 that is the number of times of handover of the femto base station 101A. Alternatively, the neighboring cell information generation unit 12 eliminates, from the neighboring cell information, a femto base station 101 as a handover destination whose number of times of handover is equal to or smaller than one N-th (1/N: N is a natural number not smaller than 2) of an average number of times of handover, i.e., an average of numbers of times of handover to the femto base station 101A, the femto base station 101C, and the femto base station 101D.

The handover information acquisition unit 11 may acquire handover information indicating the handover operation history of the wireless terminal devices 202 in a certain time period from the present to a certain point in the past. That is, the neighboring cell information generation unit 12 may generate neighboring cell information based on the handover operation history in the time period from the present to a certain point in the past. For example, the neighboring cell information generation unit 12 may generate neighboring cell information based on the handover operation history in a time period from one day ago to the present time. Alternatively, the neighboring cell information generation unit 12 may generate neighboring cell information based on the handover history corresponding to a predetermined number of times of handover. For example, the neighboring cell information generation unit 12 may generate neighboring cell information based on the handover trial history corresponding to the latest thirty times of handover. This configuration prevents a femto base station 101 that has already been powered off from remaining in the neighboring cell information.

[Notification of Neighboring Cell Information]

As described above, the femto base station 101 performs optimization of the neighboring cell information at a certain timing in association with updating of the handover information. The femto base station 101 needs to notify the wireless terminal devices 202 of the optimized neighboring cell information. That is, the neighboring cell information transmission unit 13 in the femto base station 101 transmits the neighboring cell information generated by the neighboring cell information generation unit 12 to the wireless terminal devices 202 which are communicable with the femto base station 101 as the target femto base station. For example, the following three notification methods are considered.

Figure 10:
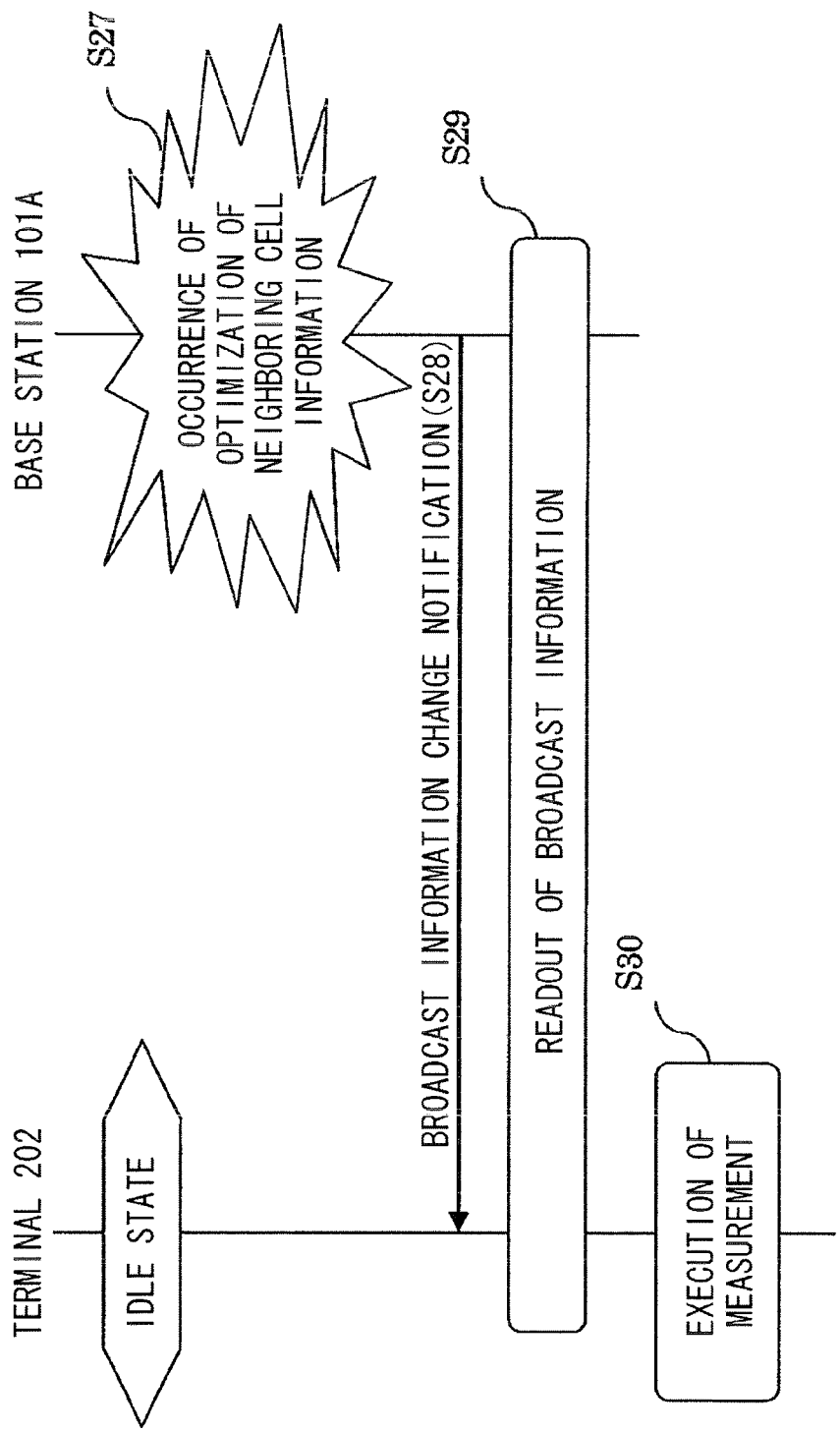
FIG. 10 is a diagram illustrating an example of a method in which a femto base station notifies wireless terminal devices of neighboring cell information, in the wireless communication system according to the first embodiment of the present invention (Chapter 1).

FIG. 10 is a diagram illustrating an example of a method in which a femto base station notifies wireless terminal devices of neighboring cell information, in the wireless communication system according to the first embodiment of the present invention.

With reference to FIG. 10, the femto base station 101A includes the neighboring cell information in broadcast information, and notifies wireless terminal devices 202 in the idle states, i.e., which are not during phone call or data communication, of the broadcast information. In this case, by using a broadcast information change notification, the femto base station 101A notifies the wireless terminal devices 202 that the neighboring cell information is updated.

More specifically, when optimization of the neighboring cell information occurs (step S27), the femto base station 101A broadcasts the broadcast information change notification to the wireless terminal devices 202 existing in the femto cell FCA (step S28).

Next, the femto base station 101A broadcasts the broadcast information including the updated neighboring cell information to the wireless terminal devices 202 existing in the femto cell FCA. Upon receiving the broadcast information change notification, each wireless terminal device 202 reads the neighboring cell information from the broadcast information transmitted from the femto base station 101A, and updates the neighboring cell information held therein to the read neighboring cell information (step S29).

Next, the wireless terminal device 202 measures, autonomously or upon receiving a measurement start request from the femto base station 101A, the reception levels of radio signals transmitted from the femto base stations 101 indicated in the updated neighboring cell information (step S30).

Figure 11:
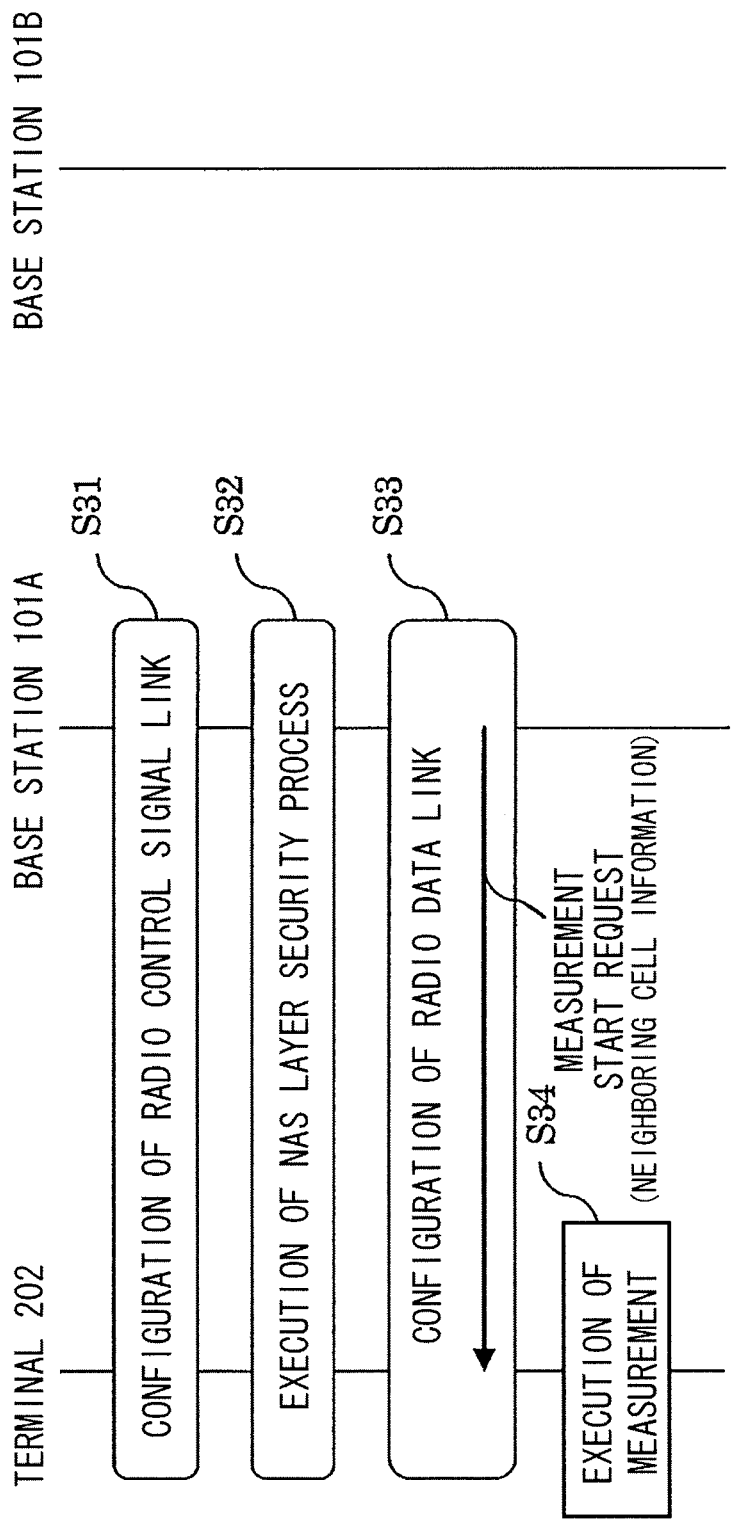
FIG. 11 is a diagram illustrating an example of a method in which a femto base station notifies wireless terminal devices of neighboring cell information, in the wireless communication system according to the first embodiment of the present invention (Chapter 1).

FIG. 11 is a diagram illustrating an example of a method in which a femto base station notifies wireless terminal devices of neighboring cell information, in the wireless communication system according to the first embodiment of the present invention.

With reference to FIG. 11, for example, in LTE, the femto base station 101A notifies a wireless terminal device 202 which performs an RRC (Radio Resource Control) connection establishing process (i.e., a wireless terminal device 202 which performs a process for starting communication with the femto base station 101A), of neighboring cell information when the femto base station 101A configures a radio data link.

More specifically, firstly, configuration of radio control signal link is performed between the wireless terminal device 202 and the femto base station 101A (step S31).

Next, a security process for a NAS layer is performed between the wireless terminal device 202 and the femto base station 101A (step S32).

Next, configuration of radio data link is performed between the wireless terminal device 202 and the femto base station 101A, and thereafter, communication data such as IP packets are transmitted/received between the wireless terminal device 202 and the femto base station 101A. Further, the femto base station 101A transmits to the wireless terminal device 202, a measurement start request that causes the wireless terminal device 202 to measure the reception levels of radio signals transmitted from other femto base stations (step S33). For example, in LTE, the measurement start request is included in a radio data link configuration request that is transmitted from the femto base station 101A to the wireless terminal device 202. The neighboring cell information is included in the measurement start request.

Upon receiving the measurement start request from the femto base station 101A, the wireless terminal device 202 updates the neighboring cell information held therein to the newly notified neighboring cell information, and measures the reception levels of radio signals transmitted from the femto base stations 101 indicated in the undated neighboring cell information (step S34).

Figure 12:
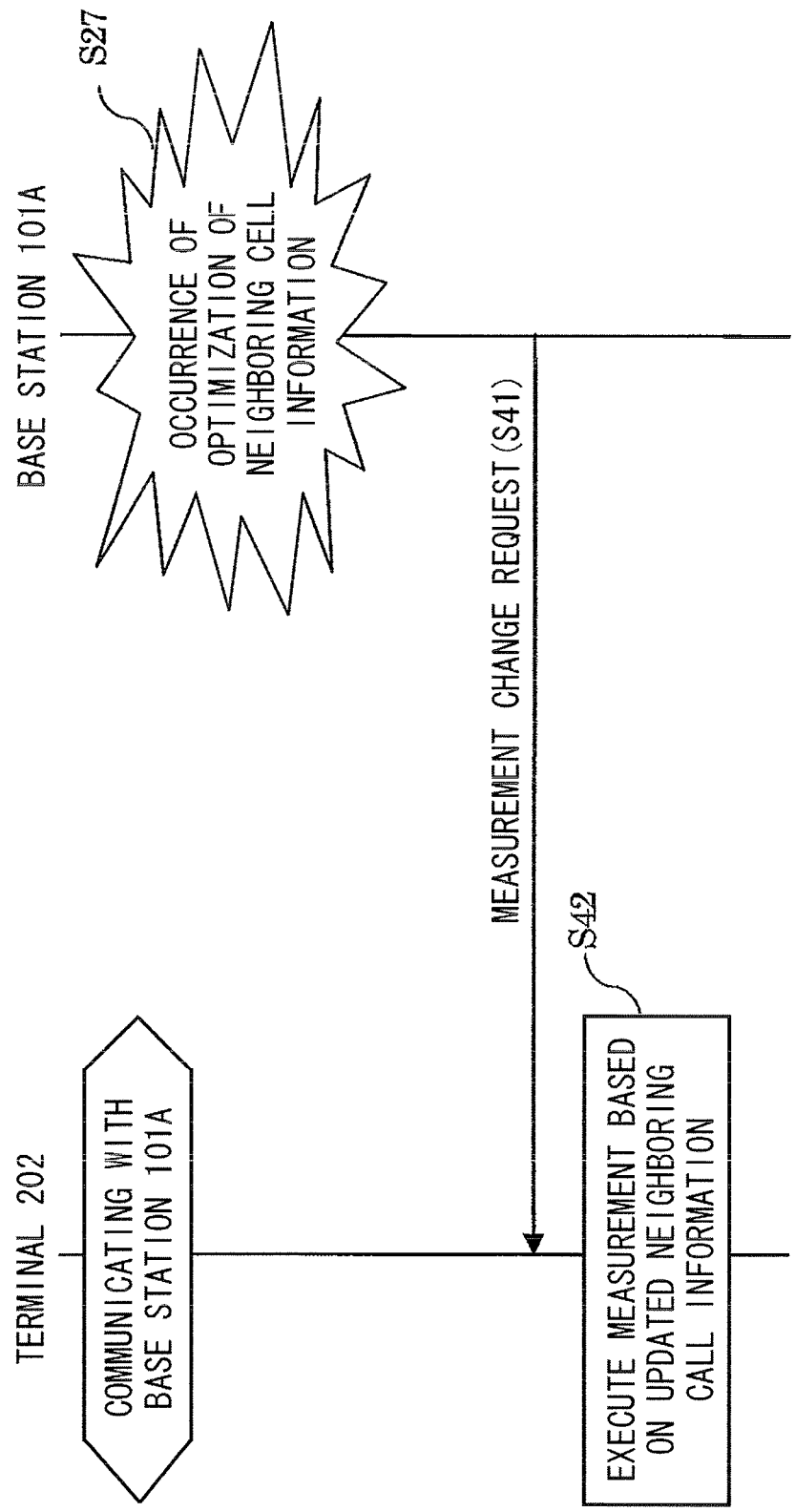
FIG. 12 is a diagram illustrating an example of a method in which a femto base station notifies wireless terminal devices of neighboring cell information, in the wireless communication system according to the first embodiment of the present invention (Chapter 1).

FIG. 12 is a diagram illustrating an example of a method in which a femto base station notifies wireless terminal devices of neighboring cell information, in the wireless communication system according to the first embodiment of the present invention.

With reference to FIG. 12, the femto base station 101A notifies a wireless terminal device 202 communicating with the femto base station 101A of updating of the neighboring cell information, by using a measurement change request.

More specifically, when optimization of the neighboring cell information occurs (step S27), the femto base station 101A includes the updated neighboring cell information in a measurement change request, and transmits the measurement change request to the wireless terminal device 202 (step S41).

Next, the wireless terminal device 202 changes the neighboring cell information held therein to the neighboring cell information included in the measurement change request received from the femto base station 101A, and measures the reception levels of radio signals transmitted from the femto base stations 101 indicated in the changed neighboring cell information (step S42).

By the way, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from femto base stations registered in the neighboring cell information, autonomously or upon receiving an indication from a femto base station, and notifies the femto base station of the measurement result. In this case, if a femto base station that is not suitable as a handover destination is registered in the neighboring cell information, the wireless terminal device performs an unnecessary measurement operation, and unnecessary handover occurs.

In contrast, in the wireless communication system according to the first embodiment of the present invention, the handover information acquisition unit 11 acquires the handover information indicating the handover operation history of the wireless terminal device 202, based on the information from the wireless terminal device 202, i.e., the handover completion notification. Based on the handover information acquired by the handover information acquisition unit 11, the neighboring cell information generation unit 12 generates neighboring cell information indicating one or a plurality of femto base stations 101 which are located in the neighborhood of the target femto base station, among the plurality of femto base stations 101 other than the target femto base station.

This configuration allows automatic optimization of the neighboring cell information, regardless of movement and power on/off of each femto base station. Therefore, the efficiency of operation in the wireless communication system 301 can be improved without manpower assistance. Further, since the neighboring cell information is automatically optimized, a special installation process for each femto base station 101 is not needed, thereby reducing the time and cost required for installing the femto base station 101.

If configuration of a femto base station is automatically performed by using the technique described in Patent Literature 1, all femto base stations located in the neighborhood of the femto base station are regarded as neighboring cells and registered in the neighboring cell information as candidates for a handover destination. Therefore, even a femto base station that is not essentially suitable as a handover destination, such as a femto base station located across a wall from a wireless terminal device, might be registered in the neighboring cell information.

In contrast, in the wireless communication system according to the first embodiment of the present invention, based on the handover information acquired by the handover information acquisition unit 11, the neighboring cell information generation unit 12 generates neighboring cell information indicating one or a plurality of femto base stations 101 to be candidate(s) for a handover destination of the wireless terminal device 202 which communicates with the target femto base station, among the plurality of femto base stations 101 other than the target femto base station.

This configuration causes the handover operation in the femto cell of the installed femto base station 101 to be in the optimum state. Further, by performing optimization of the neighboring cell information, the number of neighboring cells to be candidates for a destination of movement of a wireless terminal device 202 during communication can be reduced, thereby avoiding occurrence of unnecessary movement operation.

Further, in the wireless communication system according to the first embodiment of the present invention, the neighboring cell information generation unit 12 generates neighboring cell information indicating one or a plurality of femto base stations 101 to be the target(s) of measurement by the wireless terminal device 202, among the plurality of femto base stations 101 other than the target femto base station.

In this way, by performing optimization of the neighboring cell information, the number of neighboring cells to be the targets of measurement by the wireless terminal device 202 can be reduced, thereby preventing the wireless terminal device 202 from performing unnecessary measurement operation.

Furthermore, in the wireless communication system according to the first embodiment of the present invention, the neighboring cell information generation unit 12 generates neighboring cell information indicating one or a plurality of femto base stations 101 which output radio signals whose reception levels are to be measured by the wireless terminal device 202, among the plurality of femto base stations 101 other than the target femto base station.

In this way, by performing optimization of the neighboring cell information, the number of neighboring cells to be the targets of reception level measurement by the wireless terminal device 202 can be reduced, thereby preventing the wireless terminal device 202 from performing unnecessary measurement operation.

Furthermore, in the wireless communication system according to the first embodiment of the present invention, the neighboring cell information generation unit 12 generates neighboring cell information indicating one or a plurality of femto base stations 101 which transmit radio signal(s) whose reception level(s) are to be measured by the wireless terminal device 202 in the idle state, i.e., which is not communicating with the target femto base station, among the plurality of femto base stations 101 other than the target femto base station.

This configuration allows reduction in the number of neighboring cells to be the targets of periodical power measurement which is instructed by the broadcast information or the like from the femto base station 101, thereby preventing the wireless terminal device 202 from performing unnecessary measurement operation. In particular, the power consumption of the wireless terminal device 202 in the idle state can be reduced, resulting in remarkable effects.

Furthermore, in the wireless communication system according to the first embodiment of the present invention, the handover information acquisition unit 11 acquires handover information indicating the number of times of handover of the wireless terminal device 202 between the target femto base station and each of the plurality of femto base stations 101 other than the target femto base station.

By using the number of times of handover as a criterion for determining which femto base stations should be included in the neighboring cell information, it is possible to generate appropriate neighboring cell information.

Further, in the wireless communication system according to the first embodiment of the present invention, the neighboring cell information generation unit 12 generates neighboring cell information in which at least the femto base station 101 whose number of times of handover by the wireless terminal device 202 between the target femto base station and each of the plurality of femto base stations 101 other than the target femto base station is equal to or smaller than a predetermined value is eliminated from among the plurality of femto base stations 101 other than the target femto base station.

This configuration allows appropriate elimination of a femto base station 101 which has not been often selected as a handover destination, from the neighboring cell information.

Further, in the wireless communication system according to the first embodiment of the present invention, the femto base station 101 solely performs optimization of neighboring cell information. That is, the femto base station 101 (wireless base station device) is provided with the neighboring cell processing device according to the first embodiment of the present invention.

This configuration eliminates the need to optimize the neighboring cell information of each femto base station 101 by the gateway device 203 or the host device 205, thereby achieving dispersion of processing load in the wireless communication system 301, and reduction in the communication traffic between the femto base station 101 and the gateway device 203 or the host device 205.

In the wireless communication system according to the first embodiment of the present invention, a femto base station 101 acquires, as handover information, the number of times each of other femto base stations 101 becomes a handover destination, i.e., the number of times of handover from the femto base station 101 to each of other femto base stations 101, and generates neighboring cell information based on the handover information. However, the present invention is not limited thereto. A femto base station 101 may acquire, as handover information, the number of times each of other femto base stations 101 becomes a handover source, i.e., the number of times of handover from each of other femto base stations 101 to the femto base station 101, based on information provided from a wireless terminal device 202 that has made handover to the femto base station 101, and may generate neighboring cell information based on the handover information.

Further, in the wireless communication system according to the first embodiment of the present invention, a femto base station 101 has the initiative to select a femto base station 101 to be a communication partner of a wireless terminal device 202. However, the present invention is not limited thereto. A wireless terminal device 202 may have the initiative to select a femto base station 101 to be a communication partner of the wireless terminal device 202.

Hereinafter, a description will be given of another embodiment of the present invention with reference to figures. In the figures, the same or corresponding components are given the same reference characters and are not repeatedly described.

<Embodiment 2>

A second embodiment relates to a wireless communication system in which, instead of a femto base station, a gateway device serves as a neighboring cell processing device, in contrast to the wireless communication system of the first embodiment. The wireless communication system of the second embodiment is identical to the wireless communication system of the first embodiment except the matters described below.

Figure 13:
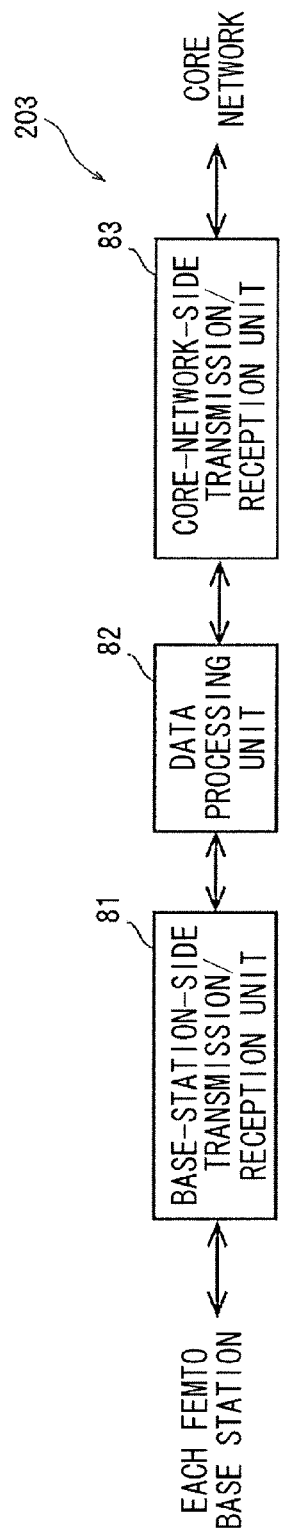
FIG. 13 is a diagram illustrating the configuration of a gateway device according to a second embodiment of the present invention (Chapter 1).

FIG. 13 is a diagram illustrating the configuration of a gateway device according to the second embodiment of the present invention.

With reference to FIG. 13, the gateway device 203 includes a base-station-side transmission/reception unit 81, a data processing unit 82, and a core-network-side transmission/reception unit 83.

The base-station-side transmission/reception unit 81 transmits communication data provided from the data processing unit 82 to each femto base station 101, and outputs communication data provided from each femto base station 101 to the data processing unit 82.

The data processing unit 82 performs various kinds of processing on the communication data provided from the base-station-side transmission/reception unit 81, and outputs the processed communication data to the core-network-side transmission/reception unit 83. Further, the data processing unit 82 performs various kinds of processing on the communication data provided from the core-network-side transmission/reception unit 83, and outputs the processed communication data to the base-station-side transmission/reception unit 81.

The core-network-side transmission/reception unit 83 outputs the communication data provided from the data processing unit 82 to the host device 205 in the core network 204, and outputs communication data received from the host device 205 in the core network 204 to the data processing unit 82.

In the wireless communication system according to the second embodiment of the present invention, the gateway device 203 monitors all subordinate femto base stations, and optimizes neighboring cell information. For example, the gateway device 203 gathers statistical information of the number of times of handover between the respective femto base stations 101.

Figure 14:
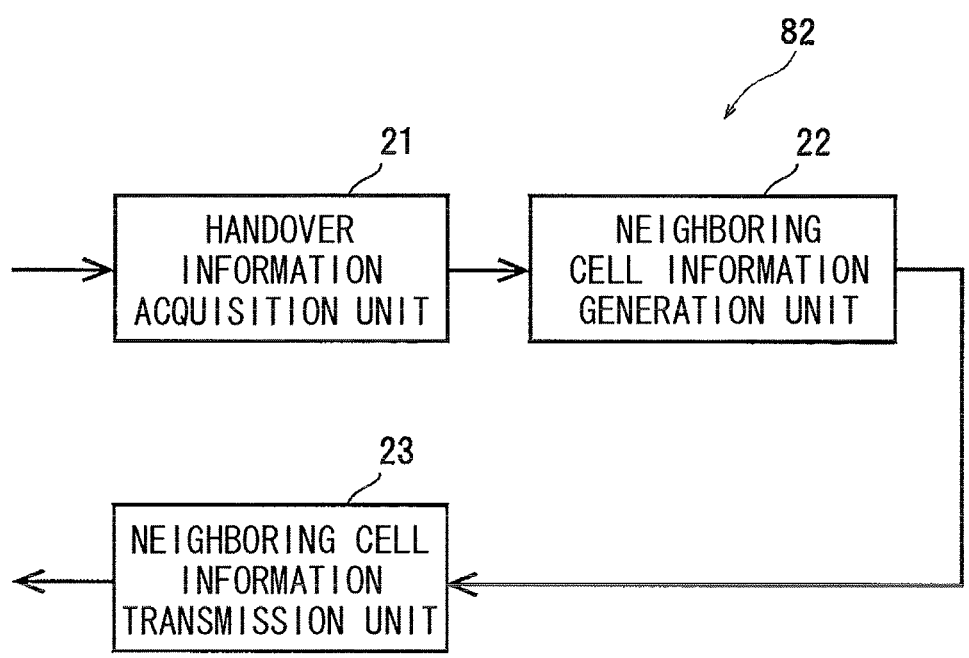
FIG. 14 is a diagram illustrating the configuration of a data processing unit in the gateway device according to the second embodiment of the present invention (Chapter 1).

FIG. 14 is a diagram illustrating the configuration of the data processing unit in the gateway device according to the second embodiment of the present invention.

With reference to FIG. 14, the data processing unit 82 includes a handover information acquisition unit 21, a neighboring cell information generation unit 22, and a neighboring cell information transmission unit 23.

The handover information acquisition unit 21 acquires handover information indicating a handover operation history of wireless terminal devices 202, based on information from each femto base station 101.

Based on the handover information acquired by the handover information acquisition unit 21, the neighboring cell information generation unit 22 generates neighboring cell information indicating one or a plurality of femto base stations 101 located in the neighborhood of a target femto base station, among a plurality of femto base stations 101 other than the target femto base station, in the wireless communication system 301.

For example, the neighboring cell information generation unit 22 generates neighboring cell information indicating one or a plurality of femto base stations 101 to be candidate(s) for a handover destination of a wireless terminal device 202 which communicates with the target femto base station.

The neighboring cell information transmission unit 23 transmits the neighboring cell information generated by the neighboring cell information generation unit 22 to the target femto base station.

Figure 15:
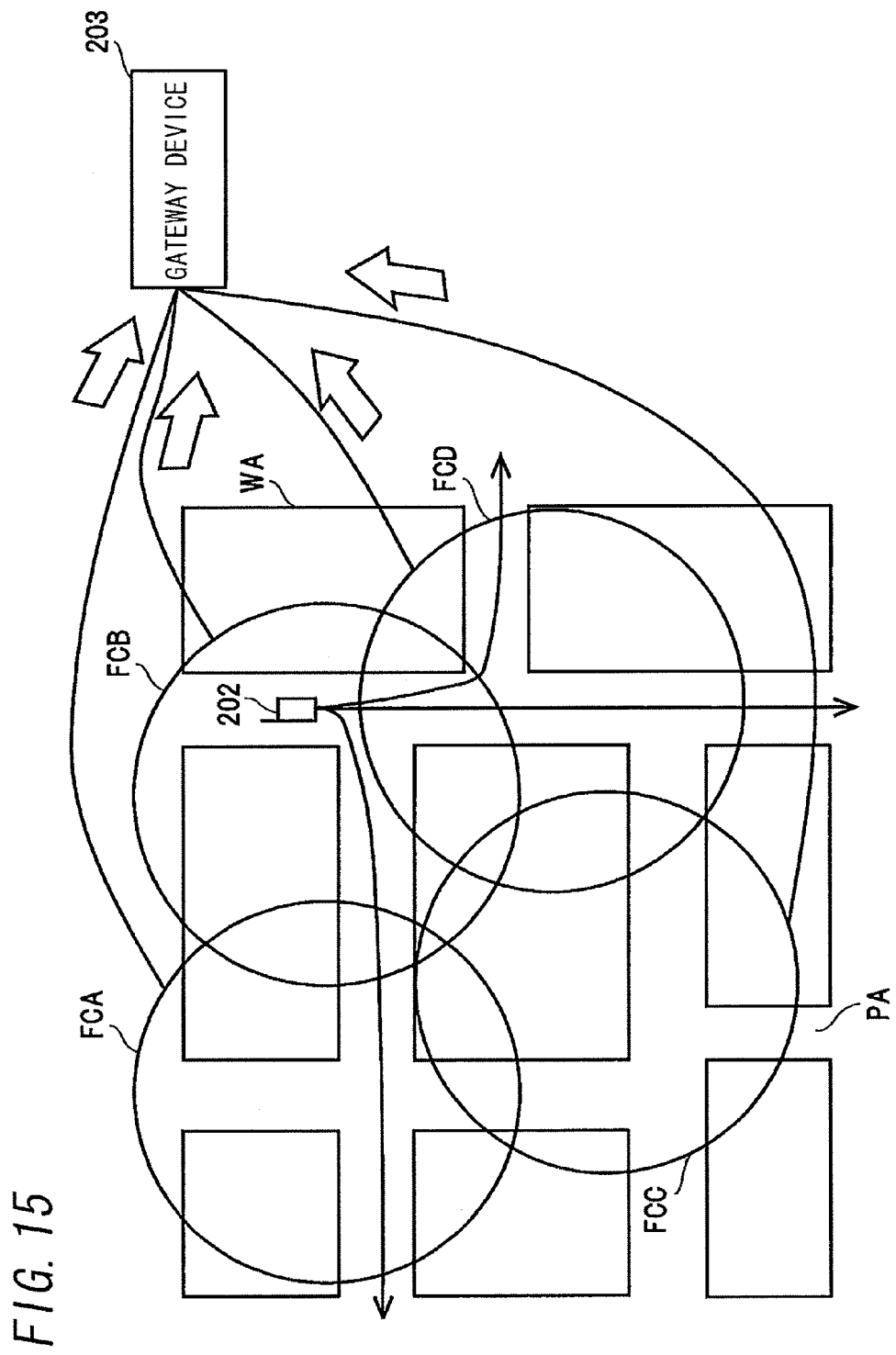
FIG. 15 is a diagram illustrating an example of handover operation, and an operation of the gateway device to acquire the handover information, in the wireless communication system according to the second embodiment of the present invention (Chapter 1).

FIG. 15 is a diagram illustrating an example of a handover operation and an operation of the gateway device to acquire handover information, in the wireless communication system according to the second embodiment of the present invention.

With reference to FIG. 15, based on information from each of femto base stations 101A, 101B, 101C, and 101D, the gateway device 203 acquires, as handover information, a number-of-times-of-handover table that shows the number of times of handover from a certain femto base station 101 as a handover source to each of the other femto base stations 101, the number of times of handover to a certain femto base station 101 as a handover destination from each of the other femto base stations 101.

Figure 16:
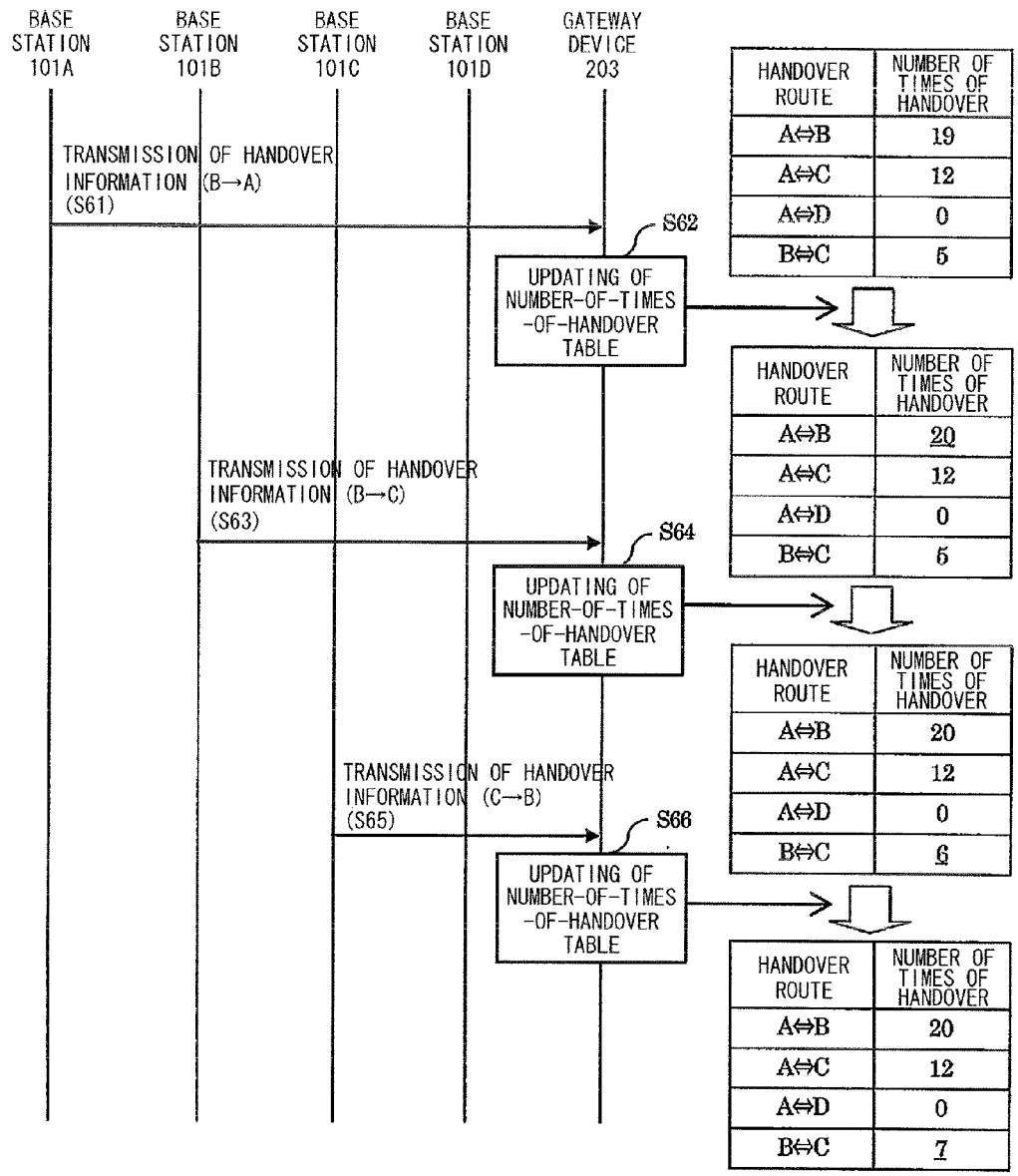
FIG. 16 is a diagram illustrating an example of a sequence in which the gateway device acquires handover information, and an example of the acquired handover information, according to the second embodiment of the present invention (Chapter 1).

FIG. 16 is a diagram illustrating an example of a sequence in which the gateway device according to the second embodiment of the present invention acquires handover information, and an example of the acquired handover information.

With reference to FIG. 16, when handover occurs, the gateway device 203 gathers information indicating the handover operation from each femto base station 101.

The information notified from each femto base station 101 at this time is information that allows the gateway device 203 to confirm from which femto base station 101 to which femto base station 101 the handover has been made. That is, this information includes identification information of a femto base station as a handover source, and identification information of a femto base station as a handover destination. It is optional which of the handover-source femto base station 101 and the handover-destination femto base station 101 notifies the gateway device 203 of this information.

Further, the gateway device 203 updates the number-of-times-of-handover table based on the gathered information, and updates the neighboring cell information based on the updated number-of-times-of-handover table, and then notifies each femto base station 101 of the updated neighboring cell information. The gateway device 203 generates neighboring cell information that each femto base station 101 requires, and notifies each femto base station 101 of the neighboring cell information. Each femto base station 101 notifies wireless terminal devices 202 of the neighboring cell information received from the gateway device 203, in the same manner as the femto base station according to the first embodiment of the present invention.

More specifically, in the gateway device 203, firstly, a number-of-times-of-handover table is obtained, which indicates that 19 times of handover have occurred between the femto base station 101A and the femto base station 101B, 12 times of handover have occurred between the femto base station 101A and the femto base station 101C, 0 times of handover have occurred between the femto base station 101A and the femto base station 101D, and 5 times of handover have occurred between the femto base station 101B and the femto base station 101C.

When handover from the femto base station 101B to the femto base station 101A occurs in a wireless terminal device 202, the femto base station 101A transmits information indicating the handover operation to the gateway device 203 (step S61).

Based on the information received from the femto base station 101A, the gateway device 203 changes the number of times of handover between the femto base station 101A and the femto base station 101B, from 19 to 20, in the number-of-times-of-handover table (step S62).

When handover from the femto base station 101B to the femto base station 101C occurs in a wireless terminal device 202, the femto base station 101B transmits information indicating the handover operation to the gateway device 203 (step S63).

Based on the information received from the femto base station 101B, the gateway device 203 changes the number of times of handover between the femto base station 101B and the femto base station 101C, from 5 to 6, in the number-of-times-of-handover table (step S64).

When handover from the femto base station 101C to the femto base station 101B occurs in a wireless terminal device 202, the femto base station 101C transmits information indicating the handover operation to the gateway device 203 (step S65).

Based on the information received from the femto base station 101C, the gateway device 203 changes the number of times of handover between the femto base station 101B and the femto base station 101C, from 6 to 7, in the number-of-times-of-handover table (step S66).

In the example shown in FIG. 16, a number-of-times-of-handover table is obtained, which indicates that, during a predetermined measurement period, 20 times of handover have occurred between the femto base station 101A and the femto base station 101B, 12 times of handover have occurred between the femto base station 101A and the femto base station 101C, 0 times of handover have occurred between the femto base station 101A and the femto base station 101D, and 7 times of handover have occurred between the femto base station 101B and the femto base station 101C.

In this case, the gateway device 203 eliminates the femto base station 101D which has the least number of times of handover, from the neighboring cell information targeted to the femto base station 101A (the target femto base station).

In the wireless communication system according to the first embodiment of the present invention, it is assumed that a femto base station is installed in a place where many people move in one direction in the morning of one day and many people move in the opposite direction in the afternoon of the same day. In this case, if measurement by the femto base station is performed in the morning, the femto base station might be determined as having less number of times of handover, and erroneously eliminated from the neighboring cell information.

In contrast to the first embodiment, in the wireless communication system according to the second embodiment of the present invention, the handover information acquisition unit 21 acquires handover information which indicates the number of times of handover of the wireless terminal devices 202 from the target femto base station to the plurality of femto base stations 101 other than the target femto base station, and the number of times of handover of the wireless terminal devices 202 from the plurality of femto base stations other than the target femto base station to the target femto base station. That is, since elimination of a femto base station 101 from the neighboring cell information is determined based on the number of times of bidirectional handover between two femto base stations 101, more appropriate neighboring cell information can be generated.

Although the gateway device according to the second embodiment of the present invention is provided separately from the femto base stations 101, the present invention is not limited thereto. The gateway device 203 may be included in at least one of the femto base stations 101 in the wireless communication system 301. In this case, the femto base station 101 equipped with the gateway device 203 acquires handover information, based on information from wireless terminal devices 202 existing in its own femto cell, and information from other femto base stations 101. Then, the gateway device 203 notifies the wireless terminal devices 202 existing in its femto cell and the other femto base stations 101 of the generated neighboring cell information.

Since other components and operations of the wireless communication system of the second embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 3>

A third embodiment relates to a wireless communication system in which the content of handover information is changed from that of the wireless communication system according to the second embodiment. The wireless communication system of the third embodiment is identical to the wireless communication system of the second embodiment except the matters described below.

Figure 17:
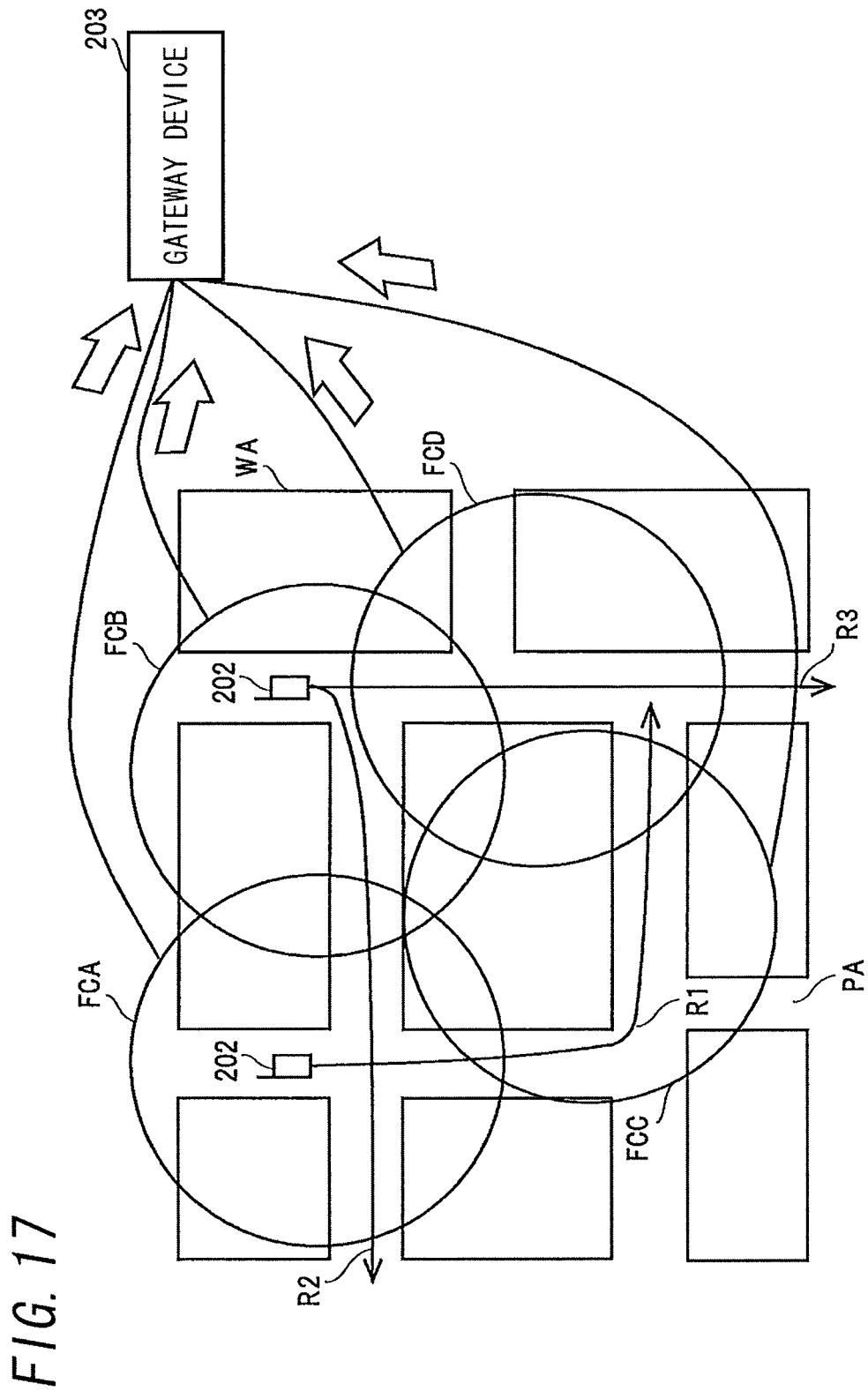
FIG. 17 is a diagram illustrating an example of handover operation, and an operation of a gateway device to acquire handover information, in a wireless communication system according to a third embodiment of the present invention (Chapter 1).

FIG. 17 is a diagram illustrating an example of a handover operation and an operation of the gateway device to acquire handover information, in the wireless communication system according to the third embodiment of the present invention.

With reference to FIG. 17, if a wireless terminal device 202 which exists in a femto cell FCA and is communicating with a femto base station 101A moves as shown by an arrow R1 in FIG. 17, the wireless terminal device 202 performs handover from the femto base station 101A to a femto base station 101C, and then performs handover from the femto base station 101C to a femto base station 101D.

Further, if a wireless terminal device 202 which exists in a femto cell FCB and is communicating with a femto base station 101B moves as shown by an arrow R2 in FIG. 17, the wireless terminal device 202 performs handover from the femto base station 101B to the femto base station 101C, and then performs handover from the femto base station 101C to the femto base station 101A.

Further, if a wireless terminal device 202 which exists in the femto cell FCB and is communicating with the femto base station 101B moves as shown by an arrow R3 in FIG. 17, the wireless terminal device 202 performs handover from the femto base station 101B to the femto base station 101C, and then performs handover from the femto base station 101C to the femto base station 101D.

FIG. 18 is a diagram illustrating an example of handover information acquired by the gateway device according to the third embodiment of the present invention.

With reference to FIG. 18, the gateway device 203 acquires handover information as follows. When a wireless terminal device 202 performs handover between the femto base station 101A and the femto base station 101D via the femto base station 101C, an average time from when the wireless terminal device 202 performs handover to the femto base station 101C to when it performs handover to the femto base station 101A or the femto base station 101D, i.e., an average sojourn time of the wireless terminal device 202 in the femto cell FCC, is 20 seconds.

Further, when a wireless terminal device 202 performs handover between the femto base station 101A and the femto base station 101B via the femto base station 101C, an average time from when the wireless terminal device 202 performs handover to the femto base station 101C to when it performs handover to the femto base station 101A or the femto base station 101B, i.e., an average sojourn time of the wireless terminal device 202 in the femto cell FCC, is 5 seconds.

Further, when a wireless terminal device 202 performs handover between the femto base station 101B and the femto base station 101D via the femto base station 101C, an average time from when the wireless terminal device 202 performs handover to the femto base station 101C to when it performs handover to the femto base station 101B or the femto base station 101D, i.e., an average sojourn time of the wireless terminal device 202 in the femto cell FCC, is 2 seconds.

Based on these pieces of information, the gateway device 203 determines whether or not the femto base station 101C should be eliminated from the neighboring cell information for each of the femto base stations 101A, 101B, and 101D. Specifically, in the neighboring cell information targeted to the femto base station 101A (the target femto base station), the gateway device 203 does not eliminate the femto base station 101C, because the sojourn time in the femto base station 101C during the handover between the femto base station 101A and the femto base station 101D is long (20 seconds) although the sojourn time in the femto base station 101C during the handover between the femto base station 101A and the femto base station 101B is short (5 seconds).

Further, in the neighboring cell information targeted to the femto base station 101D (the target femto base station), the gateway device 203 does not eliminate the femto base station 101C, because the sojourn time in the femto base station 101C during the handover between the femto base station 101D and the femto base station 101A is long (20 seconds) although the sojourn time in the femto base station 101C during the handover between the femto base station 101D and the femto base station 101B is short (2 seconds).

On the other hand, in the neighboring cell information targeted to the femto base station 101B (the target femto base station), the gateway device 203 eliminates the femto base station 101C, because the sojourn time in the femto base station 101C during the handover between the femto base station 101B and the femto base station 101A is short (5 seconds), and the sojourn time in the femto base station 101C during the handover between the femto base station 101B and the femto base station 101D is also short (2 seconds).

As described above, FIGS. 17 and 18 show an example of a case where any of the femto base stations 101A, 101B, and 101D is the target femto base station, and the femto base station 101C is the first femto base station. In the wireless communication system according to the third embodiment, the following processing is performed.

Specifically, in the wireless communication system according to the third embodiment of the present invention, it is assumed that, among a plurality of femto base stations (101B, 101C, and 101D) other than a target femto base station (e.g., 101A), the femto base station 101C is the first femto base station and the remaining femto base stations 101B and 101D are the second femto base stations, and a wireless terminal device 202 performs handover between the target femto base station (101A) and each of the remaining second femto base stations (101B and 101D) via the first femto base station (101C). In this case, the handover information acquisition unit 21 in the gateway device 203 acquires handover information which indicates sojourn times from when the wireless terminal device 202 performs handover to the first femto base station (101C) to when it performs handover to the target femto base station (101A) and the remaining second femto base stations (101B and 101D), respectively. For example, the handover information acquisition unit 21 acquires the handover information, based on information from the first femto base station (101C).

In this way, by using the sojourn time of the wireless terminal device 202 in the femto base station through which the wireless terminal device 202 has traveled at the time of handover, as a criterion for determining which femto base stations should be included in the neighboring cell information, it is possible to generate appropriate neighboring cell information.

Then, the neighboring cell information generation unit 22 generates neighboring cell information in which at least the first femto base station corresponding to a sojourn time indicated in the handover information, which is equal to or shorter than a predetermined value (for example, 5 seconds or shorter in FIG. 18) with respect to all the second femto base stations, is eliminated from among the plurality of femto base stations other than the target femto base station.

In this configuration, a femto base station 101 through which the wireless terminal device 202 need not travel during its handover operation can be appropriately eliminated from the neighboring cell information.

Figure 19:
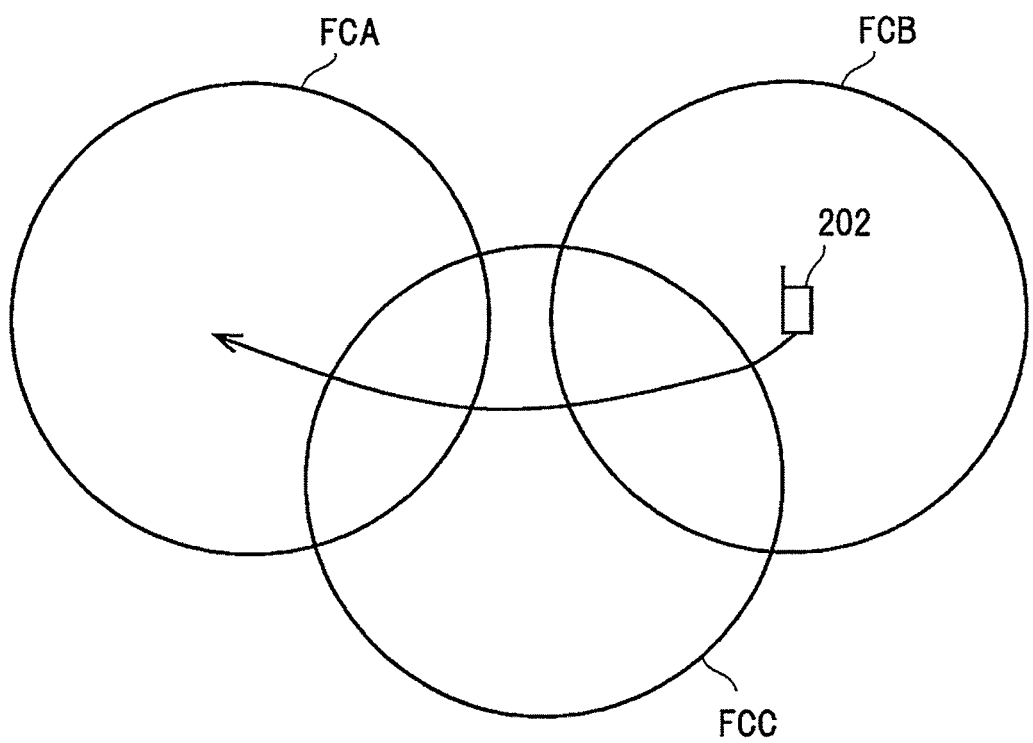
FIG. 19 is a diagram illustrating an example of cell arrangement in the wireless communication system according to the third embodiment of the present invention (Chapter 1).
Figure 20:
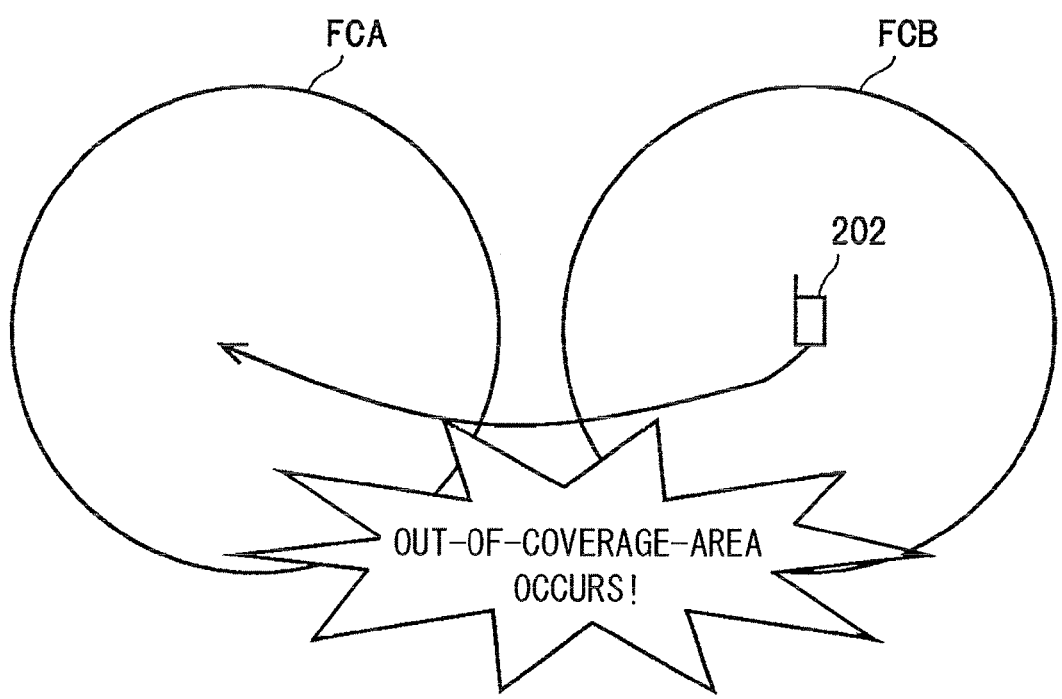
FIG. 20 is a diagram illustrating a situation where an unintended out-of-coverage-area state occurs in the cell arrangement shown in FIG. 19.

FIG. 19 is a diagram illustrating an example of cell arrangement in the wireless communication system according to the third embodiment of the present invention. FIG. 20 is a diagram illustrating a situation where unintended out-of-coverage-area state occurs in the cell arrangement shown in FIG. 19.

With reference to FIG. 19, when a wireless terminal device 202 moves from the femto cell FCB through the femto cell FCC to the femto cell FCA as shown by an arrow, the wireless terminal device 202 performs handover from the femto base station 101B to the femto base station 101A via the femto base station 101C. In this case, since the distance between the femto cell FCA and the femto cell FCB is short, the sojourn time from when the wireless terminal device 202 performs handover to the femto base station 101C to when it performs handover to the femto base station 101A is short. Therefore, as described with reference to FIGS. 17 and 18, the gateway device 203 eliminates the femto base station 101C from the neighboring cell information targeted to the femto base station 101B (the target femto base station).

However, in the cell arrangement shown in FIG. 19, the femto cell FCB and the femto cell FCA actually do not abut each other. Therefore, if the wireless terminal device 202 moves from the femto cell FCB to the femto cell FCA through the route shown by an arrow in FIG. 20, the wireless terminal device 202 cannot perform direct handover from the femto base station 101B to the femto base station 101A, and goes out of the coverage area.

The gateway device 203 according to the third embodiment of the present invention acquires, as handover information, whether or not the wireless terminal device 202 which exists in the femto cell FCB and is communicating with the femto base station 101B is communicable with the femto base station 101A, for example, whether or not the level of the radio signal received from the femto base station 101A is equal to or higher than a predetermined value.

That is, based on reception power information or the like provided from the wireless terminal device 202, the handover information acquisition unit 21 acquires handover information indicating whether or not the wireless terminal device 202 communicating with the target femto base station is communicable with the above-mentioned second femto base stations.

As described above, by acquiring, as handover information, information of other content in addition to the information of the handover operation history, it is possible to generate more appropriate neighboring cell information.

Figure 21:
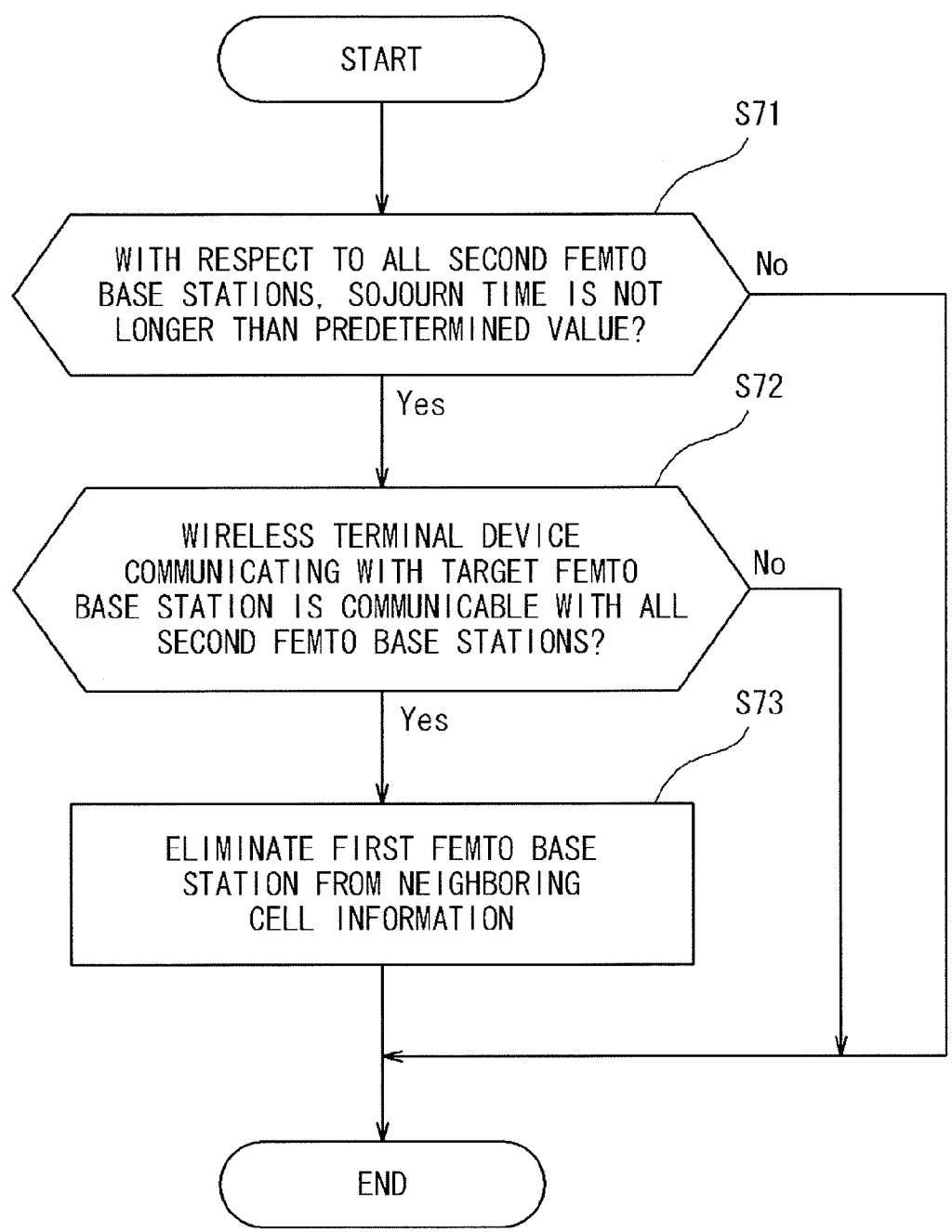
FIG. 21 is a flowchart illustrating process steps in which the gateway device according to the third embodiment of the present invention (Chapter 1) performs optimization of neighboring cell information.

FIG. 21 is a flowchart illustrating process steps in which the gateway device according to the third embodiment of the present invention performs optimization of neighboring cell information.

With reference to FIG. 21, if the sojourn times indicated in the handover information with respect to all the second femto base stations are equal to or shorter than a predetermined value (YES in step S71) and the wireless terminal device 202 communicating with the target femto base station are communicable with all the second femto base stations (YES in step S72), the neighboring cell information generation unit 22 generates neighboring cell information in which at least the first femto base station 101 corresponding to the above case is eliminated from among the plurality of femto base stations 101 other than the target femto base station (step S73).

This configuration avoids the situation that not-neighboring femto cells are recognized as if they are neighboring each other, which causes a wireless terminal device to be out of the coverage area.

In the gateway device according to the third embodiment of the present invention, assuming that the femto base station 101B is the target femto base station, neighboring cell information is generated, in which at least the first femto base station (i.e., the femto base station 101C) corresponding to the sojourn time indicated in the handover information, which is equal to or shorter than a predetermined value with respect to all the second femto base stations (i.e., both the femto base stations 101A and 101D), is eliminated. However, the present invention is not limited thereto.

The handover information acquisition unit 21 may acquire, as handover information, the sojourn time with respect to some of the second femto base stations, and the neighboring cell information generation unit 22 may determine whether or not the first femto base station should be eliminated from the neighboring cell information, based on the handover information.

This configuration allows the gateway device to adjust the condition for elimination of the first femto base station from the neighboring cell information, in accordance with the installation environment of each femto base station.

However, in the gateway device according to the third embodiment of the present invention, the handover information acquisition unit 21 acquires handover information relating to all the second femto base stations, and the neighboring cell information generation unit 22 determines, based on the handover information, whether or not the first femto base station should be eliminated from the neighboring cell information. This configuration avoids the situation that the first femto base station which is needed as a route of handover is erroneously eliminated from the neighboring cell information in the case where some femto base stations are a handover destination or a handover source.

Likewise, the handover information acquisition unit 21 may acquire, for some of the second femto base stations, handover information indicating whether or not the wireless terminal device 202 communicating with the target femto base station is communicable with the second femto base stations, and the neighboring cell information generation unit 22 may determine, based on this handover information, whether or not the first femto base station should be eliminated from the neighboring cell information.

Further, optimization of neighboring cell information according to the first or second embodiment of the present invention may be combined with optimization of neighboring cell information according to the third embodiment of the present invention. That is, as a criterion for determining which femto base stations should be included in neighboring cell information, the number of times of handover of a wireless terminal device 202 may be combined with the sojourn time of the wireless terminal device 202 in a femto base station through which the wireless terminal device 202 has traveled at the time of handover. Moreover, as a criterion for determining which femto base stations should be included in neighboring cell information, the above combination may be further combined with information as to whether or not the wireless terminal device 202 is communicable with femto base stations 101 as candidates for a handover destination.

Although the gateway device according to the third embodiment of the present invention is provided separately from the femto base stations 101, the present invention is not limited thereto. The gateway device 203 may be included in at least one of the femto base stations 101 in the wireless communication system 301. In this case, the femto base station 101 equipped with the gateway device 203 acquires handover information, based on information from wireless terminal devices 202 existing in its own femto cell, and information from other femto base stations 101. Then, the gateway device 203 notifies the wireless terminal devices 202 existing in its femto cell and the other femto base stations 101 of the generated neighboring cell information.

Further, a macro base station may perform the same operation as that of the femto base station according to any of the first to third embodiments of the present invention.

Since other components and operations of the wireless communication system of the third embodiment are identical to those of the wireless communication system of the second embodiment, repeated description is not necessary.

Hereinafter, a description will be given of another embodiment of the present invention with reference to figures. In the figures, the same or corresponding components are given the same reference characters and are not repeatedly described.

<Embodiment 4>

A fourth embodiment relates to a wireless communication system in which ranking is performed in neighboring cell information, in contrast to the wireless communication system according to the first embodiment. The wireless communication system according to the fourth embodiment is identical to that of the first embodiment except the matters described below.

A wireless base station device notifies wireless terminal devices of information relating to its own cell and neighboring cells, i.e., the frequency of its radio signal, IDs (identifications) of neighboring cells, and the like. Based on the information provided from the wireless base station device, each wireless terminal performs detection and measurement of the neighboring cells. Based on the measurement result, the wireless terminal device starts to move to a neighboring cell. Here, "movement" of a wireless terminal device means not only "handover" but also "selection" of a cell through which a wireless terminal device in the idle state starts communication, i.e., a phone call or data communication.

For example, when a wireless terminal device is communicating with a wireless base station device, a destination of the wireless terminal device is determined by the wireless base station device or a host device. When a wireless terminal device is not communicating with a wireless base station device, a destination of the wireless terminal device is determined by the wireless terminal device.

FIG. 22 is a diagram illustrating the relationship between the access modes of a femto base station and wireless terminal devices that are allowed to access the femto base station, according to the fourth embodiment of the present invention.

With reference to FIG. 22, the femto base station according to the fourth embodiment of the present invention has three access modes. Specifically, in the closed access mode, only registered wireless terminal devices are allowed to access the femto base station. In the open access mode, all wireless terminal devices are allowed to access the femto base station, and therefore, the femto base station is identical to a normal macro base station. In the hybrid mode, all wireless terminal devices are allowed to access the femto base station. In the hybrid mode, however, registered wireless terminal devices (members) may be treated preferentially over unregistered wireless terminal devices (non-members) in communication resource allocation, accounting, and the like.

That is, the femto base station according to the fourth embodiment of the present invention is configurable to operate in any of the following access modes: the open access mode in which all wireless terminal devices 202 are allowed to access the femto base station; the closed access mode in which wireless terminal devices 202 can be registered and only the registered wireless terminal devices 202 are allowed to access the femto base station; and the hybrid mode in which wireless terminal devices 202 can be registered and both the registered wireless terminal devices 202 and unregistered wireless terminal devices 202 are allowed to access the femto base station.

It is defined in 3GPP that, in a cell in the closed access mode, wireless terminal devices 202 autonomously detect neighboring cells. In a macro cell in the open access mode, when a telecommunication carrier systematically installs a wireless base station device, the telecommunication carrier grasps information relating to neighboring macro cells, and the information is set in the wireless base station device at the time of installation or maintenance.

By the way, since a user is allowed to install a femto base station in any place, it is difficult for the femto base station to grasp its present location. Therefore, it is also difficult for the femto base station to acquire information of neighboring cells.

As described above, a femto cell detection method and a movement method for wireless terminal devices in a cell in the closed access mode are defined in 3GPP. However, when a wireless terminal device moves from a macro cell or a femto cell to a macro cell or a femto cell in the open access mode, a wireless base station device as a movement source needs to notify the wireless terminal device of information of a wireless base station device as a movement destination.

Since a user of a femto base station is allowed to determine where to use the femto base station, the femto base station is likely to be moved and powered on/off, which causes the following two problems. That is, since the femto base station cannot grasp its present location, it is difficult for the femto base station to acquire information of neighboring cells by using an OAM function (maintenance function). Further, when a femto base station exists in the neighborhood of a wireless base station device and the femto base station is powered off, a wireless terminal device cannot move to the femto base station, and therefore, needs to detect on/off of the power of the femto base station.

If a femto base station can specify its present location by using a GPS (Global Positioning System) or the like, the femto base station may make an inquiry at the telecommunication carrier network to obtain information of geographically close cells. However, from the viewpoint of accuracy, it is difficult to specify the exact location.

[Configuration and Fundamental Operation]

Figure 23:
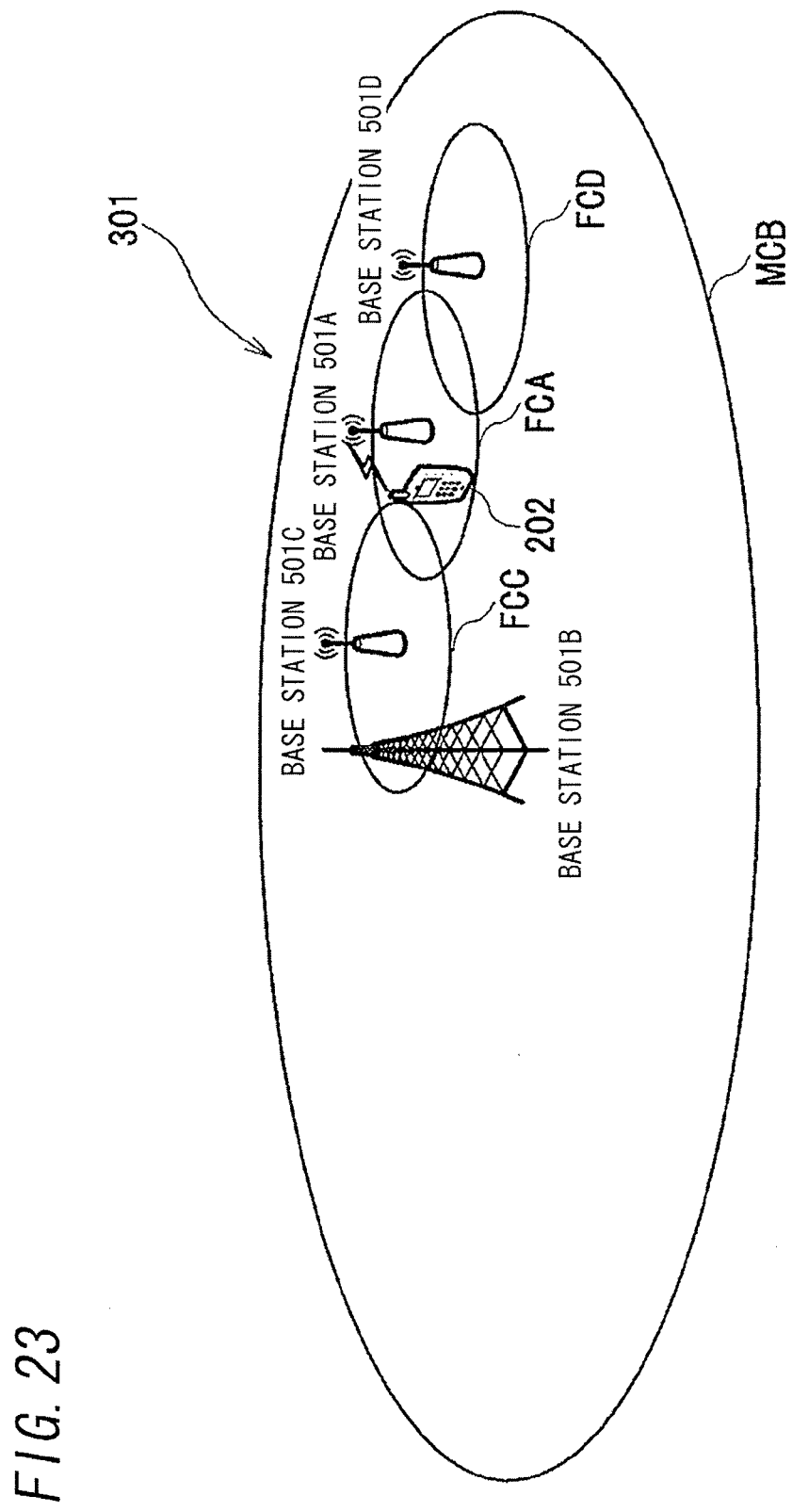
FIG. 23 is a diagram illustrating an example of arrangement of wireless base station devices in a wireless communication system according to the fourth embodiment of the present invention (Chapter 1).

FIG. 23 is a diagram illustrating an example of arrangement of wireless base station devices in the wireless communication system according to the fourth embodiment of the present invention.

With reference to FIG. 23, in the wireless communication system 301, wireless base station devices 501A, 501C, and 501D are femto base stations, and a wireless base station device 501B is a macro base station. A state is considered where a plurality of femto base stations exist in a macro cell MCB formed by the wireless base station device 501B.

A femto cell FCA formed by the wireless base station device 501A and a femto cell FCC formed by the wireless base station device 501C partially overlap each other. Further, the femto cell FCA formed by the wireless base station device 501A and a femto cell FCD formed by the wireless base station device 501D partially overlap each other.

In the wireless communication system according to the fourth embodiment of the present invention, the wireless base station devices 501A, 501B, 501C, and 501D operate as neighboring cell processing devices, respectively.

Hereinafter, each of the wireless base station devices 501A, 501B, 501C, and 501D is sometimes referred to as a wireless base station device 501.

Figure 24:
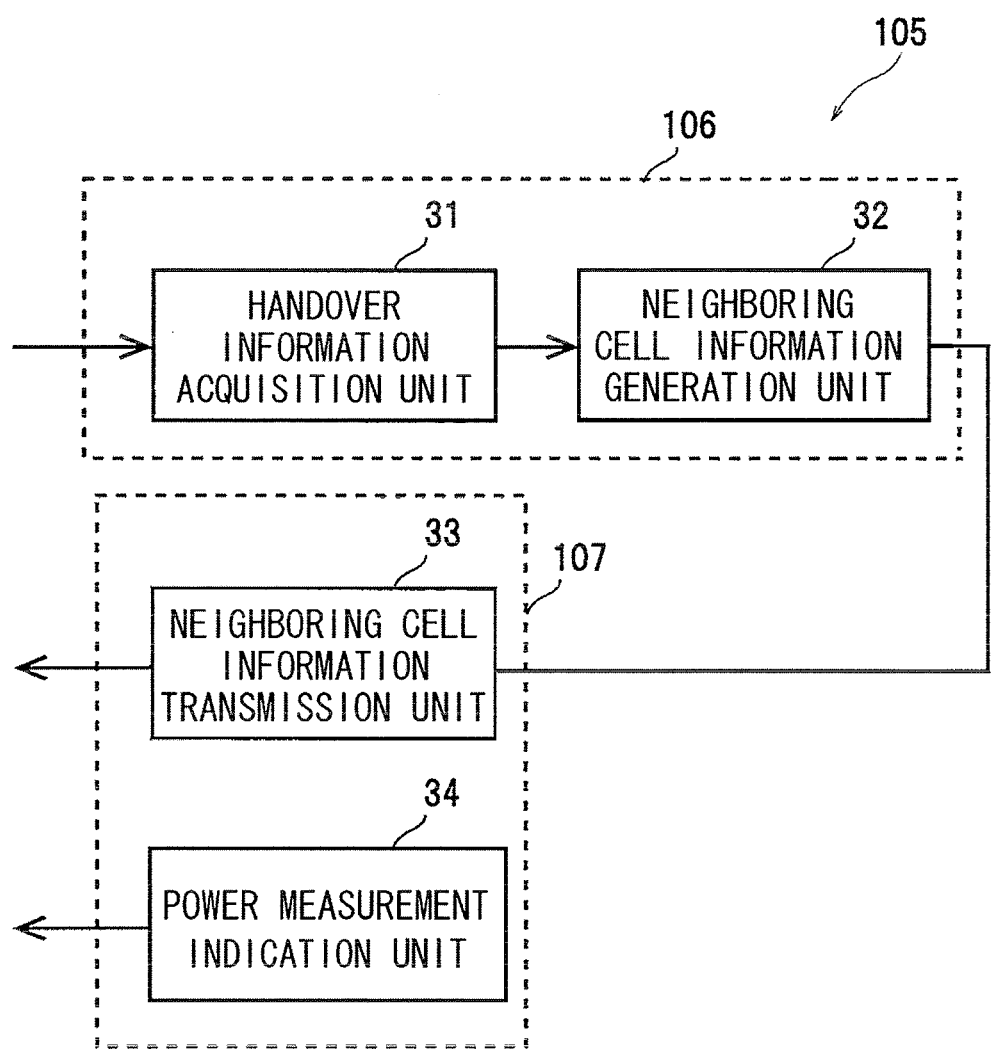
FIG. 24 is a diagram illustrating the configuration of a signal processing unit in a wireless base station device according to the fourth embodiment of the present invention (Chapter 1).

FIG. 24 is a diagram illustrating the configuration of a signal processing unit in a wireless base station device according to the fourth embodiment of the present invention.

With reference to FIG. 24, the signal processing unit 105 includes a reception signal processing unit 106 and a transmission signal processing unit 107. The reception signal processing unit 106 includes a handover information acquisition unit 31 and a neighboring cell information generation unit 32. The transmission signal processing unit 107 includes a neighboring cell information transmission unit 33 and a power measurement indication unit 34.

Based on handover information acquired by the handover information acquisition unit 31, the neighboring cell information generation unit 32 generates neighboring cell information which indicates one or a plurality of wireless base station devices 501 located in the neighborhood of a wireless base station device (hereinafter also referred to as a target base station) to which the neighboring cell information is to be given, among a plurality of wireless base station devices 501 other than the target base station, in the wireless communication system 301. In the fourth embodiment of the present invention, the target base station is the wireless base station device 501 according to the fourth embodiment.

The neighboring cell information transmission unit 33 transmits the neighboring cell information generated by the neighboring cell information generation unit 32 to wireless terminal devices 202 which are communicable with the wireless base station device 501, i.e., wireless terminal devices 202 existing in a cell formed by the wireless base station device 501.

The power measurement indication unit 34 transmits, to each of the wireless terminal devices 202, a measurement start request that causes the wireless terminal device 202 to measure the reception levels of radio signals transmitted from other wireless base station devices 501.

[Operation]

Next, a description will be given of an operation of the wireless base station device according to the fourth embodiment of the present invention to generate neighboring cell information.

Figure 25:
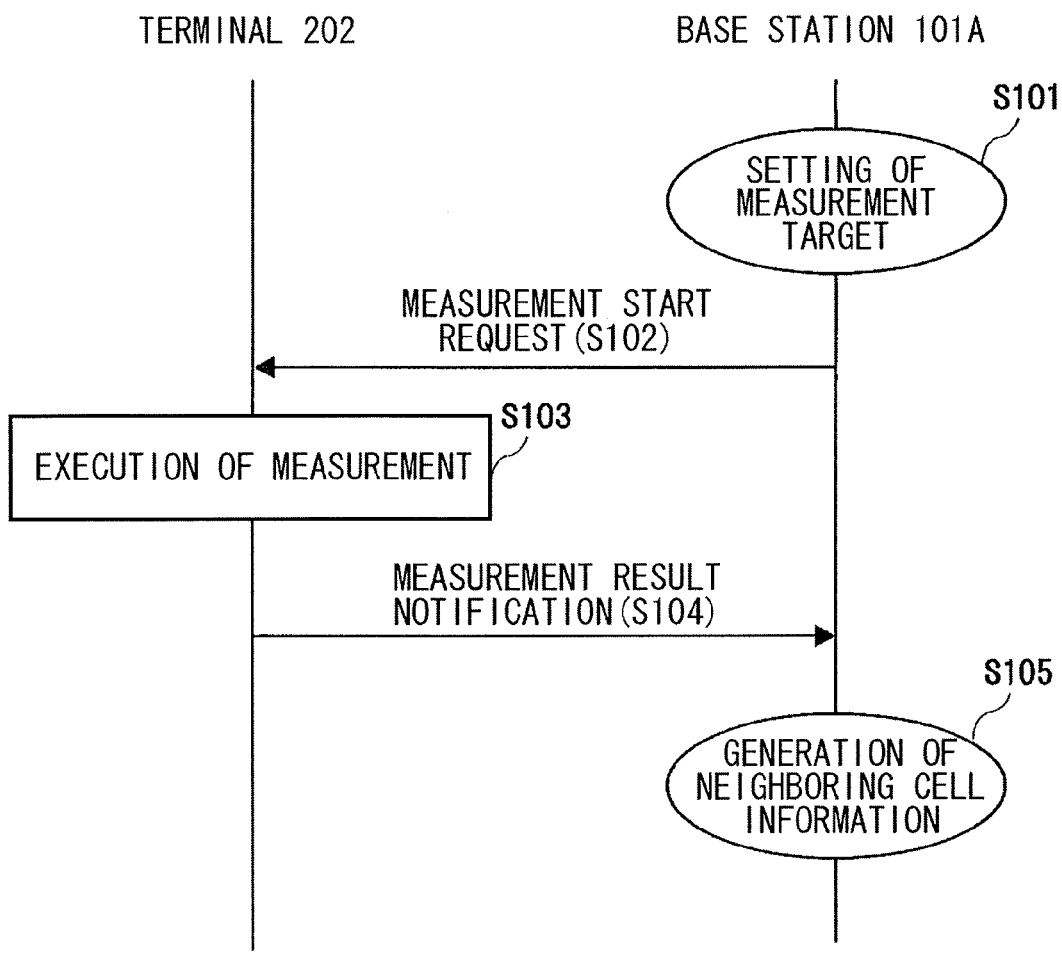
FIG. 25 is a diagram illustrating an example of a sequence in which a wireless base station device generates neighboring cell information, in the wireless communication system according to the fourth embodiment of the present invention (Chapter 1).

FIG. 25 is a diagram illustrating an example of a sequence in which the wireless base station device generates neighboring cell information, in the wireless communication system according to the fourth embodiment of the present invention.

With reference to FIG. 25, when the wireless base station device 501 has no neighboring cell information, such as when the wireless base station device 501 is activated, and then if a wireless terminal device 202 firstly establishes an RRC connection with the wireless base station device 501, the wireless base station device 501 instructs the wireless terminal device 202 to performs all-frequency search. The all-frequency search is a process of measuring the reception levels of radio signals from the respective wireless base station devices 501, for all transmission frequencies set in the wireless communication system.

Then, the wireless base station device 501 generates neighboring cell information based on the measurement result notified from the wireless terminal device 202, and stores the neighboring cell information in a storage unit (not shown).

More specifically, the wireless base station device 501A firstly sets other wireless base station devices to be the targets for measurement by the wireless terminal device 202 (step S101).

Next, the wireless base station device 501A transmits, to the wireless terminal device 202, a measurement start request that causes the wireless terminal device 202 to measure the reception levels of radio signals transmitted from the other wireless base station devices. The measurement start request includes information of the wireless base station devices that are the measurement targets (step S102).

Upon receiving the measurement start request from the wireless base station device 501A, the wireless terminal device 202 measures the reception levels of the radio signals transmitted from the wireless base station devices indicated by the received measurement start request (step S103).

Next, the wireless terminal device 202 transmits a measurement result notification indicating the measured reception levels to the wireless base station device 501A (step S104).

Based on the measurement result notification received from the wireless terminal device 202, the wireless base station device 501A generates initial neighboring cell information (step S105).

The wireless base station device 501A may instruct the wireless terminal device 202 which has established an RRC connection, to perform all-frequency search, not only at the time of activation but also at regular intervals.

When the wireless base station device 501A is a femto base station and operates in the hybrid mode, and then if a non-member wireless terminal device 202 establishes an RRC connection, the wireless base station device 501A instructs the non-member wireless terminal device 202 to perform all-frequency search.

Specifically, when the target base station operates in the hybrid mode, the power measurement indication unit 34 instructs the unregistered wireless terminal device 202 to measure, in all frequencies, the reception levels of radio signals transmitted from the wireless base station devices 501 other than the target base station.

This configuration prevents the power of a wireless terminal device 202 owned by a registered user from being consumed, thereby providing appropriate communication services.

When the target base station operates in the hybrid mode, the power measurement indication unit 34 may instruct a registered wireless terminal device 202 to measure, in all frequencies, the reception levels of radio signals transmitted from the wireless base station devices 501 other than the target base station.

This configuration prevents the power of a wireless terminal device 202 owned by an unregistered user who is usually not able to quickly charge the wireless terminal device 202, from being consumed, thereby providing appropriate communication services.

Next, a description will be given of a method of updating the neighboring cell information generated based on the sequence shown in FIG. 25 or the like.

The wireless base station device 501 performs ranking by using indices, on a list of wireless base station devices indicated by the initial neighboring cell information stored in the storage unit (not shown). That is, based on the handover information acquired by the handover information acquisition unit 31, the neighboring cell information generation unit 32 generates neighboring cell information in which the plurality of wireless base station devices 501 other than the target base station are ranked.

For example, when a wireless terminal device 202 performs a handover operation, the wireless base station device 501 transmits a handover request to the host device 205, and stores, in the storage unit (not shown), a wireless base station device as a handover destination included in this request.

Further, upon receiving a handover completion notification from the host device 205, the wireless base station device 501 recognizes that handover has succeeded, and stores this information in the storage unit (not shown). Thus, the number of times of handover or the handover success rate can be used as an index for ranking.

The handover success rate is obtained by "the number of handover completion notifications/the number of handover requests".

Figure 26:
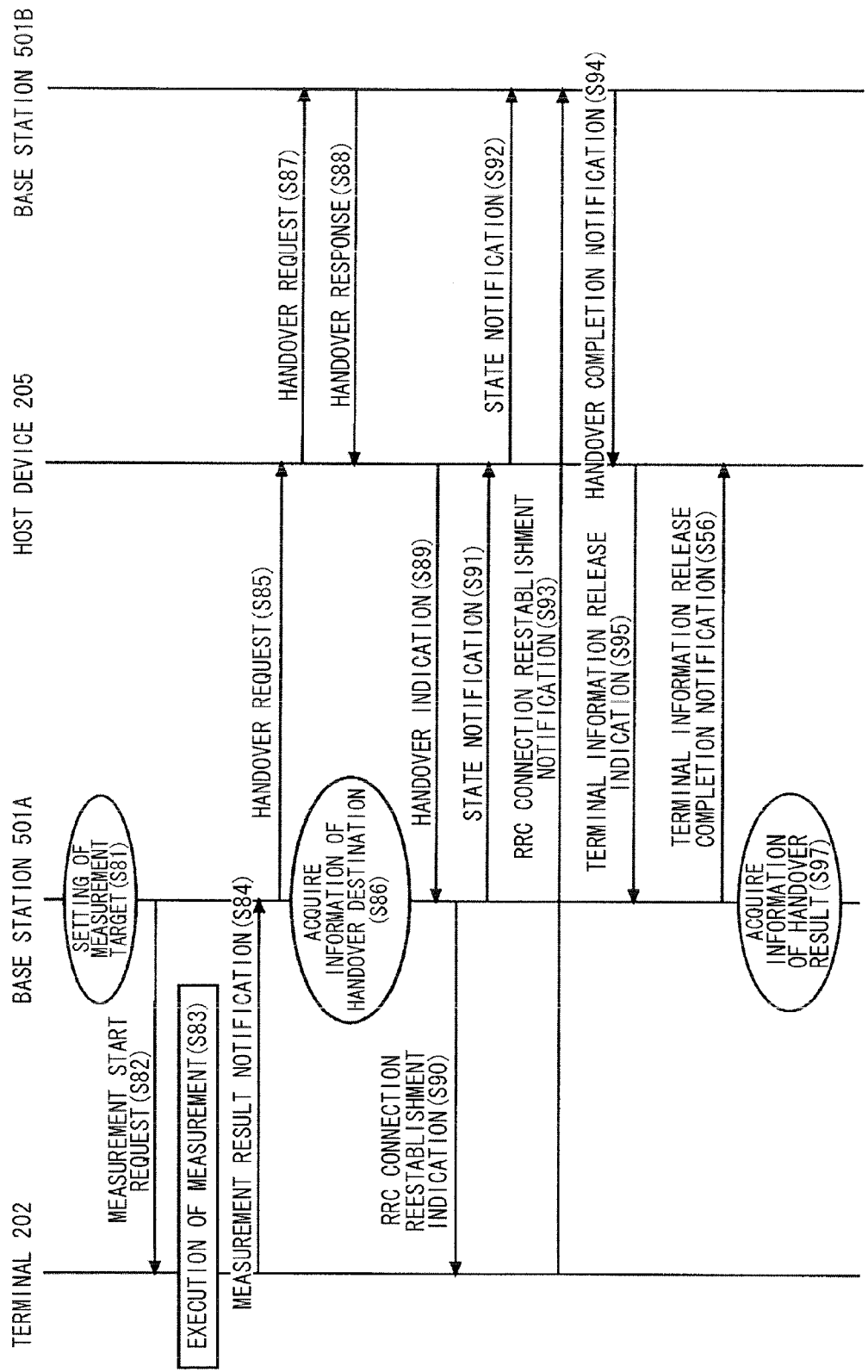
FIG. 26 is a diagram illustrating an example of a sequence in which a wireless base station device acquires handover information, in the wireless communication system according to the fourth embodiment of the present invention (Chapter 1).

FIG. 26 is a diagram illustrating an example of a sequence in which a wireless base station device acquires handover information in the wireless communication system according to the fourth embodiment of the present invention.

With reference to FIG. 26, the wireless base station device 501A firstly sets other wireless base station devices 501 to be the targets of measurement by a wireless terminal device 202 (step S81).

Next, the wireless base station device 501A transmits, to the wireless terminal device 202, a measurement start request that causes the wireless terminal device 202 to measure the reception levels of radio signals transmitted from the set wireless base station devices 501. The measurement start request includes information of the wireless base station devices 501 as the measurement targets. For example, the measurement start request includes the neighboring cell information generated based on the sequence shown in FIG. 25, and the transmission frequencies of the respective wireless base station devices 501 (step S82).

Upon receiving the measurement start request from the wireless base station device 501A, the wireless terminal device 202 measures the reception levels of the radio signals transmitted from the wireless base station devices 501 indicated by the received measurement start request (step S83).

Next, the wireless terminal device 202 transmits a measurement result notification indicating the measured reception levels to the wireless base station device 501A. For example, the wireless terminal device 202 periodically performs measurement of reception levels. When the communication state with the wireless base station device 501A is deteriorated or when the communication state with any of the wireless base station devices 501 other than the wireless base station device 501A is improved, the wireless terminal device 202 transmits the measurement result notification to the wireless base station device 501A (step S84).

Next, based on the measurement result notification received from the wireless terminal device 202, the wireless base station device 501A determines whether or not the wireless terminal device 202 should perform handover. Upon determining that the wireless terminal device 202 should perform handover, the wireless base station device 501A determines, for example, the wireless base station device 501B as a handover destination with reference to the neighboring cell information, and transmits a handover request indicating the wireless base station device 501B to the host device 205 (step S85).

Then, the wireless base station device 501A acquires information of the handover destination. That is, the wireless base station device 501A recognizes a trial of handover of the wireless terminal device 202 to the wireless base station device 501B, and updates the handover information based on this information (step S86).

Upon receiving the handover request from the wireless base station device 501A, the host device 205 transmits the handover request to the wireless base station device 501B (step S87).

Upon receiving the handover request from the host device 205, the wireless base station device 501B transmits a handover response to the handover request, to the host device 205 (step S88).

Upon receiving the handover response from the wireless base station device 501B, the host device 205 transmits a handover indication to the wireless base station device 501A (step S89).

Upon receiving the handover indication from the host device 205, the wireless base station device 501A transmits an RRC connection reestablishment indication to the wireless terminal device 202 (step S90).

Then, the wireless base station device 501A transmits a status notification indicating its own communication status and the like, to the host device 205 (step S91).

Upon receiving the status notification from the wireless base station device 501A, the host device 205 transmits a status notification indicating the content of communication with the wireless terminal device 202, to the wireless base station device 501B (step S92).

When an RRC connection is established between the wireless terminal device 202 and the wireless base station device 501B, the wireless terminal device 202 transmits an RRC connection establishment notification to the wireless base station device 501B (step S93).

Upon receiving the RRC connection establishment notification from the wireless terminal device 202, the wireless base station device 501B transmits a handover completion notification to the host device 205 (step S94).

Upon receiving the handover completion notification from the wireless base station device 501B, the host device 205 transmits a terminal information release indication to the wireless base station device 501A (step S95).

Upon receiving the terminal information release indication from the host device 205, the wireless base station device 501A releases information relating to the wireless terminal device 202, and transmits a terminal information release completion notification to the host device 205 (step S96).

Then, the wireless base station device 501A acquires information of the handover result. That is, the wireless base station device 501A recognizes that the handover of the wireless terminal device 202 to the wireless base station device 501B has succeeded, and updates the handover information based on this information (step S97).

Next, a description will be given of an operation of the wireless base station device according to the fourth embodiment of the present invention to update the neighboring cell information.

Referring back to FIG. 23, in the wireless communication system 301, when the wireless terminal device 202 communicating with the wireless base station device 501A moves away from the wireless base station device 501A, any of the wireless base station devices 501B, 501C, and 501D is considered as a destination.

Hereinafter, a description will be given of a specific example of an updating method in a case where there are three wireless base station devices as the measurement targets (i.e., three candidates for a movement destination) to be notified from the wireless base station device 501A to the wireless terminal device 202.

Figure 27:
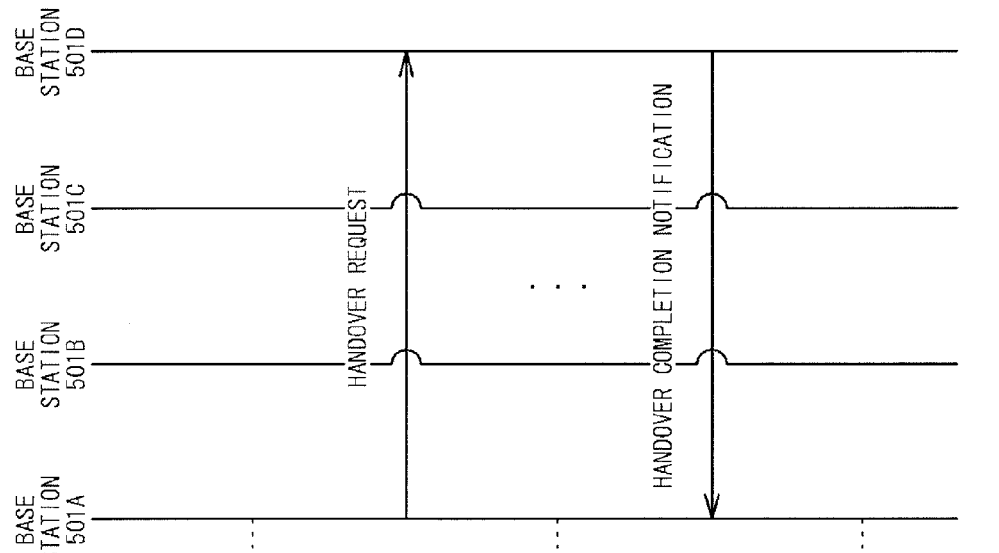
FIG. 27 is a diagram illustrating an operation of a wireless base station device according to the fourth embodiment of the present invention (Chapter 1) to update neighboring cell information.

FIG. 27 is a diagram illustrating an operation of the wireless base station device according to the fourth embodiment of the present invention to update the neighboring cell information.

With reference to FIG. 27, in the wireless base station device 501A, 12 times of handover have been tried in a certain time period. That is, the wireless base station device 501A acquires handover information, i.e., a handover history table, which indicates that handover from the wireless base station device 501A to the wireless base station device 501B has been tried 5 times and the 5 trials have succeeded, handover from the wireless base station device 501A to the wireless base station device 501C has been tried 6 times and 2 trials have succeeded, and handover from the wireless base station device 501A to the wireless base station device 501D has been tried 1 time and zero trial has succeeded.

Further, the handover history table also indicates that the success rate of handover from the wireless base station device 501A to the wireless base station device 501B is 1.00, the success rate of handover from the wireless base station device 501A to the wireless base station device 501C is 0.33, and the success rate of handover from the wireless base station device 501A to the wireless base station device 501D is 0.

Further, the wireless base station device 501A acquires neighboring cell information in which the wireless base station device 501B ranks first, the wireless base station device 501C ranks second, and the wireless base station device 501D ranks third (refer to (1) of FIG. 27).

In this situation, it is assumed that a wireless terminal device 202 existing in the femto cell FCA formed by the wireless base station device 501A tries handover to the wireless base station device 501D.

When the wireless base station device 501A transmits a handover request to the wireless base station device 501D, the number of trials of handover to the wireless base station device 501D in the handover history table of the wireless base station device 501A is updated to 2 (refer to (2) of FIG. 27).

When receiving a handover completion notification from the wireless base station device 501D, the wireless base station device 501A changes the number of successes of handover to the wireless base station device 501D to 1 in the handover history table, and calculates and changes the handover success rate to 0.50.

Thus, when the handover success rate is used as an index for ranking, the wireless base station device 501D is ranked higher than the wireless base station device 501C in the neighboring cell information. That is, the wireless base station device 501A updates the neighboring cell information such that the wireless base station device 501B ranks first, the wireless base station device 501D ranks second, and the wireless base station device 501C ranks third (refer to (3) of FIG. 27).

On the other hand, when the number of successes of handover is used as an index for ranking, the ranking of the wireless base station devices in the neighboring cell information is not changed.

When the wireless base station device 501A has updated the neighboring cell information, the wireless base station device 501A broadcasts the updated neighboring cell information to each wireless terminal device 202. For example, the wireless base station device 501A broadcasts, to each wireless terminal device 202, the neighboring cell information indicating N (N: an integer not smaller than 1) wireless base station devices from the highest rank, among the ranked wireless band station devices.

Specifically, in a case where the number of wireless base station devices registerable in the neighboring cell information to be notified to each wireless terminal device 202 is limited to two and the handover success rate is used as an index for ranking, the wireless base station device 501A notifies each wireless terminal device 202 of the neighboring cell information indicating that the wireless base station device 501B ranks first, and the wireless base station device 501D ranks second. Further, when the number of wireless base station devices registerable in the neighboring cell information to be notified to each wireless terminal device 202 is limited to two and the number of successes of handover is used as an index for ranking, the wireless base station device 501A notifies each wireless terminal device 202 of the neighboring cell information indicating that the wireless base station device 501B ranks first, and the wireless base station device 501C ranks second.

Figure 28:
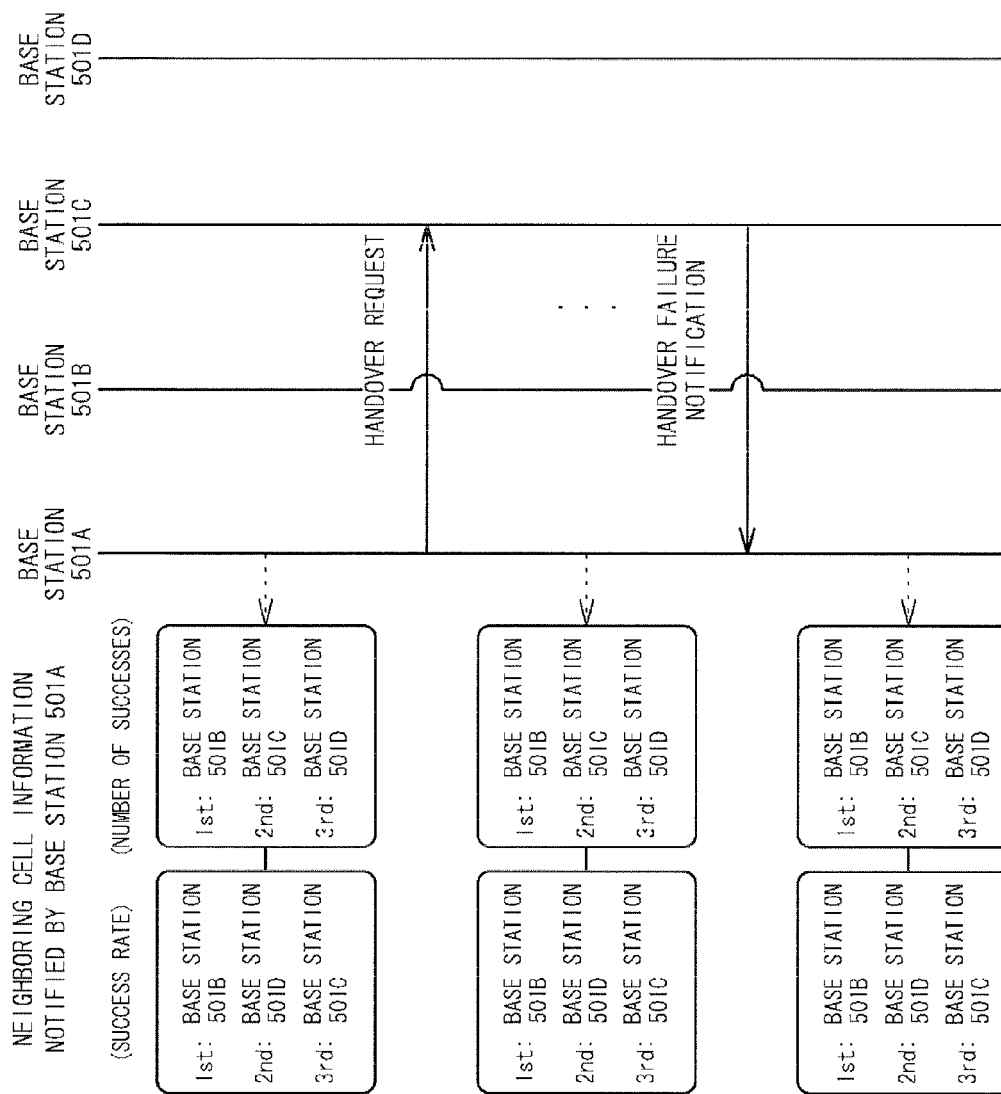
FIG. 28 is a diagram illustrating another example of an operation of the wireless base station device according to the fourth embodiment of the present invention (Chapter 1) to update neighboring cell information.

FIG. 28 is a diagram illustrating another example of operation of the wireless base station device according to the fourth embodiment of the present invention to update the neighboring cell information.

With reference to FIG. 28, the wireless base station device 501A acquires a handover history table and neighboring cell information, having the same contents as those shown in (3) of FIG. 27 (refer to (1) of FIG. 28).

In this situation, it is assumed that a wireless terminal device 202 existing in the femto cell FCA formed by the wireless base station device 501A tries handover to the wireless base station device 501C.

That is, when the wireless base station device 501A transmits a handover request to the wireless base station device 501C, the number of trials of handover to the wireless base station device 501C in the handover history table of the wireless base station device 501A is updated to 7 (refer to (2) of FIG. 28).

When this handover has failed and the wireless base station device 501A receives a handover failure notification from the wireless base station device 501C, the wireless base station device 501A calculates the handover success rate, with the number of successes of handover to the wireless base station device 501C being maintained at 2 in the handover history table, and changes the handover success rate to 0.29. At this time, regardless of whether the index for ranking is the handover success rate or the number of successes of handover, the ranking in the neighboring cell information is not changed (refer to (3) of FIG. 28).

If the wireless base station device 501A can recognize the handover source, the wireless base station device 501A may generate neighboring cell information by using not only the information of the handover destination but also the information of the handover source.

If a wireless base station device 501 has detected a new base station, the wireless base station device 501 may continue to add the new base station in the neighboring cell information for a predetermined time period or until the number of trials of handover to the new base station reaches a predetermined value, and may notify each wireless terminal device 202 of this neighboring cell information. In this case, the wireless base station device 501 may temporarily increase the number of base stations to be listed in the neighboring cell information, with the already listed wireless base station devices being left as they are.

Further, the handover information acquisition unit 31 may acquire handover information indicating the handover operation history of the wireless terminal devices 202 in a predetermined time period from the present to a certain point in the past. That is, the wireless base station device 501 may generate neighboring cell information based on the handover operation history in the predetermined time period from the present to a certain point in the past.

For example, the wireless base station device 501 may generate neighboring cell information based on the handover operation history in a time period from one day ago to the present time. Alternatively, the wireless base station device 501 may generate neighboring cell information based on the history corresponding to a predetermined number of times of handover. For example, the wireless base station device 501 may generate neighboring cell information based on the handover trial history corresponding to the latest 30 times of handover.

This configuration prevents, for example, a wireless base station device 501 which has already been powered off from remaining high in the ranking.

Alternatively, the handover information acquisition unit 31 may acquire handover information indicating the handover operation history of the wireless terminal devices 202 corresponding to a certain number of times of recent handover between the target base station and each of the plurality of wireless base station devices other than the target base station. That is, the wireless base station device 501 may generate neighboring cell information, based on the handover operation history corresponding to a certain number of times of handover from the present to a certain point in the past.

For example, it is assumed that the wireless base station device 501A acquires handover information indicating the handover operation history of the wireless terminal devices 202 corresponding to the recent 30 times of handover, and the handover information indicates that the number of successes of handover from the wireless base station device 501A to the wireless base station device 501B is 15, the number of successes of handover from the wireless base station device 501A to the wireless base station device 501C is 5, and the number of successes of handover from the wireless base station device 501A to the wireless base station device 501C is 10. In this case, the wireless base station device 501A generates neighboring cell information in which the wireless base station device 501B ranks first, the wireless base station device 501D ranks second, and the wireless base station device 501C ranks third.

Alternatively, as in the wireless communication systems according to the first to third embodiments of the present invention, the wireless base station device 501 may generate neighboring cell information in which at least the wireless base station device 501 whose number of successes of handover is equal to or smaller than a predetermined value is eliminated from among the plurality of wireless base station devices 501 other than the target base station, based on the handover operation history corresponding to a certain number of times of handover from the present to a certain point in the past.

This configuration prevents, for example, a wireless base station device 501 which has already been powered off from remaining high in the ranking.

Alternatively, when the wireless base station device 501 operates in the hybrid mode, the wireless base station device 501 may count the number of trials of handover and the number of successes of handover, after performing weighting according to the distinction between a member and a non-member. That is, when the target base station operates in the hybrid mode, the neighboring cell information generation unit 32 weights the handover information of registered wireless terminal devices 202 and the handover information of unregistered wireless terminal devices 202, and generates neighboring cell information based on the result of the weighting.

This configuration allows generation of appropriate neighboring cell information according to the distinction between a registered wireless terminal device 202 and an unregistered wireless terminal device 202.

As described above, in the wireless communication system according to the fourth embodiment of the present invention, the neighboring cell information generation unit 32 ranks the plurality of wireless base station devices 501 other than the target base station, based on the handover information acquired by the handover information acquisition unit 31, and generates neighboring cell information based on the ranking.

This configuration allows generation of detailed neighboring cell information, and achieves further improvement in the efficiency of operation in the wireless communication system, as compared with the neighboring cell processing devices according to the first to third embodiments of the present invention. For example, the wireless base station device 501 preferentially selects, as a handover destination, a higher-rank wireless base station device in the ranking result, thereby increasing the handover success rate.

Further, in the wireless communication system according to the fourth embodiment of the present invention, the neighboring cell information generation unit 32 generates neighboring cell information indicating N (N: an integer not smaller than 1) wireless base station devices from the highest rank among the ranked wireless base station devices 501.

In this configuration, for example, in a case where the number of wireless base station devices that can be included in the neighboring cell information to be notified to the wireless terminal devices 202 is limited, it is possible to notify the wireless terminal devices 202 of appropriate neighboring cell information by including the upper N wireless base station devices in the neighboring cell information.

In the wireless communication system according to the fourth embodiment of the present invention, the neighboring cell information generation unit 32 generates neighboring cell information which further indicates the ranking of the ranked wireless base station devices 501.

This configuration allows generation of more detailed neighboring cell information, and achieves further improvement in the efficiency of operation in the wireless communication system. For example, based on the ranking of the wireless base station devices in the neighboring cell information, each wireless terminal device 202 performs determination of measurement order, selection of wireless base station devices as measurement targets, and the like, thereby realizing efficient measurement operation.

Further, in the wireless communication system according to the fourth embodiment of the present invention, the neighboring cell information generation unit 32 generates initial neighboring cell information, based on the result of measurement in which the wireless terminal device 202 communicating with the target base station measures, in all frequencies, the reception levels of radio signals transmitted from the wireless base station devices 501 other than the target base station.

This configuration allows prompt construction of appropriate neighboring cell information, and prompt realization of highly-efficient operation in the wireless communication system 301.

At least any of the plurality of wireless base station devices 501 in the wireless communication system according to the fourth embodiment of the present invention is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

Further, in the wireless communication system according to the fourth embodiment of the present invention, the handover information acquisition unit 31 acquires handover information indicating the handover success rate of the wireless terminal devices 202 between the target base station and each of the plurality of wireless base station devices 501 other than the target base station.

In this way, by using the handover success rate as a criterion for determining which wireless base station devices should be included in the neighboring cell information and for ranking the wireless base station devices, it is possible to generate more appropriate neighboring cell information.

In the wireless communication systems according to the first to third embodiments of the present invention, the handover success rate may be used instead of the number of times of handover. That is, the neighboring cell information generation unit 32 generates neighboring cell information in which at least the wireless base station device 501 whose handover success rate indicated in the handover information is equal to or smaller than a predetermined value is eliminated from among the plurality of wireless base station devices 501 other than the target base station.

This configuration allows appropriate elimination of a wireless base station device 501 which has not often succeeded in handover, from the neighboring cell information.

Further, in the wireless communication system according to the fourth embodiment of the present invention, the neighboring cell information generation unit 32 generates neighboring cell information in which a wireless base station device 501 whose handover success rate indicated in the handover information acquired by the handover information acquisition unit 31 is relatively high is ranked higher than a wireless base station device 501 whose handover success rate is relatively low.

This configuration allows appropriate ranking of the wireless base station devices 501 in accordance with how often each of the wireless base station devices has been actually selected as a handover destination.

Further, in the wireless communication system according to the fourth embodiment of the present invention, the neighboring cell information generation unit 32 generates neighboring cell information in which a wireless base station device 501 whose number of successes of handover indicated in the handover information acquired by the handover information acquisition unit 31 is relatively great is ranked higher than a wireless base station device 501 whose number of successes of handover is relatively small.

This configuration allows appropriate ranking of the wireless base station devices 501 in accordance with how often each of the wireless base station devices has succeeded in handover.

In the wireless communication system according to the fourth embodiment of the present invention, the neighboring cell information generation unit 32 generates neighboring cell information indicating the ranks of the respective wireless base station devices 501 as shown in FIG. 27. However, the present invention is not limited thereto. It is not always necessary to indicate the ranks of the respective wireless base station devices 501 in the neighboring cell information. For example, when the neighboring cell information generation unit 32 generates neighboring cell information indicating N (N: an integer not smaller than 1) wireless base station devices from the highest rank among the ranked wireless base station devices 501, it is not necessary to indicate the ranks of the wireless base station devices 501 in the neighboring cell information.

Further, in the wireless base station device according to the fourth embodiment of the present invention, the neighboring cell information generation unit 32 generates initial neighboring cell information, based on the result of measurement in which the wireless terminal device 202 communicating with the target base station measures, in all frequencies, the reception levels of radio signals transmitted from the wireless base station devices 501 other than the target base station. However, the present invention is not limited thereto. The present invention is applicable not only to the configuration in which all the transmission frequencies of the wireless base station devices 501 in the wireless communication system are measured but also to a configuration in which a plurality of frequencies corresponding to part of the transmission frequencies are measured.

Further, in the wireless communication systems according to the first to fourth embodiments of the present invention, the neighboring cell information generation unit generates, based on the handover information acquired by the handover information acquisition unit, the neighboring cell information indicating one or a plurality of wireless base station devices located in the neighborhood of the target base station, among the plurality of wireless base station devices other than the target base station. However, the present invention is not limited thereto.

The neighboring cell information generation unit may generate the neighboring cell information, based on a combination of measurement information indicating the result of measurement of the radio signals transmitted from the wireless base station devices and attribute information indicating the attributes of the wireless base station devices, in addition to the handover information indicating the handover operation history of the wireless terminal devices. The measurement information may be, for example, the reception level, the number of times the presence of wireless base station devices is detected, or the detection rate. The attribute information may be, for example, information as to whether a wireless base station device is a femto base station or a macro base station.

Further, the wireless base station device according to the fourth embodiment of the present invention may acquire handover information similar to that acquired by the femto base station according to the first embodiment of the present invention, and may rank the wireless base station devices in the neighboring cell information.

Further, in the fourth embodiment of the present invention, instead of the wireless base station device 501, the gateway device 203 or the host device 205 may serve as the neighboring cell processing device, like the gateway devices according to the second and third embodiments of the present invention.

When a wireless base station device has a plurality of sectors, that is, when one cell is divided into a plurality of sectors, one sector may be treated as one wireless base station device in neighboring cell information. The present invention is also applicable to such a case.

Since other components and operations of the wireless communication system of the fourth embodiment are identical to those of the wireless communication system of the first embodiment, repeated description is not necessary.

Next, a description will be given of another embodiment of the present invention with reference to figures. In the figures, the same or corresponding components are given the same reference characters and are not repeatedly described.

<Embodiment 5>

A fifth embodiment relates to a wireless communication system in which, instead of a wireless base station device, a gateway device serves as a neighboring cell processing device, and the content of handover information is changed, in contrast to the wireless communication system according to the fourth embodiment. The wireless communication system of the fifth embodiment is identical to the wireless communication system of the fourth embodiment except the matters described below.

FIG. 29 is a diagram illustrating an example of handover information acquired by the gateway device according to the fifth embodiment of the present invention.

With reference to FIG. 29, the gateway device 203 acquires handover information as follows. That is, when a wireless terminal device 202 performs handover between a wireless base station device 501A and a wireless base station device 501C via a wireless base station device 501B, an average time from when the wireless terminal device 202 performs handover to the wireless base station device 501B to when it performs handover to the wireless base station device 501A or the wireless base station device 501C, i.e., an average sojourn time of the wireless terminal device 202 in the cell formed by the wireless base station device 501B, is 20 seconds.

When a wireless terminal device 202 performs handover between the wireless base station device 501A and the wireless base station device 501D via the wireless base station device 501B, an average time from when the wireless terminal device 202 performs handover to the wireless base station device 501B to when it performs handover to the wireless base station device 501A or the wireless base station device 501D, i.e., an average sojourn time of the wireless terminal device 202 in the cell formed by the wireless base station device 501B, is 6 seconds.

When a wireless terminal device 202 performs handover between the wireless base station device 501A and the wireless base station device 501B via the wireless base station device 501C, an average time from when the wireless terminal device 202 performs handover to the wireless base station device 501C to when it performs handover to the wireless base station device 501A or the wireless base station device 501B, i.e., an average sojourn time of the wireless terminal device 202 in the cell formed by the wireless base station device 501C, is 2 seconds.

When a wireless terminal device 202 performs handover between the wireless base station device 501A and the wireless base station device 501D via the wireless base station device 501C, an average time from when the wireless terminal device 202 performs handover to the wireless base station device 501C to when it performs handover to the wireless base station device 501A or the wireless base station device 501D, i.e., an average sojourn time of the wireless terminal device 202 in the cell formed by the wireless base station device 501C, is 20 seconds.

When a wireless terminal device 202 performs handover between the wireless base station device 501A and the wireless base station device 501B via the wireless base station device 501D, an average time from when the wireless terminal device 202 performs handover to the wireless base station device 501D to when it performs handover to the wireless base station device 501A or the wireless base station device 501B, i.e., an average sojourn time of the wireless terminal device 202 in the cell formed by the wireless base station device 501D, is 8 seconds.

When a wireless terminal device 202 performs handover between the wireless base station device 501A and the wireless base station device 501C via the wireless base station device 501D, an average time from when the wireless terminal device 202 performs handover to the wireless base station device 501D to when it performs handover to the wireless base station device 501A or the wireless base station device 501C, i.e., an average sojourn time of the wireless terminal device 202 in the cell FCD formed by the wireless base station device 501D is 4 seconds.

Figure 30:
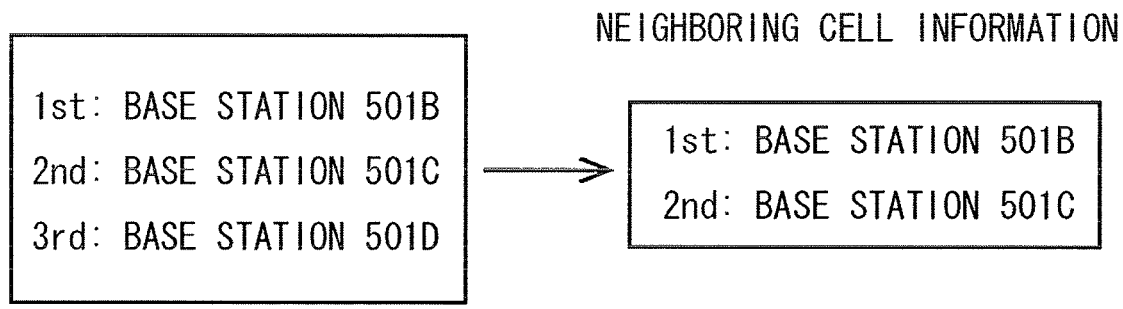
FIG. 30 is a diagram illustrating an example of neighboring cell information generated by the gateway device according to the fifth embodiment of the present invention (Chapter 1).

FIG. 30 is a diagram illustrating an example of neighboring cell information generated by the gateway device according to the fifth embodiment of the present invention.

With reference to FIG. 30, the gateway device 203 ranks the wireless base station devices 501B, 501C, and 501D by using the handover information as shown in FIG. 29. That is, in the handover via the wireless base station device 501B, with the wireless base station device 501A being a start point or an end point, the average sojourn time in the wireless base station device 501B is expressed by (20 sec+6 sec)/2=13 sec. In the handover via the wireless base station device 501C, with the wireless base station device 501A being a start point or an end point, the average sojourn time in the wireless base station device 501C is expressed by (2 sec+20 sec)/2=11 sec. In the handover via the wireless base station device 501D, with the wireless base station device 501A being a start point or an end point, the average sojourn time in the wireless base station device 501D is expressed by (8 sec+4 sec)/2=6 sec.

The gateway device 203 calculates the above-mentioned average times, and places the wireless base station device 501B corresponding to the longest average time in the first rank, the wireless base station device 501C corresponding to the next longest average time in the second rank, and the wireless base station device 501D corresponding to the shortest average time in the third rank. Then, the gateway device 203 generates neighboring cell information in which, for example, the wireless base station device 501D in the lowest rank is eliminated from among the ranked wireless base station devices, i.e., the top two wireless base station devices 501B and 501C are shown.

As described above, FIGS. 29 and 30 show an example of a case where the wireless base station device 501A is the target base station, and any of the wireless base station devices 501B, 501C, and 501D is the first wireless base station. In the wireless communication system according to the fifth embodiment, the following processing is performed.

Specifically, in the wireless communication system according to the fifth embodiment of the present invention, it is assumed that, among a plurality of wireless base station devices (501B, 501C, and 501D) other than the target base station (501A), for example, the wireless base station device 501B is the first wireless base station device and the remaining wireless base station devices 501C and 501D are the second wireless base station devices, and a wireless terminal device 202 performs handover between the target base station (501A) and each of the second wireless base station devices (501C and 501D) via the first wireless base station device (501B). In this case, the handover information acquisition unit 31 in the gateway device 203 acquires handover information which indicates the sojourn times from when the wireless terminal device 202 performs handover to the first wireless base station device (501B) to when it performs handover to the target base station (501A) and the second wireless base station devices (501C and 501D), respectively. For example, the handover information acquisition unit 31 acquires the handover information, based on the information from the first wireless base station device.

In this way, by using the sojourn time of the wireless terminal device 202 in the wireless base station device through which the wireless ten final device 202 has traveled at the time of handover, as a criterion for ranking the wireless base station devices in the neighboring cell information, it is possible to generate appropriate neighboring cell information.

Then, the neighboring cell information generation unit 32 ranks one or a plurality of wireless base station devices located in the neighborhood of the target base station, among the plurality of wireless base station devices other than the target base station, and generates neighboring cell information in which a wireless base station device corresponding to a relatively long average sojourn time indicated in the handover information with respect to all the second wireless base station devices is ranked higher than a wireless base station device corresponding to a relatively short average sojourn time.

This configuration allows appropriate ranking of the wireless base station devices 501 in accordance with the degree of necessity that a wireless terminal device 202 should travel through the wireless base station devices during its handover operation.

In the gateway device according to the fifth embodiment of the present invention, as in the gateway device according to the third embodiment of the present invention, the handover information acquisition unit may acquire handover information indicating whether or not the wireless terminal device 202 communicating with the target base station is communicable with the second wireless base station devices, based on the reception power information or the like from the wireless terminal device 202.

As described above, by acquiring, as handover information, information of other content in addition to the information of the handover operation history, it is possible to generate more appropriate neighboring cell information. That is, it is possible to avoid the situation that not-neighboring cells are recognized as if they are neighboring each other, which causes the wireless terminal device 202 to be out of the coverage area.

In the gateway device according to the fifth embodiment of the present invention, when the wireless base station device 501A is the target base station, the neighboring cell information generation unit 32 generates neighboring cell information in which a wireless base station device corresponding to a relatively long average sojourn time indicated in the handover information with respect to all the second wireless base station devices is ranked higher than a wireless base station device corresponding to a relatively short average sojourn time. However, the present invention is not limited thereto.

The handover information acquisition unit 31 may acquire, as handover information, the sojourn times with respect to some of the second wireless base station devices, and the neighboring cell information generation unit 32 may rank the first wireless base station device based on the handover information.

This configuration allows adjustment of the criterion for ranking the wireless base station devices 501 in the neighboring cell information in accordance with the installation environment of each wireless base station device.

However, in the gateway device according to the fifth embodiment of the present invention, handover information relating to all the second wireless base station devices is acquired, and the neighboring cell information generation unit 32 ranks the first wireless base station device based on the handover information. Thereby, it is possible to avoid the situation that the first femto base station which is needed as a route for handover is erroneously ranked low in the neighboring cell information in the case where some wireless base station devices are handover destinations or handover sources.

Likewise, the handover information acquisition unit 31 may acquire, for some of the second wireless base station devices, handover information indicating whether or not a wireless terminal device 202 communicating with the target base station is communicable with the second wireless base station devices, and the neighboring cell information generation unit 32 may rank the first wireless base station device based on the handover information.

Further, optimization of neighboring cell information according to the fourth embodiment of the present invention may be combined with optimization of neighboring cell information according to the fifth embodiment of the present invention. That is, as a criterion for ranking the wireless base station devices in the neighboring cell information, the number of times of handover or the handover success rate of a wireless terminal device 202 may be combined with the sojourn time of the wireless terminal device 202 in a wireless base station device through which the wireless terminal device 202 has traveled at the time of handover. Further, as a criterion for ranking the wireless base station devices in the neighboring cell information, the above combination may be further combined with information as to whether or not the wireless terminal device 202 is communicable with wireless base station devices 501 as candidates for a handover destination.

In the gateway device according to the fifth embodiment of the present invention, the sojourn time of a wireless terminal device 202 in a wireless base station device through which the wireless terminal device 202 has traveled at the time of handover is used as a criterion for ranking the wireless base station devices in the neighboring cell information. However, the present invention is not limited thereto. The number of times of handover or the handover success rate may be used as a criterion for ranking the wireless base station devices in the neighboring cell information.

For example, in the gateway device according to the fifth embodiment of the present invention, as in the gateway device according to the second embodiment of the present invention, the handover information acquisition unit 31 may acquire handover information indicating the number of times of handover or the handover success rate of a wireless terminal device 202 from the target base station to each of the plurality of wireless base station devices 501 other than the target base station, and the number of times of handover or the handover success rate of a wireless terminal device 202 from each of the plurality of wireless base station devices 501 other than the target base station to the target base station. In this case, the neighboring cell information generation unit 32 ranks the wireless base station devices 501 based on the number of times of bidirectional handover or bidirectional handover success rate between two wireless base station devices 501. This configuration allows generation of more appropriate neighboring cell information.

Furthermore, in this case, the gateway device according to the fifth embodiment of the present invention may be included in at least one of the wireless base station devices 501 in the wireless communication system 301. In this case, the wireless base station device 501 equipped with the gateway device 203 acquires handover information, based on information from wireless terminal devices 202 existing in its own cell, and information from other wireless base station devices 501. Then, the gateway device 203 notifies the wireless terminal devices 202 existing in its cell and the other wireless base station devices 501 of the generated neighboring cell information.

Since other components and operations of the wireless communication system of the fifth embodiment are identical to those of the wireless communication system of the fourth embodiment, repeated description is not necessary.

In the above-described embodiments of the present invention, the neighboring cell information generation unit generates neighboring cell information based on the handover operation history of wireless terminal devices 202. However, the present invention is not limited thereto. The present invention is applicable to not only handover that is an inter-base-station movement (inter-cell movement) operation performed by a wireless terminal device 202 communicating with a wireless base station device but also an inter-base-station movement (inter-cell movement) operation performed by a wireless terminal device 202 in the idle state.

In this case, the wireless base station device is provided with a movement information acquisition unit instead of the handover information acquisition unit, and the movement information acquisition unit acquires movement information indicating the movement operation history of each wireless terminal device 202, based on information from the wireless terminal device 202, i.e., a movement completion notification. Then, based on the movement information acquired by the movement information acquisition unit, the neighboring cell information generation unit generates neighboring cell information indicating one or a plurality of femto base stations 101 located in the neighborhood of the target femto base station, among the plurality of femto base stations 101 other than the target femto base station. That is, the present invention is also applicable to the configurations and operations in which "handover" is replaced with "movement" in the first to fourth embodiments of the present invention.

The embodiments disclosed in Chapter 1 are to be considered in all respects as illustrative and not restrictive. The scope of the present invention is indicated by the appended claims rather than by the foregoing meaning, and all changes which come within the meaning and range of equivalency of the claims are therefore intended to be embraced therein.

Further, the reference characters used in Chapter 1 are exclusively used in Chapter 1, and are not related to the reference characters in other chapters.

Description of the Reference Characters 11, 21 handover information acquisition unit
12, 22 neighboring cell information generation unit
13, 23 neighboring cell information transmission unit
31 handover information acquisition unit
32 neighboring cell information generation unit
33 neighboring cell information transmission unit
34 power measurement indication unit
81 base-station-side transmission/reception unit
82 data processing unit
83 core-network-side transmission/reception unit
91 antenna
92 circulator
93 wireless reception unit 94 wireless transmission unit
95 signal processing unit
96 reception signal processing unit
97 transmission signal processing unit
101, 101A, 101B, 101C, 101D femto base station (wireless base station device)
105 signal processing unit
106 reception signal processing unit
201 macro base station
202 wireless terminal device
203 gateway device
301 wireless communication system
501, 501A, 501B, 501C, 501D wireless base station device
FCA, FCB, FCC, FCD femto cell
MC macro cell
<<Chapter 2>>

Hereinafter, embodiments of the present invention will be described with reference to the drawings. In Chapter 2, the same or corresponding components are given the same reference characters, and are not repeatedly described.

<Embodiment 1>

A wireless base station device notifies wireless terminal devices of information relating to its own cell and neighboring cells, i.e., the frequency of its radio signal, IDs (identifications) of neighboring cells, and the like. Based on the information provided from the wireless base station device, each wireless terminal device detects and measures the neighboring cells. Based on the result of the measurement, the wireless terminal device starts to move to a neighboring cell. Here, "movement" of a wireless terminal device means "handover", and "selection" of a cell through which a wireless terminal device in the idle state will start communication, i.e., phone call or data communication.

For example, when a wireless terminal device is communicating with a wireless base station device, a destination of the wireless terminal device is determined by the wireless base station device or a host device in a core network. When a wireless terminal device is not communicating with a wireless base station device, a destination of the wireless terminal device is determined by the wireless terminal device.

In 3GPP (Third Generation Partnership Project) SPEC TS22.220, a femto cell and its access modes are described as follows. That is, a femto base station is a CPE (Customer Premise Equipment) that connects a wireless terminal device over a wireless interface to a mobile communication carrier network by using an IP backhaul.

Further, a femto base station in a closed access mode provides services to only its associated CSG (Closed Subscriber Group) members. A femto base station in a hybrid access mode provides services to its associated CSG members and to non-CSG members. A femto base station in an open access mode operates as a normal base station.

Such a definition based on 3GPP may be applied to the wireless communication system according to the first embodiment of the present invention.

Further, the following definition may be applied in combination with or separately from the above definition.

A macro base station is a wireless base station device under the control of a telecommunication carrier, with which wireless base station devices that subscribe to the telecommunication carrier are communicable. Further, it is considered that a macro base station is basically not powered off.

On the other hand, a femto base station is a wireless base station device which is mainly installed in a personal or corporate building, and is likely to be powered off depending on user's circumstances.

Further, a femto base station operates in any of the open, hybrid, and closed access modes. When the femto base station operates in the closed access mode, only registered members (terminals) are allowed to access the femto base station. When the femto base station operates in the closed access mode, the femto base station provides services to only the registered members. When the femto base station operates in the hybrid mode, the femto base station provides services to both the registered members and unregistered members (non-members). When the femto base station operates in the open access mode, the femto base station operates in the same manner as a macro base station.

FIG. 31 is a diagram illustrating the relationship between the access modes of a femto base station according to the first embodiment of the present invention, and wireless terminal devices that are allowed to access the femto base station.

With reference to FIG. 31, the femto base station according to the first embodiment of the present invention has the three access modes. Specifically, in the closed access mode, only registered wireless terminal devices are allowed to access the femto base station. In the open access mode, all wireless terminal devices are allowed to access the femto base station, and therefore, the femto base station is identical to a normal macro base station. In the hybrid mode, all wireless terminal devices are allowed to access the femto base station. In the hybrid mode, however, members, i.e., registered wireless terminal devices, may be treated preferentially over non-members, i.e., unregistered wireless terminal devices, in communication resource allocation, accounting, and the like.

That is, the femto base station according to the first embodiment of the present invention is configurable to operate in any of the following access modes: the open access mode in which all wireless terminal devices are allowed to access the femto base station; the closed access mode in which wireless terminal devices can be registered and only the registered wireless terminal devices are allowed to access the femto base station; and the hybrid mode in which wireless terminal devices can be registered and both the registered wireless terminal devices and unregistered wireless terminal devices are allowed to access the femto base station.

It is defined in 3GPP that, in a cell in the closed access mode, wireless terminal devices autonomously detect neighboring cells. In a macro cell in the open access mode, when a telecommunication carrier systematically installs a wireless base station device, the telecommunication carrier grasps information relating to neighboring macro cells, and the information is set in the wireless base station device at the time of installation or maintenance.

By the way, since a user is allowed to install a femto base station in any place, it is difficult for the femto base station to grasp its present location. Therefore, it is also difficult for the femto base station to acquire information of neighboring cells.

As described above, a femto cell detection method and a movement method of wireless terminal devices in a cell in the closed access mode are defined in 3GPP. However, when a wireless terminal device moves from a macro cell or a femto cell to a macro cell or a femto cell in the open access mode, a wireless base station device as a movement source needs to notify the wireless terminal device of information of a wireless base station device as a movement destination.

Since a user of a femto base station is allowed to determine where to use the femto base station, the femto base station is likely to be moved and powered on/off, which causes the following two problems. That is, since the femto base station cannot grasp its present location, it is difficult for the femto base station to acquire information of neighboring cells by using an OAM function (maintenance function). Further, when a femto base station exists in the neighborhood of a wireless base station device and the femto base station is powered off a wireless terminal device cannot move to the femto base station, and therefore, needs to detect on/off of the power of the femto base station.

If a femto base station can specify its present location by using a GPS (Global Positioning System) or the like, the femto base station may make an inquiry at the telecommunication carrier network to obtain information of geographically close cells. However, from the viewpoint of accuracy, it is difficult to specify the exact location.

[Configuration and Fundamental Operation]

Figure 32:
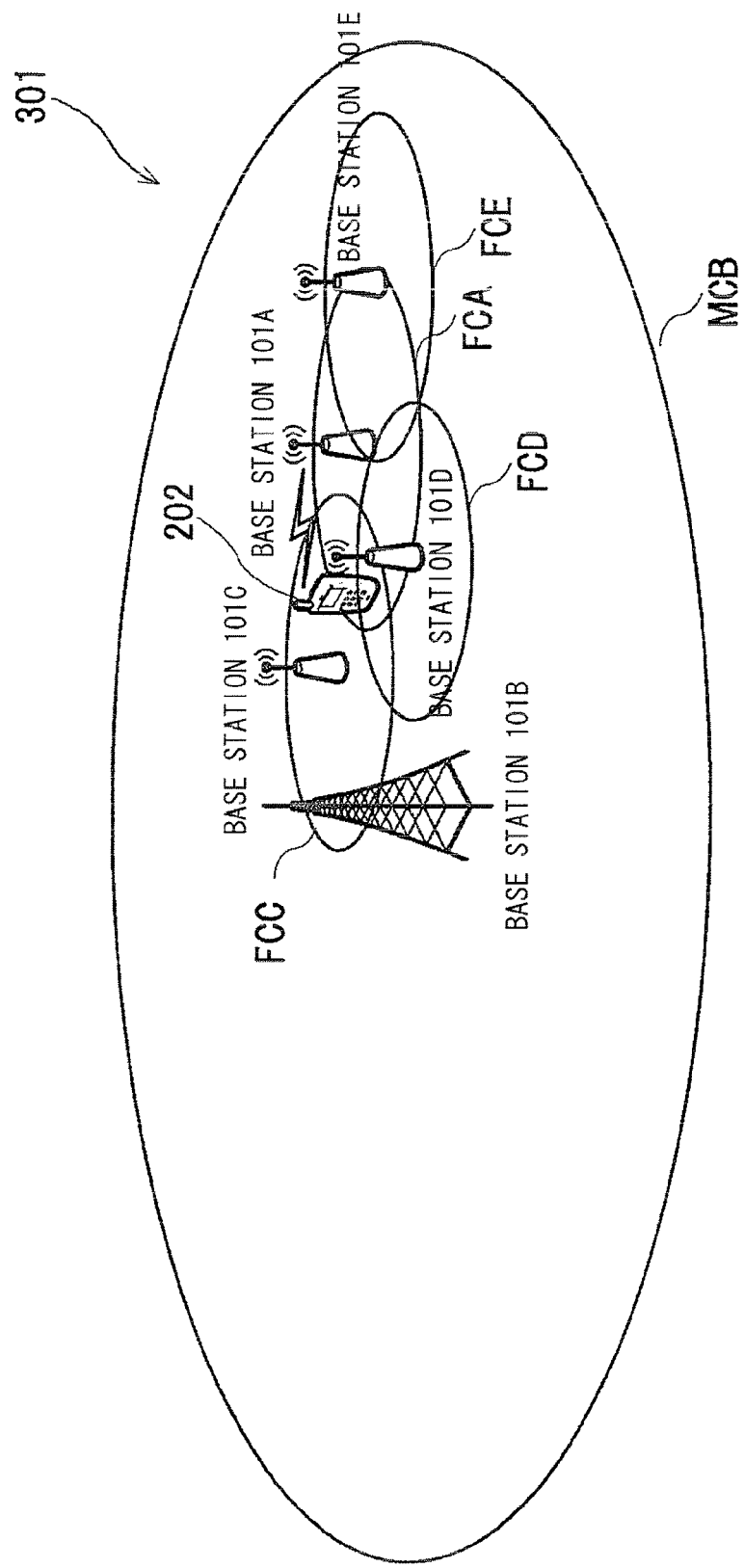
FIG. 32 is a diagram illustrating an example of arrangement of wireless base station devices in a wireless communication system according to the first embodiment of the present invention (Chapter 2).

FIG. 32 is a diagram illustrating an example of arrangement of wireless base station devices in a wireless communication system according to the first embodiment of the present invention.

With reference to FIG. 32, a wireless communication system 301 is a mobile communication system based on LTE (Long Term Evolution) standardized by, for example, 3GPP, and includes wireless base station devices 101A, 101B, 101C, 101D, and 101E.

In the wireless communication system 301, the wireless base station devices 101A, 101C, 101D, and 101E are femto base stations, and the wireless base station device 101B is a macro base station.

The wireless base station device 101B forms a macro cell MCB having a radius of several kilometers. The wireless base station devices 101A, 101C, 101D, and 101E form femto cells FCA, FCC, FCD, and FCE, respectively, each having a radius of several tens of meters.

In the present embodiment, it is assumed that a plurality of femto base stations exist in the macro cell formed by the macro base station 101B.

The wireless base station device 101B is allowed to communicate with wireless terminal devices 202 existing in the macro cell MCB by transmitting/receiving radio signals to/from the wireless terminal devices 202.

The wireless base station devices 101A, 101C, 101D, and 101E are installed in places such as homes and underground malls where it is difficult for wireless terminal devices 202 to receive a radio signal from the wireless base station device 101B, and are allowed to communicate with wireless terminal devices 202 existing in the femto cells FCA, FCC, FCD, and FCE, respectively, by transmitting/receiving radio signals to/from the wireless terminal devices 202.

In FIG. 32, the femto cells FCA and FCC respectively formed by the wireless base station device 101A and the wireless base station device 101C partially overlap each other. Further, the femto cells FCA and FCD respectively formed by the wireless base station device 101A and the wireless base station device 101D partially overlap each other. Further, the femto cells FCA and FCE respectively formed by the wireless base station device 101A and the wireless base station device 101E partially overlap each other.

At present, there is a wireless terminal device 202 communicating with the wireless base station device 101A, and the wireless terminal device 202 is located in an area where the femto cells FCA, FCC, and FCD formed by the wireless base station devices 101A, 101C, and 101D, respectively, partially overlap each other. Further, the wireless base station devices 101A and 101E are located such that one is located in a cell formed by the other.

In the wireless communication system according to the first embodiment of the present invention, each of the wireless base station devices 101A, 101B, 101C, 101D, and 101E operates as a neighboring cell processing device. That is, each of the wireless base station devices 101A, 101B, 101C, 101D, and 101E solely performs optimization of neighboring cell information.

Hereinafter, each of the wireless base station devices 101A, 101B, 101C, 101D, and 101E is sometimes referred to as a wireless base station device 101. Although one macro base station and four femto base stations are representatively shown in FIG. 32, less or more macro base stations and femto base stations may be provided.

Figure 33:
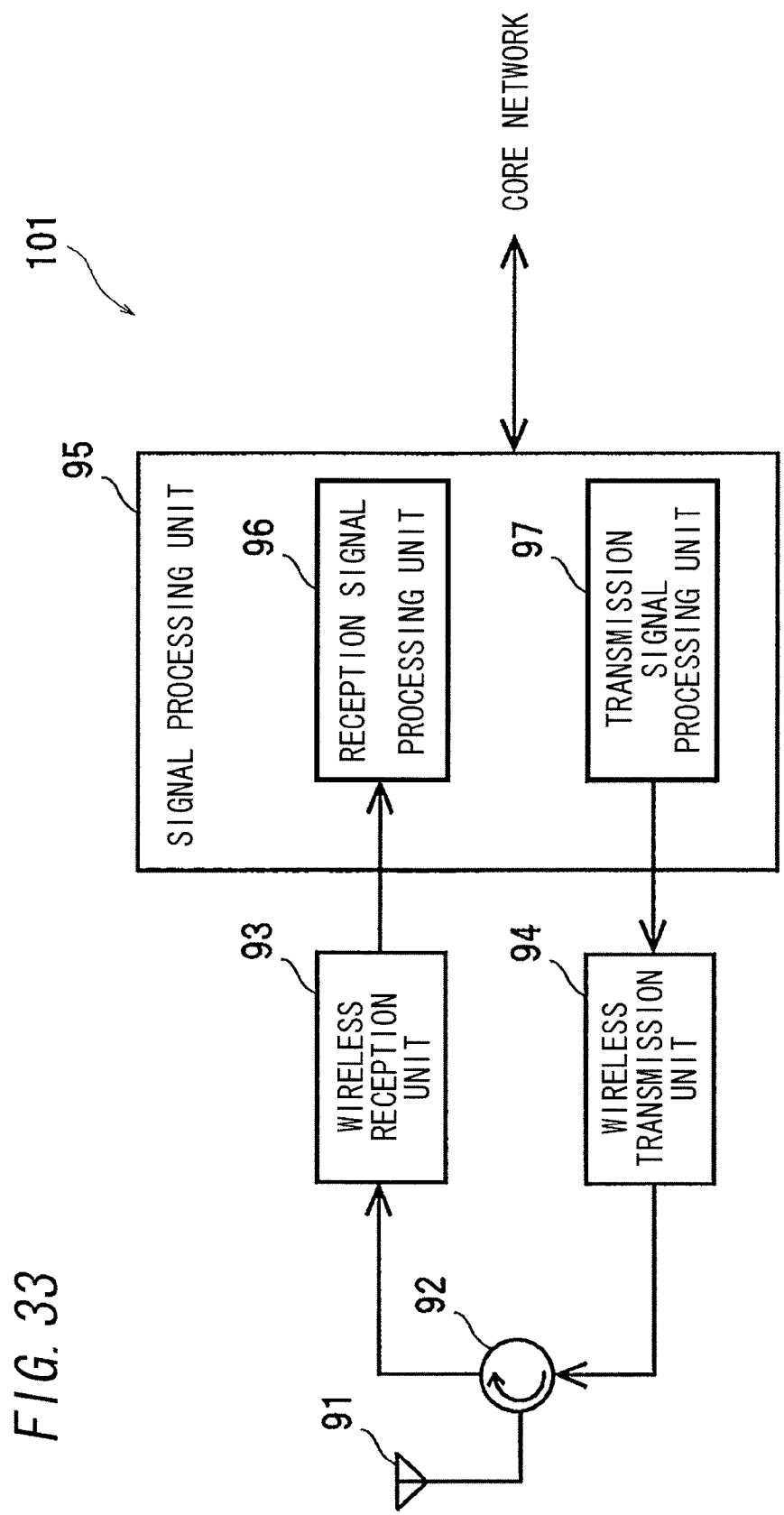
FIG. 33 is a diagram illustrating the configuration of a wireless base station device according to the first embodiment of the present invention (Chapter 2).

FIG. 33 is a diagram illustrating the configuration of a wireless base station device according to the first embodiment of the present invention.

With reference to FIG. 33, the wireless base station device 101 includes an antenna 91, a circulator 92, a wireless reception unit 93, a wireless transmission unit 94, and a signal processing unit 95. The signal processing unit 95 includes a reception signal processing unit 96 and a transmission signal processing unit 97. The signal processing unit 95 is implemented by a CPU (Central Processing Unit), a DSP (Digital Signal Processor), or the like.

The circulator 92 outputs a radio signal transmitted from the wireless terminal device 202 and received by the antenna 91, to the wireless reception unit 93, and outputs a radio signal provided from the wireless transmission unit 94, to the antenna 91.

The wireless reception unit 93 frequency-converts the radio signal provided from the circulator 92 into a base band signal or an IF (Intermediate Frequency) signal, converts the frequency-converted signal into a digital signal, and outputs the digital signal to the reception signal processing unit 96.

The reception signal processing unit 96 subjects the digital signal provided from the wireless reception unit 93 to signal processing such as reverse spreading in CDMA (Code Division Multiple Access), converts a part or the entirety of the processed digital signal into a predetermined frame format, and outputs the resultant signal to the core network.

The transmission signal processing unit 97 converts communication data received from the core network into a predetermined frame format, or generates communication data, and subjects the converted or generated communication data to signal processing such as IFFT (Inverse Fast Fourier Transform) in OFDM (Orthogonal Frequency Division Multiplex), and then outputs a digital signal obtained by the signal processing to the wireless transmission unit 94.

The wireless transmission unit 94 converts the digital signal provided from the transmission signal processing unit 97 into an analog signal, frequency-converts the analog signal into a radio signal, and outputs the radio signal to the circulator 92.

Figure 34:
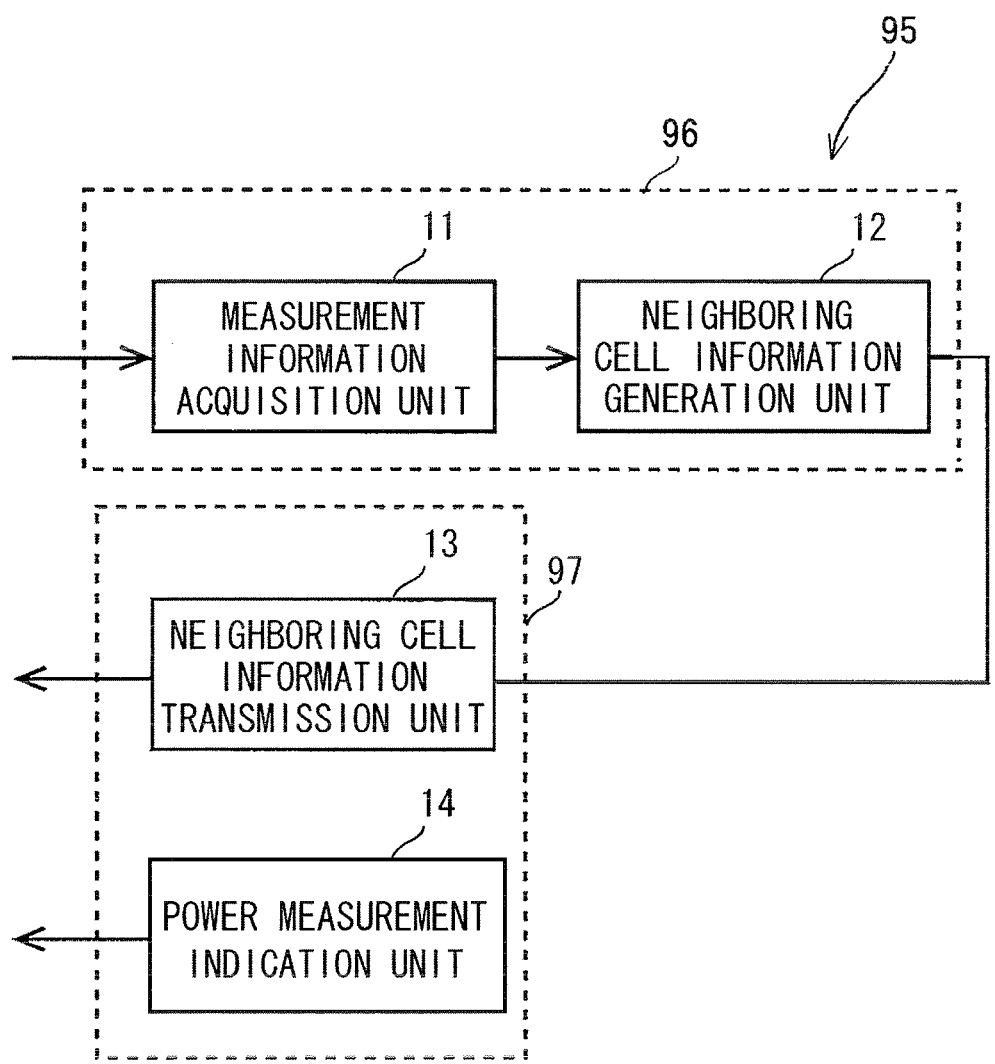
FIG. 34 is a diagram illustrating the configuration of a signal processing unit according to the first embodiment of the present invention (Chapter 2).

FIG. 34 is a diagram illustrating the configuration of the signal processing unit according to the first embodiment of the present invention.

With reference to FIG. 34, the reception signal processing unit 96 includes a measurement information acquisition unit 11, and a neighboring cell information generation unit 12. The transmission signal processing unit 97 includes a neighboring cell information transmission unit 13 and a power measurement indication unit 14.

The measurement information acquisition unit 11 acquires measurement information indicating a result of measurement of radio signals transmitted from other wireless base station devices 101, based on information provided from at least either of the wireless base station devices 101 or wireless terminal devices 202.

Based on the measurement information acquired by the measurement information acquisition unit 11, the neighboring cell information generation unit 12 generates neighboring cell information which indicates one or a plurality of wireless base station devices 101 located in the neighborhood of a wireless base station device (hereinafter also referred to as a target base station) to which the neighboring cell information is to be given, among a plurality of wireless base station devices 101 other than the target base station, in the wireless communication system 301. In the first embodiment of the present invention, the target base station is a wireless base station device 101 according to the first embodiment.

For example, the neighboring cell information generation unit 12 generates neighboring cell information indicating one or a plurality of wireless base station devices 101 to be candidate(s) for a handover destination of a wireless terminal device 202 which communicates with the target base station.

The neighboring cell information transmission unit 13 transmits the neighboring cell information generated by the neighboring cell information generation unit 12 to wireless terminal devices 202 which are communicable with the femto base station 101, i.e., wireless terminal devices 202 existing in the cell formed by the femto base station 101.

The power measurement indication unit 14 transmits, to each wireless terminal device 202, a measurement start request which causes the wireless terminal device 202 to measure the reception levels of radio signals transmitted from other wireless base station devices 101.

[Operation]

Next, a description will be given of an operation of the wireless base station device according to the first embodiment of the present invention to generate neighboring cell information.

Figure 35:
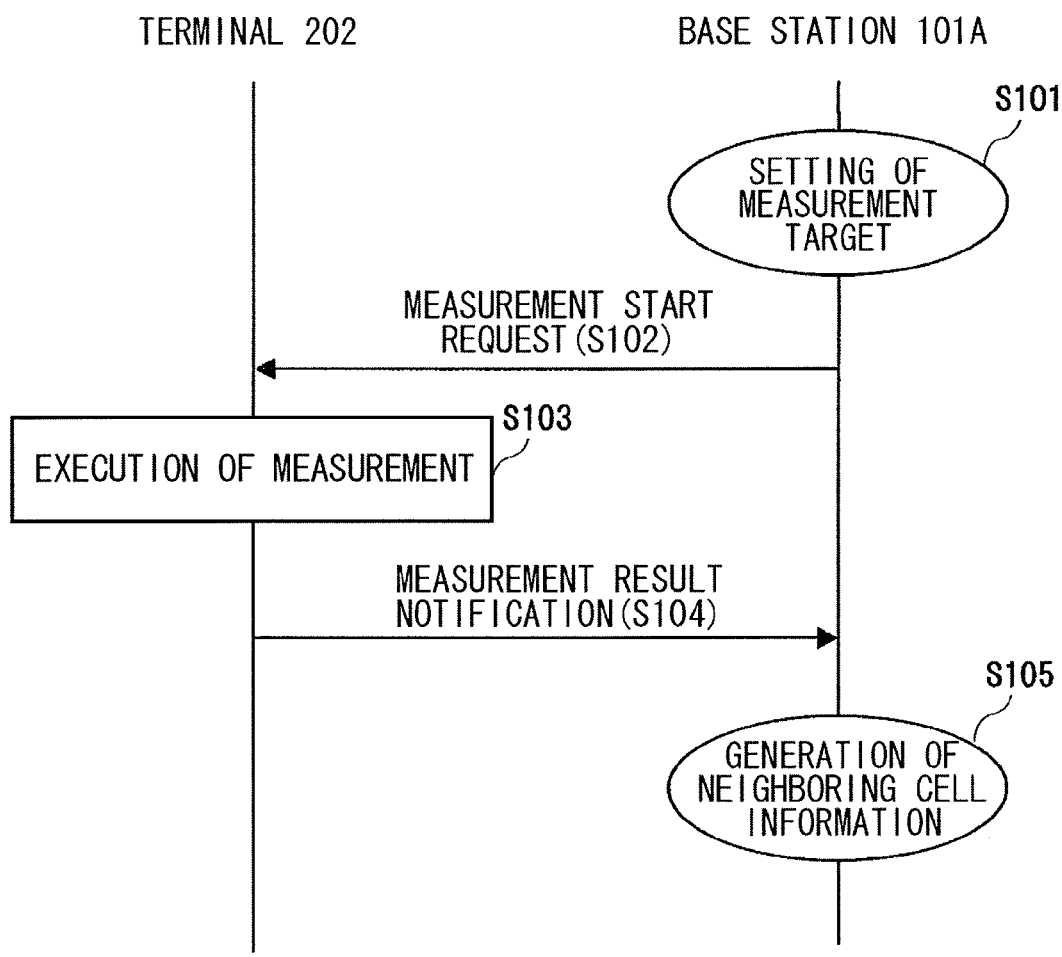
FIG. 35 is a diagram illustrating an example of a sequence in which a wireless base station device generates initial neighboring cell information, in the wireless communication system according to the first embodiment of the present invention (Chapter 2).

FIG. 35 is a diagram illustrating an example of a sequence in which a wireless base station device generates initial neighboring cell information, in the wireless communication system according to the first embodiment of the present invention.

When the wireless base station device 101 has no neighboring cell information, such as when the wireless base station device 101 is activated, the wireless base station device 101 instructs a wireless terminal device 202 to perform all-frequency search. For example, in LTE, when a wireless terminal device 202 firstly establishes an RRC (Radio Resource Control) connection with the wireless base station device 101, i.e., when a wireless terminal device 202 completes a process for starting communication with the wireless base station device 101, the wireless base station device 101 instructs the wireless terminal device 202 to perform all-frequency search.

The all-frequency search is a process of measuring the reception level of a radio signal transmitted from each wireless base station device 101, in all kinds of transmission frequencies set in the wireless communication system.

Then, based on the measurement result notified from the wireless terminal device 202, the wireless base station device 101 generates neighboring cell information, and stores the neighboring cell information in a storage unit (not shown).

More specifically, with reference to FIG. 35, the wireless base station device 101A firstly sets other wireless base station devices to be the targets of measurement by the wireless terminal device 202 (step S101).

Next, the wireless base station device 101A transmits, to the wireless terminal device 202, a measurement start request that causes the wireless terminal device 202 to measure the reception levels of radio signals transmitted from the set wireless base station devices. The measurement start request includes information relating to the frequencies and the wireless base station devices, which are the measurement targets (step S102).

Upon receiving the measurement start request from the wireless base station device 101A, the wireless terminal device 202 measures the reception levels of the radio signals transmitted from the wireless base station devices indicated by the received measurement start request (step S103).

Next, the wireless terminal device 202 transmits a measurement result notification indicating the measured reception levels to the wireless base station device 101A (step S104).

Based on the measurement result notification received from the wireless terminal device 202, the wireless base station device 101A generates initial neighboring cell information (step S105).

The wireless base station device 101A may instruct the wireless terminal device 202 which has firstly established an RRC connection, to perform all-frequency search, not only at the time of activation but also at regular intervals.

When the wireless base station device 101A is a femto base station and operates in the hybrid mode, and then if a non-member wireless terminal device 202 establishes an RRC connection, the wireless base station device 101A instructs the non-member wireless terminal device 202 to perform all-frequency search.

Specifically, when the target base station operates in the hybrid mode, the power measurement indication unit 14 instructs the unregistered wireless terminal device 202 to measure, in all frequencies, the reception levels of radio signals transmitted from the wireless base station devices 101 other than the target base station.

This configuration prevents the power of a wireless terminal device 202 owned by a registered user from being consumed, thereby providing appropriate communication services.

Alternatively, when the target base station operates in the hybrid mode, the power measurement indication unit 14 may instruct registered wireless terminal devices 202 to measure, in all frequencies, the reception levels of radio signals transmitted from the wireless base station devices 101 other than the target base station.

This configuration prevents the power of a wireless terminal device 202 owned by an unregistered user who is usually not able to quickly charge the wireless terminal device 202, from being consumed, thereby providing appropriate communication services.

Figure 36:
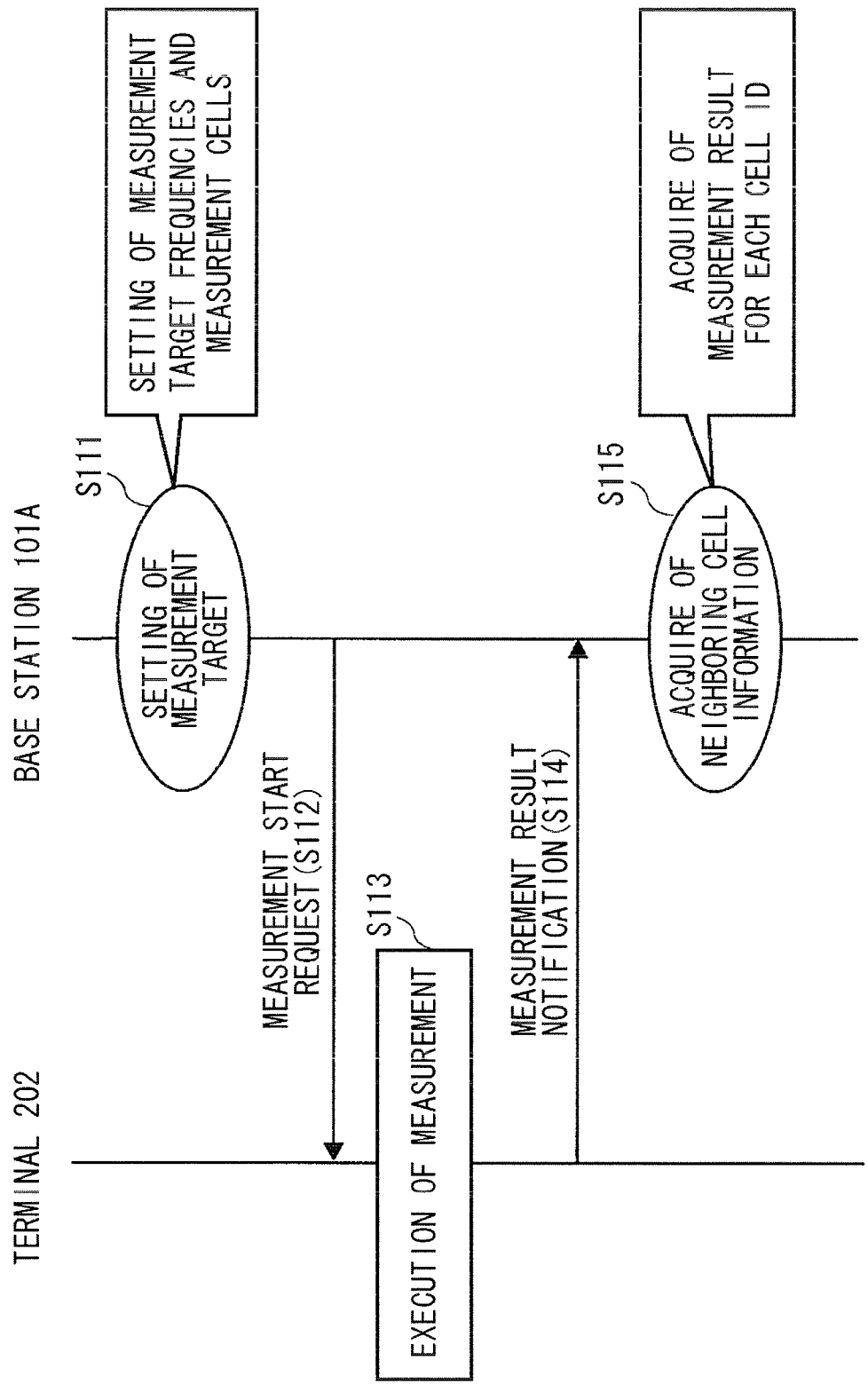
FIG. 36 is a diagram illustrating an example of a sequence in which a wireless base station device acquires measurement information, in the wireless communication system according to the first embodiment of the present invention (Chapter 2).

FIG. 36 is a diagram illustrating an example of a sequence in which a wireless base station device acquires measurement information in the wireless communication system according to the first embodiment of the present invention.

With reference to FIG. 36, firstly, the wireless base station device 101A sets frequencies to be measured by a wireless terminal device 202 communicating with the wireless base station device 101A, and measurement cells, i.e., other wireless base station devices transmitting radio signals of the frequencies (step S111).

Next, the wireless base station device 101A transmits, to the wireless terminal device 202, a measurement start request that causes the wireless terminal device 202 to measure the reception levels of radio signals transmitted from the other wireless base station devices. The measurement start request includes information, i.e., cell IDs, of the wireless base station devices 101 as the measurement targets. For example, this information is the neighboring cell information generated by the sequence shown in FIG. 35. Further, the measurement start request includes the transmission frequencies of the wireless base station devices 101 (step S112).

Upon receiving the measurement start request from the wireless base station device 101A, the wireless terminal device 202 measures, in the frequencies indicated by the received measurement start request, the reception levels of the radio signals transmitted from the wireless base station devices indicated by the measurement start request (step S113).

Next, the wireless terminal device 202 transmits a measurement result notification indicating the measured reception levels to the wireless base station device 101A. For example, the wireless terminal device 202 periodically performs measurement of reception levels. When the communication state with the wireless base station device 101A is deteriorated or when the communication state with any of the wireless base station devices 101 other than the wireless base station device 101A is improved, the wireless terminal device 202 transmits the measurement result notification to the wireless base station device 101A (step S114).

Next, based on the measurement result notification received from the wireless terminal device 202, the wireless base station device 101A acquires measurement information indicating the measurement result for each cell ID, and stores the measurement information in a storage unit (not shown) (step S115).

If the wireless terminal device 202 detects a cell which is not notified from the wireless base station device 101, the wireless terminal device 202 may include the measurement result of this cell in the measurement result notification to be notified to the wireless base station device 101.

Further, the wireless base station device 101 may instruct the wireless terminal device 202 to perform the above measurement in all frequencies available in the wireless communication system 301, thereby causing the wireless terminal device 202 to perform detection of neighboring cells and power measurement in all the frequencies.

Figure 37:
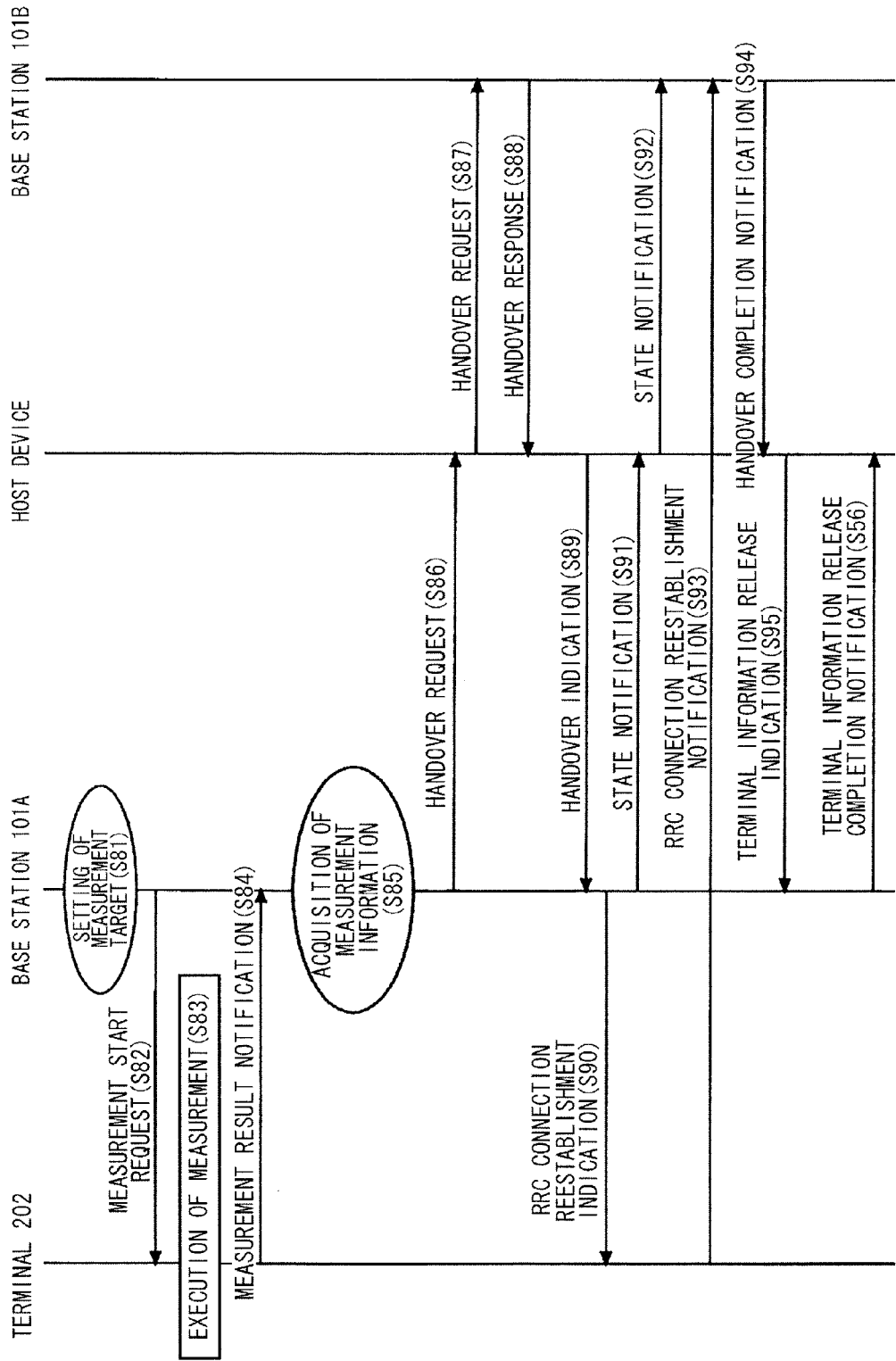
FIG. 37 is a diagram illustrating an example of a sequence of a handover operation in the wireless communication system according to the first embodiment of the present invention (Chapter 2).

FIG. 37 is a diagram illustrating an example of a sequence of a handover operation in the wireless communication system according to the first embodiment of the present invention.

With reference to FIG. 37, the operation in steps S81 to S85 is identical to the operation in steps S111 to S115 in the sequence shown in FIG. 36.

Next, based on the measurement result notification received from the wireless terminal device 202, the wireless base station device 101A determines whether or not the wireless terminal device 202 should perform handover. Upon determining that the wireless terminal device 202 should perform handover, the wireless base station device 101A determines, for example, the wireless base station device 101B as a handover destination with reference to the neighboring cell information, and transmits a handover request indicating the wireless base station device 101B to the host device (step S86).

In the wireless communication system according to the first embodiment of the present invention, "handover" means that a wireless base station device 101 which is a communication partner for a wireless terminal device 202 during phone call or data communication is changed to another wireless base station device 101.

Upon receiving the handover request from the wireless base station device 101A, the host device transmits the handover request to the wireless base station device 101B (step S87).

Upon receiving the handover request from the host device, the wireless base station device 101B transmits a handover response to the handover request, to the host device (step S88).

Upon receiving the handover response from the wireless base station device 101B, the host device transmits a handover indication to the wireless base station device 101A (step S89).

Upon receiving the handover indication from the host device, the wireless base station device 101A transmits an RRC connection reestablishment indication to the wireless terminal device 202 (step S90).

Then, the wireless base station device 101A transmits a status notification indicating its own communication status and the like, to the host device (step S91).

Upon receiving the status notification from the wireless base station device 101A, the host device transmits a status notification indicating the content of communication with the wireless terminal device 202 and the like, to the wireless base station device 101B (step S92).

When an RRC connection is established between the wireless terminal device 202 and the wireless base station device 101B, the wireless terminal device 202 transmits an RRC connection establishment notification to the wireless base station device 101B (step S93).

Upon receiving the RRC connection establishment notification from the wireless terminal device 202, the wireless base station device 101B transmits a handover completion notification to the host device (step S94).

Upon receiving the handover completion notification from the wireless base station device 101B, the host device transmits a terminal information release indication to the wireless base station device 101A (step S95).

Upon receiving the terminal information release indication from the host device, the wireless base station device 101A releases information relating to the wireless terminal device 202, and transmits a terminal information release completion notification to the host device (step S96).

Next, a description will be given of a method of updating the neighboring cell information generated based on the sequence or the like shown in FIG. 35.

The wireless base station device 101 performs ranking by using indices, on a list of wireless base station devices which is stored in the storage unit (not shown). That is, based on the measurement information acquired by the measurement information acquisition unit 11, the neighboring cell information generation unit 12 generates neighboring cell information in which one or a plurality of wireless base station devices 101 located in the neighborhood of the target base station are ranked among the plurality of wireless base station devices 101 other than the target base station.

FIG. 38 is a diagram illustrating an example of cell IDs and carrier frequencies of the respective wireless base station devices in the wireless communication system shown in FIG. 32.

With reference to FIG. 38, the cell ID of the wireless base station device 101A is 1111, and the carrier frequency of the radio signal transmitted from the wireless base station device 101A is f1. The cell ID of the wireless base station device 101B is 2222, and the carrier frequency of the radio signal transmitted from the wireless base station device 101B is f1. The cell ID of the wireless base station device 101C is 3333, and the carrier frequency of the radio signal transmitted from the wireless base station device 101C is f1. The cell ID of the wireless base station device 101D is 4444, and the carrier frequency of the radio signal transmitted from the wireless base station device 101D is f2. The cell ID of the wireless base station device 101E is 5555, and the carrier frequency of the radio signal transmitted from the wireless base station device 101E is f2.

In this case, with reference to the initial neighboring cell information generated based on the sequence shown in FIG. 35, the wireless base station device 101A instructs the wireless terminal device 202 to measure the radio signals transmitted from the wireless base station devices 101A, 101B, and 101C at the frequency f1, and measure the radio signal transmitted from the wireless base station device 101D at the frequency f2.

Then, according to the sequence shown in FIG. 36, the wireless terminal device 202 notifies the wireless base station device 101A of the measurement result, i.e., transmits a measurement result notification to the wireless base station device 101A.

FIG. 39 is a diagram illustrating an example of measurement information acquired by the wireless base station device.

With reference to FIG. 39, based on the measurement result information transmitted from the wireless terminal device 202, the wireless base station device 101A acquires measurement information indicating that the reception level of the radio signal transmitted from the wireless base station device 101A whose cell ID is 1111 is 10, the reception level of the radio signal transmitted from the wireless base station device 101B whose cell ID is 2222 is 8, the reception level of the radio signal transmitted from the wireless base station device 101C whose cell ID is 3333 is 3, and the reception level of the radio signal transmitted from the wireless base station device 101D whose cell ID is 4444 is 4.

FIG. 40 is a diagram illustrating an example of neighboring cell information generated by the wireless base station device.

With reference to FIG. 40, it is found from the measurement information shown in FIG. 39 acquired by the wireless base station device 101A that the magnitude of the reception level descends in order of: the wireless base station device 101B; the wireless base station device 101D; and the wireless base station device 101C. Therefore, the wireless base station device 101A registers the wireless base station devices 101B, 101D, and 101C in this order in the neighboring cell information. That is, the wireless base station device 101A updates the initial neighboring cell information generated based on the sequence shown in FIG. 35 to neighboring cell information indicating that the cell ID 2222 (wireless base station device 101B) having the reception level of 8 at the frequency f1 ranks first, the cell ID 4444 (wireless base station device 101D) having the reception level of 4 at the frequency f2 ranks second, and the cell ID 3333 (wireless base station device 101C) having the reception level of 3 at the frequency f1 ranks third.

When updating the neighboring cell information, the wireless base station device 101A broadcasts the updated neighboring cell information to the wireless terminal devices 202. For example, the wireless base station device 101A broadcasts, as the neighboring cell information, to the wireless terminal devices 202, N (N: an integer not smaller than 1) wireless base station devices from the highest level among the ranked wireless base station devices.

Specifically, in a case where the number of wireless base station devices registerable in the neighboring cell information to be notified to each wireless terminal device 202 is limited to two, the wireless base station device 101A notifies each wireless terminal device 202 of neighboring cell information indicating that the cell ID 2222 (wireless base station device 101B) ranks first, and the cell ID 4444 (wireless base station device 101D) ranks second.

FIG. 41 is a diagram illustrating another example of neighboring cell information generated by the wireless base station device.

In the wireless communication system according to the first embodiment of the present invention, the neighboring cell information generation unit 12 ranks the plurality of wireless base station devices 101 other than the target wireless base station device 101, based on the measurement information acquired by the measurement information acquisition unit 11, and generates neighboring cell information based on the result of the ranking. However, the present invention is not limited thereto.

The neighboring cell information generation unit 12 may determine a wireless base station device 101 not to be registered in the neighboring cell information, among the plurality of wireless base station devices 101 other than the target base station, based on the measurement information acquired by the measurement information acquisition unit 11, without performing ranking based on the magnitude of the reception level. For example, the neighboring cell information generation unit 12 may generate neighboring cell information in which at least the wireless base station device 101 whose reception level is lower than a predetermined value is eliminated.

With reference to FIG. 41, for example, when the threshold is 4, the neighboring cell information generation unit 12 eliminates the wireless base station device 101C, and registers the wireless base station devices 101B and 101D in the neighboring cell information. Then, the neighboring cell information transmission unit 13 notifies each wireless terminal device 202 of the neighboring cell information.

[Notification of Neighboring Cell Information]

As described above, the wireless base station device 101 performs optimization of the neighboring cell information in association with obtainment of the measurement information. The wireless base station device 101 needs to notify the wireless terminal devices 202 of the optimized neighboring cell information. That is, the neighboring cell information transmission unit 13 in the wireless base station device 101 transmits the neighboring cell information generated by the neighboring cell information generation unit 12 to the wireless terminal devices 202 which are communicable with the wireless base station device 101 as the target base station. For example, the following three notification methods are considered.

Figure 42:
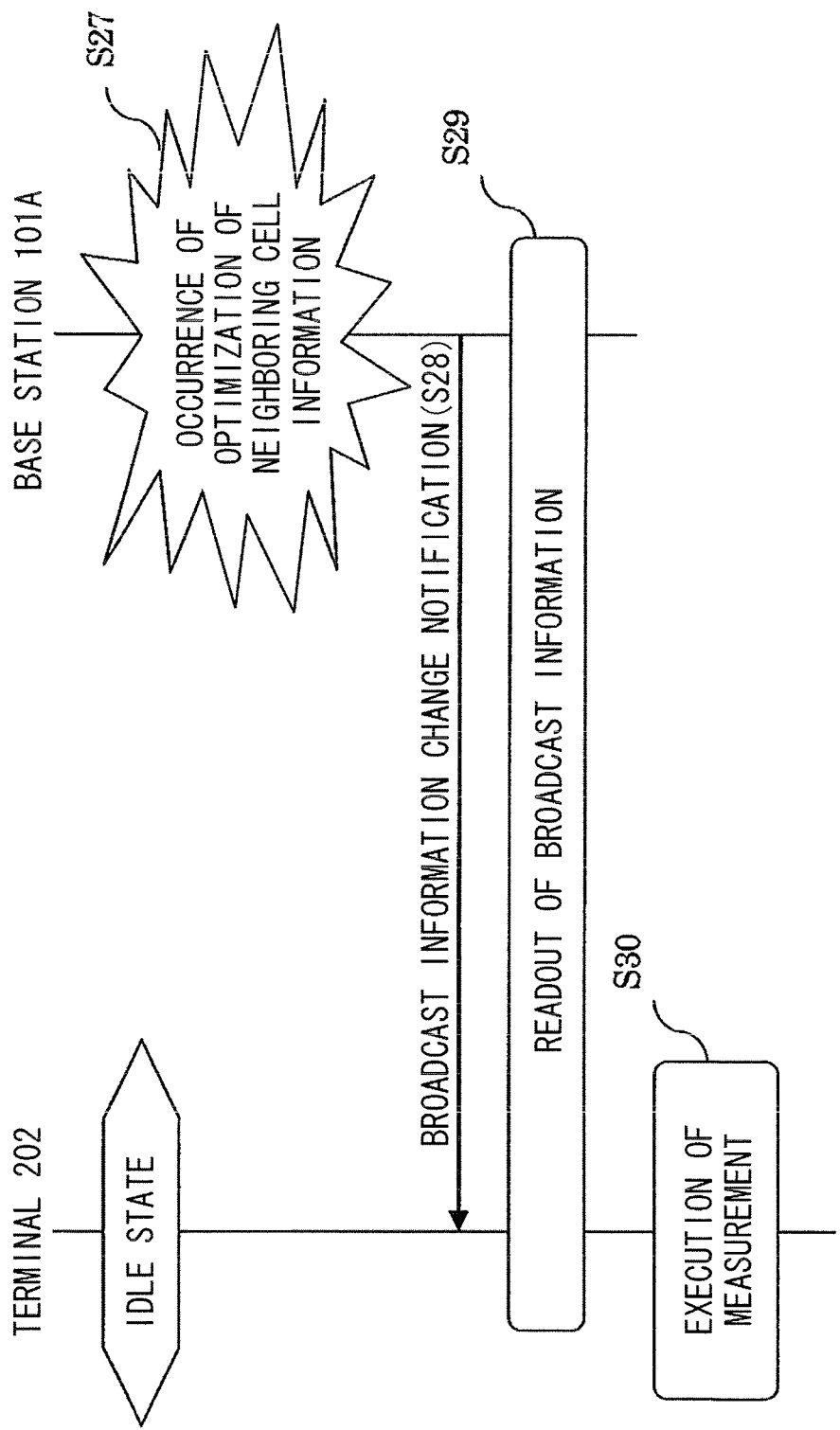
FIG. 42 is a diagram illustrating an example of a method in which a wireless base station device notifies wireless terminal devices of neighboring cell information, in the wireless communication system according to the first embodiment of the present invention (Chapter 2).

FIG. 42 is a diagram illustrating an example of a method in which a wireless base station device notifies wireless terminal devices of neighboring cell information, in the wireless communication system according to the first embodiment of the present invention.

With reference to FIG. 42, the wireless base station device 101A includes the neighboring cell information in broadcast information, and notifies wireless terminal devices 202 in the idle states, i.e., which are not during phone call or data communication, of the broadcast information. In this case, by using a broadcast information change notification, the wireless base station device 101A notifies the wireless terminal devices 202 that the neighboring cell information is updated.

More specifically, when optimization of the neighboring cell information occurs (step S27), the wireless base station device 101A broadcasts the broadcast information change notification to the wireless terminal devices 202 existing in the femto cell FCA (step S28).

Next, the wireless base station device 101A broadcasts the broadcast information including the updated neighboring cell information to the wireless terminal devices 202 existing in the femto cell FCA. Upon receiving the broadcast information change notification, each wireless terminal device 202 reads the neighboring cell information from the broadcast information transmitted from the wireless base station device 101A, and updates the neighboring cell information held therein to the read neighboring cell information (step S29).

Next, the wireless terminal device 202 measures, autonomously or upon receiving a measurement start request from the wireless base station device 101A, the reception levels of radio signals transmitted from the wireless base station devices 101 indicated in the updated neighboring cell information (step S30).

Figure 43:
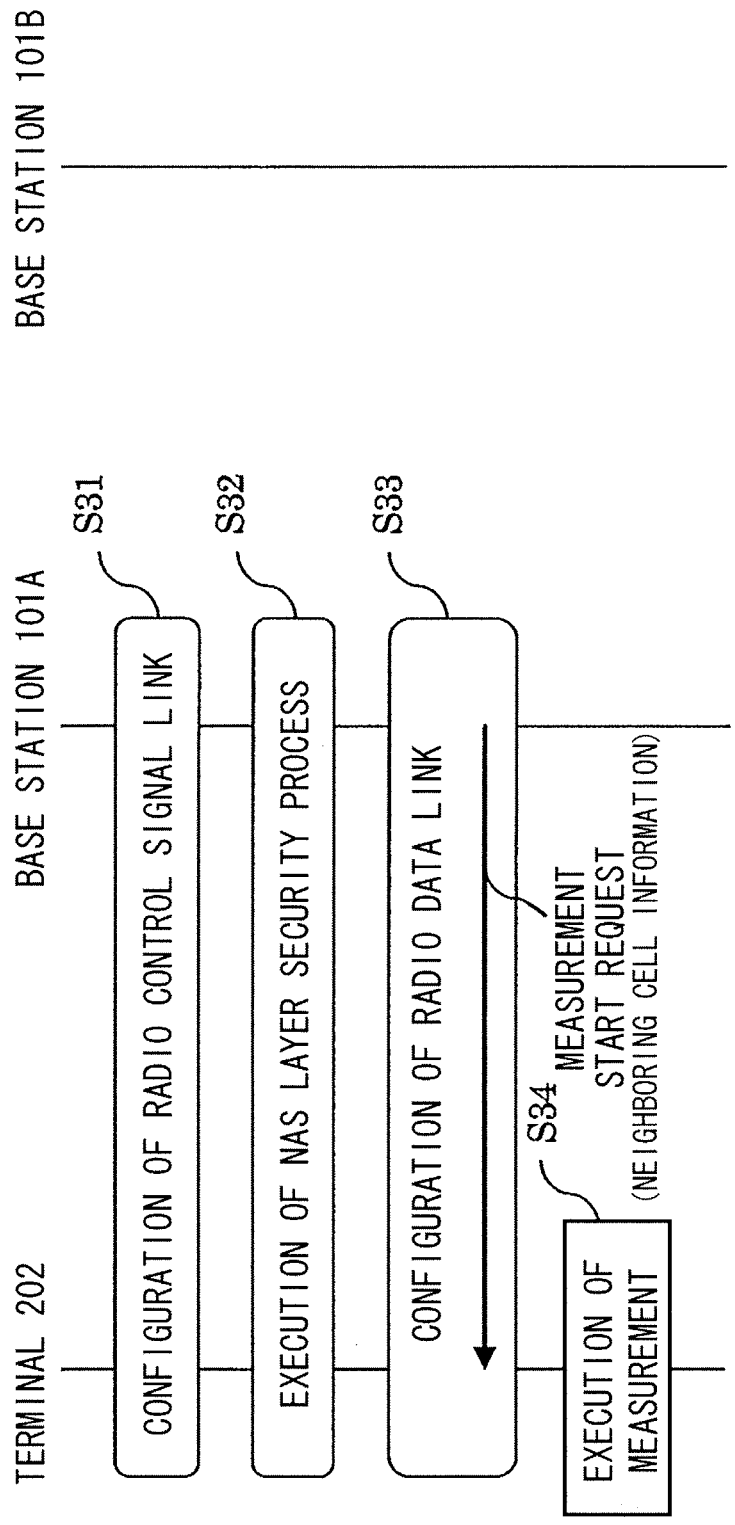
FIG. 43 is a diagram illustrating an example of a method in which a wireless base station device notifies wireless terminal devices of neighboring cell information, in the wireless communication system according to the first embodiment of the present invention (Chapter 2).

FIG. 43 is a diagram illustrating an example of a method in which a wireless base station device notifies wireless terminal devices of neighboring cell information, in the wireless communication system according to the first embodiment of the present invention.

With reference to FIG. 43, for example, in LTE, the wireless base station device 101A notifies a wireless terminal device 202 that performs an RRC connection establishing process, of neighboring cell information, when the wireless base station device 101A configures a radio data link.

More specifically, firstly, configuration of radio control signal link, i.e., various control processes in advance of transmission/reception of communication data such as IP (Internet Protocol) packets, is performed between the wireless terminal device 202 and the wireless base station device 101A (step S31).

Next, a security process for a NAS (Non-Access Stratum) layer, i.e., transmission/reception of information required for encryption of communication, is performed between the wireless terminal device 202 and the wireless base station device 101A (step S32). For example, in LTE, the wireless terminal device 202 transmits/receives information to/from the host device in the core network, and the wireless base station device 101A relays the information.

Next, configuration of radio data link is performed between the wireless terminal device 202 and the wireless base station device 101A, and thereafter, communication data such as IP packets are transmitted/received between the wireless terminal device 202 and the wireless base station device 101A. Further, the wireless base station device 101A transmits, to the wireless terminal device 202, a measurement start request that causes the wireless terminal device 202 to measure the reception levels of radio signals transmitted from other wireless base station devices 101 (step S33). For example, in LTE, the measurement start request is included in a radio data link configuration request transmitted from the wireless base station device 101A to the wireless terminal device 202. The neighboring cell information is included in the measurement start request.

Upon receiving the measurement start request from the wireless base station device 101A, the wireless terminal device 202 updates the neighboring cell information held therein to the newly informed neighboring cell information, and measures the reception levels of the radio signals transmitted from the wireless base station devices 101 indicated in the updated neighboring cell information (step S34).

Figure 44:
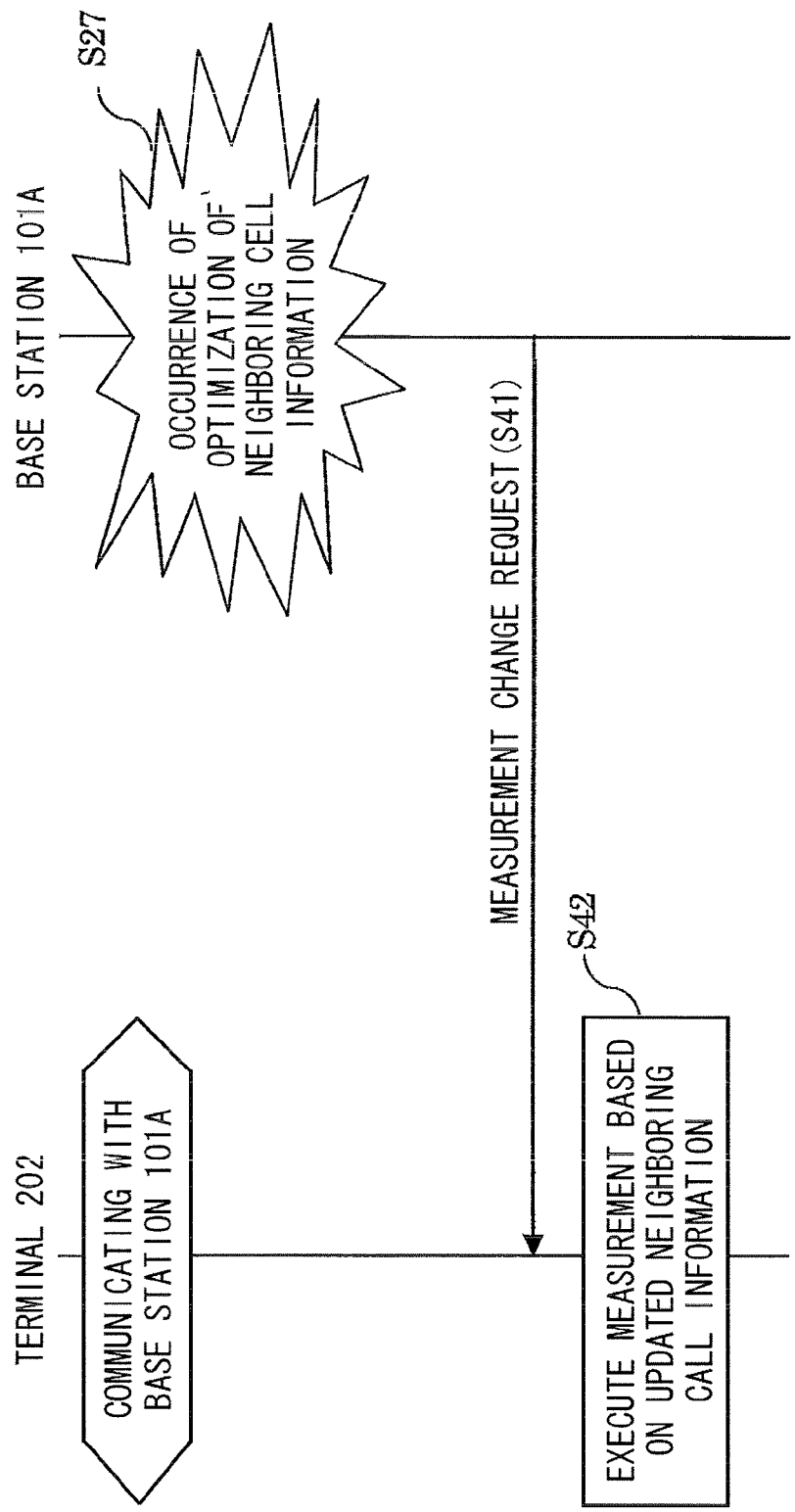
FIG. 44 is a diagram illustrating an example of a method in which a wireless base station device notifies wireless terminal devices of neighboring cell information, in the wireless communication system according to the first embodiment of the present invention (Chapter 2).

FIG. 44 is a diagram illustrating an example of a method in which a wireless base station device notifies wireless terminal devices of neighboring cell information, in the wireless communication system according to the first embodiment of the present invention.

With reference to FIG. 44, the wireless base station device 101A notifies a wireless terminal device 202 communicating with the wireless base station device 101A of updating of the neighboring cell information, by using a measurement change request.

More specifically, when optimization of the neighboring cell information occurs (step S27), the wireless base station device 101A includes the updated neighboring cell information in the measurement change request, and transmits the measurement change request to the wireless terminal device 202 (step S41).

Then, the wireless terminal device 202 changes the neighboring cell information held therein to the neighboring cell information included in the measurement change request received from the wireless base station device 101A, and measures the reception levels of the radio signals transmitted from the wireless base station devices 101 indicated in the changed neighboring cell information (step S42).

By the way, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from the femto base stations registered in the neighboring cell information, autonomously or upon receiving an indication from a femto base station, and notifies the femto base station of the measurement result. In this case, if a femto base station that is not suitable as a handover destination is registered in the neighboring cell information, the wireless terminal device performs unnecessary measurement, and unnecessary handover occurs.

In contrast, in the wireless communication system according to the first embodiment of the present invention, the measurement information acquisition unit 11 acquires the measurement information indicating the measurement result of the radio signals transmitted from the plurality of wireless base station devices 101 other than the target base station, based on the information from each wireless terminal device 202, i.e., the measurement result notification. Based on the measurement information acquired by the measurement information acquisition unit 11, the neighboring cell information generation unit 12 generates neighboring cell information indicating one or a plurality of wireless base station devices 101 located in the neighborhood of the target base station, among the plurality of wireless base station devices 101 other than the target wireless base station device 101.

This configuration allows automatic optimization of the neighboring cell information, regardless of movement and power on/off of each femto base station. Therefore, the efficiency of operation in the wireless communication system 301 can be improved without manpower assistance. Further, since the neighboring cell information is automatically optimized, a special installation process for each wireless base station device 101 is not needed, thereby reducing the time and cost required for installing the wireless base station device 101.

Furthermore, in the wireless communication system according to the first embodiment of the present invention, the neighboring cell information generation unit 12 ranks the wireless base station devices 101 other than the target base station, based on the measurement information acquired by the measurement information acquisition unit 11, and generates neighboring cell information based on the result of the ranking.

This configuration allows generation of detailed neighboring cell information, and achieves further improvement in the efficiency of operation in the wireless communication system. For example, the wireless base station device 101 preferentially selects, as a handover destination, a higher-rank wireless base station device in the ranking result, thereby increasing the handover success rate.

Further, in the wireless communication system according to the first embodiment of the present invention, the neighboring cell information generation unit 12 generates neighboring cell information indicating N (N: an integer not smaller than 1) wireless base station devices from the highest rank among the ranked wireless base station devices 101.

In this configuration, for example, in a case where the number of wireless base station devices that can be included in the neighboring cell information to be notified to the wireless terminal devices 202 is limited, it is possible to notify each wireless terminal device 202 of appropriate neighboring cell information by including the upper N wireless base station devices in the neighboring cell information.

Further, in the wireless communication system according to the first embodiment of the present invention, the neighboring cell information generation unit 12 generates neighboring cell information which further indicates the ranking of the ranked wireless base station devices 101.

This configuration allows generation of more detailed neighboring cell information, and achieves further improvement in the efficiency of operation in the wireless communication system. For example, based on the ranking of the wireless base station devices in the neighboring cell information, each wireless terminal device 202 performs determination of measurement order, selection of wireless base station devices as measurement targets, and the like, thereby realizing efficient measurement operation.

Further, in the wireless communication system according to the first embodiment of the present invention, the measurement information acquisition unit 11 acquires, based on the information from each wireless terminal device 202, measurement information indicating the result of measurement in which the wireless terminal device 202 has measured the reception levels of the radio signals transmitted from the plurality of wireless base station devices 101 other than the target wireless base station device 101.

In this way, by using the reception level as a criterion for determining which wireless base station devices should be included in the neighboring cell information, and for ranking the wireless base station devices, it is possible to generate appropriate neighboring cell information.

Further, in the wireless communication system according to the first embodiment of the present invention, the neighboring cell information generation unit 12 ranks the wireless base station devices 101. In the ranking, a wireless base station device 101 whose reception level indicated in the measurement information is relatively high is ranked higher than a wireless base station device 101 whose reception level is relatively low.

This configuration allows appropriate ranking of the wireless base station devices 101 in accordance with the actually measured reception levels.

Further, in the wireless communication system according to the first embodiment of the present invention, the neighboring cell information generation unit 12 generates neighboring cell information in which at least the wireless base station device 101 whose reception level indicated in the measurement information is lower than a predetermined value is eliminated from among the plurality of wireless base station devices 101 other than the target base station.

This configuration allows appropriate elimination of a wireless base station device 101 whose reception level actually measured is low, from the neighboring cell information.

At least any of the plurality of wireless base station devices 101 in the wireless communication system according to the first embodiment of the present invention is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

If configuration of a femto base station is automatically performed by using the technique described in Patent Literature 1, all femto base stations located in the neighborhood of the femto base station are regarded as neighboring cells and registered in the neighboring cell information as candidates for a handover destination. Therefore, even a femto base station that is not essentially suitable as a handover destination, such as a femto base station located across a wall from a wireless terminal device, might be registered in the neighboring cell information.

In contrast, in the wireless communication system according to the first embodiment of the present invention, based on the measurement information acquired by the measurement information acquisition unit 11, the neighboring cell information generation unit 12 generates neighboring cell information indicating one or a plurality of wireless base station devices 101 to be candidate(s) for a handover destination of the wireless terminal device 202 which communicates with the target base station, among the plurality of wireless base station devices 101 other than the target base station.

This configuration causes the handover operation in the femto cell of the installed wireless base station device 101 to be in the optimum state. Further, by performing optimization of the neighboring cell information, the number of neighboring cells candidates for a handover destination of the wireless terminal device 202 during communication can be reduced, thereby avoiding occurrence of unnecessary handover.

Further, in the wireless communication system according to the first embodiment of the present invention, the neighboring cell information generation unit 12 generates neighboring cell information indicating one or a plurality of wireless base station devices 101 to be the target(s) of measurement by the wireless terminal device 202, among the plurality of wireless base station devices 101 other than the target base station.

In this way, by performing optimization of the neighboring cell information, the number of neighboring cells to be the targets of measurement by the wireless terminal device 202 can be reduced, thereby preventing the wireless terminal device 202 from performing unnecessary measurement operation.

Further, in the wireless communication system according to the first embodiment of the present invention, the neighboring cell information generation unit 12 generates neighboring cell information indicating one or a plurality of wireless base station devices 101 which transmit radio signal(s) whose reception level(s) are to be measured by the wireless terminal device 202, among the plurality of wireless base station devices 101 other than the target base station.

In this way, by performing optimization of the neighboring cell information, the number of neighboring cells to be the targets of reception level measurement by the wireless terminal device 202 can be reduced, thereby preventing the wireless terminal device 202 from performing unnecessary measurement operation.

Further, in the wireless communication system according to the first embodiment of the present invention, the neighboring cell information generation unit 12 generates neighboring cell information indicating one or a plurality of wireless base station devices 101 which transmit radio signal(s) whose reception level(s) are to be measured by the wireless terminal device 202 in the idle state, i.e., which is not communicating with the target base station, among the plurality of wireless base station devices 101 other than the target base station.

This configuration reduces the number of neighboring cells to be the targets of periodical power measurement which is instructed by the broadcast information or the like from the wireless base station device 101, thereby preventing the wireless terminal device 202 from performing unnecessary measurement operation. In particular, the power consumption of the wireless terminal device 202 in the idle state can be reduced, resulting in remarkable effects.

Further, in the wireless communication system according to the first embodiment of the present invention, the neighboring cell information generation unit 12 generates initial neighboring cell information, based on the result of measurement in which the wireless terminal device 202 communicating with the target base station measures, in all frequencies, the reception levels of radio signals transmitted from the wireless base station devices 101 other than the target base station.

This configuration allows prompt construction of appropriate neighboring cell information, and prompt realization of highly-efficient operation in the wireless communication system 301.

Further, in the wireless communication system according to the first embodiment of the present invention, each wireless base station device 101 solely performs optimization of neighboring cell information. That is, each wireless base station device 101 is provided with the neighboring cell processing device according to the first embodiment of the present invention.

This configuration eliminates the need to optimize the neighboring cell information of each wireless base station device 101 by the host device in the core network, thereby achieving dispersion of processing load in the wireless communication system 301, and reduction in the communication traffic between the wireless base station device 101 and the host device.

In the wireless communication system according to the first embodiment of the present invention, a wireless base station device 101 causes a wireless terminal device 202 to measure the reception power. However, the present invention is not limited thereto. If the wireless base station device 101 itself is able to measure the reception power of a radio signal from another wireless base station device 101, the wireless base station device 101 may measure the reception power to acquire measurement information.

Further, in the wireless communication system according to the first embodiment of the present invention, the reception level of a radio signal transmitted from each wireless base station device 101 is used as an index for ranking. However, the present invention is not limited thereto. For example, an SNR (Signal to Noise Ratio) may be calculated based on the reception level of a radio signal transmitted from a certain wireless base station device 101 and the reception level of a radio signal transmitted from another wireless base station device 101 to be an interference source, and the SNR may be used as an index for ranking of wireless base station devices. Alternatively, instead of the SNR, a CINR (carrier to interference and noise ratio) may be used as an index for ranking of wireless base station devices.

Further, in the wireless base station device according to the first embodiment of the present invention, the neighboring cell information generation unit 12 generates initial neighboring cell information, based on the result of measurement in which the wireless terminal device 202 communicating with the target base station measures, in all frequencies, the reception levels of radio signals transmitted from the wireless base station devices 101 other than the target base station. However, the present invention is not limited thereto. The present invention is applicable not only to the configuration in which all the transmission frequencies of the wireless base station devices 101 in the wireless communication system are measured but also to a configuration in which a plurality of frequencies corresponding to part of the transmission frequencies are measured.

Further, in the wireless communication system according to the first embodiment of the present invention, a wireless base station device 101 has the initiative to select a wireless base station device 101 to be a communication partner of a wireless terminal device 202. However, the present invention is not limited thereto. A wireless terminal device 202 may have the initiative to select a wireless base station device 101 to be a communication partner of the wireless terminal device 202.

Further, in the first embodiment of the present invention, the handover operation of wireless terminal devices is specifically described. However, the present invention is applicable to not only handover that is an inter-base-station movement (inter-cell movement) operation performed by a wireless terminal device communicating with a wireless base station device but also an inter-base-station movement (inter-cell movement) operation performed by a wireless terminal device in the idle state. That is, the present invention is applicable to the configurations and operations in which "handover" is replaced with "movement" in the first embodiment of the present invention.

Hereinafter, a description will be given of another embodiment of the present invention with reference to figures. In the figures, the same or corresponding components are given the same reference characters and are not repeatedly described.

<Embodiment 2>

A second embodiment relates to a wireless communication system in which the content of measurement information is changed from that of the wireless communication system according to the first embodiment. The wireless communication system of the second embodiment is identical to the wireless communication system of the first embodiment except the matters described below.

In the wireless communication system according to the second embodiment of the present invention, the measurement information acquisition unit 11 acquires, based on information from each wireless terminal device 202, measurement information indicating the number of times the wireless terminal device 202 has detected the presence of each of a plurality of wireless base station devices 101 other than a target wireless base station device 101, based on radio signals transmitted from the respective wireless base station devices 101, and indicating the detection rate at which the wireless terminal device 202 detects the presence of each wireless base station device 101. In the present embodiment, the detection rate is a ratio of the number of times a wireless terminal device 202 has detected the presence of a wireless base station device 101 to the number of times the wireless terminal device 202 has executed measurement.

FIG. 45 is a diagram illustrating an example of a result of measurement by a wireless terminal device 202.

For example, a wireless base station device 101A instructs a wireless terminal device 202 communicating with the wireless base station device 101A to perform four times of all-frequency search, and acquires a measurement result as shown in FIG. 45 based on a measurement result notification that notifies the result of the four times of all-frequency search performed by the wireless terminal device 202.

Specifically, the wireless terminal device 202 transmits, to the wireless base station device 101A, a measurement result notification indicating that the wireless terminal device 202 has detected the wireless base station devices 101B, 101C, and 101D in the first measurement, the wireless base station devices 101B, 101C, 101D, and 101E in the second measurement, the wireless base station devices 101B and 101D in the third measurement, and the wireless base station device 101B in the fourth measurement.

FIG. 46 is a diagram illustrating an example of measurement information acquired by the wireless base station device.

With reference to FIG. 46, based on the measurement result notification transmitted from the wireless terminal device 202, the wireless base station device 101A acquires measurement information indicating that the number of times of detection of the wireless base station device 101B is 4 and the detection rate of the wireless base station device 101B is 1.00, the number of times of detection of the wireless base station device 101C is 2 and the detection rate of the wireless base station device 101C is 0.50, the number of times of detection of the wireless base station device 101D is 3 and the detection rate of the wireless base station device 101D is 0.75, and the number of times of detection of the wireless base station device 101E is 1 and the detection rate of the wireless base station device 101E is 0.25.

FIG. 47 is a diagram illustrating an example of neighboring cell information generated by the wireless base station device.

With reference to FIG. 47, based on the measurement information acquired by the wireless base station device 101A, the number of times of detection and the detection rate descend in order of: the wireless base station device 101B; the wireless base station device 101D; the wireless base station device 101C; and the wireless base station device 101E. Therefore, the wireless base station device 101A registers the wireless base station devices 101B, 101D, 101C, and 101E in this order in the neighboring cell information. That is, the wireless base station device 101A updates the initial neighboring cell information generated by the sequence shown in FIG. 35 or the like, to neighboring cell information indicating that the cell ID 2222 (wireless base station device 101B) ranks first, whose number of times of detection at the frequency f1 is 4 and whose detection rate is 1.00; the cell ID 4444 (wireless base station device 101D) ranks second, whose number of times of detection at the frequency f2 is 3 and whose detection rate is 0.75; the cell ID 3333 (wireless base station device 101C) ranks third, whose number of times of detection at the frequency f1 is 2 and whose detection rate is 0.50; and the cell ID 5555 (wireless base station device 101E) ranks fourth, whose number of times of detection at the frequency f2 is 1 and whose detection rate is 0.25.

When updating the neighboring cell information, the wireless base station device 101A broadcasts the updated neighboring cell information to each wireless terminal device 202. For example, the wireless base station device 101A broadcasts, to each wireless terminal device 202, neighboring cell information indicating N (N: an integer not smaller than 1) wireless base station devices from the highest rank among the ranked wireless base station devices.

Specifically, in a case where the number of wireless base station devices registerable in the neighboring cell information to be notified to each wireless terminal device 202 is limited to two, the wireless base station device 101A notifies each wireless terminal device 202 of neighboring cell information indicating that the cell ID 2222 (wireless base station device 101B) ranks first, and the cell ID 4444 (wireless base station device 101D) ranks second.

FIG. 48 is a diagram illustrating another example of neighboring cell information generated by the wireless base station device.

In the wireless communication system according to the second embodiment of the present invention, the neighboring cell information generation unit 12 ranks the plurality of wireless base station devices 101 other than the target wireless base station device 101, based on the measurement information acquired by the measurement information acquisition unit 11, and generates neighboring cell information based on the result of the ranking. However, the present invention is not limited thereto.

The neighboring cell information generation unit 12 may determine wireless base station devices 101 not to be registered in the neighboring cell information from among the plurality of wireless base station devices 101 other than the target base station, based on the measurement information acquired by the measurement information acquisition unit 11, without performing ranking based on the number of times of detection or the detection rate. That is, the neighboring cell information generation unit 12 generates neighboring cell information in which at least the wireless base station device 101 whose number of times of detection or detection rate is smaller than a predetermined threshold is eliminated.

With reference to FIG. 4R, for example, when the threshold of the number of times of detection is 2, the neighboring cell information generation unit 12 registers the wireless base station devices 101B, 101C, and 101D in the neighboring cell information.

When the threshold of the detection rate is 0.50, the neighboring cell information generation unit 12 registers the wireless base station devices 101B, 101C, and 101D in the neighboring cell information.

Then, the neighboring cell information transmission unit 13 notifies each wireless terminal device 202 of the neighboring cell information.

As described above, when all the measurements performed by the wireless terminal device 202 are all-frequency search, the ranking in the neighboring cell information according to the number of times of detection is the same as the ranking in the neighboring cell information according to the detection rate. However, if the measurement target frequencies in the plurality of times of measurement performed by the wireless terminal device 202 are different from each other, the ranking in the neighboring cell information according to the number of times of detection is different from the ranking in the neighboring cell information according to the detection rate.

As described above, in the wireless communication system according to the second embodiment of the present invention, a wireless terminal device 202 measures the reception levels of radio signals transmitted from the plurality of wireless base station devices 101 other than the target wireless base station device 101, and detects the presence of each of the wireless base station devices. Then, the measurement information acquisition unit 11 in the wireless base station device 101 acquires, based on information from the wireless terminal device 202, measurement information indicating the number of times the wireless terminal device 202 has detected the presence of each of the wireless base station devices 101.

In this way, by using the number of times of detection of each wireless base station device as a criterion for determining which wireless base station devices should be included in the neighboring cell information, and for ranking the wireless base station devices, it is possible to generate appropriate neighboring cell information.

Further, the measurement information acquisition unit 11 acquires, based on information from the wireless terminal device 202, measurement information indicating the detection rate at which the wireless terminal device 202 detects the presence of each of the plurality of wireless base station devices 101 other than the target wireless base station device 101, based on the radio signals transmitted from the respective wireless base station devices 101.

In this way, by using the detection rate of each of the wireless base station devices as a criterion for determining which wireless base station devices should be included in the neighboring cell information, and for ranking the wireless base station devices, it is possible to generate appropriate neighboring cell information.

Then, the wireless base station device 101 ranks the wireless base station devices, based on the detection rate (i.e., the number of times of detection/the number of times of all-frequency search) or the number of times of detection of each wireless base station device which is measured by the wireless terming device 202.

This configuration allows recognition of powered-on wireless base station devices and powered-off wireless base station devices, thereby generating appropriate neighboring cell information.

Accordingly, in the wireless communication system of the second embodiment of the present invention, by generating appropriate neighboring cell information, highly-efficient operation in the wireless communication system can be achieved.

Further, in the wireless communication system according to the second embodiment of the present invention, the neighboring cell information generation unit 12 ranks the wireless base station devices 101. In the ranking, a wireless base station device 101 whose number of times of detection indicated in the measurement information is relatively great is ranked higher than a wireless base station device 101 whose number of times of detection is relatively small.

This configuration allows appropriate ranking of the wireless base station devices 101 in accordance with how often the presence of each wireless base station device 101 has actually been detected.

Further, in the wireless communication system according to the second embodiment of the present invention, the neighboring cell information generation unit 12 generates neighboring cell information in which at least the wireless base station device 101 whose number of times of detection indicated in the measurement information is smaller than a predetermined value is eliminated from among the plurality of wireless base station devices 101 other than the target base station.

This configuration allows appropriate elimination of wireless base station devices 101 which have not been often detected, from the neighboring cell information.

Further, in the wireless communication system according to the second embodiment of the present invention, the neighboring cell information generation unit 12 ranks the wireless base station devices 101. In the ranking, a wireless base station device 101 whose detection rate indicated in the measurement information is relatively high is ranked higher than a wireless base station device 101 whose detection rate is relatively low.

This configuration allows appropriate ranking of wireless base station devices 101 in accordance with how often each wireless base station device 101 has actually been detected.

Further, in the wireless communication system according to the second embodiment of the present invention, the neighboring cell information generation unit 12 generates neighboring cell information in which at least the wireless base station device 101 whose detection rate indicated in the measurement information is lower than a predetermined value is eliminated from among the plurality of wireless base station devices 101 other than the target base station.

This configuration allows appropriate elimination of a wireless base station device 101 which has not been often detected, from the neighboring cell information.

In the wireless communication system according to the second embodiment of the present invention, the neighboring cell information generation unit 12 generates neighboring cell information, based on the number of times of detection and the detection rate. However, the present invention is not limited thereto. The neighboring cell information generation unit 12 may generate neighboring cell information, based on at least either of the number of times of detection or the detection rate.

Further, in the wireless communication system according to the second embodiment of the present invention, a wireless terminal device 202 detects wireless base station devices 101. However, the present invention is not limited thereto. If a wireless base station device 101 itself is able to detect other wireless base station devices 101, the wireless base station device 101 may perform detection and measurement of wireless base station devices to acquire measurement information.

Further, the measurement information acquisition unit 11 may acquire measurement information indicating the measurement result in a predetermined time period from the present to a certain point in the past. That is, the wireless base station device 101 may generate neighboring cell information, based on a measurement history in a predetermined time period from the present to a certain point in the past.

For example, the wireless base station device 101 may generate neighboring cell information, based on a measurement history in a time period from one day ago to the present time. Alternatively, the wireless base station device 101 may generate neighboring cell information based on a measurement history corresponding to a predetermined number of times of measurement. For example, the wireless base station device 101 may generate neighboring cell information, fbased on a measurement history corresponding to the latest 30 times of measurement. This configuration prevents a wireless base station device 101 which has already been powered off from remaining high in the ranking.

Hereinafter, another embodiment of the present invention will be described with reference to figures. In the figures, the same or corresponding components are given the same reference characters and are not repeatedly described.

<Embodiment 3>

A third embodiment relates to a wireless communication system in which the content of measurement information is changed from that of the wireless communication system according to the first embodiment. The wireless communication system of the third embodiment is identical to the wireless communication system of the first embodiment except the matters described below.

In the wireless communication system according to the third embodiment of the present invention, a wireless base station device 101 stores a record of detection of wireless base station devices 101 by itself or wireless terminal devices 202. That is, the measurement information acquisition unit 11 acquires, based on information from wireless terminal devices 202, measurement information indicating a measurement time at which the latest measurement result was obtained, which latest measurement result caused a wireless base station device 101 to be added or left in the neighboring cell information.

Thereby, the wireless base station device 101 is allowed to obtain, as measurement information, the last updating time of the detection record for a wireless base station device 101 which has been detected at least one time. That is, the last updating time is a time at which a target base station or a wireless terminal device 202 could measure a wireless base station device 101 other than the target base station, that is, a time at which the reception level of a radio signal transmitted from the wireless base station device 101 was equal to or higher than a predetermined threshold.

A wireless base station device 101 for which an elapsed time from the last updating time is long is less likely to exist in the neighborhood of the target base station, and therefore, is less likely to be measured. Accordingly, the wireless base station device 101 ranks the wireless base station devices 101, based on the elapsed time from the last updating time.

FIG. 49 is a diagram illustrating an example of measurement information acquired by the wireless base station device.

With reference to FIG. 49, the wireless base station device 101A acquires measurement information indicating that the first measurement was performed at 15:12 on Jun. 14, 2010 and the wireless terminal device 202 detected the wireless base station devices 101B, 101C, and 101D in the first measurement; the second measurement was performed at 23:50 on Jun. 14, 2010 and the wireless terminal device 202 detected the wireless base station devices 101B, 101C, 101D, and 101E in the second measurement; the third measurement was performed at 6:30 on Jun. 14, 2010 and the wireless terminal device 202 detected the wireless base station devices 101B and 101D in the third measurement; and the fourth measurement was performed at 16:20 on Jun. 14, 2010 and the wireless terminal device 202 detected the wireless base station device 101B in the fourth measurement.

FIG. 50 is a diagram illustrating an example of neighboring cell information generated by the wireless base station device.

With reference to FIG. 50, it is found from the measurement information acquired by the wireless base station device 101A that the elapsed time from the last updating time (i.e., the last detection time) at the time when the fourth measurement has ended, ascends in order of: the wireless base station device 101B; the wireless base station device 101D; the wireless base station device 101C; and wireless base station device 101E. Therefore, the wireless base station device 101A registers the wireless base station devices 101B, 101D, 101C, and 101E in this order in the neighboring cell information.

Specifically, the wireless base station device 101A updates the initial neighboring cell information generated by the sequence shown in FIG. 35 or the like, to neighboring cell information indicating that the cell ID 2222 (wireless base station device 101B) ranks first, whose last detection time is 16:20 on Jun. 14, 2010 and whose elapsed time is 00(min):00(sec); the cell ID 4444 (wireless base station device 101D) ranks second, whose last detection time is 6:30 on Jun. 14, 2010 and whose elapsed time is 09(min):50(sec); the cell ID 3333 (wireless base station device 101C) ranks third, whose last detection time is 23:50 on Jun. 14, 2010 and whose elapsed time is 16(min):30(sec); and the cell ID 5555 (wireless base station device 101E) ranks fourth, whose last detection time is 23:50 on Jun. 14, 2010 and whose elapsed time is 16(min):30(sec).

When updating the neighboring cell information, the wireless base station device 101A broadcasts the updated neighboring cell information to each wireless terminal device 202. The wireless base station device 101A broadcasts, to each wireless terminal device 202, neighboring cell information indicating N (N: an integer not smaller than 1) wireless base station devices from the highest rank among the ranked wireless base station devices.

Specifically, in a case where the number of wireless base station devices registerable in the neighboring cell information to be notified to each wireless terminal device 202 is limited to two, the wireless base station device 101A notifies each wireless terminal device 202 of neighboring cell information indicating that the cell ID 2222 (wireless base station device 101B) ranks first, and the cell ID 4444 (wireless base station device 101D) ranks second.

FIG. 51 is a diagram illustrating another example of neighboring cell information generated by the wireless base station device.

In the wireless communication system according to the third embodiment of the present invention, the neighboring cell information generation unit 12 ranks the plurality of wireless base station devices 101 other than the target wireless base station device 101, based on the measurement information acquired by the measurement information acquisition unit 11, and generates neighboring cell information based on the result of the ranking. However, the present invention is not limited thereto.

The neighboring cell information generation unit 12 may determine wireless base station devices 101 not to be registered in the neighboring cell information from among the plurality of wireless base station devices 101 other than the target base station, based on the measurement information acquired by the measurement information acquisition unit 11, without performing ranking based on the length of the elapsed time from the measurement time. That is, the neighboring cell information generation unit 12 generates neighboring cell information in which at least the wireless base station device 101 for which an elapsed time from the measurement time is equal to or longer than a predetermined threshold is eliminated.

With reference to FIG. 51, for example, if the threshold of the elapsed time from the last updating time is 10 min, the neighboring cell information generation unit 12 registers the wireless base station devices 101B and 101n in the neighboring cell information. Then, the neighboring cell information transmission unit 13 notifies each wireless terminal device 202 of the neighboring cell information.

As described above, in the wireless communication system according to the third embodiment of the present invention, the measurement information acquisition unit 11 acquires, based on information from wireless terminal devices 202, measurement information indicating the measurement time at which the last measurement result was obtained, which latest measurement result caused a wireless base station device 101 to be added or left in the neighboring cell information.

That is, by using the elapsed time from the measurement time as a criterion for determining which wireless base station devices should be included in the neighboring cell information, and for ranking the wireless base station devices, it is possible to recognize a wireless base station device which is less likely to exist at present, thereby generating appropriate neighboring cell information.

Accordingly, in the wireless communication system of the third embodiment of the present invention, by generating appropriate neighboring cell information, highly-efficient operation in the wireless communication system can be achieved.

Further, in the wireless communication system according to the third embodiment of the present invention, the neighboring cell information generation unit 12 ranks the wireless base station devices 101. In the ranking, a wireless base station device 101 for which an elapsed time from the measurement time is relatively long is ranked lower than a wireless base station device 101 for which an elapsed time from the measurement time is relatively short. That is, the wireless base station device 101 determines that a wireless base station device for which a predetermined time or more has elapsed from the last updating time cannot be ensured for its existence, and lowers the rank of the wireless base station device.

This configuration allows appropriate ranking of wireless base station devices 101 in accordance with the possibility of presence of each wireless base station device at present.

Further, in the wireless communication system according to the third embodiment of the present invention, the neighboring cell information generation unit 12 generates neighboring cell information in which at least the wireless base station device 101 for which an elapsed time from the measurement time is equal to or longer than a predetermined value is eliminated from among the plurality of wireless base station devices 101 other than the target base station. That is, the wireless base station device 101 determines that a wireless base station device for which a longer time has passed from the last updating time is less likely to be ensured for its presence, and eliminates the wireless base station device from the neighboring cell information.

This configuration allows appropriate elimination of a wireless base station device 101 which is less likely to exist at present, from the neighboring cell information.

In the wireless communication system according to the third embodiment of the present invention, the measurement information acquisition unit 11 acquires, as measurement information, a record of detection of wireless base station devices 101 by each wireless terminal device 202. However, the present invention is not limited thereto. If a wireless base station device 101 itself is able to detect other wireless base station devices 101, the wireless base station device 101 may acquire, as measurement information, a record of detection of wireless base station devices 101 by the wireless base station device 101.

Further, in the wireless communication systems according to the first to third embodiments of the present invention, if a wireless base station device 101 has detected a new base station, the wireless base station device 101 may continue to add the new base station in the neighboring cell information for a predetermined time period or until the number of times of measurement for the new base station reaches a predetermined value, and may notify each wireless terminal device 202 of this neighboring cell information. In this case, the wireless base station device 101 may temporarily increase the number of base stations to be listed in the neighboring cell information, with the already listed wireless base station devices being left as they are.

Further, in the wireless communication systems according to the first to third embodiments of the present invention, when the wireless base station device 101 operates in the hybrid mode, the wireless base station device 101 may weight, based on the distinction between a member and a non-member, the reception level, the number of times of detection, the detection rate, and the elapsed time. That is, when the target base station operates in the hybrid mode, the neighboring cell information generation unit 12 weights the measurement information of registered wireless terminal devices 202 and the measurement information of unregistered wireless terminal devices 202, and generates neighboring cell information based on the result of the weighting.

This configuration allows generation of appropriate neighboring cell information according to the distinction between a registered wireless terminal device 202 and an unregistered wireless terminal device 202.

Since other components and operations of the wireless communication system of the third embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 4>

A fourth embodiment relates to a wireless communication system in which, instead of a wireless base station device, a gateway device serves as a neighboring cell processing device, in contrast to the wireless communication systems according to the first to third embodiments. The wireless communication system of the fourth embodiment is identical to the wireless communication systems of the first to third embodiments except the matters described below.

Figure 52:
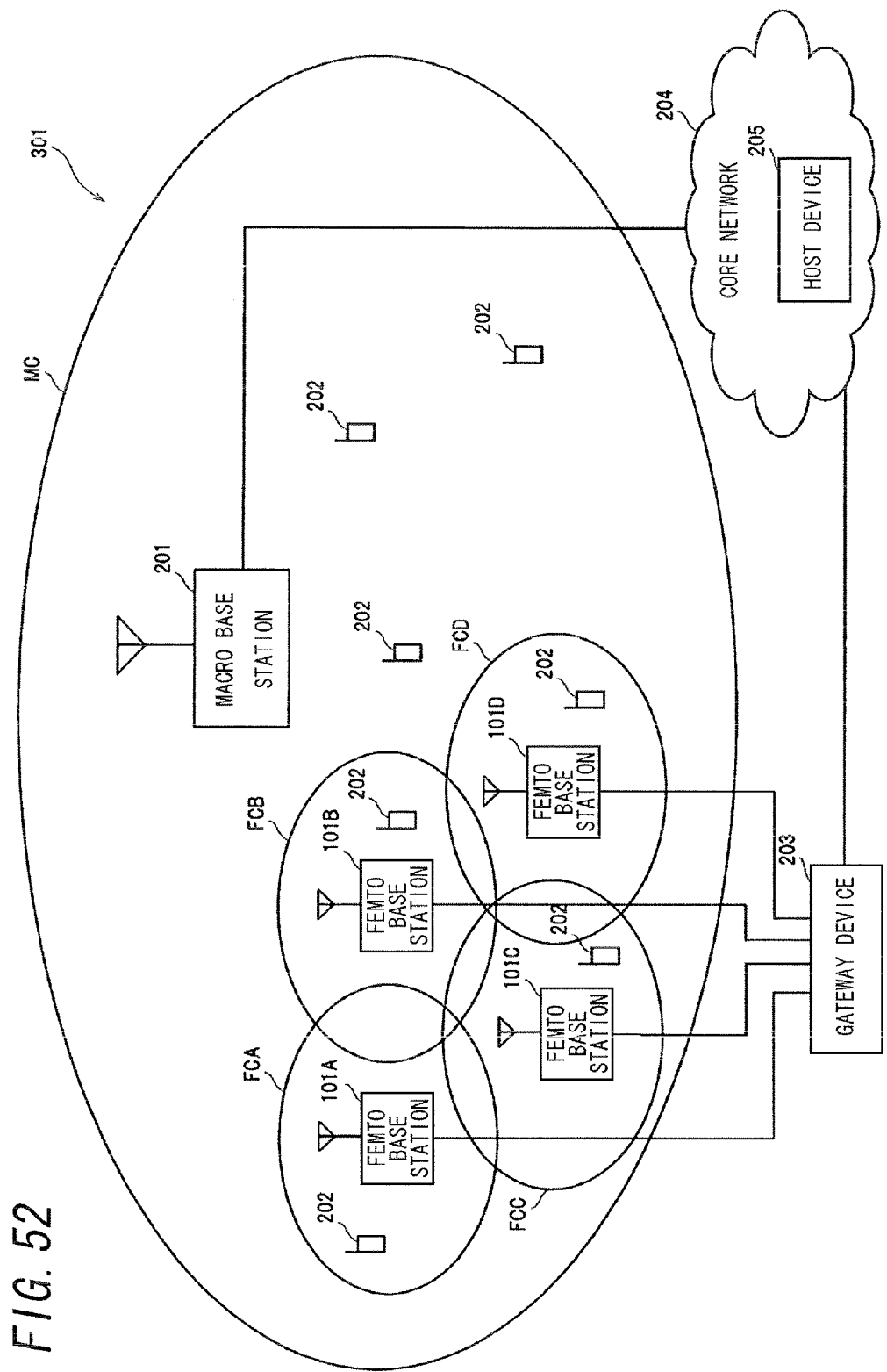
FIG. 52 is a diagram illustrating the configuration of a wireless communication system according to a fourth embodiment of the present invention (Chapter 2).

FIG. 52 is a diagram illustrating the configuration of the wireless communication system according to the fourth embodiment of the present invention.

With reference to FIG. 52, the wireless communication system 302 includes wireless base station devices 101A, 101B, 101C, 101D, and 101E, a gateway device 203, and a host device 205.

In the wireless communication system 302, as in the wireless communication system 301, the wireless base station devices 101A, 101C, 101D, and 101E are femto base stations, and the wireless base station device 101B is a macro base station.

Hereinafter, each of the wireless base station devices 101A, 101C, 101D, and 101E is sometimes referred to as a femto base station 101. Although one macro base station and four femto base stations are representatively shown in FIG. 52, less or more macro base stations and femto base stations may be provided.

The gateway device 203 performs, for example, a process of relaying various kinds of communication data transmitted between each of the wireless base station devices 101A, 101C, 101D, and 101E, and the host device 205 in the core network 204.

Figure 53:
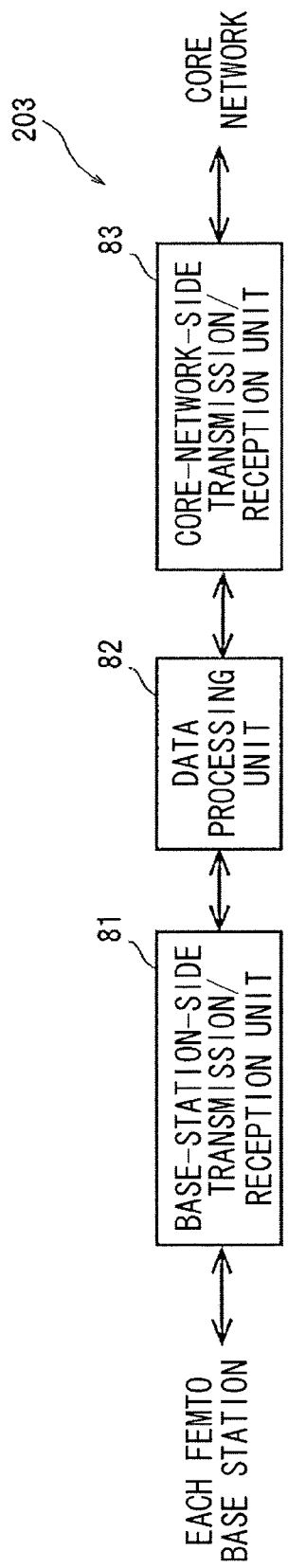
FIG. 53 is a diagram illustrating the configuration of a gateway device according to the fourth embodiment of the present invention (Chapter 2).

FIG. 53 is a diagram illustrating the configuration of the gateway device according to the fourth embodiment of the present invention.

With reference to FIG. 53, the gateway device 203 includes a base-station-side transmission/reception unit 81, a data processing unit 82, and a core-network-side transmission/reception unit 83.

The base-station-side transmission/reception unit 81 transmits communication data provided from the data processing unit 82 to each femto base station 101, and outputs communication data received from each femto base station 101 to the data processing unit 82.

The data processing unit 82 performs various kinds of processing on the communication data provided from the base-station-side transmission/reception unit 81, and outputs the processed communication data to the core-network-side transmission/reception unit 83. Further, the data processing unit 87 performs various kinds of processing on the communication data provided from the core-network-side transmission/reception unit 83, and outputs the processed communication data to the base-station-side transmission/reception unit 81.

The core-network-side transmission/reception unit 83 outputs the communication data provided from the data processing unit 82 to the host device 205 in the core network 204, and outputs communication data received from the host device 205 in the core network 204 to the data processing unit 82.

In the wireless communication system according to the fourth embodiment of the present invention, the gateway device 203 monitors the subordinate femto base stations, and optimizes neighboring cell information.

Figure 54:
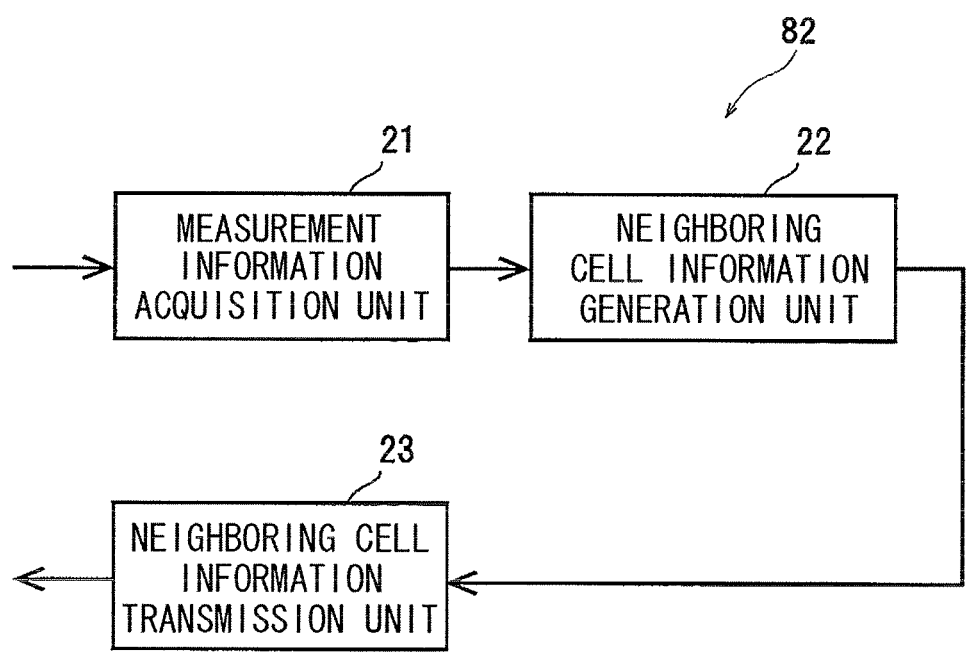
FIG. 54 is a diagram illustrating the configuration of a data processing unit in the gateway device according to the fourth embodiment of the present invention (Chapter 2).

FIG. 54 is a diagram illustrating the configuration of the data processing unit in the gateway device according to the fourth embodiment of the present invention.

With reference to FIG. 54, the data processing unit 82 includes a measurement information acquisition unit 21, a neighboring cell information generation unit 22, and a neighboring cell information transmission unit 23.

The measurement information acquisition unit 21 acquires measurement information indicating the result of measurement of radio signals transmitted from the wireless base station devices 101 other than the target base station, based on information provided from each femto base station 101.

Based on the measurement information acquired by the measurement information acquisition unit 21, the neighboring cell information generation unit 22 generates neighboring cell information indicating one or a plurality of wireless base station devices located in the neighborhood of the target femto base station, among the plurality of femto base stations other than the target femto base station, in the wireless communication system 302.

The neighboring cell information transmission unit 23 transmits the neighboring cell information generated by the neighboring cell information generation unit 22 to the target femto base station.

The content of a method of generating neighboring cell information by the neighboring cell information generation unit 22 is identical to, for example, the method of generating neighboring cell information by the neighboring cell information generation unit 12 according to any of the first to third embodiments of the present invention.

Figure 55:
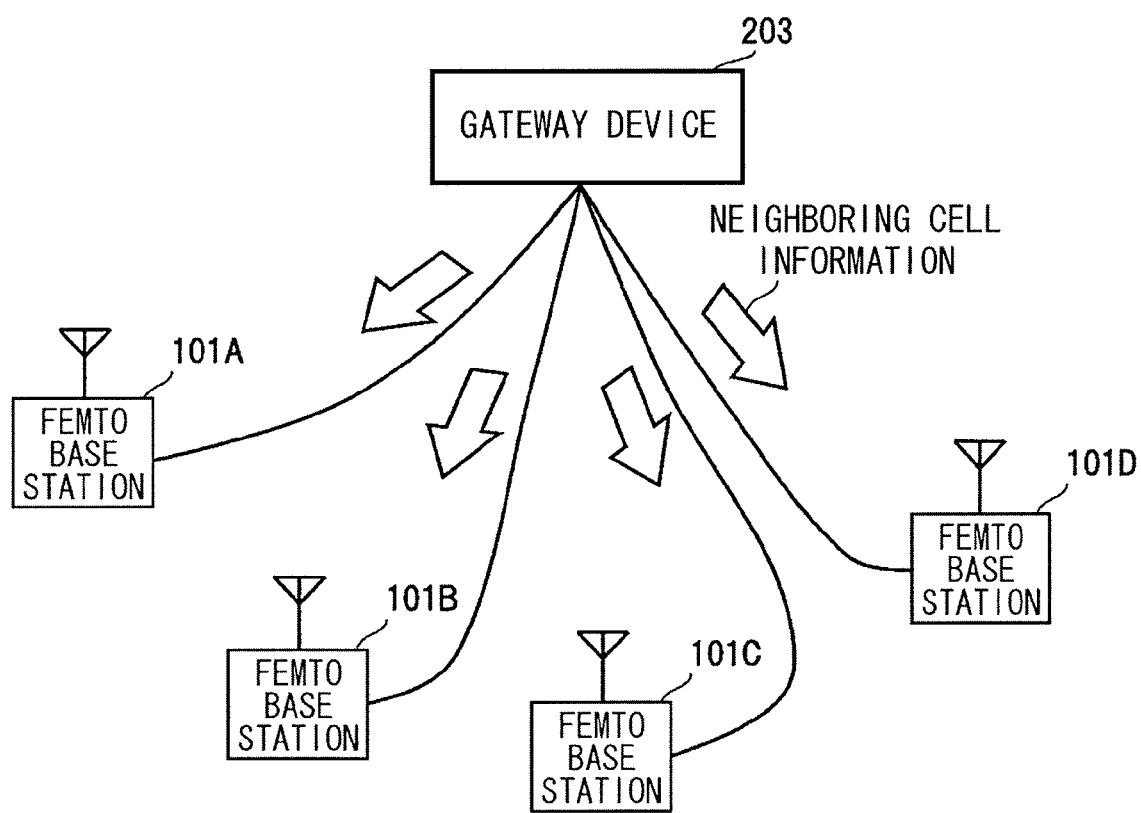
FIG. 55 is a diagram illustrating a method in which a gateway device according to the fourth embodiment of the present invention (Chapter 2) notifies neighboring cell information.

FIG. 55 is a diagram illustrating a method in which the gateway device according to the fourth embodiment of the present invention notifies neighboring cell information.

With reference to FIG. 55, the gateway device 203 notifies the femto base stations 101A, 101C, 101D, and 101E of the corresponding neighboring cell information.

Although the gateway device according to the fourth embodiment of the present invention is provided separately from the wireless base station devices, the present invention is not limited thereto. The gateway device 203 may be included in at least one of the wireless base station devices in the wireless communication system 302. In this case, the wireless base station device equipped with the gateway device 203 acquires measurement information, based on information provided from wireless terminal devices 202 existing in its cell and information provided from other wireless base station devices. Then, the gateway device 203 notifies the wireless terminal devices 202 existing in its cell and the other femto base stations of the generated neighboring cell information.

Further, in the wireless communication systems according to the first to fourth embodiments of the present invention, based on the measurement information acquired by the measurement information acquisition unit, the neighboring cell information generation unit generates neighboring cell information indicating one or a plurality of wireless base station devices located in the neighborhood of the target base station, among the plurality of wireless base station devices other than the target base station. However, the present invention is not limited thereto. The neighboring cell information generation unit may generate the neighboring cell information, based on a combination of handover information indicating the handover operation history of the wireless terminal devices and attribute information indicating the attributes of the wireless base station devices, in addition to the measurement information indicating the result of measurement of the radio signals transmitted from the wireless base station devices. The handover information may be, for example, the number of times of handover or the handover success rate. The attribute information may be, for example, information as to whether each of the wireless base station devices is a femto base station or a macro base station.

Further, in the first to third embodiments of the present invention, instead of the wireless base station device 101, the host device 205 may serve as the neighboring cell processing device, like the gateway device according to the fourth embodiment of the present invention.

Since other components and operations of the wireless communication system of the fourth embodiment are identical to those of the wireless communication systems of the first to third embodiments, repeated description is not necessary.

When a wireless base station device has a plurality of sectors, that is, when one cell is divided into a plurality of sectors, one sector may be treated as one wireless base station device in neighboring cell information. The present invention is also applicable to such a case.

The embodiments disclosed in Chapter 2 are to be considered in all respects as illustrative and not restrictive. The scope of the present invention is indicated by the appended claims rather than by the foregoing meaning, and all changes which come within the meaning and range of equivalency of the claims are therefore intended to be embraced therein.

Further, the reference characters used in Chapter 2 are exclusively used in Chapter 2, and are not related to the reference characters in other chapters.

Description of the Reference Characters
 11 measurement information acquisition unit
 12 neighboring cell information generation unit
 13 neighboring cell information transmission unit
 14 power measurement indication unit
 81 base-station-side transmission/reception unit
 82 data processing unit
 83 core-network-side transmission/reception unit
 91 antenna
 92 circulator
 93 wireless reception unit
 94 wireless transmission unit
 95 signal processing unit
 96 reception signal processing unit
 97 transmission signal processing unit
 101A, 101B, 101C, 101D, 101E wireless base station device
 202 wireless terminal device
 203 gateway device
 205 host device
 301 wireless communication system
 FCA, FCC, FCD, FCE femto cell
 MCB macro cell <<Chapter 3>>

Hereinafter, embodiments of the present invention will be described with reference to the drawings. In Chapter 3, the same or corresponding components are given the same reference characters, and are not repeatedly described.

<Embodiment 1>

A wireless base station device notifies wireless terminal devices of information relating to its own cell and neighboring cells, i.e., the frequency of its radio signal, IDs (identifications) of neighboring cells, and the like. Based on the information notified from the wireless base station device, each wireless terminal device detects and measures the neighboring cells. Based on the measurement result, the wireless terminal device starts to move to a neighboring cell. Here, "movement" of a wireless terminal device means "handover", and "selection" of a cell through which a wireless terminal device in the idle state will start communication, i.e., phone call or data communication.

For example, when a wireless terminal device is communicating with a wireless base station device, a destination of the wireless terminal device is determined by the wireless base station device or a host device in a core network. When a wireless terminal device is not communicating with a wireless base station device, a destination of the wireless terminal device is determined by the wireless terminal device.

In 3GPP (Third Generation Partnership Project) SPEC TS22.220, a femto cell and its access modes are described as follows. That is, a femto base station is a CPE (Customer Premise Equipment) that connects a wireless terminal device over a wireless interface to a mobile communication carrier network by using an IP backhaul.

Further, a femto base station in the closed access mode provides services to only its associated CSG (Closed Subscriber Group) members. A femto base station in the hybrid mode provides services to its associated CSG members and to non-CSG members. A femto base station in the open access mode operates as a normal base station.

Such a definition based on 3GPP may be applied to the wireless communication system according to the first embodiment of the present invention.

Further, the following definition may be applied in combination with or separately from the above definition.

A macro base station is a wireless base station device under the control of a telecommunication carrier, with which wireless base station devices that subscribe to the telecommunication carrier are communicable. Further, it is considered that a macro base station is basically not powered off. On the other hand, a femto base station is a wireless base station device which is mainly installed in a personal or corporate building, and is likely to be moved or powered off depending on user's circumstances.

Further, a femto base station operates in any of the open, hybrid, and closed access modes. When the femto base station operates in the closed access mode, only registered members (terminals) are allowed to access the femto base station. When the femto base station operates in the closed access mode, the femto base station provides services to only the registered members. When the femto base station operates in the hybrid mode, the femto base station provides services to both the registered members and unregistered members (non-members). When the femto base station operates in the open access mode, the femto base station operates in the same manner as a macro base station.

FIG. 56 is a diagram illustrating the relationship between the access modes of a femto base station according to the first embodiment of the present invention, and wireless terminal devices that are allowed to access the femto base station.

With reference to FIG. 56, the femto base station according to the first embodiment of the present invention has the three access modes. Specifically, in the closed access mode, only registered wireless terminal devices are allowed to access the femto base station. In the open access mode, all wireless terminal devices are allowed to access the femto base station, and therefore, the femto base station is identical to a normal macro base station. In the hybrid mode, all wireless terminal devices are allowed to access the femto base station. In the hybrid mode, however, members, i.e., registered wireless terminal devices, may be treated preferentially over non-members, i.e., unregistered wireless terminal devices, in communication resource allocation, accounting, and the like.

That is, the femto base station according to the first embodiment of the present invention is configurable to operate in any of the following access modes: the open access mode in which all wireless terminal devices are allowed to access the femto base station; the closed access mode in which wireless terminal devices can be registered and only the registered wireless terminal devices are allowed to access the femto base station; and the hybrid mode in which wireless terminal devices can be registered and both the registered wireless terminal devices and unregistered wireless terminal devices are allowed to access the femto base station.

It is defined in 3GPP that, in a cell in the closed access mode, wireless terminal devices autonomously detect neighboring cells. In a macro cell in the open access mode, when a telecommunication carrier systematically installs a wireless base station device, the telecommunication carrier grasps information relating to neighboring macro cells, and the information is set in the wireless base station device at the time of installation or maintenance of the wireless base station device.

By the way, since a user is allowed to install a femto base station in any place, it is difficult for the femto base station to grasp its present location. Therefore, it is also difficult for the femto base station to acquire information of neighboring cells.

As described above, a femto cell detection method and a movement method of wireless terminal devices in a cell in the closed access mode are defined in 3GPP. However, when a wireless terminal device moves from a macro cell or a femto cell to a macro cell or a femto cell in the open access mode, a wireless base station device as a movement source needs to notify the wireless terminal device of information of a wireless base station device as a movement destination.

Since a user of a femto base station is allowed to determine where to use the femto base station, the femto base station is likely to be moved and powered on/off, which causes the following two problems. That is, since the femto base station cannot grasp its present location, it is difficult for the femto base station to acquire information of neighboring cells by using an OAM function (maintenance function). Further, when a femto base station exists in the neighborhood of a wireless base station device and the femto base station is powered off, a wireless terminal device cannot move to the femto base station, and therefore, needs to detect on/off of the power of the femto base station.

If a femto base station can specify its present location by using a GPS (Global Positioning System) or the like, the femto base station may make an inquiry at the telecommunication carrier network to obtain information of geographically close cells. However, from the viewpoint of accuracy, it is difficult to specify the exact location.

[Configuration and Fundamental Operation]

Figure 57:
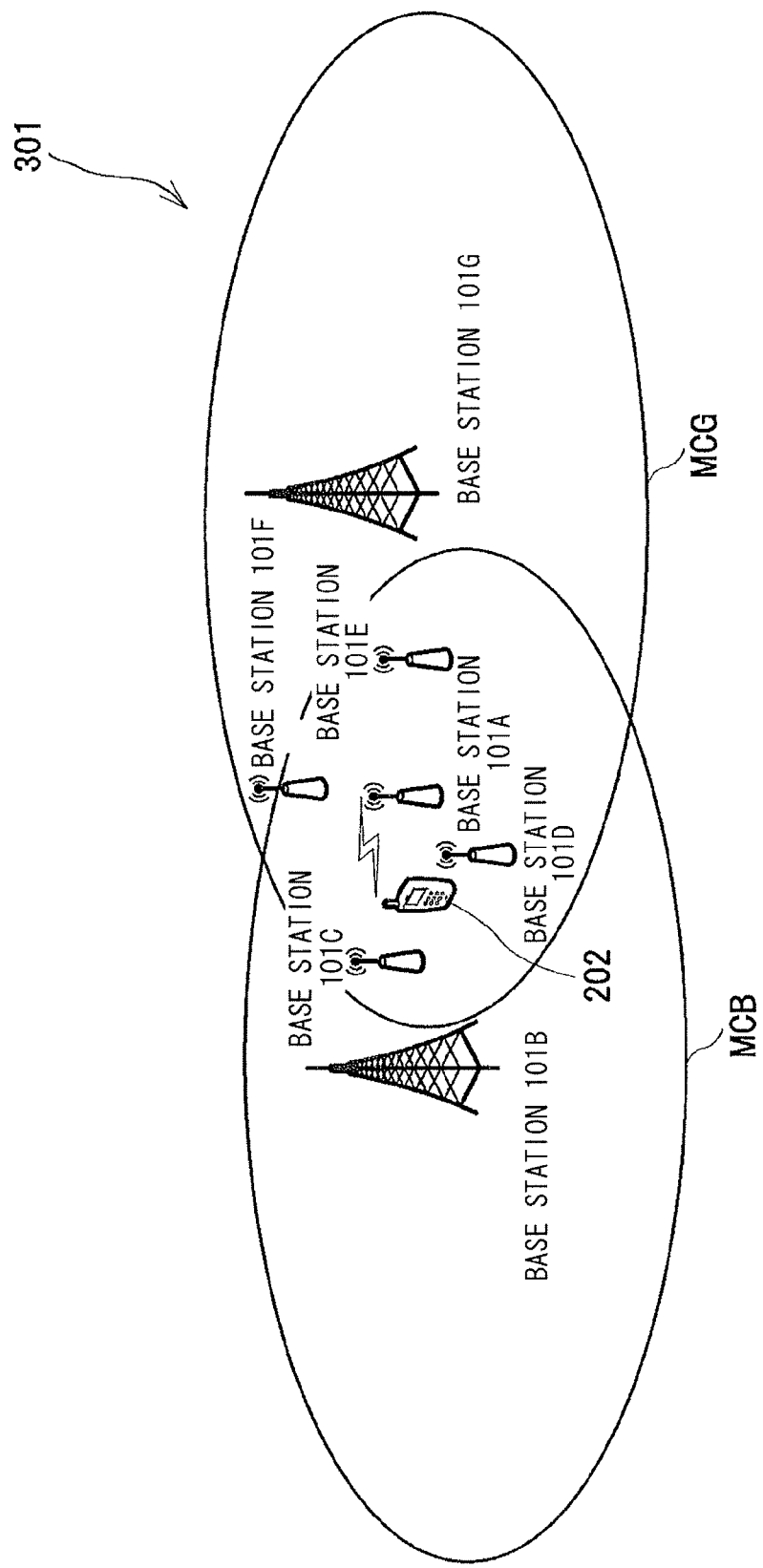
FIG. 57 is a diagram illustrating an example of arrangement of wireless base station devices in a wireless communication system according to the first embodiment of the present invention (Chapter 3).

FIG. 57 is a diagram illustrating an example of arrangement of wireless base station devices in a wireless communication system according to the first embodiment of the present invention.

With reference to FIG. 57, a wireless communication system 301 is a mobile communication system based on LTE (Long Term Evolution) standardized by, for example, 3GPP, and includes wireless base station devices 101A, 101B, 101C, 101D, 101E, 101F, and 101G.

In the wireless communication system 301, the wireless base station devices 101A, 101C, 101D, 101E, and 101F are femto base stations, and the wireless base station devices 101B and 101G are macro base stations.

The wireless base station devices 101B and 101G form macro cells MCB and MCG, respectively, each having a radius of several kilometers. The wireless base station devices 101A, 101C, 101D, 101E, and 101F form femto cells FCA, FCC, FCD, FCE, and FCF, respectively, each having a radius of several tens of meters.

In the present embodiment, it is assumed that a plurality of femto base stations exist in the macro cells formed by the macro base stations 101B and 101G.

The wireless base station device 101B is allowed to communicate with wireless terminal devices 202 existing in the macro cell MCB by transmitting/receiving radio signals to/from the wireless terminal devices 202. The wireless base station device 101G is allowed to communicate with wireless terminal devices 202 existing in the macro cell MCG by transmitting/receiving radio signals to/from the wireless terminal device 202.

The wireless base station devices 101A, 101C, 101D, 101E, and 101F are installed in places such as homes and underground malls where it is difficult for the wireless terminal devices 202 to receive a radio signal from the wireless base station device 101B or 101G, and are allowed to communicate with the wireless terminal devices 202 existing in the femto cells FCA, FCC, FCD, FCE, and FCF by transmitting/receiving radio signals to/from the wireless terminal devices 202.

In FIG. 57, the macro cells MCB and MCG formed by the wireless base station devices 101B and 101G, respectively, partially overlap each other. Further, the wireless base station devices 101A, 101C, 101D, 101E, and 101F are located in a region where the macro cells MCB and MCG formed by the wireless base station devices 101B and 101G overlap each other. It is assumed that there is a wireless terminal device 202 communicating with the wireless base station device 101A.

Figure 58:
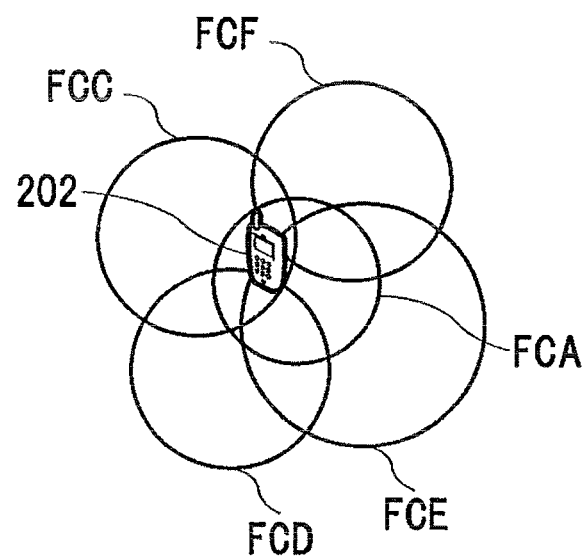
FIG. 58 is a diagram illustrating in detail an example of arrangement of wireless base station devices in the wireless communication system according to the first embodiment of the present invention (Chapter 3).

FIG. 58 is a diagram specifically illustrating an example of arrangement of the wireless base station devices in the wireless communication system according to the first embodiment of the present invention.

With reference to FIG. 58, the femto cells FCA, FCC, FCD, FCE, and FCF partially overlap each other. The wireless terminal device 202 communicating with the wireless base station device 101A is located in the femto cells FCA, FCC, FCD, FCE, and FCF, and is allowed to receive radio signals from the wireless base station devices 101A, 101B, 101C, 101D, 101E, 101F, and 101G.

In the wireless communication system according to the first embodiment of the present invention, each of the wireless base station devices 101A, 101B, 101C, 101D, 101E, 101F, and 101G operates as a neighboring cell processing device. That is, each of the wireless base station devices 101A, 101B, 101C, 101D, 101E, 101F, and 101G solely performs optimization of neighboring cell information.

Hereinafter, each of the wireless base station devices 101A, 101B, 101C, 101D, 101E, 101F, and 101G is sometimes referred to as a wireless base station device 101. Although two macro base stations and five femto base stations are representatively shown in FIG. 57, less or more macro base stations and femto base stations may be provided.

FIG. 59 is a diagram illustrating the attributes of the respective wireless base station devices in the wireless communication system shown in FIG. 57.

With reference to FIG. 59, in the wireless communication system 301, the cell ID of the wireless base station device 101A is 1111, the cell mode is femto, the access mode is the closed access mode, the CSG (Closed Subscriber Group) ID is 8888, the carrier frequency of a radio signal transmitted from the wireless base station device 101A is f1, and the RAT (Radio Access Technology) is LTE. The cell ID of the wireless base station device 101B is 2222, the cell mode is macro, the carrier frequency of a radio signal transmitted from the wireless base station device 101B is f1, and the RAT is LTE. The cell ID of the wireless base station device 101C is 3333, the cell mode is femto, the access mode is hybrid mode, the CSG ID is 8888, the carrier frequency of a radio signal transmitted from the wireless base station device 101C is f1, and the RAT is LTE. The cell ID of the wireless base station device 101D is 4444, the cell mode is femto, the access mode is closed access mode, the CSG ID is 8888, the carrier frequency of a radio signal transmitted from the wireless base station device 101D is f3, and the RAT is LTE. The cell ID of the wireless base station device 101E is 5555, the cell mode is femto, the access mode is open access mode, the carrier frequency of a radio signal transmitted from the wireless base station device 101E is f2, and the RAT is W-CDMA (Wideband Code Division Multiple Access). The cell ID of the wireless base station device 101F is 6666, the cell mode is femto, the access mode is hybrid mode, the CSG ID is 9999, the carrier frequency of a radio signal transmitted from the wireless base station device 101F is f3, and the RAT is LTE. The cell ID of the wireless base station device 101G is 7777, the cell mode is macro, the carrier frequency of a radio signal transmitted from the wireless base station device 101G is f2, and the RAT is W-CDMA.

The CSG ID is an ID assigned to the wireless terminal device 202 and the wireless base station devices in the closed access mode and the hybrid mode. The CSG ID allows the wireless terminal device 202 to identify whether the wireless terminal device 202 is a member or a non-member for a certain wireless base station device 101.

Figure 60:
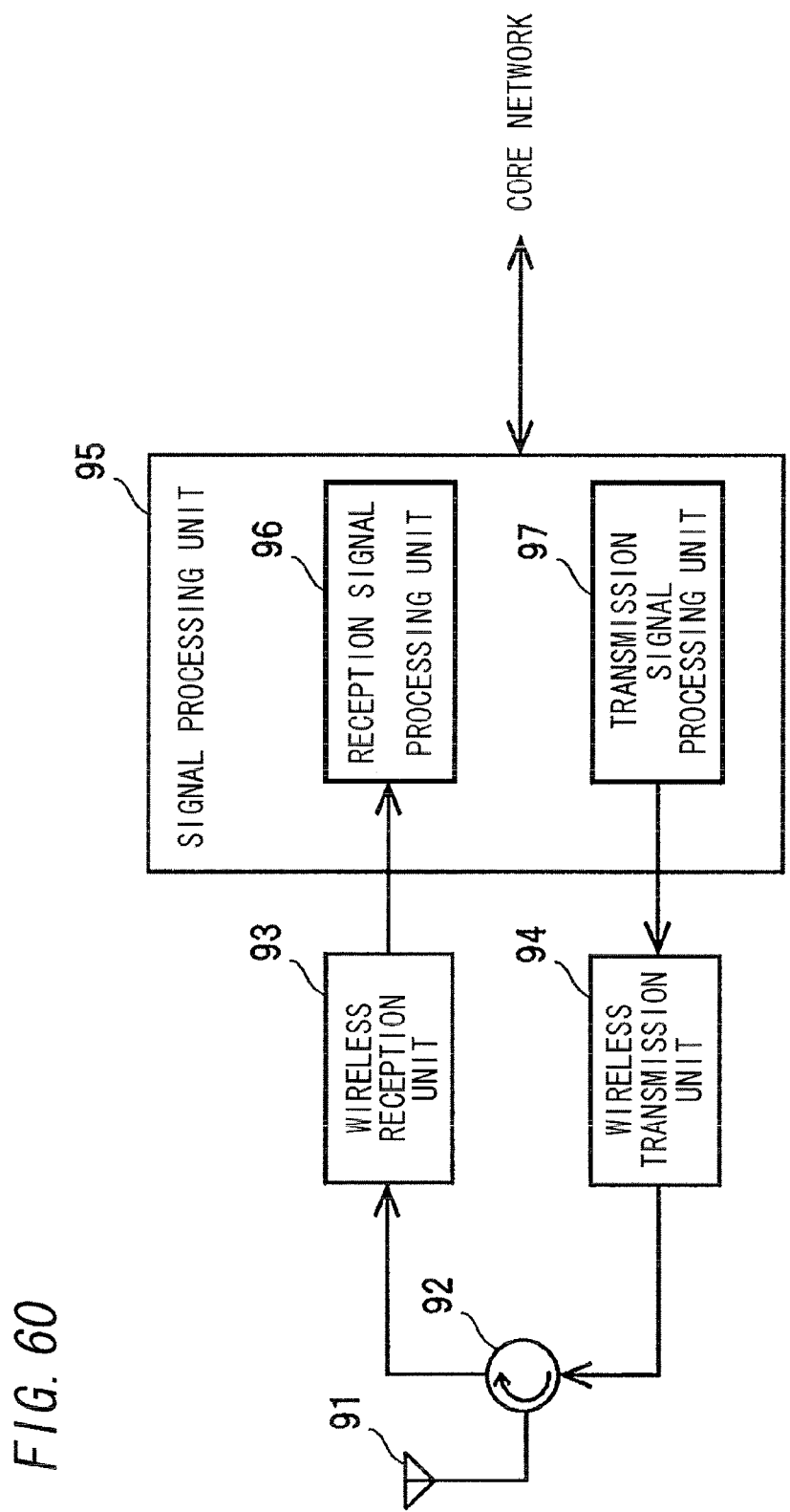
FIG. 60 is a diagram illustrating the configuration of a wireless base station device according to the first embodiment of the present invention (Chapter 3).

FIG. 60 is a diagram illustrating the configuration of a wireless base station device according to the first embodiment of the present invention.

With reference to FIG. 60, the wireless base station device 101 includes an antenna 91, a circulator 92, a wireless reception unit 93, a wireless transmission unit 94, and a signal processing unit 95. The signal processing unit 95 includes a reception signal processing unit 96 and a transmission signal processing unit 97. The signal processing unit 95 is implemented by a CPU (Central Processing Unit), a DSP (Digital Signal Processor), or the like.

The circulator 92 outputs a radio signal transmitted from the wireless terminal device 202 and received by the antenna 91, to the wireless reception unit 93, and outputs a radio signal provided from the wireless transmission unit 94, to the antenna 91.

The wireless reception unit 93 frequency-converts the radio signal provided from the circulator 92 into a base band signal or an IF (Intermediate Frequency) signal, converts the frequency-converted signal into a digital signal, and outputs the digital signal to the reception signal processing unit 96.

The reception signal processing unit 96 subjects the digital signal provided from the wireless reception unit 93 to signal processing such as reverse spreading in CDMA (Code Division Multiple Access), converts a part or the entirety of the processed digital signal into a predetermined frame format, and outputs the resultant signal to the core network.

The transmission signal processing unit 97 converts communication data received from the core network into a predetermined frame format, or generates communication data, and subjects the converted or generated communication data to signal processing such as IFFT (Inverse Fast Fourier Transform) in OFDM (Orthogonal Frequency Division Multiplex), and then outputs a digital signal obtained by the signal processing to the wireless transmission unit 94.

The wireless transmission unit 94 converts the digital signal provided from the transmission signal processing unit 97 into an analog signal, frequency-converts the analog signal into a radio signal, and outputs the radio signal to the circulator 92.

Figure 61:
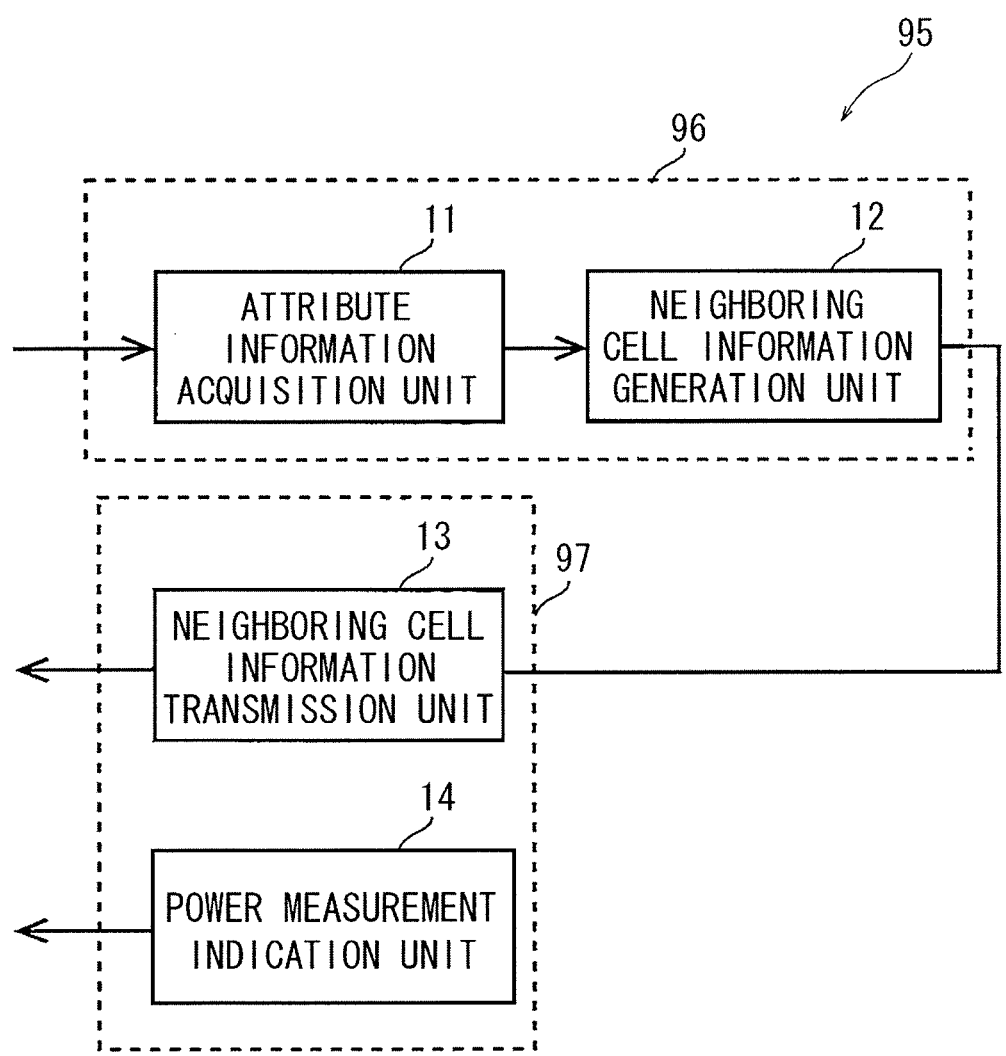
FIG. 61 is a diagram illustrating the configuration of a signal processing unit according to the first embodiment of the present invention (Chapter 3).

FIG. 61 is a diagram illustrating the configuration of the signal processing unit according to the first embodiment of the present invention.

With reference to FIG. 61, the reception signal processing unit 96 includes an attribute information acquisition unit 11, and a neighboring cell information generation unit 12. The transmission signal processing unit 97 includes a neighboring cell information transmission unit 13 and a power measurement indication unit 14.

The attribute information acquisition unit 11 acquires attribute information indicating the attributes of at least a plurality of wireless base station devices 101 other than a target base station, based on information from at least either of other wireless base station devices 101 or wireless terminal devices 202.

Based on the attribute information acquired by the attribute information acquisition unit 11, the neighboring cell information generation unit 12 generates neighboring cell information which indicates one or a plurality of wireless base station devices 101 located in the neighborhood of a wireless base station device to which the neighboring cell information is to be given (hereinafter also referred to as a target base station), among a plurality of wireless base station devices 101 other than the target base station, in the wireless communication system 301. In the first embodiment of the present invention, the target base station is a wireless base station device 101 of the first embodiment.

For example, the neighboring cell information generation unit 12 generates neighboring cell information indicating one or a plurality of wireless base station devices 101 to be candidate(s) for a handover destination of a wireless terminal device 202 which communicates with the target base station.

The neighboring cell information transmission unit 13 transmits the neighboring cell information generated by the neighboring cell information generation unit 12 to wireless terminal devices 202 which are communicable with the femto base station 101, i.e., wireless terminal devices 202 existing in the cell formed by the femto base station 101.

The power measurement indication unit 14 transmits, to each wireless terminal device 202, a measurement start request which causes the wireless terminal device 202 to measure the reception levels of radio signals transmitted from other wireless base station devices 101.

[Operation]

Next, a description will be given of an operation of the wireless base station device according to the first embodiment of the present invention to generate neighboring cell information.

Figure 62:
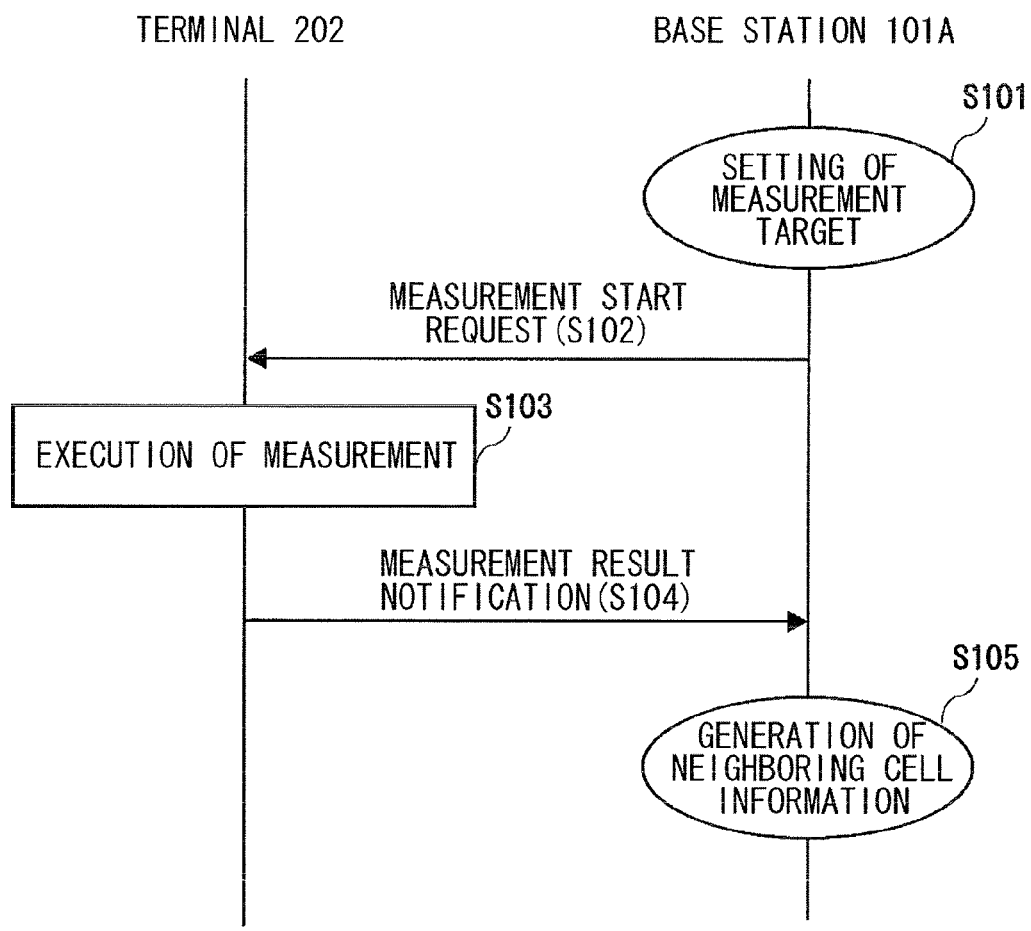
FIG. 62 is a diagram illustrating an example of a sequence in which a wireless base station device generates initial neighboring cell information, in the wireless communication system according to the first embodiment of the present invention (Chapter 3).

FIG. 62 is a diagram illustrating an example of a sequence in which the wireless base station device generates initial neighboring cell information, in the wireless communication system according to the first embodiment of the present invention.

When the wireless base station device 101 has no neighboring cell information, such as when the wireless base station device 101 is activated, the wireless base station device 101 instructs the wireless terminal device 202 to perform all-frequency search. For example, in LTE, when a wireless terminal device 202 firstly establishes an RRC (Radio Resource Control) connection with the wireless base station device 101, i.e., when a wireless terminal device 202 completes a process for starting communication with the wireless base station device 101, the wireless base station device 101 instructs the wireless terminal device 202 to perform all-frequency search.

The all-frequency search is a process of measuring the reception level of a radio signal transmitted from each wireless base station device 101, in all kinds of transmission frequencies set in the wireless communication system.

Then, based on the measurement result notified from the wireless terminal device 202, the wireless base station device 101 generates neighboring cell information, and stores the neighboring cell information in a storage unit (not shown).

More specifically, with reference to FIG. 62, the wireless base station device 101A firstly sets other wireless base station devices to be the targets for measurement by the wireless terminal device 202 (step S101).

Next, the wireless base station device 101A transmits, to the wireless terminal device 202, a measurement start request that causes the wireless terminal device 202 to measure the reception levels of radio signals transmitted from the other wireless base station devices. The measurement start request includes information relating to the frequencies and the wireless base station devices, which are the measurement targets (step S102).

Upon receiving the measurement start request from the wireless base station device 101A, the wireless terminal device 202 measures the reception levels of the radio signals transmitted from the wireless base station devices indicated by the received measurement start request (step S103).

Next, the wireless terminal device 202 transmits a measurement result notification indicating the measured reception levels to the wireless base station device 101A (step S104).

Based on the measurement result notification received from the wireless terminal device 202, the wireless base station device 101A generates initial neighboring cell information (step S105).

The wireless base station device 101A may instruct the wireless terminal device 202 which has firstly established an RRC connection, to perform all-frequency search, not only at the time of activation but also at regular intervals.

When the wireless base station device 101A is a femto base station and operates in the hybrid mode, and then if a non-member wireless terminal device 202 establishes an RRC connection, the wireless base station device 101A instructs the non-member wireless terminal device 202 to perform all-frequency search.

Specifically, when the target base station operates in the hybrid mode, the power measurement indication unit 14 instructs the unregistered wireless terminal device 202 to measure, in all frequencies, the reception levels of radio signals transmitted from the wireless base station devices 101 other than the target base station.

This configuration prevents the power of a wireless terminal device 202 owned by a registered user from being consumed, thereby providing appropriate communication services.

Alternatively, when the target base station operates in the hybrid mode, the power measurement indication unit 14 may instruct registered wireless terminal devices 202 to measure, in all frequencies, the reception levels of radio signals transmitted from the wireless base station devices 101 other than the target base station.

This configuration prevents the power of a wireless terminal device 202 owned by an unregistered user who is usually not able to quickly charge the wireless terminal device 202, from being consumed, thereby providing appropriate communication services.

Figure 63:
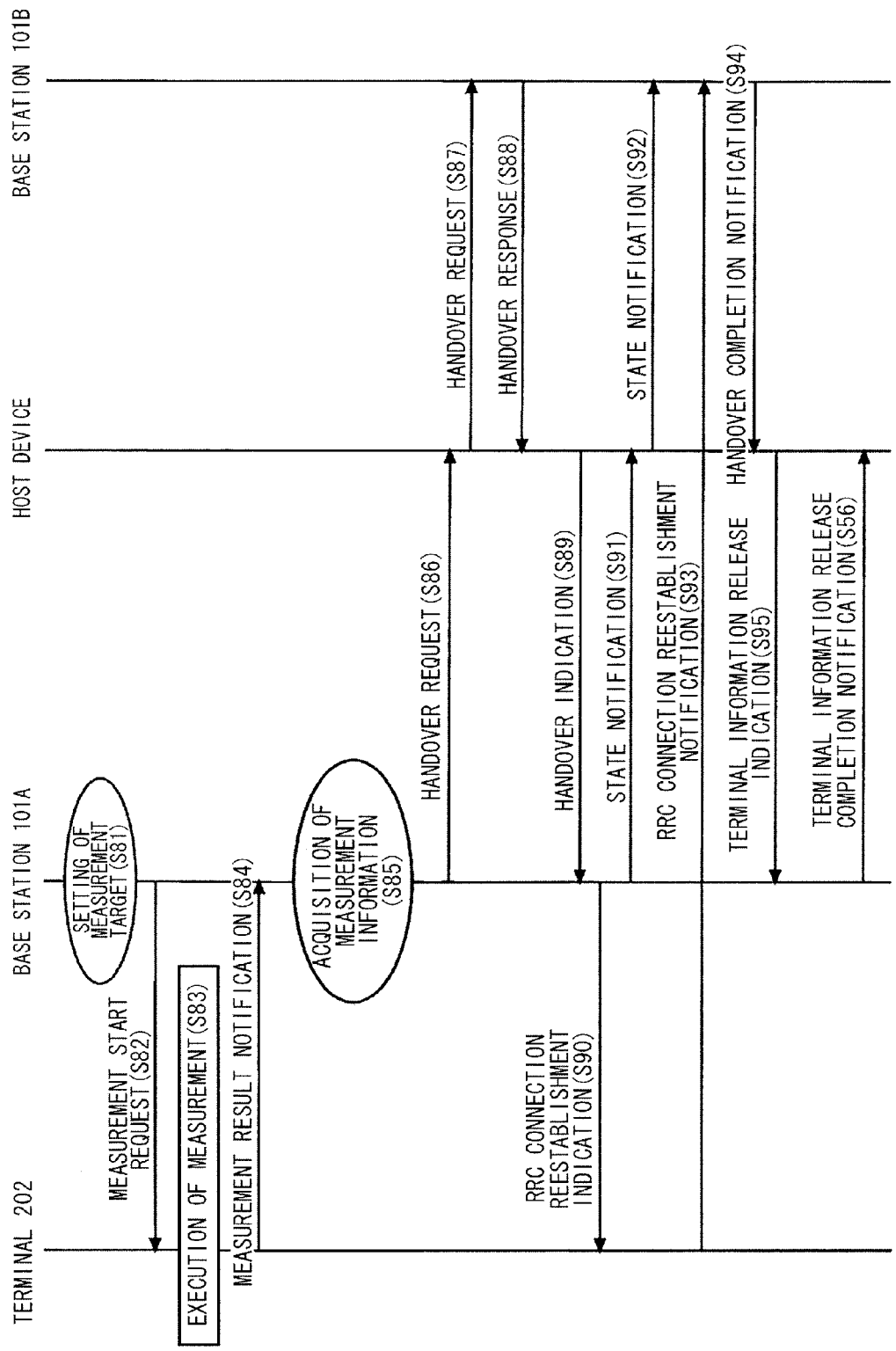
FIG. 63 is a diagram illustrating an example of a sequence of a handover operation in the wireless communication system according to the first embodiment of the present invention (Chapter 3).

FIG. 63 is a diagram illustrating an example of a sequence in which a wireless base station device acquires measurement information in the wireless communication system according to the first embodiment of the present invention.

With reference to FIG. 63, firstly, the wireless base station device 101A sets the frequencies to be measured by a wireless terminal device 202 communicating with the wireless base station device 101A, and measurement cells, i.e., other wireless base station devices transmitting radio signals of the frequencies (step S81).

Next, the wireless base station device 101A transmits, to the wireless terminal device 202, a measurement start request that causes the wireless terminal device 202 to measure the reception levels of the radio signals transmitted from the other wireless base station devices. The measurement start request includes information (i.e., cell IDs) of the wireless base station devices 101 as the measurement targets. For example, this information is the neighboring cell information generated by the sequence shown in FIG. 62. Further, the measurement start request includes the transmission frequencies of the wireless base station devices 101 (step S82).

Upon receiving the measurement start request from the wireless base station device 101A, the wireless terminal device 202 measures, in the frequency indicated by the received measurement start request, the reception levels of the radio signals transmitted from the wireless base station devices indicated by the measurement start request (step S83).

Next, the wireless terminal device 202 transmits a measurement result notification indicating the measured reception levels to the wireless base station device 101A. For example, the wireless terminal device 202 periodically performs measurement of reception levels. When the communication state with the wireless base station device 101A is deteriorated or when the communication state with any of the wireless base station devices 101 other than the wireless base station device 101A is improved, the wireless terminal device 202 transmits the measurement result notification to the wireless base station device 101A (step S84).

Next, based on the measurement result notification received from the wireless terminal device 202, the wireless base station device 101A acquires measurement information indicating the measurement result for each cell ID, and stores the measurement information in a storage unit (not shown) (step S85).

Next, based on the measurement result notification received from the wireless terminal device 202, the wireless base station device 101A determines whether or not the wireless terminal device 202 should perform handover. Upon determining that the wireless terminal device 202 should perform handover, the wireless base station device 101A determines, for example, the wireless base station device 101B as a handover destination with reference to the neighboring cell information, and transmits a handover request indicating the wireless base station device 101B to the host device (step S86).

In the wireless communication system according to the first embodiment of the present invention, "handover" means that a wireless base station device 101 which is a communication partner for a wireless terminal device 202 during phone call or data communication is changed to another wireless base station device 101.

Upon receiving the handover request from the wireless base station device 101A, the host device transmits the handover request to the wireless base station device 101B (step S87).

Upon receiving the handover request from the host device, the wireless base station device 101B transmits a handover response to the handover request, to the host device (step S88).

Upon receiving the handover response from the wireless base station device 101B, the host device transmits a handover indication to the wireless base station device 101A (step S89).

Upon receiving the handover indication from the host device, the wireless base station device 101A transmits an RRC connection reestablishment indication to the wireless terminal device 202 (step S90).

Then, the wireless base station device 101A transmits a status notification indicating its own communication status and the like, to the host device (step S91).

Upon receiving the status notification from the wireless base station device 101A, the host device transmits a status notification indicating the content of communication with the wireless terminal device 202 and the like, to the wireless base station device 101B (step S92).

When an RRC connection is established between the wireless terminal device 202 and the wireless base station device 101B, the wireless terminal device 202 transmits an RRC connection establishment notification to the wireless base station device 101B (step S93).

Upon receiving the RRC connection establishment notification from the wireless terminal device 202, the wireless base station device 101B transmits a handover completion notification to the host device (step S94).

Upon receiving the handover completion notification from the wireless base station device 101B, the host device transmits a terminal information release indication to the wireless base station device 101A (step S95).

Upon receiving the terminal information release indication from the host device, the wireless base station device 101A releases information relating to the wireless terminal device 202, and transmits a terminal information release completion notification to the host device (step S96).

Next, a description will be given of a method of updating the neighboring cell information generated based on the sequence shown in FIG. 62 or the like.

The wireless base station device 101 acquires, as attribute information, a part or the entirety of the attributes of the respective wireless base station devices shown in FIG. 59, from broadcast information or the like that is regularly or irregularly transmitted from other wireless base station devices, and stores the attribute information in a storage unit (not shown). The wireless base station device 101 performs ranking with indices, on a list of wireless base station devices which is stored in the storage unit (not shown). That is, based on the attribute information acquired by the attribute information acquisition unit 11, the neighboring cell information generation unit 12 generates neighboring cell information in which one or a plurality of wireless base station devices 101 located in the neighborhood of the target base station are ranked among the plurality of wireless base station devices 101 other than the target base station.

For example, the attribute information acquisition unit 11 acquires attribute information indicating whether the plurality of wireless base station devices 101 other than the target base station are macro base stations or femto base stations.

FIG. 64 is a diagram illustrating an example of attribute information acquired by the wireless base station device.

With reference to FIG. 64, the wireless base station device 101A acquires attribute information indicating that the cell mode of the wireless base station device 101B whose cell ID is 2222 is macro, the cell mode of the wireless base station device 101B whose cell ID is 3333 is femto, the cell mode of the wireless base station device 101D whose cell ID is 4444 is femto, the cell mode of the wireless base station device 101E whose cell ID is 5555 is femto, the cell mode of the wireless base station device 101F whose cell ID is 6666 is femto, and the cell mode of the wireless base station device 101G whose cell ID is 7777 is macro.

FIG. 65 is a diagram illustrating an example of neighboring cell information generated by the wireless base station device.

With reference to FIG. 65, it is considered that a macro base station is less likely to be powered off than a femto base station. Therefore, the wireless base station device 101A generates neighboring cell information in which the priorities of the macro base stations in the acquired attribute information shown in FIG. 64 are raised. That is, the neighboring cell information generation unit 12 performs ranking of the plurality of wireless base station devices 101 other than the target base station, and in the ranking, the wireless base station devices 101 as macro base stations are ranked higher than the wireless base station devices 101 as femto base stations.

Specifically, the wireless base station device 101A updates the initial neighboring cell information generated by the sequence shown in FIG. 62, to neighboring cell information indicating that the cell ID 2222 (wireless base station device 101B) whose cell mode is macro ranks first, the cell ID 7777 (wireless base station device 101G) whose cell mode is macro ranks first, the cell ID 3333 (wireless base station device 101C) whose cell mode is femto ranks second, the cell ID 4444 (wireless base station device 101D) whose cell mode is femto ranks second, the cell ID 5555 (wireless base station device 101E) whose cell mode is femto ranks second, and the cell ID 6666 (wireless base station device 101F) whose cell mode is femto ranks second.

Then, when the wireless base station device 101A has updated the neighboring cell information, the wireless base station device 101A broadcasts the updated neighboring cell information to each of the wireless terminal devices 202. The wireless base station device 101A broadcasts, to each wireless terminal device 202, the neighboring cell information indicating N (N: an integer not smaller than 1) wireless base station devices from the highest rank among the ranked wireless band station devices.

FIG. 66 is a diagram illustrating another example of neighboring cell information generated by the wireless base station device.

With reference to FIG. 66, if the number of wireless base station devices registerable in the neighboring cell information to be notified to each wireless terminal device 202 is limited to two, the wireless base station device 101A notifies each wireless terminal device 202 of neighboring cell information indicating that the cell ID 2222 (wireless base station device 101B) ranks first, and the cell ID 7777 (wireless base station device 101G) ranks first. In FIG. 66, all the wireless base station devices registered in the neighboring cell information rank first. In this case, the wireless base station devices may be ranked based on any other criterion.

FIG. 67 is a diagram illustrating another example of neighboring cell information generated by the wireless base station device.

In the wireless communication system according to the first embodiment of the present invention, the neighboring cell information generation unit 12 ranks the plurality of wireless base station devices 101 other than the target wireless base station device 101, based on the attribute information acquired by the attribute information acquisition unit 11, and generates neighboring cell information based on the result of the ranking. However, the present invention is not limited thereto.

The neighboring cell information generation unit 12 may determine whether each of the plurality of wireless base station devices 101 other than the target base station should be registered in the neighboring cell information, based on whether or not the attribute indicated in the attribute information matches a predetermined attribute, without performing ranking based on the distinction between a macro base station and a femto base station. More specifically, the neighboring cell information generation unit 12 may generate neighboring cell information in which at least the wireless base station devices 101 whose attributes indicated in the attribute information are macro base stations or wireless base station devices 101 whose attributes indicated in the attribute information are femto base stations are eliminated from among the plurality of wireless base station devices 101 other than the target base station.

With reference to FIG. 67, for example, the neighboring cell information generation unit 12 adopts, as a criterion for registration, that a wireless base station device 101 is a macro base station, and adopts, as a criterion for non-registration, that a wireless base station device 101 is a femto base station. In this case, the neighboring cell information generation unit 12 registers, in the neighboring cell information, the wireless base station devices 101B and 101G other than the wireless base station devices 101C, 101D, 101E, and 101F. Then, the neighboring cell information transmission unit 13 notifies each wireless terminal device 202 of the neighboring cell information.

[Notification of Neighboring Cell Information]

As described above, the wireless base station device 101 performs optimization of the neighboring cell information in association with obtainment of the attribute information. The wireless base station device 101 needs to notify the wireless terminal devices 202 of the optimized neighboring cell information. That is, the neighboring cell information transmission unit 13 in the wireless base station device 101 transmits the neighboring cell information generated by the neighboring cell information generation unit 12 to the wireless terminal devices 202 which are communicable with the wireless base station device 101 as the target base station. For example, the following three notification methods are considered.

Figure 68:
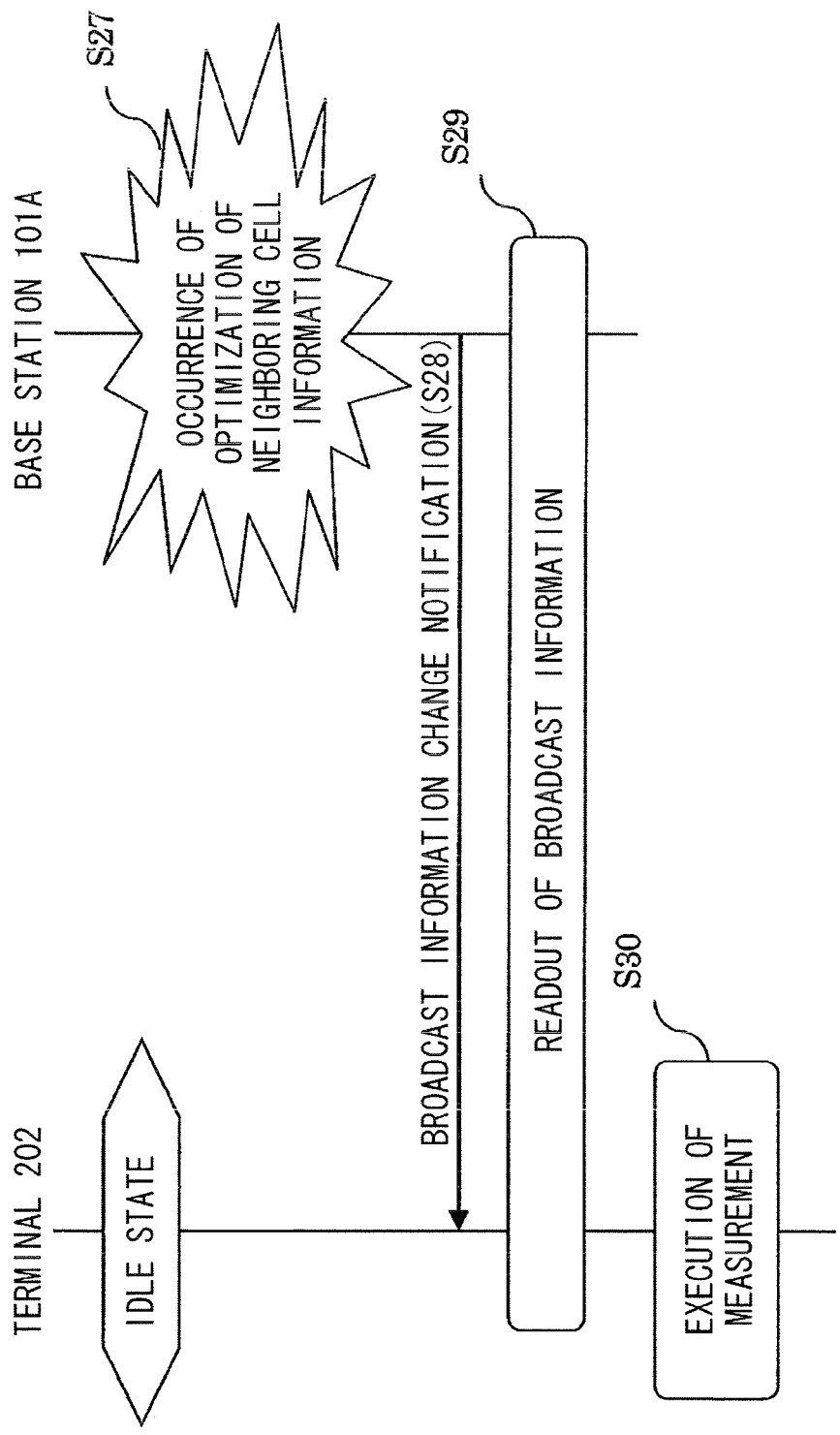
FIG. 68 is a diagram illustrating an example of a method in which a wireless base station device notifies wireless terminal devices of neighboring cell information, in the wireless communication system according to the first embodiment of the present invention (Chapter 3).

FIG. 68 is a diagram illustrating an example of a method in which a wireless base station device notifies wireless terminal devices of neighboring cell information, in the wireless communication system according to the first embodiment of the present invention.

With reference to FIG. 68, the wireless base station device 101A includes the neighboring cell information in broadcast information, and notifies wireless terminal devices 202 in the idle states, i.e., which are not during phone call or data communication, of the broadcast information. In this case, by using a broadcast information change notification, the wireless base station device 101A notifies the wireless terminal devices 202 that the neighboring cell information is updated.

More specifically, when optimization of the neighboring cell information occurs (step S27), the wireless base station device 101A broadcasts the broadcast information change notification to the wireless terminal devices 202 existing in the femto cell FCA (step S28).

Next, the wireless base station device 101A broadcasts the broadcast information including the updated neighboring cell information to the wireless terminal devices 202 existing in the femto cell FCA. Upon receiving the broadcast information change notification, each wireless terminal device 202 reads the neighboring cell information from the broadcast information transmitted from the wireless base station device 101A, and updates the neighboring cell information held therein to the read neighboring cell information (step S29).

Next, the wireless terminal device 202 measures, autonomously or upon receiving a measurement start request from the wireless base station device 101A, the reception levels of radio signals transmitted from the wireless base station devices 101 indicated in the updated neighboring cell information (step S30).

Figure 69:
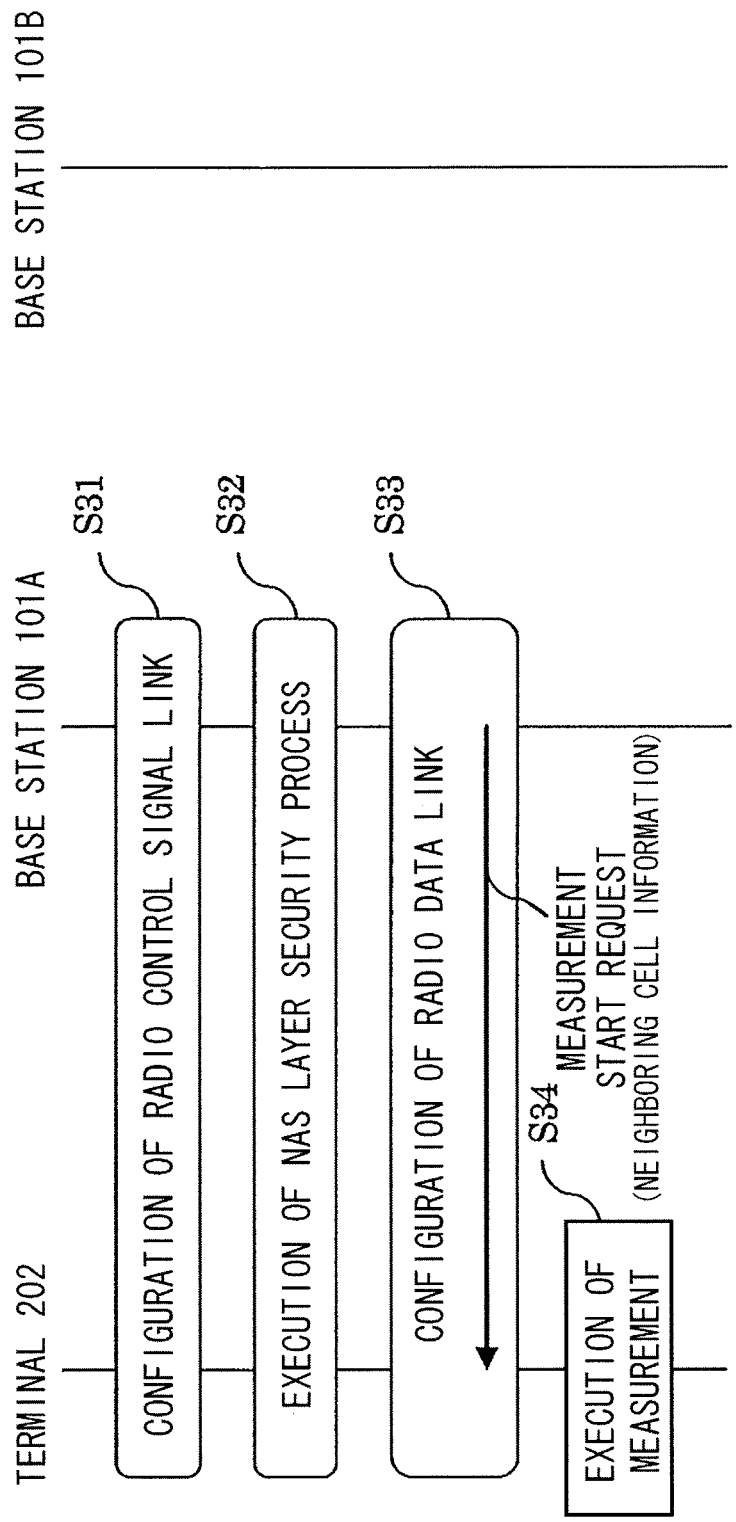
FIG. 69 is a diagram illustrating an example of a method in which a wireless base station device notifies wireless terminal devices of neighboring cell information, in the wireless communication system according to the first embodiment of the present invention (Chapter 3).

FIG. 69 is a diagram illustrating an example of a method in which a wireless base station device notifies wireless terminal devices of neighboring cell information, in the wireless communication system according to the first embodiment of the present invention.

With reference to FIG. 69, for example, in LTE, the wireless base station device 101A notifies a wireless terminal device 202 that performs an RRC connection establishing process, of neighboring cell information, when the wireless base station device 101A configures a radio data link.

More specifically, firstly, configuration of radio control signal link, i.e., various control processes in advance of transmission/reception of communication data such as IP (Internet Protocol) packets, is performed between the wireless terminal device 202 and the wireless base station device 101A (step S31).

Next, a security process for a NAS (Non-Access Stratum) layer, i.e., transmission/reception of information required for encryption of communication, is performed between the wireless terminal device 202 and the wireless base station device 101A (step S32). For example, in LTE, the wireless terminal device 202 transmits/receives information to/from the host device in the core network, and the wireless base station device 101A relays the information.

Next, configuration of radio data link is performed between the wireless terminal device 202 and the wireless base station device 101A, and thereafter, communication data such as IP packets are transmitted/received between the wireless terminal device 202 and the wireless base station device 101A. Further, the wireless base station device 101A transmits, to the wireless terminal device 202, a measurement start request that causes the wireless terminal device 202 to measure the reception levels of radio signals transmitted from other wireless base station devices 101 (step S33). For example, in LTE, the measurement start request is included in a radio data link configuration request transmitted from the wireless base station device 101A to the wireless terminal device 202. The neighboring cell information is included in the measurement start request.

Upon receiving the measurement start request from the wireless base station device 101A, the wireless terminal device 202 updates the neighboring cell information held therein to the newly informed neighboring cell information, and measures the reception levels of radio signals transmitted from the wireless base station devices 101 indicated in the updated neighboring cell information (step S34).

Figure 70:
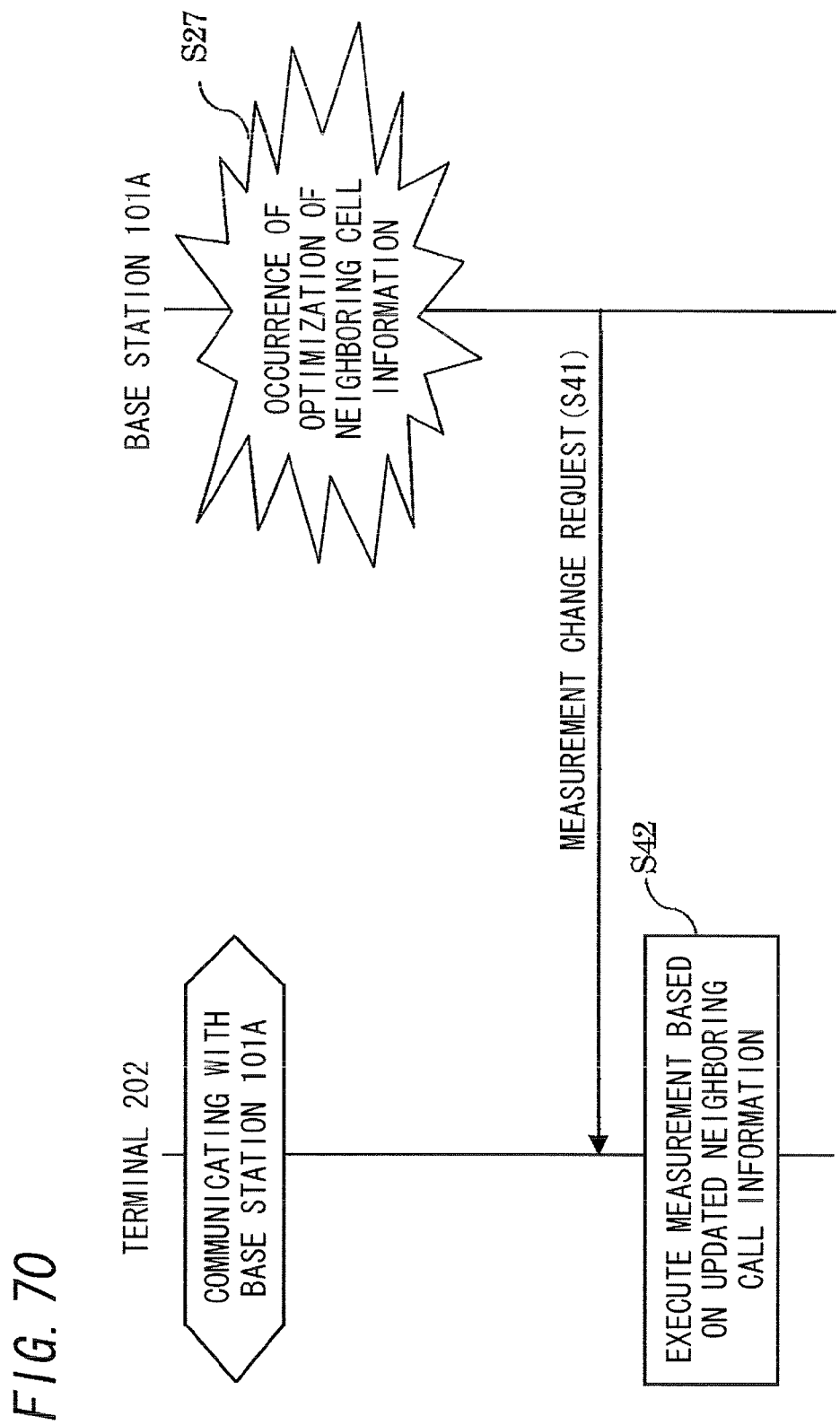
FIG. 70 is a diagram illustrating an example of a method in which a wireless base station device notifies wireless terminal devices of neighboring cell information, in the wireless communication system according to the first embodiment of the present invention (Chapter 3).

FIG. 70 is a diagram illustrating an example of a method in which a wireless base station device notifies wireless terminal devices of neighboring cell information, in the wireless communication system according to the first embodiment of the present invention.

With reference to FIG. 70, the wireless base station device 101A notifies a wireless terminal device 202 communicating with the wireless base station device 101A, of updating of the neighboring cell information, by using a measurement change request.

More specifically, when optimization of the neighboring cell information occurs (step S27), the wireless base station device 101A includes the updated neighboring cell information in the measurement change request, and transmits the measurement change request to the wireless terminal device 202 (step S41).

Then, the wireless terminal device 202 changes the neighboring cell information held by therein to the neighboring cell information included in the measurement change request received from the wireless base station device 101A, and measures the reception levels of radio signals transmitted from the wireless base station devices 101 indicated in the changed neighboring cell information (step S42).

By the way, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from the femto base stations registered in the neighboring cell information, autonomously or upon receiving an indication from a femto base station, and notifies the femto base station of the measurement result. In this case, if a femto base station that is not suitable as a handover destination is registered in the neighboring cell information, the wireless terminal device performs unnecessary measurement, and unnecessary handover occurs.

In contrast, in the wireless communication system according to the first embodiment of the present invention, the attribute information acquisition unit 11 acquires attribute information indicating the attributes of at least a plurality of wireless base station devices 101 other than the target base station, based on broadcast information from other wireless base station devices 101. Based on the attribute information acquired by the attribute information acquisition unit 11, the neighboring cell information generation unit 12 generates neighboring cell information indicating one or a plurality of wireless base station devices 101 located in the neighborhood of the target base station, among the plurality of wireless base station devices 101 other than the target base station.

The above configuration allows automatic optimization of the neighboring cell information, regardless of movement and power on/off of each femto base station. Therefore, the efficiency of operation in the wireless communication system 301 can be improved without manpower assistance. Further, since the neighboring cell information is automatically optimized, a special installation process for each wireless base station device 101 is not needed, thereby reducing the time and cost required for installing the wireless base station device 101.

Furthermore, in the wireless communication system according to the first embodiment of the present invention, the neighboring cell information generation unit 12 ranks the wireless base station devices 101 other than the target base station, based on the attribute information acquired by the attribute information acquisition unit 11, and generates neighboring cell information based on the result of the ranking.

This configuration allows generation of detailed neighboring cell information, and achieves further improvement in the efficiency of operation in the wireless communication system. For example, the wireless base station device 101 preferentially selects, as a handover destination, a higher-rank wireless base station device in the ranking result, thereby increasing the handover success rate.

Further, in the wireless communication system according to the first embodiment of the present invention, the neighboring cell information generation unit 12 generates neighboring cell information indicating N (N: an integer not smaller than 1) wireless base station devices from the highest rank among the ranked wireless base station devices 101.

In this configuration, for example, in a case where the number of wireless base station devices that can be included in the neighboring cell information to be notified to each wireless terminal device 202 is limited, it is possible to notify each wireless terminal device 202 of appropriate neighboring cell information by including the upper N wireless base station devices in the neighboring cell information.

Further, in the wireless communication system according to the first embodiment of the present invention, the neighboring cell information generation unit 12 generates neighboring cell information which further indicates the ranking of the ranked wireless base station devices 101.

This configuration allows generation of more detailed neighboring cell information, and achieves further improvement in the efficiency of operation in the wireless communication system. For example, based on the ranking of the wireless base station devices in the neighboring cell information, each wireless terminal device 202 performs determination of measurement order, selection of wireless base station devices as measurement targets, and the like, thereby realizing efficient measurement operation.

Further, in the wireless communication system according to the first embodiment of the present invention, the neighboring cell information generation unit 12 determines whether or not each of the plurality of wireless base station devices 101 other than the target base station should be registered in the neighboring cell information, based on whether or not the attribute indicated in the attribute information matches a predetermined attribute.

This configuration allows appropriate registration or elimination of each wireless base station device 101 in or from the neighboring cell information, based on the attribute of the wireless base station device 101.

Further, in the wireless communication system according to the first embodiment of the present invention, the attribute information acquisition unit 11 acquires attribute information indicating whether each of the plurality of wireless base station devices 101 other than the target base station is a macro base station or a femto base station.

In this way, by using the information indicating the distinction between a macro base stations and a femto base station, as a criterion for determining which wireless base station devices should be included in the neighboring cell information, and for ranking the wireless base station devices, it is possible to generate appropriate neighboring cell information.

Further, in the wireless communication system according to the first embodiment of the present invention, the neighboring cell information generation unit 12 ranks the plurality of wireless base station devices 101 other than the target base station. In the ranking, the wireless base station devices 101 as macro base stations are ranked higher than the wireless base station devices 101 as femto base stations.

As described above, in the wireless communication system in which macro base stations and femto base stations coexist, by raising the priority of the macro base stations that are not likely to be powered off, it is possible to appropriately perform ranking based on the distinction between a macro base station and a femto base station.

Further, in the wireless communication system according to the first embodiment of the present invention, the neighboring cell information generation unit 12 generates neighboring cell information in which at least the wireless base station devices 101 whose attributes indicated in the attribute information are macro base stations or wireless base station devices 101 whose attributes indicated in the attribute information are femto base stations are eliminated from among the plurality of wireless base station devices 101 other than the target base station.

This configuration allows appropriate elimination of wireless base station devices 101 from the neighboring cell information, in accordance with the distinction between a macro base station and a femto base station.

At least any of the plurality of wireless base station devices 101 in the wireless communication system according to the first embodiment of the present invention is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

If configuration of a femto base station is automatically performed by using the technique described in Patent Literature 1, all femto base stations located in the neighborhood of the femto base station are regarded as neighboring cells and registered in the neighboring cell information as candidates for a handover destination. Therefore, even a femto base station that is not essentially suitable as a handover destination, such as a femto base station located across a wall from a wireless terminal device, might be registered in the neighboring cell information.

In contrast, in the wireless communication system according to the first embodiment of the present invention, based on the attribute information acquired by the attribute information acquisition unit 11, the neighboring cell information generation unit 12 generates neighboring cell information indicating one or a plurality of wireless base station devices 101 to be candidate(s) for a handover destination of the wireless terminal device 202 which communicates with the target base station, among the plurality of wireless base station devices 101 other than the target base station.

This configuration causes the handover operation in the femto cell of the installed wireless base station device 101 to be in the optimum state. Further, by performing optimization of the neighboring cell information, the number of neighboring cells candidates for a handover destination of the wireless terminal device 202 during communication can be reduced, thereby avoiding occurrence of unnecessary handover.

Further, in the wireless communication system according to the first embodiment of the present invention, the neighboring cell information generation unit 12 generates neighboring cell information indicating one or a plurality of wireless base station devices 101 to be the target(s) for measurement by the wireless terminal device 202, among the plurality of wireless base station devices 101 other than the target base station.

In this way, by performing optimization of the neighboring cell information, the number of neighboring cells to be the targets of measurement by the wireless terminal device 202 can be reduced, thereby preventing the wireless terminal device 202 from performing unnecessary measurement operation.

Further, in the wireless communication system according to the first embodiment of the present invention, the neighboring cell information generation unit 12 generates neighboring cell information indicating one or a plurality of wireless base station devices 101 which transmit radio signal(s) whose reception level(s) are to be measured by the wireless terminal device 202, among the plurality of wireless base station devices 101 other than the target base station.

In this way, by performing optimization of the neighboring cell information, the number of neighboring cells to be the targets of reception level measurement by the wireless terminal device 202 can be reduced, thereby preventing the wireless terminal device 202 from performing unnecessary measurement operation. In particular, the power consumption of the wireless terminal device 202 in the idle state can be reduced, resulting in remarkable effects.

Further, in the wireless communication system according to the first embodiment of the present invention, the neighboring cell information generation unit 12 generates neighboring cell information indicating one or a plurality of wireless base station devices 101 which transmit radio signal(s) whose reception level(s) are to be measured by the wireless terminal device 202 in the idle state, i.e., which is not communicating with the target base station, among the plurality of wireless base station devices 101 other than the target base station.

This configuration reduces the number of neighboring cells to be the targets of periodical power measurement which is instructed by the broadcast information or the like from the wireless base station device 101, thereby preventing the wireless terminal device 202 from performing unnecessary measurement operation.

Further, in the wireless communication system according to the first embodiment of the present invention, the neighboring cell information generation unit 12 generates initial neighboring cell information, based on the result of measurement in which the wireless terminal device 202 communicating with the target base station measures, in all frequencies, the reception levels of radio signals transmitted from the wireless base station devices 101 other than the target base station.

This configuration allows prompt construction of appropriate neighboring cell information, and prompt realization of highly-efficient operation in the wireless communication system 301.

Further, in the wireless communication system according to the first embodiment of the present invention, each wireless base station device 101 solely performs optimization of neighboring cell information. That is, each wireless base station device 101 is provided with the neighboring cell processing device according to the first embodiment of the present invention.

This configuration eliminates the need to optimize the neighboring cell information of each wireless base station device 101 by the host device in the core network, thereby achieving dispersion of processing load in the wireless communication system 301, and reduction in the communication traffic between the wireless base station device 101 and the host device.

In the wireless communication system according to the first embodiment of the present invention, a wireless base station device 101 acquires attribute information of the wireless base station device 101, based on information from other wireless base station devices 101. However, the present invention is not limited thereto. If a wireless terminal device 202 is allowed to acquire the attribute of a wireless base station device 101 based on broadcast information or the like provided from the wireless base station device 101, the wireless terminal device 202 may notify the target base station of the acquired attribute, and the target base station may acquire attribute information of other wireless base station devices 101 based on this notification.

Further, in the wireless communication system according to the first embodiment of the present invention, the neighboring cell information generation unit 12 generates neighboring cell information in which the priorities of macro base stations are raised. However, the present invention is not limited thereto. The neighboring cell information generation unit 12 may rank the plurality of wireless base station devices 101 other than the target base station, and in the ranking, the wireless base station devices 101 as the femto base stations may be ranked higher than the wireless base station devices 101 as the macro base stations.

This configuration allows appropriate ranking based on the distinction between a macro base station and a femto base station, under the situation where, in the communication system in which macro base stations and femto base stations coexist, the femto base stations should be preferentially registered in the neighboring cell information.

Further, in the wireless base station device according to the first embodiment of the present invention, the neighboring cell information generation unit 12 generates initial neighboring cell information, based on the result of measurement in which the wireless terminal device 202 communicating with the target base station measures, in all frequencies, the reception levels of radio signals transmitted from the wireless base station devices 101 other than the target base station. However, the present invention is not limited thereto. The present invention is applicable not only to the configuration in which all the transmission frequencies of the wireless base station devices 101 in the wireless communication system are measured but also to a configuration in which a plurality of frequencies corresponding to part of the transmission frequencies are measured.

Further, in the wireless communication system according to the first embodiment of the present invention, a wireless base station device 101 has the initiative to select a wireless base station device 101 to be a communication partner of a wireless terminal device 202. However, the present invention is not limited thereto. A wireless terminal device 202 may have the initiative to select a wireless base station device 101 to be a communication partner of the wireless terminal device 202.

Further, in the first embodiment of the present invention, the handover operation of wireless terminal devices is specifically described. However, the present invention is applicable to not only handover that is an inter-base-station movement (inter-cell movement) operation performed by a wireless terminal device communicating with a wireless base station device but also an inter-base-station movement (inter-cell movement) operation performed by a wireless terminal device in the idle state. That is, the present invention is applicable to the configurations and operations in which "handover" is replaced with "movement" in the first embodiment of the present invention.

Hereinafter, a description will be given of another embodiment of the present invention with reference to figures. In the figures, the same or corresponding components are given the same reference characters and are not repeatedly described.

<Embodiment 2>

A second embodiment relates to a wireless communication system in which the content of attribute information is changed from that of the wireless communication system according to the first embodiment. The wireless communication system of the second embodiment is identical to the wireless communication system of the first embodiment except the matters described below.

When a wireless base station device 101 operates in the closed access mode or the hybrid mode, the wireless base station device 101 belongs to a set CSG (Closed Subscriber Group), that is, a CSG ID is set in the wireless base station device 101. The wireless base station device 101 allows wireless terminal devices 202 which belong to the same CSG (i.e., which have the same CSG ID) as the wireless base station device 101 to communicate with the wireless base station device 101.

If the priorities of the wireless base station devices are considered in terms of radio resources which are likely to be used by a wireless terminal device 202, the priority ranking is as follows: (1) a femto base station that operates in the closed access mode, and has the wireless terminal device 202 as a member (i.e., the wireless terminal device 202 has the same CSG ID as the femto base station); (2) a femto base station that operates in the hybrid mode, and has the wireless terminal device 202 as a member; (3) a macro base station; (4) a femto base station that operates in the open access mode; (5) a femto base station that operates in the hybrid mode, and has the wireless terminal device 202 as a non-member (i.e., the wireless terminal device 202 has a CSG ID different from that of the femto base station); and (6) a femto base station that operates in the closed access mode, and has the wireless terminal device 202 as a non-member.

However, with respect to "the femto base station which operates in the closed access mode, and has the wireless terminal device 202 as a member" and "the femto base station which operates in the hybrid mode, and has the wireless terminal device 202 as a member", each of these wireless base station devices has already known the CSG IDs of neighboring wireless base station devices 101, based on such as broadcast information from other wireless base station devices 101 and information from the wireless terminal device 202. And, the CSG IDs are useful only when neighboring cell information is individually applied to each of wireless terminal devices 202 having the same CSG ID as the wireless base station device, for example, when neighboring cell information is individually used for a measurement request to each wireless terminal device 202, or in search for a handover destination.

Therefore, in a case where the wireless base station device 101A broadcasts common neighboring cell information to all wireless terminal devices 202 that are communicable with the wireless base station device 101A, and does not perform generation of neighboring cell information considering its own access mode, which is described as a modification later, it is not necessary to perform ranking based on match/mismatch of CSG IDs.

Then, if the priorities of the wireless base station devices are considered in terms of radio resources which are likely to be used by a wireless terminal device 202, the priority ranking is as follows: (1) a macro base station; (2) a femto base station that operates in the open access mode; (3) a femto base station that operates in the hybrid mode, and (4) a femto base station that operates in the closed access mode.

In this case, the attribute information acquisition unit 11 acquires attribute information indicating whether each of the plurality of wireless base station devices 101 other than the target base station is a macro base station or a femto base station, and indicating the mode (any of the open access mode, the closed access mode, and the hybrid mode) in which the wireless base station device 101 as a femto base station operates.

FIG. 71 is a diagram illustrating an example of attribute information acquired by a wireless base station device.

With reference to FIG. 71, the wireless base station device 101A acquires attribute information indicating that the cell mode of the wireless base station device 101B whose cell ID is 2222 is macro, the cell mode of the wireless base station device 101C whose cell ID is 3333 is femto, the cell mode of the wireless base station device 101D whose access mode is the hybrid mode and whose cell ID is 4444 is femto, the cell mode of the wireless base station device 101E whose access mode is the closed access mode and whose cell ID is 5555 is femto, the cell mode of the wireless base station device 101F whose access mode is the open access mode and whose cell ID is 6666 is femto, and the cell mode of the wireless base station device 101G whose access mode is the hybrid mode and whose cell ID is 7777 is macro.

FIG. 72 is a diagram illustrating an example of neighboring cell information generated by a wireless base station device.

With reference to FIG. 72, the wireless base station device 101A generates neighboring cell information according to the above-described priority ranking in the acquired attribute information shown in FIG. 71. That is, the neighboring cell information generation unit 12 ranks the plurality of wireless base station devices 101 other than the target base station. In the ranking, the wireless base station devices 101 are ranked in descending order as follows: a wireless base station device 101 as a macro base station; a wireless base station device 101 as a femto base station that operates in the open access mode; a wireless base station device 101 as a femto base station that operates in the hybrid mode; and a wireless base station device 101 as a femto base station that operates in the closed access mode.

Specifically, the wireless base station device 101A updates the initial neighboring cell information generated based on the sequence shown in FIG. 62 to neighboring cell information indicating that the cell ID 2222 (wireless base station device 101B) whose cell mode is macro ranks first, the cell ID 7777 (wireless base station device 101G) whose cell mode is macro ranks first, the cell ID 5555 (wireless base station device 101E) whose cell mode is femto and which operates in the open access mode ranks second, the cell ID 3333 (wireless base station device 101C) whose cell mode is femto and which operates in the hybrid mode ranks third, the cell ID 6666 (wireless base station device 101F) whose cell mode is femto and which operates in the hybrid mode ranks third, and the cell ID 4444 (wireless base station device 101D) whose cell mode is femto and which operates in the closed access mode ranks fourth.

When the wireless base station device 101A has updated the neighboring cell information, the wireless base station device 101A broadcasts the updated neighboring cell information to each wireless terminal device 202. For example, the wireless base station device 101A broadcasts, to each wireless terminal device 202, the neighboring cell information indicating N (N: an integer not smaller than 1) wireless base station devices from the highest rank among the ranked wireless band station devices.

FIG. 73 is a diagram illustrating another example of neighboring cell information generated by the wireless base station device.

With reference to FIG. 73, in a case where the number of wireless base station devices registerable in the neighboring cell information to be notified to each wireless terminal device 202 is limited to three, the wireless base station device 101A notifies each wireless terminal device 202 of neighboring cell information indicating that the cell ID 2222 (wireless base station device 101B) ranks first, the cell ID 7777 (wireless base station device 101G) ranks first, and the cell ID 5555 (wireless base station device 101E) ranks second.

FIG. 74 is a diagram illustrating another example of neighboring cell information generated by the wireless base station device.

In the wireless communication system according to the second embodiment of the present invention, the neighboring cell information generation unit 12 ranks the plurality of wireless base station devices 101 other than the target base station, based on the attribute information acquired by the attribute information acquisition unit 11, and generates neighboring cell information based on the result of the ranking. However, the present invention is not limited thereto.

The neighboring cell information generation unit 12 may determine whether or not each of the plurality of wireless base station devices 101 other than the target base station should be registered in the neighboring cell information, based on whether or not the attribute indicated in the attribute information matches a predetermined attribute, without performing ranking based on the distinction between a macro base station and a femto base station, and the distinction of access modes. More specifically, the neighboring cell information generation unit 12 may generate neighboring cell information in which, among four types of wireless base station devices 101, i.e., wireless base station device 101 that is a macro base station, a wireless base station device 101 that is a femto base station and operates in the open access mode, a wireless base station device 101 that is a femto base station and operates in the hybrid mode, and a wireless base station device 101 that is a femto base station and operates in the closed access mode, at least one, or two, or three types of wireless base station devices 101 are eliminated from among the plurality of wireless base station devices 101 other than the target base station.

With reference to FIG. 74, for example, the neighboring cell information generation unit 12 adopts, as a criterion for registration, that a wireless base station device 101 is a macro base station, or a femto base station operating in the open access mode, or a femto base station operating in the hybrid mode, and adopts, as a criterion for non-registration, that a wireless base station device 101 is a femto base station operating in the closed access mode. In this case, the neighboring cell information generation unit 12 registers, in the neighboring cell information, the wireless base station devices 101B, 101C, 101E, 101F, and 101G other than the wireless base station device 101D. Then, the neighboring cell information transmission unit 13 notifies each wireless terminal device 202 of the neighboring cell information.

[Modification]

In this modification, the attribute information acquisition unit 11 acquires attribute information indicating the attribute of the target base station, in addition to the attributes of the plurality of wireless base station devices 101 other than the target base station. Then, the neighboring cell information generation unit 12 generates neighboring cell information based on the attribute of the target base station and the attributes of the plurality of wireless base station devices 101 other than the target base station, which are indicated in the attribute information acquired by the attribute information acquisition unit 11.

More specifically, the attribute information acquisition unit 11 acquires attribute information indicating: whether each of the target base station and the plurality of wireless base station devices 101 other than the target base station is a macro base station or a femto base station: the access modes (any of the open access mode, the closed access mode, and the hybrid mode) in which the target base station and the plurality of wireless base station devices 101 other than the target base station operate; the CSGs (Closed Subscriber Groups) to which the target base station and the plurality of wireless base station devices 101 other than the target base station belong.

The neighboring cell information generation unit 12 ranks the plurality of wireless base station devices 101 other than the target base station. In the ranking, the wireless base station devices 101 that belong to the same CSG as the target base station are ranked higher than the wireless base station devices 101 that belong to the CSGs different from the CSG of the target base station.

FIG. 75 is a diagram illustrating an example of attribute information acquired by the wireless base station device.

With reference to FIG. 75, the wireless base station device 101A acquires attribute information indicating that the cell mode of the wireless base station device 101A whose cell ID is 1111 is femto; the cell mode of the wireless base station device 101B whose access mode is the closed access mode, whose CSG ID is 8888, and whose cell ID is 2222 is macro; the cell mode of the wireless base station device 101C whose cell ID is 3333 is femto; the cell mode of the wireless base station device 101D whose access mode is the hybrid mode, whose CSG ID is 8888, and whose cell ID is 4444 is femto; the cell mode of the wireless base station device 101E whose access mode is the closed access mode, whose CSG ID is 8888, and whose cell ID is 5555 is femto; the cell mode of the wireless base station device 101F whose access mode is the open access mode and whose cell ID is 6666 is femto; and the cell mode of the wireless base station device 101G whose access mode is the hybrid mode, whose CSG ID is 9999, and whose cell ID is 7777 is macro.

FIG. 76 is a diagram illustrating an example of neighboring cell information generated by a wireless base station device.

With reference to FIG. 76, it is assumed that the wireless base station device 101A operates in the closed access mode. A wireless terminal device 202 is allowed to recognize that the wireless terminal device 202 is a member of another wireless base station device 101 having the same CSG ID as the wireless base station device 101A that is communicating with the wireless terminal device 202. In this case, if the priorities of the wireless base station devices are considered in terms of radio resources which are likely to be used by a wireless terminal device 202, the priority ranking is as follows: (1) a femto base station that operates in the closed access mode and has the same CSG ID as the wireless base station device 101A; (2) a femto base station that operates in the hybrid mode and has the same CSG ID as the wireless base station device 101A; (3) a macro base station, (4) a femto base station that operates in the open access mode, and (5) a femto base station that operates in the hybrid mode, and whose CSG ID is different from that of the wireless base station device 101A.

There is a possibility that the wireless terminal device 202 communicable with the wireless base station device 101A is a member of the femto base station whose CSG ID is different from that of the wireless base station device 101A and operates in the closed access mode. However, since there are wireless terminal devices 202 that are not members of such a femto base station, such a femto base station is excluded from the targets of the above-described priority ranking.

The wireless base station device 101A generates neighboring cell information in accordance with the above-described priority ranking, in the acquired attribute information shown in FIG. 75. That is, when the target base station is a femto base station operating in the closed access mode, the neighboring cell information generation unit 12 ranks the wireless base station devices 101 in descending order of: a wireless base station device 101 that is a femto base station, operates in the closed access mode, and belongs to the same CSG as the target base station; a wireless base station device 101 that is a femto base station, operates in the hybrid mode, and belongs to the same CSG as the target base station; a wireless base station device 101 that is a macro base station; a wireless base station device 101 that is a femto base station, and operates in the open access mode; and a wireless base station device 101 that is a femto base station, operates in the hybrid mode, and belongs to a CSG different from the CSG of the target base station.

Specifically, the wireless base station device 101A updates the initial neighboring cell information generated by the sequence shown in FIG. 62, to neighboring cell information indicating that the cell ID 4444 (wireless base station device 101D) ranks first, which operates in the closed access mode, whose cell mode is femto, and whose CSG ID is 8888 (i.e., the same as the CSG ID of the wireless base station device 101A); the cell ID 3333 (wireless base station device 101C) ranks second, which operates in the hybrid mode, whose cell mode is femto, and whose CSG ID is 8888 (i.e., the same as the CSG ID of the wireless base station device 101A); the cell ID 2222 (wireless base station device 101B) whose cell mode is macro ranks third; the cell ID 7777 (wireless base station device 101G) whose cell mode is macro ranks third; the cell ID 5555 (wireless base station device 101E) whose cell mode is femto and which operates in the open access mode ranks fifth; and the cell ID 6666 (wireless base station device 101F) ranks sixth, whose cell mode is femto, which operates in the hybrid mode, and whose CSG ID is 9999 (i.e., different from the CSG ID of the wireless base station device 101A).

When the wireless base station device 101A has updated the neighboring cell information, the wireless base station device 101A broadcasts the updated neighboring cell information to each wireless terminal device 202. For example, the wireless base station device 101A broadcasts, to each wireless terminal device 202, the neighboring cell information indicating N (N: an integer not smaller than 1) wireless base station devices from the highest rank among the ranked wireless band station devices.

FIG. 77 is a diagram illustrating another example of neighboring cell information generated by the wireless base station device.

With reference to FIG. 77, in a case where the number of wireless base station devices registerable in the neighboring cell information to be notified to each wireless terminal device 202 is limited to four, the wireless base station device 101A notifies each wireless terminal device 202 of neighboring cell information indicating that the cell ID 4444 (wireless base station device 101D) ranks first, the cell ID 3333 (wireless base station device 101C) ranks second, the cell ID 2222 (wireless base station device 101B) ranks third, and the cell ID 7777 (wireless base station device 101G) ranks third.

FIG. 78 is a diagram illustrating another example of neighboring cell information generated by the wireless base station device.

In the wireless communication system according to the first embodiment of the present invention, the neighboring cell information generation unit 12 ranks the plurality of wireless base station devices 101 other than the target base station, based on the attribute information acquired by the attribute information acquisition unit 11, and generates neighboring cell information based on the result of the ranking. However the present invention is not limited thereto.

The neighboring cell information generation unit 12 may determine whether or not each of the plurality of wireless base station devices 101 other than the target base station should be registered in the neighboring cell information, based on whether or not the attribute indicated in the attribute information matches a predetermined attribute, without performing ranking based on the distinction between a macro base station and a femto base station, the distinction of access modes, and match/mismatch of CSG IDs. More specifically, when the target base station is a femto base station operating in the closed access mode, the neighboring cell information generation unit 12 generates neighboring cell information in which, among five types of wireless base station devices 101, i.e., a wireless base station device 101 that is a femto base station, operates in the closed access mode, and belongs to the same CSG as the target base station; a wireless base station device 101 that is a femto base station, operates in the hybrid mode, and belongs to the same CSG as the target base station; a wireless base station device 101 that is a macro base station; a wireless base station device 101 that is a femto base station, and operates in the open access mode; and a wireless base station device 101 that is a femto base station, operates in the hybrid mode, and belongs to a CSG different from the CSG of the target base station, at least one, two, three or four types of wireless base station devices 101 are eliminated from among the plurality of wireless base station devices 101 other than the target base station.

With reference to FIG. 78, for example, the neighboring cell information generation unit 12 adopts, as a criterion for registration, that a wireless base station device 101 is a femto base station that operates in the hybrid mode or the closed access mode, and has the same CSG ID as the target wireless base station device, or a macro base station, and adopts, as a criterion for non-registration, that a wireless base station device 101 is a femto base station that operates in the hybrid mode or the closed access mode, and has a CSG ID different from that of the target wireless base station device. In this case, the neighboring cell information generation unit 12 registers, in the neighboring cell information, the wireless base station devices 101B, 101C, 101D, 101E, and 101G, other than the wireless base station device 101F Then, the neighboring cell information transmission unit 13 notifies each wireless terminal device 202 of the neighboring cell information.

Next, a case where the wireless base station device 101A operates in the hybrid mode or the open access mode, and a case where the wireless base station device 101A is a macro base station, are considered.

A wireless terminal device 202 communicating with the wireless base station device 101A is: a member that belongs to the same CSG as the wireless base station device 101A; or a non-member that belongs to a CSG different from the CSG of the wireless base station device 101A; or does not belong to any CSG. Therefore, when the wireless base station device 101A broadcasts common neighboring cell information to all wireless terminal devices 202 communicable with the wireless base station device 101A, it is not possible to uniquely determine the priority order between a femto base station that operates in the hybrid mode and has the same CSG ID as the wireless base station device 101A, and a femto base station that operates in the hybrid mode and has a CSG ID different from that of the wireless base station device 101A, and the priority order between a femto base station that operates in the closed access mode and has the same CSG ID as the wireless base station device 101A, and a femto base station that operates in the closed access mode and has a CSG ID different from that of the wireless base station device 101A.

Then, if the priorities of the wireless the base station devices are considered in terms of radio resources which are likely to be used by a wireless terminal device 202, the priority ranking is as follows: (1) a macro base station, (2) a femto base station that operates in the open access mode, (3) a femto base station that operates in the hybrid mode, and (4) a femto base station that operates in the closed access mode.

That is, in the case where the wireless base station device 101A operates in the hybrid mode or the open access mode, and in the case where the wireless base station device 101A is a macro base station, the neighboring cell information generating method is identical to that described with reference to FIGS. 72 to 74.

As described above, in the wireless communication system according to the second embodiment of the present invention, the attribute information acquisition unit 11 acquires attribute information indicating the access mode (any of the open access mode, the closed access mode, and the hybrid mode) in which each wireless base station device 101 as a femto base station operates, in addition to whether each of the plurality of wireless base station devices 101 other than the target base station is a macro base station or a femto base station.

As described above, by using the information indicating the distinction between a macro base station and a femto base station and the distinction of access modes is used as a criterion for determining which wireless base station devices should be included in the neighboring cell information, and for ranking the wireless base station devices, it is possible to generate more appropriate neighboring cell information, as compared with the wireless communication system according to the first embodiment of the present invention.

Furthermore, in the wireless communication system according to the second embodiment of the present invention, the neighboring cell information generation unit 12 ranks the plurality of wireless base station devices 101 other than the target base station. In the ranking, the wireless bases station devices are ranked in descending order as follows: a wireless base station device 101 that is a macro base station; a wireless base station device 101 that is a femto base station, and operates in the open access mode; a wireless base station device 101 that is a femto base station, and operates in the hybrid mode; and a wireless base station device 101 that is a femto base station, and operates in the closed access mode.

This configuration allows appropriate ranking of the wireless base station devices 101 in accordance with the distinction between a macro base station and a femto base station, and the distinction of access modes.

Further, in the wireless communication system according to the second embodiment of the present invention, the neighboring cell information generation unit 12 generates neighboring cell information in which, among four types of wireless base station devices 101, i.e., a wireless base station device 101 that is a macro base station, a wireless base station device 101 that is a femto base station and operates in the open access mode, a wireless base station device 101 that is a femto base station and operates in the hybrid mode, and a wireless base station device 101 that is a femto base station and operates in the closed access mode, at least one, two, or three types of wireless base stations devices 101 are eliminated from among the plurality of wireless base station devices 101 other than the target base station.

This configuration allows appropriate elimination of wireless base station devices 101 from the neighboring cell information in accordance with the distinction between a macro base station and a femto base station, and the distinction of access modes.

Further, in the wireless communication system according to the second embodiment of the present invention, the attribute information acquisition unit 11 acquires attribute information indicating the attribute of the target base station, in addition to the attributes of the plurality of wireless base station devices 101 other than the target base station. Then, the neighboring cell information generation unit 12 generates neighboring cell information based on the attribute of the target base station and the attributes of the plurality of wireless base station devices 101 other than the target base station, which are indicated in the attribute information acquired by the attribute information acquisition unit 11.

In this way, by using the information indicating the attribute of the target base station in addition to the information indicating the attributes of the plurality of wireless base station devices 101 other than the target base station, as a criterion for determining which wireless base station devices should be included in the neighboring cell information, and for ranking the wireless base station devices, it is possible to generate more appropriate neighboring cell information.

Further, in the wireless communication system according to the second embodiment of the present invention, the attribute information acquisition unit 11 acquires attribute information further indicating the CSGs to which the target base station and the plurality of wireless base station devices 101 other than the target base station belong, respectively.

In this way, by using information indicating the distinction between a macro base station and a femto base station, the distinction of access modes, and the match/mismatch of CSG IDs, with respect to the target base station and the plurality of wireless base station devices 101 other than the target base station, as a criterion for determining which wireless base station devices should be included in the neighboring cell information, and for ranking the wireless base station devices, it is possible to generate more appropriate neighboring cell information.

Further, in the wireless communication system according to the second embodiment of the present invention, the neighboring cell information generation unit 12 ranks the plurality of wireless base station devices 101 other than the target base station. In the ranking, the wireless base station devices 101 which belong to the same CSG as the target base station are ranked higher than the wireless base station devices 101 which belong to CSGs different from the CSG of the target base station.

This configuration allow appropriate ranking of the wireless base station devices 101 in accordance with the match/mismatch of CSG IDs.

Further, in the wireless communication system according to the second embodiment of the present invention, the plurality of wireless base station devices 101 other than the target base station are ranked. When the target base station is a femto base station operating in the closed access mode, in this ranking, the wireless base station devices 101 are ranked in descending order as follows: a wireless base station device 101 that is a femto base station, operates in the closed access mode, and belongs to the same CSG as the target base station; a wireless base station device 101 that is a femto base station, operates in the hybrid mode, and belongs to the same CSG as the target base station; a wireless base station device 101 that is a macro base station; a wireless base station device 101 that is a femto base station, and operates in the open access mode; and a wireless base station device 101 that is a femto base station, operates in the hybrid mode, and belongs to a CSG different from the CSG of the target base station.

This configuration allows appropriate ranking of the wireless base station devices 101 in accordance with the distinction between a macro base station and a femto base station, the distinction of access modes, and match/mismatch of CSG IDs.

Further, in the wireless communication system according to the second embodiment of the present invention, when the target base station is a femto base station operating in the closed access mode, the neighboring cell information generation unit 12 generates neighboring cell information in which, among five types of wireless base station devices 101, i.e., a wireless base station device 101 that is a femto base station, operates in the closed access mode, and belongs to the same CSG as the target base station; a wireless base station device 101 that is a femto base station, operates in the hybrid mode, and belongs to the same CSG as the target base station; a wireless base station device 101 that is a macro base station; a wireless base station device 101 that is a femto base station, and operates in the open access mode; and a wireless base station device 101 that is a femto base station, operates in the hybrid mode, and belongs to a CSG different from the CSG of the target base station, least one, two, three or four types of wireless base station devices 101 are eliminated from among the plurality of wireless base station devices 101 other than the target base station.

This configuration allows appropriate elimination of wireless base station devices 101 from the neighboring cell information in accordance with the distinction between a macro base station and a femto base station, the distinction of access modes, and match/mismatch of CSG IDs.

In the wireless communication system according to the second embodiment of the present invention, the neighboring cell information generation unit 12 adopts the information indicating the distinction between a macro base station and a femto base station, as a criterion for determining which wireless base station devices should be included in the neighboring cell information, and for ranking the wireless base station devices. However, the present invention is not limited thereto.

For example, when a macro base station has the three access modes, i.e., the open access mode, the hybrid mode, and the closed access mode, ranking based on the distinction of access modes may be performed regardless of the distinction between a macro base station and a femto base station.

Further, also in a case where no macro base station is located in the wireless communication system, or only femto base stations are located in the neighborhood of a wireless base station device, it is considered that ranking may be performed based on, for example, the distinction of access modes, regardless of the distinction between a macro base station and a femto base station.

That is, the neighboring cell information generation unit 12 need not use the information indicating the distinction between a macro base station and a femto base station, as a criterion for determining which wireless base station devices should be included in the neighboring cell information, and for ranking the wireless base station devices.

In this case, the attribute information acquisition unit 11 acquires attribute information indicating the access mode (any of the open access mode, the closed access mode, and the hybrid mode) in which each of the plurality of wireless base station devices 101 other than the target base station operates.

In this way, by using the information indicating the distinction of access modes as a criterion for determining which wireless base station devices should be included in the neighboring cell information, and for ranking the wireless base station devices, it is possible to generate more appropriate neighboring cell information, as compared with the wireless communication system according to the first embodiment of the present invention.

Further, the neighboring cell information generation unit 12 ranks the plurality of wireless base station devices 101 other than the target base station. In the ranking, the wireless base station devices 101 are ranked in descending order as follows: a wireless base station device 101 that operates in the open access mode; a wireless base station device 101 that operates in the hybrid mode; and a wireless base station device 101 that operates in the closed access mode.

This configuration allows appropriate ranking of wireless base station devices 101 in accordance with the distinction of access modes.

Alternatively, the neighboring cell information generation unit 12 generates neighboring cell information in which, among three kinds of wireless base station devices 101, i.e., a wireless base station device 101 that operates in the open access mode, a wireless base station device 101 that operates in the hybrid mode, and a wireless base station device 101 that operates in the closed access mode, at least one or two kinds of wireless base stations devices 101 are eliminated from among the plurality of wireless base station devices 101 other than the target base station.

This configuration allows appropriate elimination of wireless base station devices 101 from the neighboring cell information in accordance with the distinction of access modes.

Further, the attribute information acquisition unit 11 acquires attribute information further indicating the CSGs to which the target base station and the plurality of wireless base station devices 101 other than the target base station belong, respectively.

In this way, by using information indicating the distinction of access modes, and match/mismatch of CSG IDs, with respect to the target base station and the plurality of wireless base station devices 101 other than the target base station, as a criterion for determining which wireless base station devices should be included in the neighboring cell information, and for ranking the wireless base station devices, it is possible to generate more appropriate neighboring cell information.

Further, the neighboring cell information generation unit 12 ranks the plurality of wireless base station devices 101 other than the target base station. When the target base station operates in the closed access mode, in the ranking, the wireless base station devices 101 are ranked in descending order as follows: a wireless base station device 101 that operates in the closed access mode and belongs to the same CSG as the target base station; a wireless base station device 101 that operates in the hybrid mode and belongs to the same CSG as the target base station; a wireless base station device 101 that operates in the open access mode; and a wireless base station device 101 that operates in the hybrid mode and belongs to a CSG different from the CSG of the target base station.

This configuration allows appropriate ranking of wireless base station devices 101 in accordance with the distinction of access modes and match/mismatch of CSG IDs.

Alternatively, when the target base station operates in the closed access mode, the neighboring cell information generation unit 12 may generate neighboring cell information in which, among four types of wireless base station devices 101, i.e., a wireless base station device 101 that operates in the closed access mode and belongs to the same CSG as the target base station, a wireless base station device 101 that operates in the hybrid mode and belongs to the same CSG as the target base station, a wireless base station device 101 that operates in the open access mode, and a wireless base station device 101 that operates in the hybrid mode and belongs to a CSG different from the CSG of the target base station, at least one, two or three types of wireless base station devices 101 are eliminated from among the plurality of wireless base station devices 101 other than the target base station.

This configuration allows appropriate elimination of wireless base station devices 101 from the neighboring cell information in accordance with the distinction of access modes and match/mismatch of CSG IDs.

Since other components and operations of the wireless communication system of the second embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 3>

A third embodiment relates to a wireless communication system in which the content of attribute information is changed from that of the wireless communication system according to the first embodiment. The wireless communication system of the third embodiment is identical to the wireless communication system of the first embodiment except the matters described below.

In the wireless communication system according to the third embodiment of the present invention, the attribute information acquisition unit 11 acquires attribute information indicating the frequencies of radio signals transmitted from the target base station and the plurality of wireless base station devices 101 other than the target base station.

FIG. 79 is a diagram illustrating an example of attribute information acquired by a wireless base station device.

With reference to FIG. 79, the wireless base station device 101A acquires attribute information indicating that the carrier frequency of a radio signal transmitted from the wireless base station device 101A whose cell ID is 1111 is f1, the carrier frequency of a radio signal transmitted from the wireless base station device 101B whose cell ID is 2222 is f1, the carrier frequency of a radio signal transmitted from the wireless base station device 101C whose cell ID is 3333 is f1, the carrier frequency of a radio signal transmitted from the wireless base station device 101D whose cell ID is 4444 is f3, the carrier frequency of a radio signal transmitted from the wireless base station device 101E whose cell ID is 5555 is f2, the carrier frequency of a radio signal transmitted from the wireless base station device 101F whose cell ID is 6666 is f3, and the carrier frequency of a radio signal transmitted from the wireless base station device 101G whose cell ID is 7777 is f2.

The wireless base station device 101A acquires the carrier frequencies of the respective wireless base station devices shown in FIG. 79, as attribute information, from broadcast information or the like regularly or irregularly transmitted from the wireless base station devices.

The wireless base station device 101A may obtain the carrier frequencies not from the broadcast information or the like but by measuring the frequencies of the radio signals transmitted from the other wireless base station devices 101. Alternatively, as shown in FIG. 63, the wireless base station device 101A may obtain the carrier frequencies by causing a wireless terminal device 202 communicating with the wireless base station device 101A to measure the frequencies of radio signals transmitted from the other wireless base station devices 101.

If the wireless terminal device 202 moves to another wireless base station device 101 which uses the same carrier frequency as the wireless base station device 101A, both the radio signal from the wireless terminal device 202 and the radio signal from the another wireless base station device 101 become interference waves for the wireless base station device 101A and another wireless terminal device 202 communicating with the wireless base station device 101A. So, the wireless base station device 101A raises the priority of a wireless base station device 101 which uses a carrier frequency different from that used by the wireless base station device 101A.

That is, the priority ranking in the neighboring cell information is as follows: (1) a wireless base station device using a carrier frequency different from that used by the wireless base station device 101A; and (2) a wireless base station device using the same carrier frequency as the wireless base station device 101A.

FIG. 80 is a diagram illustrating an example of neighboring cell information generated by the wireless base station device.

With reference to FIG. 80, the wireless base station device 101A generates neighboring cell information in which the priority ranks of the wireless base station devices 101 using the carrier frequencies different from that of the wireless base station device 101A are raised in the attribute information shown in FIG. 79. Specifically, the neighboring cell information generation unit 12 ranks the plurality of wireless base station devices 101 other than the target base station, and in the ranking, the wireless base station devices 101 whose frequencies indicated in the attribute information are different from the frequency of the radio signal transmitted from the target base station are ranked higher than the wireless base station devices 101 whose frequencies indicated in the attribute information are the same as the frequency of the target base station.

Specifically, the wireless base station device 101A updates the initial neighboring cell information generated by the sequence shown in FIG. 62, to neighboring cell information indicating that the cell ID 4444 (wireless base station device 101D) whose carrier frequency is f3 ranks first, the cell ID 6666 (wireless base station device 101F) whose carrier frequency is f3 ranks first, the cell ID 5555 (wireless base station device 101E) whose carrier frequency is f2 ranks third, the cell ID 7777 (wireless base station device 101G) whose carrier frequency is f2 ranks third, the cell ID 2222 (wireless base station device 101B) whose carrier frequency is f1 ranks fifth, and the cell ID 3333 (wireless base station device 101C) whose carrier frequency is f1 ranks fifth.

This configuration allows the wireless base station device 101A to guide the wireless terminal device 202 to a wireless base station device using a carrier frequency different from that of the wireless base station device 101A, thereby reducing interference to the wireless base station device 101A.

Further, it is assumed that the carrier frequencies satisfy f1<f2<f3, and the radio signal of the carrier frequency f3 is least likely to interfere with the wireless base station device 101 using the carrier frequency f1.

Specifically, the neighboring cell information generation unit 12 ranks the plurality of wireless base station devices 101 other than the target base station. In the ranking, the wireless base station device 101 whose frequency indicated in the attribute information is farther from the frequency of the radio signal transmitted from the target base station is ranked higher than the wireless base station device 101 whose frequency indicated in the attribute information is closer to the frequency of the radio signal transmitted from the target base station.

This configuration allows the wireless base station device 101A to guide the wireless terminal device 202 to a wireless base station device using a carrier frequency farthest from the carrier frequency of the wireless base station device 101A, thereby further reducing interference to the wireless base station device 101A.

When the wireless base station device 101A has updated the neighboring cell information, the wireless base station device 101A broadcasts the updated neighboring cell information to each wireless terminal device 202. For example, the wireless base station device 101A broadcasts, to each wireless terminal device 202, the neighboring cell information indicating N (N: an integer not smaller than 1) wireless base station devices from the highest rank among the ranked wireless band station devices.

FIG. 81 is a diagram illustrating another example of neighboring cell information generated by the wireless base station device.

With reference to FIG. 81 in a case where the number of wireless base station devices registerable in the neighboring cell information to be notified to each wireless terminal device 202 is limited to two, the wireless base station device 101A notifies each wireless terminal device 202 of neighboring cell information indicating that the cell ID 4444 (wireless base station device 101D) ranks first, and the cell ID 6666 (wireless base station device 101F) ranks first. In FIG. 81, all the wireless base station devices registered in the neighboring cell information rank first. In this case, the wireless base station devices may be ranked based on any other criterion.

FIG. 82 is a diagram illustrating another example of neighboring cell information generated by the wireless base station device.

In the wireless communication system according to the third embodiment of the present invention, the neighboring cell information generation unit 12 ranks the plurality of wireless base station devices 101 other than the target base station, based on the attribute information acquired by the attribute information acquisition unit 11, and generates neighboring cell information based on the result of the ranking. However, the present invention is not limited thereto.

The neighboring cell information generation unit 12 may determine whether or not each of the plurality of wireless base station devices 101 other than the target base station should be registered in the neighboring cell information, based on whether or not the attribute indicated in the attribute information matches a predetermined attribute, without performing ranking based on the distinction of carrier frequencies. More specifically, the neighboring cell information generation unit 12 may generate neighboring cell information in which at least the wireless base station device 101 whose frequency indicated in the attribute information is the same as the frequency of the radio signal transmitted from the target base station is eliminated from among the plurality of wireless base station devices 101 other than the target base station.

With reference to FIG. 82, the neighboring cell information generation unit 12 adopts, as a criterion for registration, that a wireless base station device uses a carrier frequency different from that used by the wireless base station device 101A, and adopts, as a criterion for non-registration, that a wireless base station device uses the same carrier frequency as the wireless base station device 101A. In this case, the neighboring cell information generation unit 12 registers, in the neighboring cell information, the wireless base station devices 101D, 101E, 101F, and 101G other than the wireless base station devices 101B and 101C. Then, the neighboring cell information transmission unit 13 notifies each wireless terminal device 202 of the neighboring cell information.

[Modification]

A wireless terminal device 202 basically performs measurement of the reception level or the like of a carrier frequency that is used by a wireless base station device 101 currently communicating with the wireless terminal device 202. Accordingly, when the carrier frequency of a wireless base station device registered in the neighboring cell information is the same as the carrier frequency of the wireless base station device 101 currently communicating with the wireless terminal device 202, the frequency of the measurement target for the wireless terminal device 202 is one, which facilitates the measurement.

So, in this modification, the wireless base station device 101A gives priority to a wireless base station device using the same carrier frequency as the wireless base station device 101A.

Specifically, the priority ranking in the neighboring cell information is as follows: (1) a wireless base station device using the same carrier frequency as the wireless base station device 101A; and (2) a wireless base station device using a carrier frequency different from that of the wireless base station device 101A.

FIG. 83 is a diagram illustrating an example of neighboring cell information generated by the wireless base station device. Note that the carrier frequencies satisfy f1<f2<f3.

With reference to FIG. 83, the wireless base station device 101A generates neighboring cell information in which the priorities of the wireless base station devices 101 using the same carrier frequency as the wireless base station device 101A are raised in the attribute information shown in FIG. 79. That is, based on the attribute information acquired by the attribute information acquisition unit 11, the neighboring cell information generation unit 12 ranks the plurality of wireless base station devices 101 other than the target base station. In this ranking, the wireless base station devices 101 whose frequencies indicated in the attribute information are the same as the frequency of the radio signal transmitted from the target base station are ranked higher than the wireless base station devices 101 whose frequencies indicated in the attribute information are different from that of the target base station.

With reference to FIG. 83, the wireless base station device 101A updates the initial neighboring cell information generated by the sequence shown in FIG. 62, to neighboring cell information indicating that the cell ID 2222 (wireless base station device 101B) whose carrier frequency is f1 ranks first, the cell ID 3333 (wireless base station device 101C) whose carrier frequency is f1 ranks first, the cell ID 5555 (wireless base station device 101E) whose carrier frequency is f2 ranks third, the cell ID 7777 (wireless base station device 101G) whose carrier frequency is f2 ranks third, the cell ID 4444 (wireless base station device 101D) whose carrier frequency is f3 ranks fifth, and the cell ID 6666 (wireless base station device 101F) whose carrier frequency is f3 ranks fifth.

This configuration allows the wireless base station device 101A to guide the wireless terminal device 202 to a wireless base station device using the same carrier frequency as the wireless base station device 101A, thereby facilitating measurement performed in the wireless terminal device 202.

When the wireless base station device 101A has updated the neighboring cell information, the wireless base station device 101A broadcasts the updated neighboring cell information to each wireless terminal device 202. For example, the wireless base station device 101A broadcasts, to each wireless terminal device 202, the neighboring cell information indicating N (N: an integer not smaller than 1) wireless base station devices from the highest rank, among the ranked wireless band station devices.

FIG. 84 is a diagram illustrating another example of neighboring cell information generated by the wireless base station device.

In a case where the number of wireless base station devices registerable in the neighboring cell information to be notified to each wireless terminal device 202 is limited to two, the wireless base station device 101A notifies each wireless terminal device 202 of neighboring cell information indicating that the cell ID 2222 (wireless base station device 101B) ranks first, and the cell ID 3333 (wireless base station device 101C) ranks first. In FIG. 84, all the wireless base station devices registered in the neighboring cell information rank first. In this case, the wireless base station devices may be ranked based on any other criterion.

FIG. 85 is a diagram illustrating another example of neighboring cell information generated by the wireless base station device.

Also in this modification, the neighboring cell information generation unit 12 may determine whether or not each of the plurality of wireless base station devices 101 other than the target base station should be registered in the neighboring cell information, based on whether or not the attribute indicated in the attribute information matches a predetermined attribute, without performing ranking based on the distinction of carrier frequencies. More specifically, the neighboring cell information generation unit 12 may generate neighboring cell information in which at least the wireless base station device 101 whose frequency indicated in the attribute information is different from the frequency of the radio signal transmitted from the target base station is eliminated from among the plurality of wireless base station devices 101 other than the target base station.

With reference to FIG. 85, the neighboring cell information generation unit 12 adopts, as a criterion for registration, that a wireless base station device uses the same carrier frequency as the wireless base station device 101A, and adopts, as a criterion for non-registration, that a wireless base station device uses a carrier frequency different from that of the wireless base station device 101A. In this case, the neighboring cell information generation unit 12 registers, in the neighboring cell information, the wireless base station devices 101B and 101C other than the wireless base station devices 101D, 101E, 101F, and 101G. Then, the neighboring cell information transmission unit 13 notifies each wireless terminal device 202 of the neighboring cell information.

As described above, in the wireless communication system according to the third embodiment of the present invention, the attribute information acquisition unit 11 acquires attribute information indicating the frequencies of the radio signals transmitted from the target base station and the plurality of wireless base station devices 101 other than the target base station.

In this way, by using the information indicating the carrier frequencies of the wireless base station devices as a criterion for determining which wireless base station devices should be included in the neighboring cell information, and for ranking the wireless base station devices, it is possible to generate appropriate neighboring cell information.

Further, in the wireless communication system according to the third embodiment of the present invention, the neighboring cell information generation unit 12 ranks the plurality of wireless base station devices 101 other than the target base station. In this ranking, the wireless base station devices 101 whose frequencies indicated in the attribute information are different from the frequency of the radio signal transmitted from the target base station are ranked higher than the wireless base station devices 101 whose frequencies are the same as the frequency of the target base station.

This configuration allows appropriate ranking of the wireless base station devices 101 in accordance with the distinction of carrier frequencies of the wireless base station devices. Specifically, the wireless base station device 101A is allowed to guide the wireless terminal device 202 to a wireless base station device using a carrier frequency different from that used by the wireless base station device 101A, thereby reducing interference to the wireless base station device 101A.

Moreover, in the wireless communication system according to the third embodiment of the present invention, the wireless base station device 101 whose frequency indicated in the attribute information is farther from the frequency of the radio signal transmitted from the target base station is ranked higher than the wireless base station device 101 whose frequency is closer to the frequency of the radio signal transmitted from the target base station.

This configuration allows the wireless base station device 101A to guide the wireless terminal device 202 to a wireless base station device using a carrier frequency farthest from the carrier frequency of the wireless base station device 101A, thereby further reducing interference to the wireless base station device 101A.

Further, in the wireless communication system according to the third embodiment of the present invention, the neighboring cell information generation unit 12 ranks the plurality of wireless base station devices 101 other than the target base station. In this ranking, the wireless base station devices 101 whose frequencies indicated in the attribute information are the same as the frequency of the radio signal transmitted from the target base station are ranked higher than the wireless base station devices 101 whose frequencies indicated in the attribute information are different from the frequency of the target base station.

This configuration allows appropriate ranking of the wireless base station devices 101 according to the distinction of carrier frequencies of the wireless base station devices. Specifically, the wireless base station device 101A is allowed to guide the wireless terminal device 202 to a wireless base station device using the same carrier frequency as the wireless base station device 101A, thereby facilitating measurement performed in the wireless terminal device 202.

Further, in the wireless communication system according to the third embodiment of the present invention, the neighboring cell information generation unit 12 generates neighboring cell information in which at least the wireless base station device 101 whose frequency indicated in the attribute information is the same as the frequency of the radio signal transmitted from the target base station or the wireless base station device 101 whose frequency is different from the frequency of the radio signal transmitted from the target base station is eliminated from among the plurality of wireless base station devices 101 other than the target base station.

This configuration allows appropriate elimination of wireless base station devices 101 from the neighboring cell information in accordance with the distinction of carrier frequencies of the wireless base station devices. Specifically, the wireless base station device 101A is allowed to guide the wireless terminal device 202 to a wireless base station device using a carrier frequency different from the carrier frequency of the wireless base station device 101A, thereby reducing interference to the wireless base station device 101A. Alternatively, the wireless base station device 101A is allowed to guide the wireless terminal device 202 to a wireless base station device using the same carrier frequency as the wireless base station device 101A, thereby facilitating measurement in the wireless terminal device 202.

In the wireless communication system according to the third embodiment of the present invention, the attribute information acquisition unit 11 acquires attribute information indicating the frequencies of the radio signals transmitted from the target base station and the plurality of wireless base station devices 101 other than the target base station, and the neighboring cell information generation unit 12 performs ranking or registration/non-registration of the wireless base station devices, based on the distinction between a wireless base station device using a carrier frequency different from that of the target base station and a wireless base station device using the same carrier frequency as the target base station. However, the present invention is not limited thereto. The neighboring cell information generation unit 12 may perform ranking or registration/non-registration of the wireless base station devices, based on criteria that are not related to the attribute of the target base station, such as the level (high/low) of frequency. In this case, the attribute information acquisition unit 11 need not obtain the attribute information indicating the frequency of a radio signal transmitted from the target base station.

Since other components and operations of the wireless communication system of the third embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 4>

A fourth embodiment relates to a wireless communication system in which the content of attribute information is changed from that of the wireless communication system according to the first embodiment. The wireless communication system of the fourth embodiment is identical to the wireless communication system of the first embodiment except the matters described below.

In the wireless communication system according to the fourth embodiment of the present invention, the wireless base station device 101A acquires a radio access technology (RAT) of each of the wireless base station devices shown in FIG. 86, as attribute information, from such as a result of measurement by wireless terminal devices 202.

Specifically, the attribute information acquisition unit 11 acquires attribute information indicating RATs of the target base station and the plurality of wireless base station devices 101 other than the target base station.

FIG. 86 is a diagram illustrating an example of attribute information acquired by the wireless base station device.

With reference to FIG. 86, the wireless base station device 101A acquires attribute information indicating that the RAT of the wireless base station device 101A whose cell ID is 1111 is LTE, the RAT of the wireless base station device 101B whose cell ID is 2222 is LTE, the RAT of the wireless base station device 101C whose cell ID is 3333 is LTE, the RAT of the wireless base station device 101D whose cell ID is 4444 is LTE, the RAT of the wireless base station device 101E whose cell ID is 5555 is W-CDMA, the RAT of the wireless base station device 101F whose cell ID is 6666 is LTE, and the RAT of the wireless base station device 101G whose cell ID is 7777 is W-CDMA.

Then, considering a case where a wireless terminal device 202 which does not corresponds to RATs other than LTE uses neighboring cell information, the wireless base station device 101A raises the ranks of the wireless base station devices adopting the same RAT as the wireless base station device 101A.

That is, the priority ranking in neighboring cell information is as follows: (1) a wireless base station device adopting the same RAT as the wireless base station device 101A; and (2) a wireless base station device adopting a RAT different from that used by the wireless base station device 101A.

FIG. 87 is a diagram illustrating an example of neighboring cell information generated by the wireless base station device.

With reference to FIG. 87, the wireless base station device 101A generates neighboring cell information in which the priorities of the wireless base station devices adopting the same RAT as the wireless base station device 101A are raised in the attribute information shown in FIG. 86. That is, the neighboring cell information generation unit 12 ranks the plurality of wireless base station devices 101 other than the target base station, and in the ranking, the wireless base station devices 101 whose RATs indicated in the attribute information are the same as the RAT of the target base station are ranked higher than the wireless base station devices 101 whose RATs are different from the RAT of the target base station.

Specifically, the wireless base station device 101A updates the initial neighboring cell information generated by the sequence shown in FIG. 62, to neighboring cell information indicating that the cell ID 2222 (wireless base station device 101B) adopting LTE as RAT ranks first, the cell ID 3333 (wireless base station device 101C) adopting LTE ranks first, the cell ID 4444 (wireless base station device 101D) adopting LTE ranks first, the cell ID 6666 (wireless base station device 101F) adopting LTE ranks first, the cell ID 5555 (wireless base station device 101E) adopting W-CDMA ranks fifth, and the ell ID 7777 (wireless base station device 101G) adopting W-CDMA ranks fifth.

This configuration allows the wireless base station device 101A to guide a wireless terminal device 202 to a wireless base station device adopting the same RAT as the wireless base station device 101A, thereby achieving stable operation in the wireless communication system.

When the wireless base station device 101A has updated the neighboring cell information, the wireless base station device 101A broadcasts the updated neighboring cell information to each wireless terminal device 202. For example, the wireless base station device 101A broadcasts, to each wireless terminal device 202, the neighboring cell information indicating N (N: an integer not smaller than 1) wireless base station devices from the highest rank, among the ranked wireless band station devices.

FIG. 88 is a diagram illustrating another example of neighboring cell information generated by the wireless base station device.

In a case where the number of wireless base station devices registerable in the neighboring cell information to be notified to each wireless terminal device 202 is limited to four, the wireless base station device 101A notifies each wireless terminal device 202 of neighboring cell information indicating that the cell ID 2222 (wireless base station device 101B) ranks first, the cell ID 3333 (wireless base station device 101C) ranks first, the cell ID 4444 (wireless base station device 101D) ranks first, and the cell ID 6666 (wireless base station device 101F) ranks first. In FIG. 88, all the wireless base station devices registered in the neighboring cell information rank first. In this case, the wireless base station devices may be ranked based on any other criterion.

FIG. 89 is a diagram illustrating another example of neighboring cell information generated by the wireless base station device.

In the wireless communication system according to the fourth embodiment of the present invention, the neighboring cell information generation unit 12 ranks the plurality of wireless base station devices 101 other than the target base station based on the attribute information acquired by the attribute information acquisition unit 11, and generates neighboring cell information based on the result of the ranking. However, the present invention is not limited thereto.

The neighboring cell information generation unit 12 may determine whether or not each of the plurality of wireless base station devices 101 other than the target base station should be registered in the neighboring cell information, based on whether or not the attribute indicated in the attribute information matches a predetermined attribute, without performing ranking based on the distinction of RATs. More specifically, the neighboring cell information generation unit 12 may generate neighboring cell information in which at least the wireless base station device 101 whose RAT indicated in the attribute information is different from the RAT of the target base station or the wireless base station device 101 whose RAT indicated in the attribute information is the same as that of the target base station is eliminated from among the plurality of wireless base station devices 101 other than the target base station.

Further, in the wireless communication system according to the fourth embodiment of the present invention, the attribute information acquisition unit 11 acquires attribute information indicating the RATs of the target base station and the plurality of wireless base station devices 101 other than the target base station. However, the present invention is not limited thereto. Further, the neighboring cell information generation unit 12 performs ranking or registration/non-registration of the wireless base station devices, based on the distinction between a wireless base station device adopting the same RAT as the target base station and a wireless base station device adopting a RAT different from that of the target base station. However, the present invention is not limited thereto. The neighboring cell information generation unit 12 may perform ranking or registration/non-registration of wireless base station devices, based on criteria that are not related to the attribute of the target base station, such as the level (high/low) of communication performance. In this case, the attribute information acquisition unit 11 need not obtain the attribute information indicating the RAT of the target base station.

When comparing LTE and W-CDMA, LTE, the later technology, provides higher communication performance such as throughput. Therefore, the wireless base station devices adopting the later technology may be ranked higher.

Specifically, with reference to FIG. 89, the neighboring cell information generation unit 12 adopts, as a criterion for registration, that a wireless base station device uses LTE, and adopts, as a criterion for non-registration, that a wireless base station device uses W-CDMA. In this case, the neighboring cell information generation unit 12 registers, in the neighboring cell information, the wireless base station devices 101B, 101C, 101D, and 101F other than the wireless base station devices 101E and 101G. Then, the neighboring cell information transmission unit 13 notifies each wireless terminal device 202 of the neighboring cell information.

As described above, in the wireless communication system according to the fourth embodiment of the present invention, the attribute information acquisition unit 11 acquires attribute information indicating the RATs of the target base station and the plurality of wireless base station devices 101 other than the target base station.

By using the information indicating the RATs of the wireless base station devices as a criterion for determining which wireless base station devices should be included in the neighboring cell information, and for ranking the wireless base station devices, it is possible to generate appropriate neighboring cell information.

Further, in the wireless communication system according to the fourth embodiment of the present invention, the neighboring cell information generation unit 12 ranks the plurality of the wireless base station devices 101 other than the target base station. In the ranking, the wireless base station devices 101 whose RATs indicated in the attribute information are the same as the RAT of the target base station are ranked higher than the wireless base station devices 101 whose RATs indicated in the attribute information are different from the RAT of the target base station.

This configuration allows appropriate ranking of the wireless base station devices 101 based on the distinction of carrier frequencies of the wireless base station devices. Specifically, the wireless base station device 101A is allowed to guide a wireless terminal device 202 to a wireless base station device adopting the same RAT as the wireless base station device 101A, thereby achieving stable operation in the wireless communication system.

Further, in the wireless communication system according to the fourth embodiment of the present invention, the neighboring cell information generation unit 12 generates neighboring cell information in which at least the wireless base station device 101 whose RAT indicated in the attribute information is different from the RAT of the target base station or the wireless base station device 101 whose RAT indicated in the attribute information is the same as the RAT of the target base station is eliminated from among the plurality of wireless base station devices 101 other than the target base station.

This configuration allows appropriate elimination of wireless base station devices 101 from the neighboring cell information in accordance with the distinction of RATs of the wireless base station devices.

In the wireless communication system according to the fourth embodiment of the present invention, the neighboring cell information generation unit 12 generates the neighboring cell information in which the priorities of the wireless base station devices 101 adopting the same RAT as the target base station are raised. However, the present invention is not limited thereto. The neighboring cell information generation unit 12 may rank the wireless base station devices 101 other than the target base station such that the wireless base station device 101 whose RAT indicated in the attribute information is different from the RAT of the target base station is ranked higher than the wireless base station device 101 whose RAT indicated in the attribute information is the same as the RAT of the target base station.

This configuration allows appropriate ranking of the wireless base station devices 101 in accordance with the distinction of RATs of the wireless base station devices, under the situation that the wireless base station device whose RAT is different from the RAT of the target base station should be preferentially registered in the neighboring cell information.

Since other components and operations of the wireless communication system of the fourth embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 5>

A fifth embodiment relates to a wireless communication system in which, instead of a wireless base station device, a gateway device serves as a neighboring cell processing device, in contrast to the wireless communication systems according to the first to fourth embodiments. The wireless communication system of the fifth embodiment is identical to the wireless communication systems of the first to fourth embodiments except the matters described below.

Figure 90:
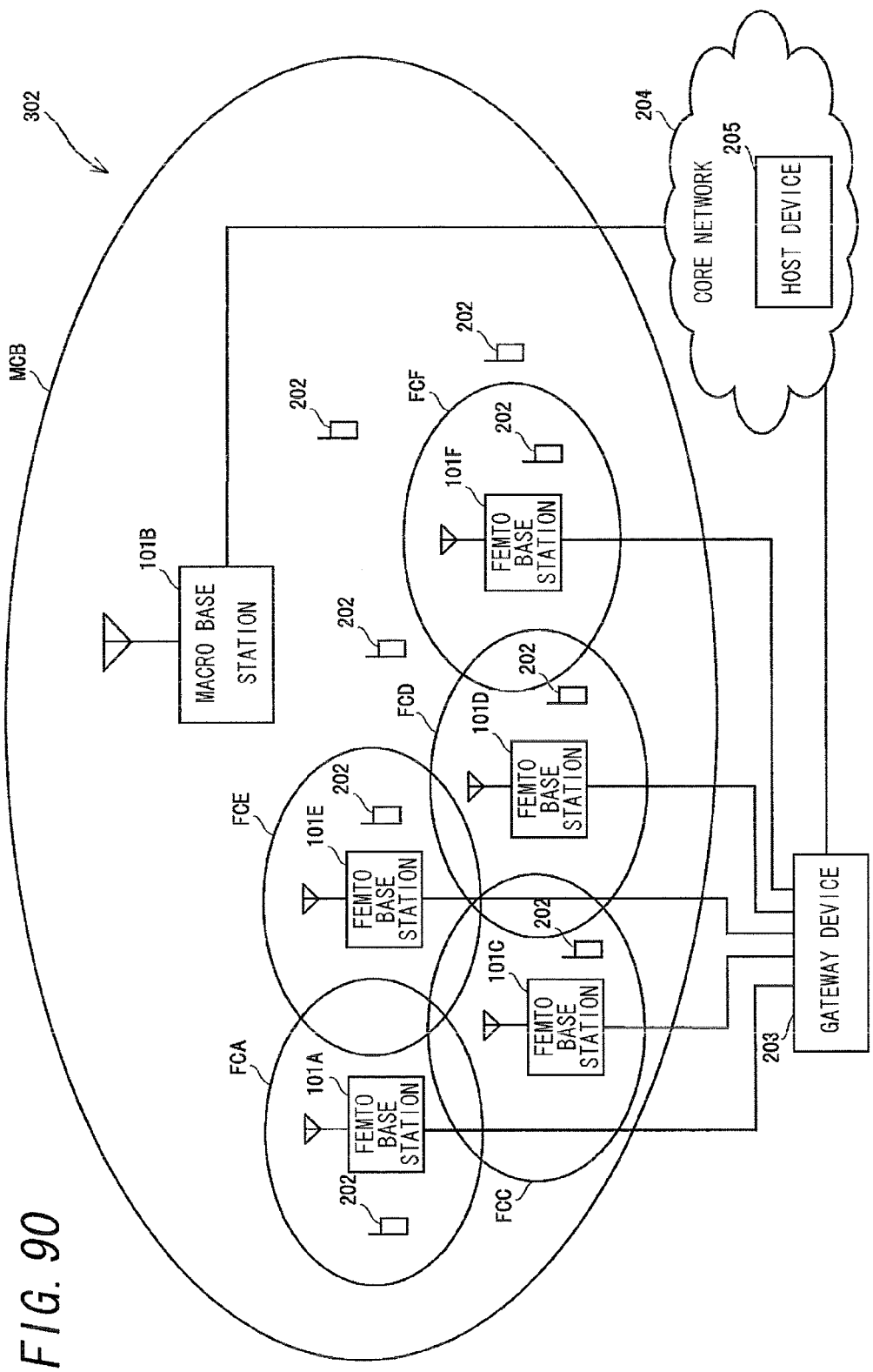
FIG. 90 is a diagram illustrating the configuration of a wireless communication system according to a fifth embodiment of the present invention (Chapter 3).

FIG. 90 is a diagram illustrating the configuration of the wireless communication system according to the fifth embodiment of the present invention.

With reference to FIG. 90, the wireless communication system 302 includes wireless base station devices 101A, 101B, 101C, 101D, 101E, and 101F, a gateway device 203, and a host device 205.

In the wireless communication system 302, as in the wireless communication system 301, the wireless base station devices 101A, 101C, 101D, 101E, and 101F are femto base stations, and the wireless base station device 101B is a macro base station.

Hereinafter, each of the wireless base station devices 101A, 101C, 101D, 101E, and 101F is sometimes referred to as a femto base station 101. Although one macro base station and five femto base stations are representatively shown in FIG. 90, less or more macro base stations and femto base stations may be provided.

The gateway device 203 performs, for example, a process of relaying various kinds of communication data transmitted between each of the wireless base station devices 101A, 101C, 101D, 101E, and 101F, and the host device 205 in the core network 204.

Figure 91:
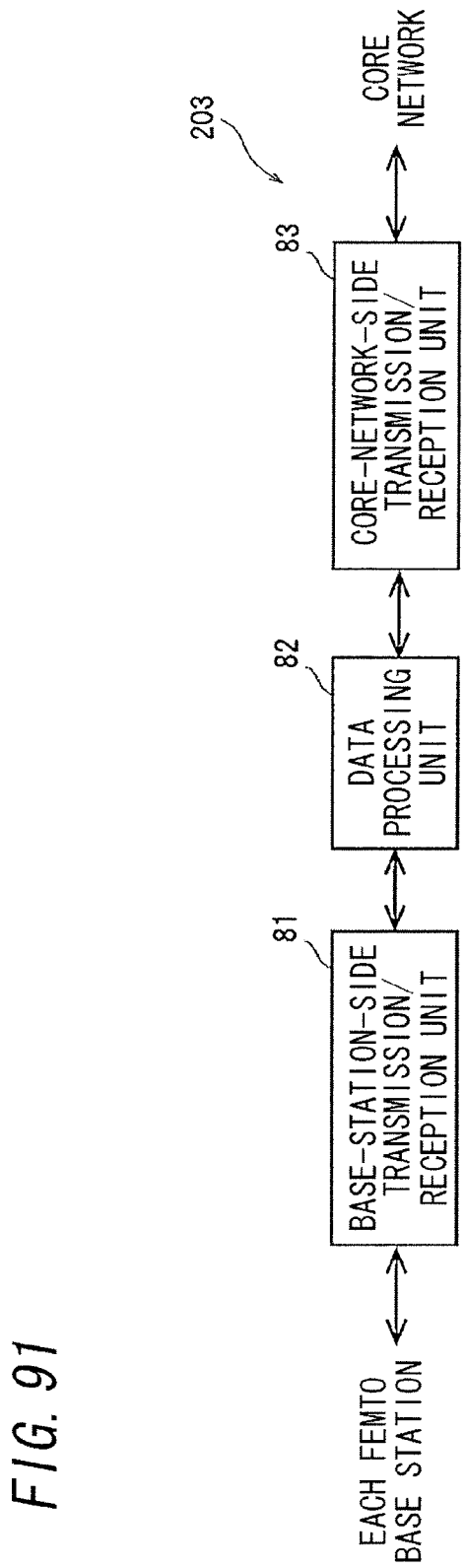
FIG. 91 is a diagram illustrating the configuration of a gateway device according to the fifth embodiment of the present invention (Chapter 3).

FIG. 91 is a diagram illustrating the configuration of the gateway device according to the fifth embodiment of the present invention.

With reference to FIG. 91, the gateway device 203 includes a base-station-side transmission/reception unit 81, a data processing unit 82, and a core-network-side transmission/reception unit 83.

The base-station-side transmission/reception unit 81 transmits communication data provided from the data processing unit 82 to each femto base station 101, and outputs communication data received from each femto base station 101 to the data processing unit 82.

The data processing unit 82 performs various kinds of processing on the communication data provided from the base-station-side transmission/reception unit 81, and outputs the processed communication data to the core-network-side transmission/reception unit 83. Further, the data processing unit 82 performs various kinds of processing on the communication data provided from the core-network-side transmission/reception unit 83, and outputs the processed communication data to the base-station-side transmission/reception unit 81.

The core-network-side transmission/reception unit 83 outputs the communication data provided from the data processing unit 82 to the host device 205 in the core network 204, and outputs communication data received from the host device 205 in the core network 204 to the data processing unit 82.

In the wireless communication system according to the fifth embodiment of the present invention, the gateway device 203 monitors the subordinate femto base stations, and optimizes neighboring cell information.

Figure 92:
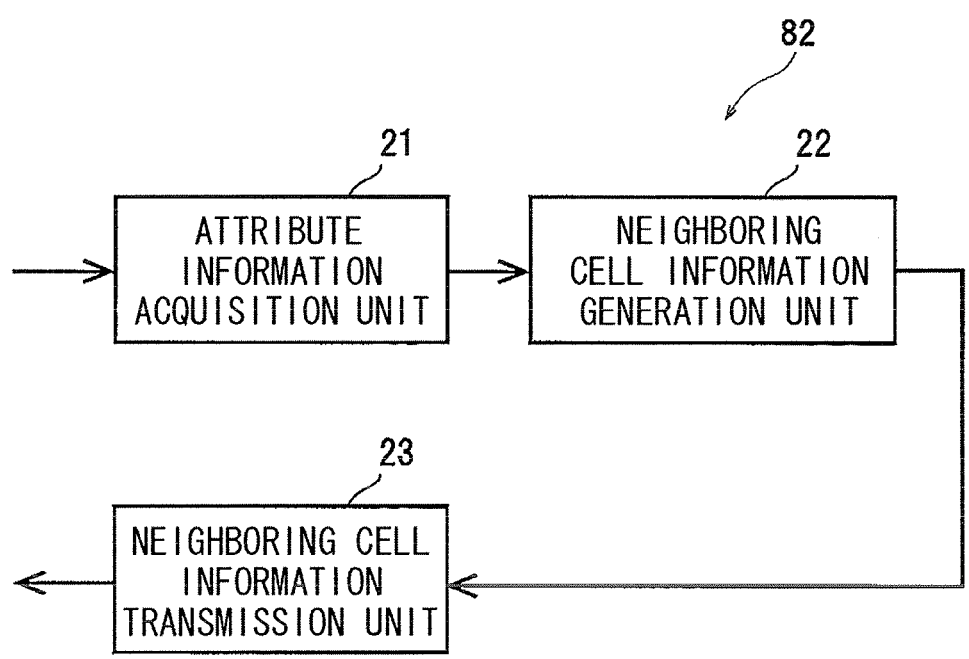
FIG. 92 is a diagram illustrating the configuration of a data processing unit in the gateway device according to the fifth embodiment of the present invention (Chapter 3).

FIG. 92 is a diagram illustrating the configuration of the data processing unit in the gateway device according to the fifth embodiment of the present invention.

With reference to FIG. 92, the data processing unit 82 includes an attribute information acquisition unit 21, a neighboring cell information generation unit 22, and a neighboring cell information transmission unit 23.

The attribute information acquisition unit 21 acquires attribute information indicating attributes of at least the wireless base station devices 101 other than the target base station, based on information provided from each femto base station 101.

Based on the attribute information acquired by the attribute information acquisition unit 21, the neighboring cell information generation unit 22 generates neighboring cell information indicating one or a plurality of wireless base station devices located in the neighborhood of the target femto base station, among the plurality of femto base stations other than the target femto base station, in the wireless communication system 302.

The neighboring cell information transmission unit 23 transmits the neighboring cell information generated by the neighboring cell information generation unit 22 to the target femto base station.

The content of a method of generating neighboring cell information by the neighboring cell information generation unit 22 is identical to, for example, the method of generating neighboring cell information by the neighboring cell information generation unit 12 according to any of the first to fourth embodiments of the present invention.

Figure 93:
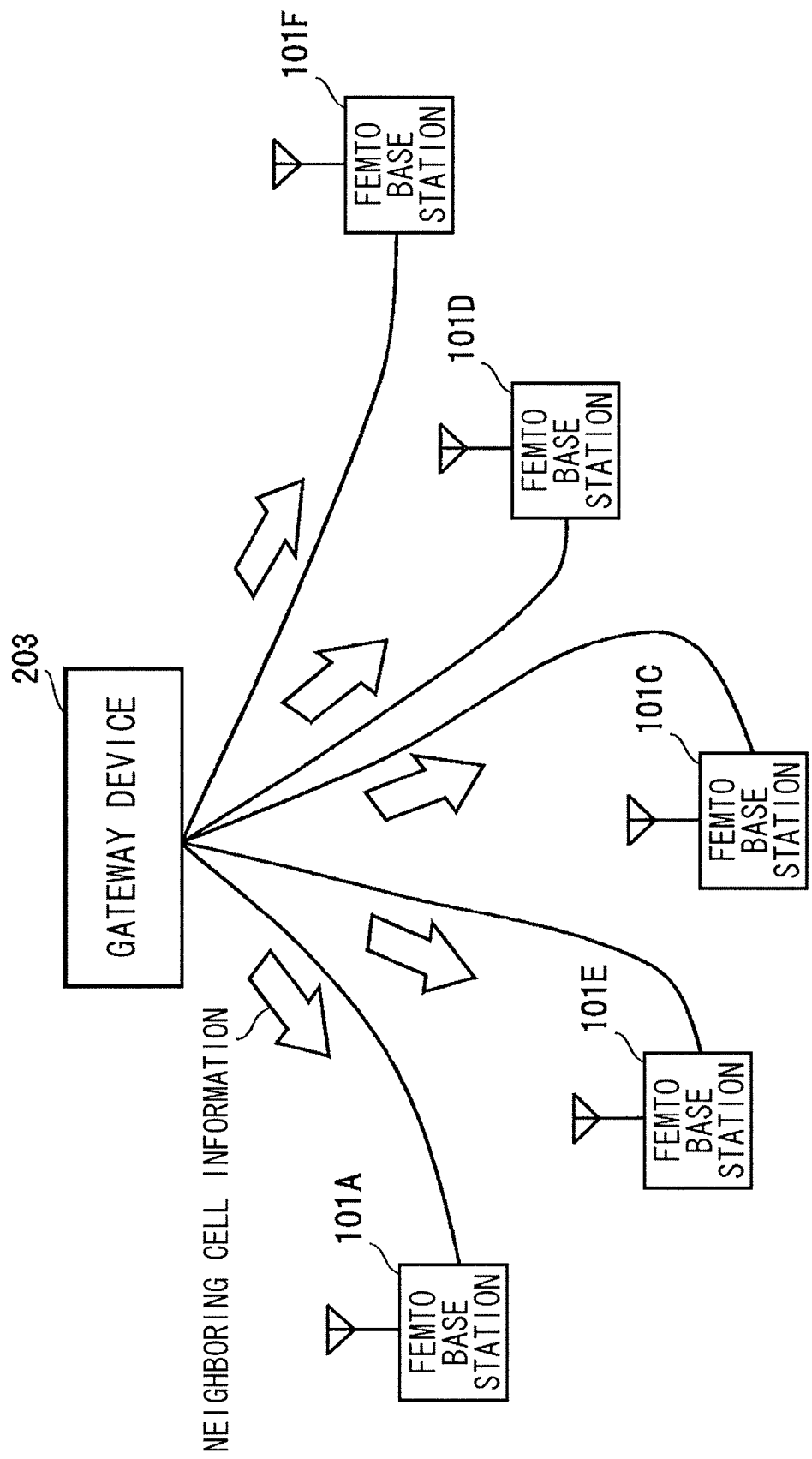
FIG. 93 is a diagram illustrating a method in which the gateway device according to the fifth embodiment of the present invention (Chapter 3) notifies neighboring cell information.

FIG. 93 is a diagram illustrating a method in which the gateway device according to the fifth embodiment of the present invention notifies neighboring cell information.

With reference to FIG. 93, the gateway device 203 notifies the femto base stations 101A, 101C, 101D, 101E, and 101F of the corresponding neighboring cell information.

Although the gateway device according to the fifth embodiment of the present invention is provided separately from the wireless base station devices, the present invention is not limited thereto. The gateway device 203 may be included in at least one of the wireless base station devices in the wireless communication system 302. In this case, the wireless base station device equipped with the gateway device 203 acquires attribute information, based on information provided from wireless terminal devices 202 existing in its cell and information provided from other wireless base station devices. Then, the gateway device 203 notifies the wireless terminal devices 202 existing in its cell and the other femto base stations of the generated neighboring cell information.

Further, in the wireless communication systems according to the first to fifth embodiments of the present invention, based on the attribute information acquired by the attribute information acquisition unit, the neighboring cell information generation unit generates neighboring cell information indicating one or a plurality of wireless base station devices located in the neighborhood of the target base station, among the plurality of wireless base station devices other than the target base station. However, the present invention is not limited thereto. The neighboring cell information generation unit may generate the neighboring cell information, based on a combination of handover information indicating the handover operation history of the wireless terminal devices and measurement information indicating the measurement result of the radio signals transmitted from the wireless base station devices, in addition to the attribute information indicating the attributes of the wireless base station devices. The handover information may be, for example, the number of times of handover or the handover success rate. The measurement information may be, for example, the reception level, the number of times the presence of each wireless base station device is detected, or the detection rate.

Further, in the first to fourth embodiments of the present invention, instead of the wireless base station device 101, the host device 205 may serve as the neighboring cell processing device, like the gateway device according to the fifth embodiment, the host device 205.

Since other components and operations of the wireless communication system of the fifth embodiment are identical to those of the wireless communication systems of the first to fourth embodiments, repeated description is not necessary.

When a wireless base station device has a plurality of sectors, that is, when one cell is divided into a plurality of sectors, one sector may be treated as one wireless base station device in neighboring cell information. The present invention is also applicable to such a case.

The embodiments disclosed in Chapter 3 are to be considered in all respects as illustrative and not restrictive. The scope of the present invention is indicated by the appended claims rather than by the foregoing meaning, and all changes which come within the meaning and range of equivalency of the claims are therefore intended to be embraced therein.

Further, the reference characters used in Chapter 3 are exclusively used in Chapter 3, and are not related to the reference characters in other chapters.

Description of the Reference Characters
11, 21 attribute information acquisition unit
12, 22 neighboring cell information generation unit
13, 23 neighboring cell information transmission unit
14 power measurement indication unit
81 base-station-side transmission/reception unit
82 data processing unit
83 core-network-side transmission/reception unit
91 antenna
92 circulator
93 wireless reception unit
94 wireless transmission unit
95 signal processing unit
96 reception signal processing unit
97 transmission signal processing unit
101A, 101B, 101C, 101D, 101E, 101F, 101G wireless base station device
202 wireless terminal device
203 gateway device
205 host device
301 wireless communication system
FCA, FCC, FCD, FCE, FCF femto cell
MCB, MCG macro cell <<Chapter 4>>

Hereinafter, embodiments of the present invention will be described with reference to the drawings. In Chapter 4, the same or corresponding components are given the same reference characters, and are not repeatedly described.

<Embodiment 1>

A wireless base station device notifies wireless terminal devices of information relating to its own cell and neighboring cells, i.e., the frequency of its radio signal, IDs (identifications) of neighboring cells, and the like. Based on the information notified from the wireless base station device, each wireless terminal device detects and measures the neighboring cells. Based on the measurement result, the wireless terminal device starts to move to a neighboring cell. Here, "movement" of a wireless terminal device means "handover", and "selection" of a cell through which a wireless terminal device in the idle state will start communication, i.e., phone call or data communication.

For example, when a wireless terminal device is communicating with a wireless base station device, a destination of the wireless terminal device is determined by the wireless base station device or a host device in a core network. When a wireless terminal device is not communicating with a wireless base station device, a destination of the wireless terminal device is determined by the wireless terminal device.

In 3GPP (Third Generation Partnership Project) SPEC TS22.220, a femto cell and its access modes are described as follows. That is, a femto base station is a CPE (Customer Premise Equipment) that connects a wireless terminal device over a wireless interface to a mobile communication carrier network by using an IP backhaul.

Further, a femto base station in the closed access mode provides services to only its associated CSG (Closed Subscriber Group) members. A femto base station in the hybrid mode provides services to its associated CSG members and to non-CSG members. A femto base station in open access mode operates as a normal base station.

Such a definition based on 3GPP may be applied to the wireless communication system according to the first embodiment of the present invention.

Further, the following definition may be applied in combination with or separately from the above definition.

A macro base station is a wireless base station device under the control of a telecommunication carrier, with which wireless base station devices that subscribe to the telecommunication carrier are communicable. Further, it is considered that a macro base station is basically not powered off.

On the other hand, a femto base station is a wireless base station device which is mainly installed in a personal or corporate building, and is likely to be moved or powered off depending on user's circumstances.

Further, a femto base station operates in any of the open, hybrid, and closed access modes. When the femto base station operates in the closed access mode, only registered members (terminals) are allowed to access the femto base station. When the femto base station operates in the closed access mode, the femto base station provides services to only the registered members. When the femto base station operates in the hybrid mode, the femto base station provides services to both the registered members and unregistered members (non-members). When the femto base station operates in the open access mode, the femto base station operates in the same manner as a macro base station.

FIG. 94 is a diagram illustrating the relationship between the access modes of a femto base station according to the first embodiment of the present invention, and wireless terminal devices that are allowed to access the femto base station.

With reference to FIG. 94, the femto base station according to the first embodiment of the present invention has the three access modes. Specifically, in the closed access mode, only registered wireless terminal devices are allowed to access the femto base station. In the open access mode, all wireless terminal devices are allowed to access the femto base station, and therefore, the femto base station is identical to a normal macro base station. In the hybrid mode, all wireless terminal devices are allowed to access the femto base station. In the hybrid mode, however, members, i.e., registered wireless terminal devices, may be treated preferentially over non-members, i.e., unregistered wireless terminal devices, in communication resource allocation, accounting, and the like.

That is, the femto base station according to the first embodiment of the present invention is configurable to operate in any of the following access modes: the open access mod in which all wireless terminal devices are allowed to access the femto base station; the closed access mode in which wireless terminal devices can be registered and only the registered wireless terminal devices are allowed to access the femto base station; and the hybrid mode in which wireless terminal devices can be registered and both the registered wireless terminal devices and unregistered wireless terminal devices are allowed to access the femto base station.

It is defined in 3GPP that, in a cell in the closed access mode, wireless terminal devices autonomously detect neighboring cells. In a macro cell in the open access mode, when a telecommunication carrier systematically installs a wireless base station device, the telecommunication carrier grasps information relating to neighboring macro cells, and the information is set in the wireless base station device at the time of installation or maintenance of the wireless base station device.

By the way, since a user is allowed to install a femto base station in any place, it is difficult for the femto base station to grasp its present location. Therefore, it is also difficult for the femto base station to acquire information of neighboring cells.

As described above, a femto cell detection method and a movement method of wireless terminal devices in a cell in the closed access mode are defined in 3GPP. However, when a wireless terminal device moves from a macro cell or a femto cell to a macro cell or a femto cell in the open access mode, a wireless base station device as a movement source needs to notify the wireless terminal device of information of a wireless base station device as a movement destination.

Since a user of a femto base station is allowed to determine where to use the femto base station, the femto base station is likely to be moved and powered on/off, which causes the following two problems. That is, since the femto base station cannot grasp its present location, it is difficult for the femto base station to acquire information of neighboring cells by using an OAM function (maintenance function). Further, when a femto base station exists in the neighborhood of a wireless base station device and the femto base station is powered off, a wireless terminal device cannot move to the femto base station, and therefore, needs to detect on/off of the power of the femto base station.

If a femto base station can specify its present location by using a GPS (Global Positioning System) or the like, the femto base station may make an inquiry at the telecommunication carrier network to obtain information of geographically close cells. However, from the viewpoint of accuracy, it is difficult to specify the exact location.

[Configuration and Fundamental Operation]

Figure 95:
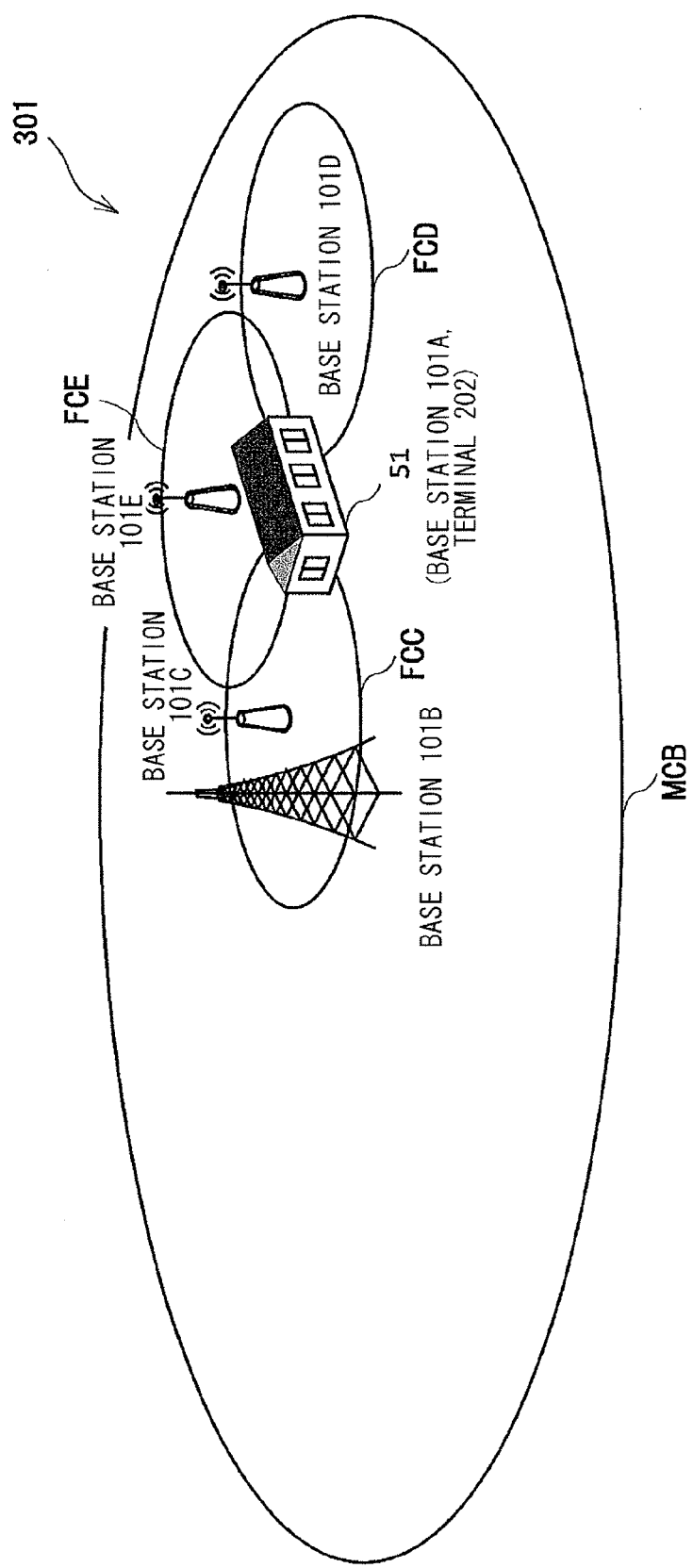
FIG. 95 is a diagram illustrating an example of arrangement of wireless base station devices in a wireless communication system according to the first embodiment of the present invention (Chapter 4).

FIG. 95 is a diagram illustrating an example of arrangement of wireless base station devices in a wireless communication system according to the first embodiment of the present invention.

With reference to FIG. 95, a wireless communication system 301 is a mobile communication system based on LTE (Long Term Evolution) standardized by, for example, 3GPP, and includes wireless base station devices 101A, 101B, 101C, 101D, and 101E. In a building 51, the wireless base station device 101A is installed, and a wireless terminal device 202 exists.

In the wireless communication system 301, the wireless base station devices 101A, 101C, 101D, and 101E are femto base stations, and the wireless base station device 101B is a macro base station.

The wireless base station device 101B forms a macro cell MCB having a radius of several kilometers. The wireless base station devices 101A, 101C, 101D, and 101E form femto cells FCA, FCC, FCD, and FCE, respectively, each having a radius of several tens of meters.

In the present embodiment, it is assumed that a plurality of femto base stations exist in the macro cell formed by the macro base station 101B.

The wireless base station device 101R is allowed to communicate with wireless terminal devices 202 existing in the macro cell MCB by transmitting/receiving radio signals to/from the wireless terminal devices 202.

The wireless base station devices 101A, 101C, 101D, and 101E are installed in places such as homes and underground malls where it is difficult for wireless terminal devices 202 to receive a radio signal from the wireless base station device 101B, and are allowed to communicate with wireless terminal devices 202 existing in the femto cells FCA, FCC, FCD, and FCE, respectively, by transmitting/receiving radio signals to/from the wireless terminal devices 202.

In FIG. 95, the femto cells FCC and FCE formed by the wireless base station devices 101C and 101E partially overlap each other. Further, the femto cells FCE and FCD formed by the wireless base station devices 101E and 101D partially overlap each other. Further, the wireless base station devices 101A, 101C, 101D, and 101E are located in the macro cell MCB formed by the wireless base station device 101B. The building 51 is located in the macro cell MCB, and partially in the femto cells FCC, FCD, and FCE.

Figure 96:
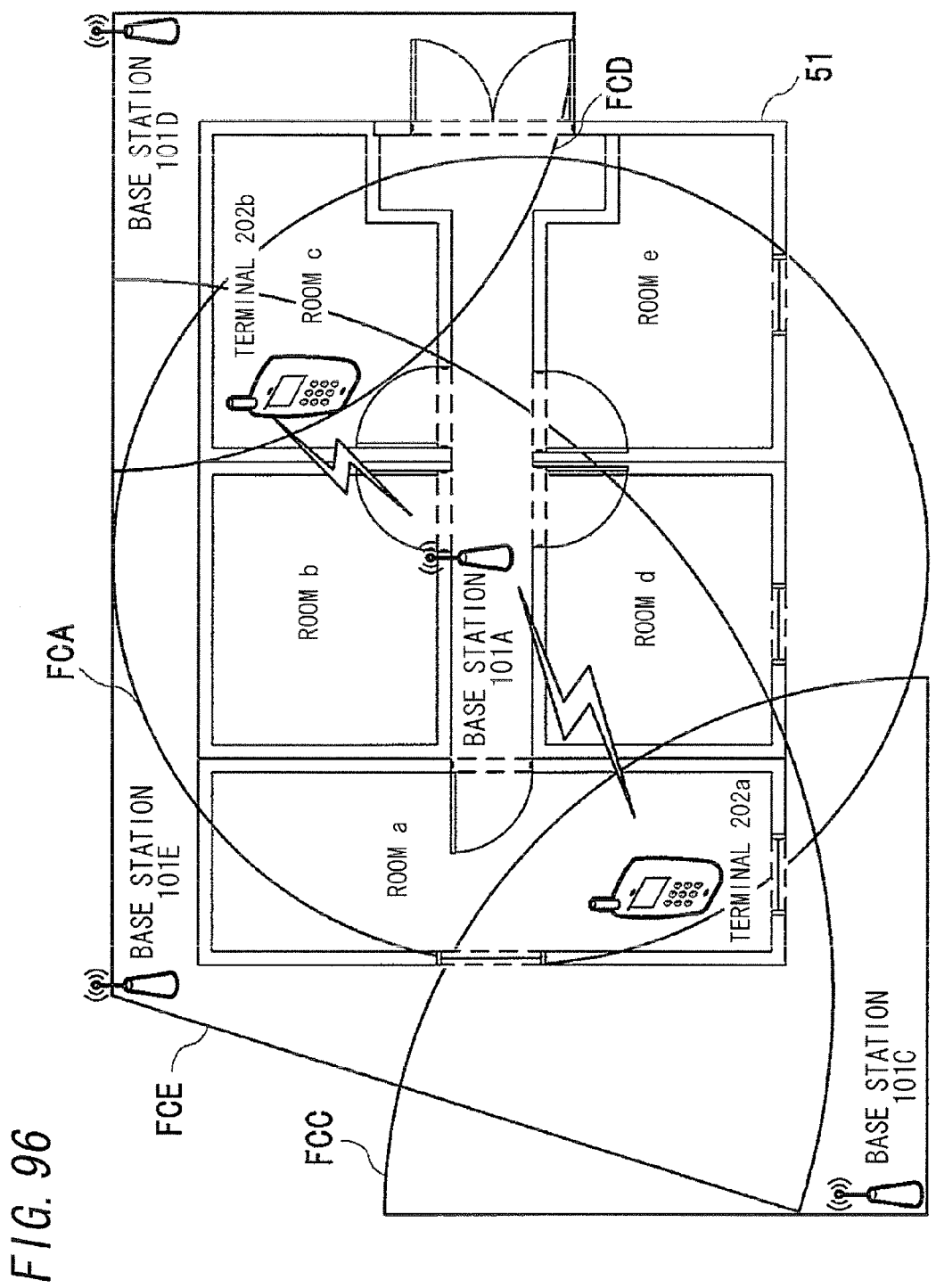
FIG. 96 is a diagram illustrating in detail an example of arrangement of wireless base station devices in the wireless communication system according to the first embodiment of the present invention (Chapter 4).

FIG. 96 is a diagram specifically illustrating an example of arrangement of wireless base station devices in the wireless communication system according to the first embodiment of the present invention.

With reference to FIG. 96, the building 51 has rooms a, b, c, d, and e, and almost the entire regions of the rooms a, b, c, d, and e are within the range of the wireless base station device 101A. At present, a wireless terminal device 202a and a wireless terminal device 202b exist in the room a and the room c, respectively, and are communicating with the wireless base station device 101A. Further, the wireless terminal device 202a exists in the ranges of the wireless base station devices 101B, 101C, and 101E, and the wireless terminal device 202b exists in the ranges of the wireless base station devices 101B, 101D, and 101E.

The femto cell FCA partially overlaps with each of the femto cells FCC, FCD, and FCE. The wireless terminal device 202a communicating with the wireless base station device 101A is located in the femto cells FCA, FCC, and FCE, and is allowed to receive radio signals from the wireless base station devices 101A, 101C, and 101E. Further, the wireless terminal device 202b communicating with the wireless base station device 101A is located in the femto cells FCA, FCD, and FCE, and is allowed to receive radio signals from the wireless base station devices 101A, 101D, and 101E.

In the wireless communication system according to the first embodiment of the present invention, each of the wireless base station devices 101A, 101B, 101C, 101D, and 101E operates as a neighboring cell processing device. That is, each of the wireless base station devices 101A, 101B, 101C, 101D, and 101E solely performs optimization of neighboring cell information.

Hereinafter, each of the wireless base station devices 101A, 101B, 101C, 101D, and 101E is sometimes referred to as a wireless base station device 101. Although one macro base station and four femto base stations are representatively shown in FIGS. 95 and 96, less or more macro base stations and femto base stations may be provided.

FIG. 97 is a diagram illustrating the attributes of the respective wireless base station devices in the wireless communication system shown in FIG. 95.

With reference to FIG. 97, in the wireless communication system 301, the wireless base station device 101A has a cell ID of 1111, operates in the hybrid mode, and has a CSG (Closed Subscriber Group) ID of 7777. The wireless base station device 101B has a cell ID of 2222, is a macro base station, and has no CSG ID. The wireless base station device 101C has a cell ID of 3333, operates in the open access mode, and has no CSG ID. The wireless base station device 101D has a cell ID of 4444, operates in the hybrid mode, and has a CSG ID of 8888. The wireless base station device 101E has a cell ID of 5555, operettas in the closed access mode, and has a CSG ID of 8888.

The CSG IDs are assigned to the wireless terminal devices 202 and the wireless base station devices 101 in the closed access mode and the hybrid mode. The CSG ID allows each wireless terminal device 202 to recognize whether it is a member or a non-member for a certain wireless base station device 101.

That is, each wireless base station device 101 as a femto base station is configurable to operate in any of the following access modes: the open access mode in which all wireless terminal devices 202 are allowed to access the wireless base station device 101; the closed access mode in which the wireless base station device 101 belongs to a set CSG, and wireless terminal devices 202 that belong to the same CSG are allowed to access the wireless base station device 101; and the hybrid mode in which the wireless base station device 101 belongs to a set CSG, and wireless terminal devices 202 that belong to the same CSG and wireless terminal devices 202 that belong to different CSGs are both allowed to access the wireless base station device 101.

Figure 98:
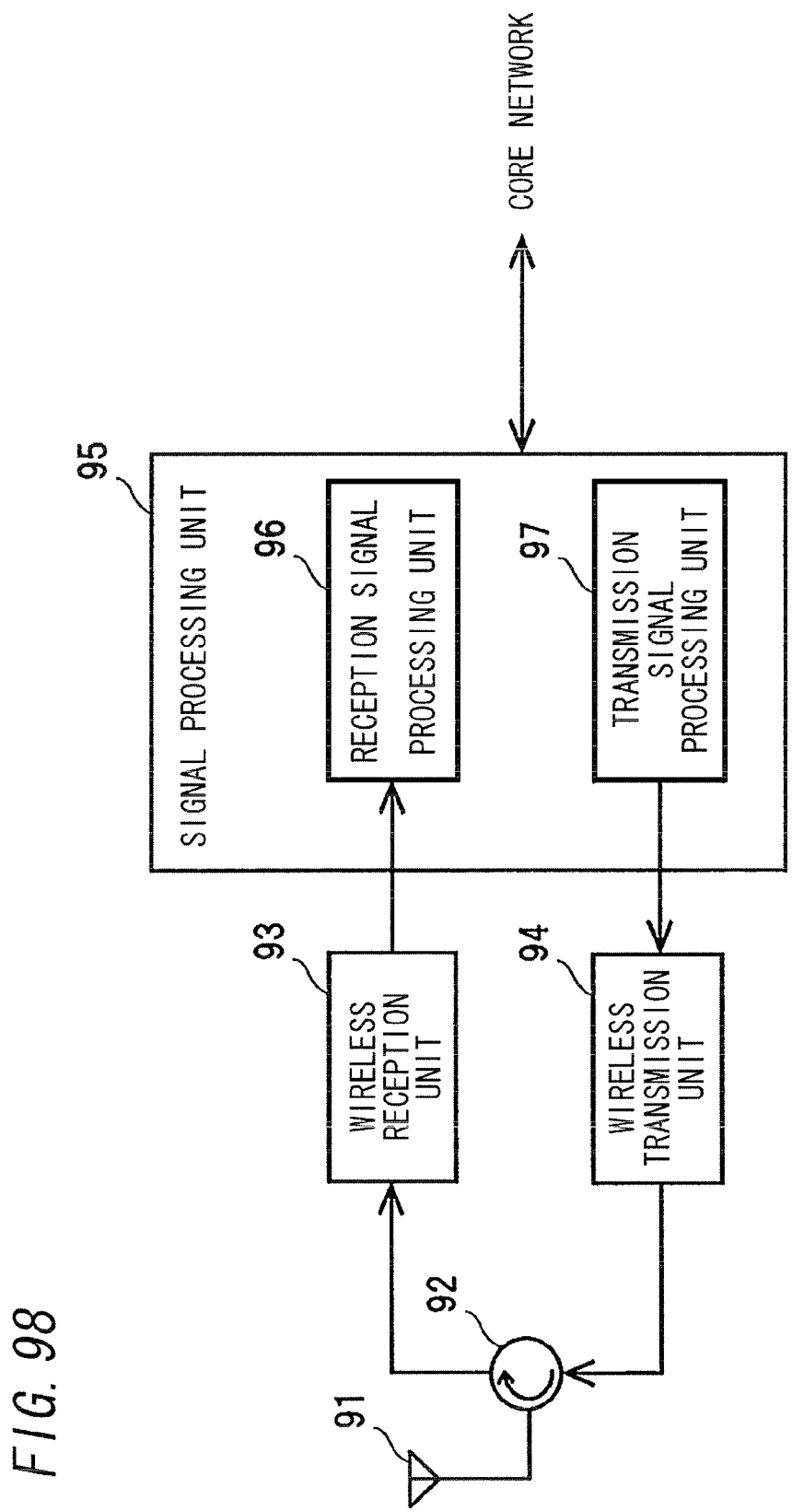
FIG. 98 is a diagram illustrating the configuration of a wireless base station device according to the first embodiment of the present invention (Chapter 4).

FIG. 98 is a diagram illustrating the configuration of a wireless base station device according to the first embodiment of the present invention.

With reference to FIG. 98, the wireless base station device 101 includes an antenna 91, a circulator 92, a wireless reception unit 93, a wireless transmission unit 94, and a signal processing unit 95. The signal processing unit 95 includes a reception signal processing unit 96 and a transmission signal processing unit 97. The signal processing unit 95 is implemented by a CPU (Central Processing Unit), a DSP (Digital Signal Processor), or the like.

The circulator 92 outputs a radio signal transmitted from the wireless terminal device 202 and received by the antenna 91, to the wireless reception unit 93, and outputs a radio signal provided from the wireless transmission unit 94, to the antenna 91.

The wireless reception unit 93 frequency-converts the radio signal provided from the circulator 92 into a base band signal or an IF (Intermediate Frequency) signal, converts the frequency-converted signal into a digital signal, and outputs the digital signal to the reception signal processing unit 96.

The reception signal processing unit 96 subjects the digital signal provided from the wireless reception unit 93 to signal processing such as reverse spreading in CDMA (Code Division Multiple Access), converts a part or the entirety of the processed digital signal into a predetermined frame format, and outputs the resultant signal to the core network.

The transmission signal processing unit 97 converts communication data received from the core network into a predetermined frame format, or generates communication data, and subjects the converted or generated communication data to signal processing such as IFFT (Inverse Fast Fourier Transform) in OFDM (Orthogonal Frequency Division Multiplex), and then outputs a digital signal obtained by the signal processing to the wireless transmission unit 94.

The wireless transmission unit 94 converts the digital signal provided from the transmission signal processing unit 97 into an analog signal, frequency-converts the analog signal into a radio signal, and outputs the radio signal to the circulator 92.

Figure 99:
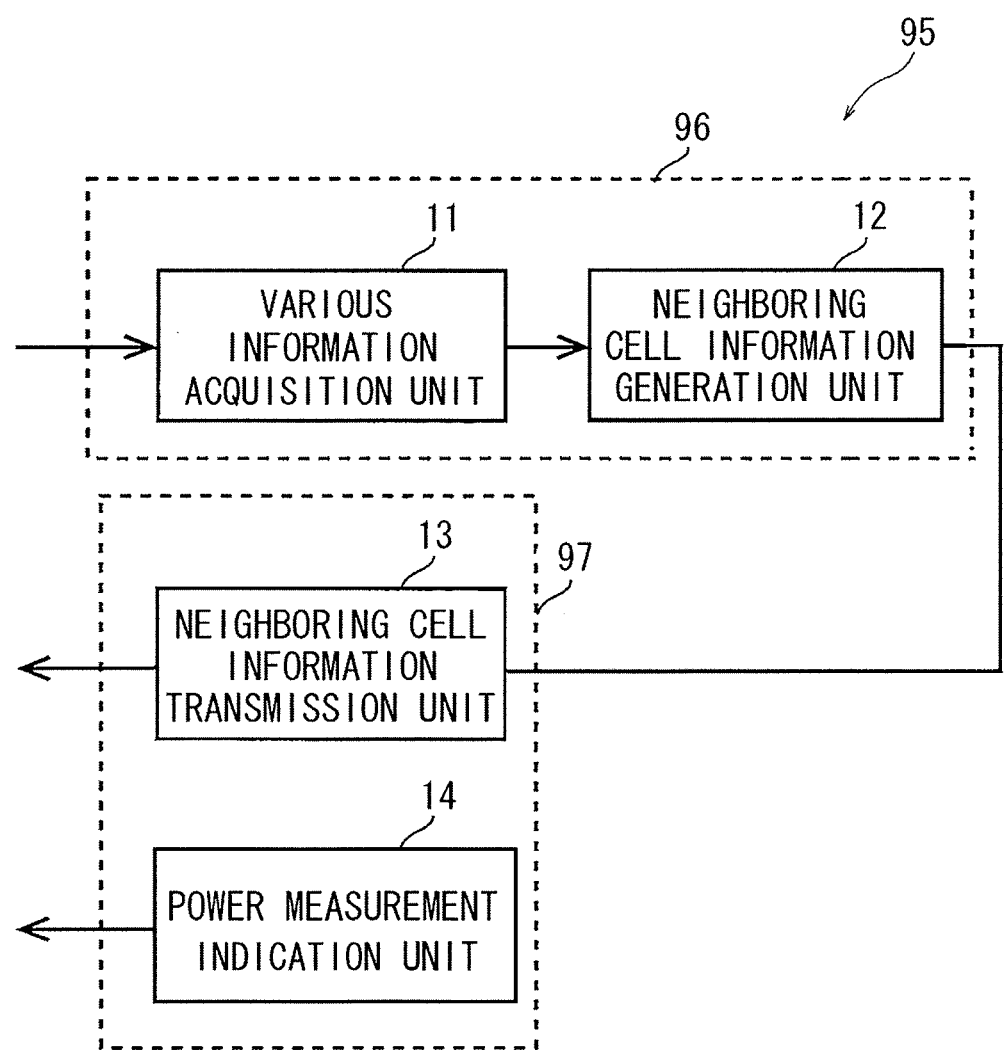
FIG. 99 is a diagram illustrating the configuration of a signal processing unit according to the first embodiment of the present invention (Chapter 4).

FIG. 99 is a diagram illustrating the configuration of the signal processing unit according to the first embodiment of the present invention.

With reference to FIG. 99, the reception signal processing unit 96 includes a various information acquisition unit 11, and a neighboring cell information generation unit 12. The transmission signal processing unit 97 includes a neighboring cell information transmission unit 13 and a power measurement indication unit 14.

The various information acquisition unit 11 acquires various kinds of information required for generation of neighboring cell information. For example, the various information acquisition unit 11 acquires the various kinds of information based on information provided from at least either of other wireless base station devices 101 or the wireless terminal devices 202.

Based on the information acquired by the various information acquisition unit 11, the neighboring cell information generation unit 12 generates, for each wireless terminal device 202, neighboring cell information which indicates one or a plurality of wireless base station devices 101 located in the neighborhood of a wireless base station device to which the neighboring cell information is to be given (hereinafter also referred to as a target base station), among a plurality of wireless base station devices 101 other than the target base station, in the wireless communication system 301. For example, the neighboring cell information generation unit 12 generates neighboring cell information for each wireless terminal device 202 communicable with the target base station. In the first embodiment of the present invention, the target base station is a wireless base station device 101 according to the first embodiment of the present invention.

The neighboring cell information transmits the neighboring cell information for each wireless terminal device 202, which has been generated by the neighboring cell information generation unit 12, to the corresponding wireless terminal device 202.

The power measurement indication unit 14 transmits, to the wireless terminal device 202, a measurement start request which causes the wireless terminal device 202 to measure the reception levels of radio signals transmitted from the wireless base station devices 101 other than the target base station.

[Operation]

Next, a description will be given of an operation of the wireless base station device according to the first embodiment of the present invention to generate neighboring cell information.

For example, the various information acquisition unit 11 acquires, for each wireless terminal device 202, based on information from the wireless terminal device 202, measurement information indicating the result of measurement in which the wireless terminal device 202 has measured the radio signals transmitted from the wireless base station devices 101 other than the target base station.

The neighboring cell information generation unit 12 generates neighboring cell information for each wireless terminal device 202, based on the measurement information for each wireless terminal device 202 which is acquired by the various information acquisition unit 11.

Figure 100:
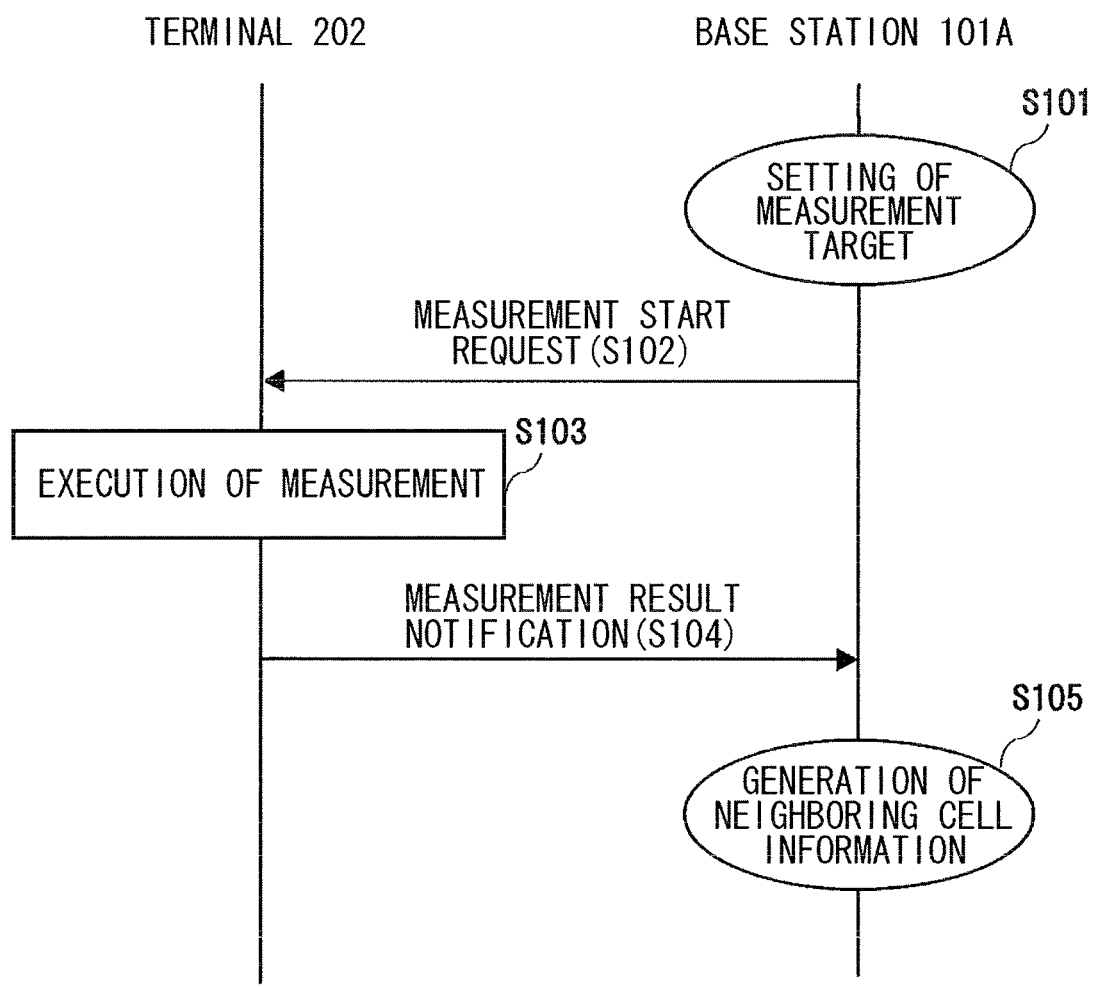
FIG. 100 is a diagram illustrating an example of a sequence in which a wireless base station device generates neighboring cell information, in the wireless communication system according to the first embodiment of the present invention (Chapter 4).

FIG. 100 is a diagram illustrating an example of a sequence in which a wireless base station device generates a neighboring cell information, in the wireless communication system according to the first embodiment of the present invention.

For example, in LTE, when a wireless terminal device 202 firstly establishes an RRC (Radio Resource Control) connection with a wireless base station device 101, i.e., when the wireless terminal device 202 completes a process for starting communication with the wireless base station device 101, the wireless base station device 101 instructs the wireless terminal device 202 to perform all-frequency search.

The all-frequency search is a process of measuring the reception level of a radio signal transmitted from each wireless base station device 101, in all kinds of transmission frequencies set in the wireless communication system.

Then, based on the measurement result notified from the wireless terminal device 202, the wireless base station device 101 generates neighboring cell information, and stores the neighboring cell information in a storage unit (not shown).

More specifically, with reference to FIG. 100, the wireless base station device 101A firstly sets other wireless base station devices to be the targets for measurement by the wireless terminal device 202 (step S101).

Next, the wireless base station device 101A transmits, to the wireless terminal device 202, a measurement start request that causes the wireless terminal device 202 to measure the reception levels of radio signals transmitted from the other wireless base station devices. The measurement start request includes information relating to the frequencies and the wireless base station devices, which are the measurement targets (step S102).

Upon receiving the measurement start request from the wireless base station device 101A, the wireless terminal device 202 measures the reception levels of the radio signals transmitted from the wireless base station devices indicated by the received measurement start request (step S103).

Next, the wireless terminal device 202 transmits a measurement result notification indicating the measured reception levels to the wireless base station device 101A (step S104).

Based on the measurement result notification received from the wireless terminal device 202, the wireless base station device 101A generates initial neighboring cell information (step S105).

In this way, by generating the neighboring cell information using the result of all-frequency search, appropriate neighboring cell information can be promptly constructed, and thereby highly-efficient operation in the wireless communication system can be promptly realized.

Figure 101:
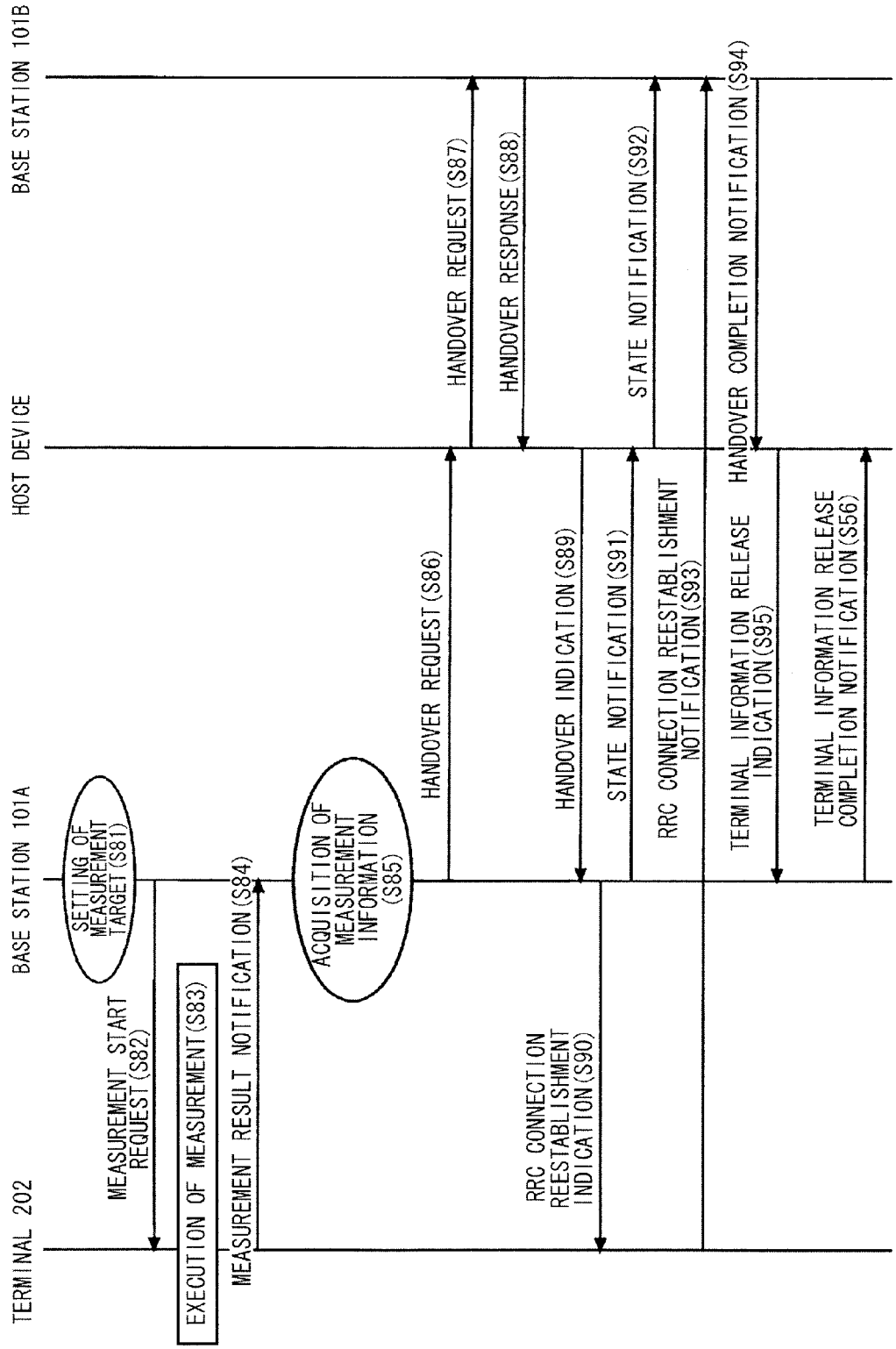
FIG. 101 is a diagram illustrating an example of a sequence of a handover operation in the wireless communication system according to the first embodiment of the present invention (Chapter 4).

FIG. 101 is a diagram illustrating an example of a sequence of a handover operation in the wireless communication system according to the first embodiment of the present invention.

With reference to FIG. 101, firstly, the wireless base station device 101A sets the frequencies to be measured by a wireless terminal device 202 communicating with the wireless base station device 101A, and other wireless base station devices transmitting the radio signals of the frequencies (step S81).

Next, the wireless base station device 101A transmits, to the wireless terminal device 202, a measurement start request that causes the wireless terminal device 202 to measure the reception levels of radio signals transmitted from the other wireless base station devices. The measurement start request includes information (i.e., cell IDs) of the wireless base station devices as the measurement targets. For example, this information is the neighboring cell information for each wireless terminal device 202, which has been generated by the sequence shown in FIG. 100. Further, the measurement start request includes the transmission frequencies of the respective wireless base station devices 101 (step S82).

Upon receiving the measurement start request from the wireless base station device 101A, the wireless terminal device 202 measures, in the frequency indicated by the received measurement start request, the reception levels of the radio signals transmitted from the wireless base station devices indicated by the measurement start request (step S83).

Next, the wireless terminal device 202 transmits a measurement result notification indicating the measured reception levels to the wireless base station device 101A. For example, the wireless terminal device 202 periodically performs measurement of reception levels. When the communication state with the wireless base station device 101A is deteriorated or when the communication state with any of the wireless base station devices 101 other than the wireless base station device 101A is improved, the wireless terminal device 202 transmits the measurement result notification to the wireless base station device 101A (step S84).

Next, based on the measurement result notification received from the wireless terminal device 202, the wireless base station device 101A acquires measurement information indicating the measurement result for each cell ID, and stores the measurement information in a storage unit (not shown) (step S85).

Next, based on the measurement result notification received from the wireless terminal device 202, the wireless base station device 101A determines whether or not the wireless terminal device 202 should perform handover. Upon determining that the wireless terminal device 202 should perform handover, the wireless base station device 101A determines, for example, the wireless base station device 101B as a handover destination with reference to the corresponding neighboring cell information, and transmits a handover request indicating the wireless base station device 101B to the host device (step S86).

In the wireless communication system according to the first embodiment of the present invention, "handover" means that a wireless base station device 101 which is a communication partner for a wireless terminal device 202 during phone call or data communication is changed to another wireless base station device 101.

Upon receiving the handover request from the wireless base station device 101A, the host device transmits the handover request to the wireless base station device 101B (step S87).

Upon receiving the handover request from the host device, the wireless base station device 101B transmits a handover response to the handover request, to the host device (step S88).

Upon receiving the handover response from the wireless base station device 101B, the host device transmits a handover indication to the wireless base station device 101A (step S89).

Upon receiving the handover indication from the host device, the wireless base station device 101A transmits an RRC connection reestablishment indication to the wireless terminal device 202 (step S90).

Then, the wireless base station device 101A transmits a status notification indicating its own communication status and the like, to the host device (step S91).

Upon receiving the status notification from the wireless base station device 101A, the host device transmits a status notification indicating the content of communication with the wireless terminal device 202 and the like, to the wireless base station device 101B (step S92).

When an RRC connection is established between the wireless terminal device 202 and the wireless base station device 101B, the wireless terminal device 202 transmits an RRC connection establishment notification to the wireless base station device 101B (step S93).

Upon receiving the RRC connection establishment notification from the wireless terminal device 202, the wireless base station device 101B transmits a handover completion notification to the host device (step S94).

Upon receiving the handover completion notification from the wireless base station device 101B, the host device transmits a terminal information release indication to the wireless base station device 101A (step S95).

Upon receiving the terminal information release indication from the host device, the wireless base station device 101A releases information relating to the wireless terminal device 202, and transmits a terminal information release completion notification to the host device (step S96).

Next, a description will be given of specific neighboring cell information for each wireless terminal device 202.

In the wireless communication system according to the first embodiment of the present invention, the wireless base station device 101 generates a plurality of pieces of neighboring cell information, and updates them. For example, it is assumed that two wireless terminal devices, a wireless terminal device 202a and a wireless terminal device 202b, are registered in the wireless base station device 101A. In this case, the wireless base station device 101A generates neighboring cell information for each of the wireless terminal device 202a and the wireless terminal device 202b. Further, the wireless base station device 101A generates total neighboring cell information in which the respective pieces of the neighboring cell information for the wireless terminal device 202a and the wireless terminal device 202b are put together, to be notified to unregistered terminals, and to be broadcast.

FIG. 102 is a diagram illustrating an example of neighboring cell information generated by the wireless base station device.

With reference to FIG. 102, the wireless base station device 101A generates, for the wireless terminal device 202a, neighboring cell information indicating that the wireless base station device 101B has a cell ID of 2222, is a macro base station, and has no CSG ID; the wireless base station device 101C has a cell ID of 3333, operates in the open access mode, and has no CSG ID; and the wireless base station device 101E has a cell ID of 5555, operates in the closed access mode, and has a CSG ID of 8888.

FIG. 103 is a diagram illustrating an example of neighboring cell information generated by the wireless base station device.

With reference to FIG. 103, the wireless base station device 101A generates, for the wireless terminal device 202b, neighboring cell information indicating that the wireless base station device 101B has a cell ID of 2222, is a macro base station, and has no CSG ID, the wireless base station device 101D has a cell ID of 4444, operates in the hybrid mode, and has a CSG ID of 8888, and the wireless base station device 101E has a cell ID of 5555, operates in the closed access mode, and has a CSG ID of 8888.

When the wireless base station device 101A has updated the neighboring cell information, the wireless base station device 101A notifies the corresponding wireless terminal device 202 of the updated neighboring cell information.

The neighboring cell information generation unit 12 may determine whether or not each of the plurality of wireless base station devices 101 other than the target base station should be registered in the neighboring cell information, based on the various kinds of information acquired by the various information acquisition unit 11. That is, the neighboring cell information generation unit 12 may register, in the neighboring cell information, only wireless base station devices 101 that satisfy a certain criterion.

Specifically, based on the measurement result notification obtained from the wireless terminal device 202, the various information acquisition unit 11 acquires measurement information indicating the reception levels of radio signals transmitted from the wireless base station devices 101 other than the target base station. The various information acquisition unit 11 stores the measurement information for each wireless terminal device 202 in the storage unit (not shown).

Then, the neighboring cell information generation unit 12 registers, in the neighboring cell information of the corresponding wireless terminal device 202, the wireless base station devices 101 whose reception levels are equal to or higher than a predetermined value.

Alternatively, based on the information from the wireless terminal device 202, the various information acquisition unit 11 may acquire measurement information indicating at least either of the number of times the wireless terminal device 202 has detected the presence of each of the wireless base station devices 101 based on the radio signals transmitted from the plurality of wireless base station devices 101 other than the target base station, or the detection rate at which the wireless terminal device 202 detects the presence of each of the wireless base station devices 101. The detection rate is a ratio of the number of times a wireless terminal device 202 has detected the presence of a wireless base station device 101 to the number of times the wireless terminal device 202 has executed measurement.

For example, the wireless base station device 101A instructs a wireless terminal device 202 communicating with the wireless base station device 101A to perform all-frequency search more than one time, and acquires the number of times of detection or the detection rate from a measurement result notification indicating the result of the all-frequency searches performed by the wireless terminal device 202.

Then, the neighboring cell information generation unit 12 registers, in the neighboring cell information of the corresponding wireless terminal device 202, the wireless base station device 101 whose number of times of detection is equal to or greater than a predetermined value, or the wireless base station device 101 whose detection rate is equal to or higher than a predetermined value.

Alternatively, the wireless base station device 101 may adopt the following criterion for registration in the neighboring cell information. That is, the handover information acquisition unit 11 acquires, for each wireless terminal device 202, handover information indicating the handover operation history of the wireless terminal device 202, based on information from at least one of the wireless terminal device 202 and another wireless base station device 101.

Then, the neighboring cell information generation unit 12 generates neighboring cell information for each wireless terminal device 202, based on the handover information of each wireless terminal device 202, which has been acquired by the handover information acquisition unit 11.

Specifically, the various information acquisition unit 11 acquires handover information indicating at least either of the number of times of handover of the wireless terminal device 202 from the target base station to the plurality of wireless base station devices 101 other than the target base station, or the number of times of handover of the wireless terminal device 202 from the plurality of wireless base station devices 101 other than the target base station to the target base station. The various information acquisition unit 11 acquires this handover information by, for example, the handover completion notification in the sequence shown in FIG. 101, and stores the handover information, for each wireless terminal device 202, in the storage unit (not shown).

Then, the neighboring cell information generation unit 12 registers, in the neighboring cell information of the corresponding wireless terminal device 202, the wireless base station device 101 whose number of times of handover is equal to or greater than a predetermined value.

If the various information acquisition unit 11 is able to calculate the handover success rate, the various information acquisition unit 11 may acquire handover information indicating the handover success rate instead of the number of times of handover. The handover success rate is the number of handover completion notifications/the number of handover requests in the sequence shown in FIG. 101.

Further, the neighboring cell information generation unit 12 may generate neighboring cell information in which one or a plurality of wireless base station devices 101 located in the neighborhood of the target base station are ranked, among the plurality of wireless base station devices 101 other than the target base station.

That is, the neighboring cell information generation unit 12 ranks the plurality of wireless base station devices 101 other than the target base station, based on the various kinds of information acquired by the various information acquisition unit 11, and generates neighboring cell information based on the result f the ranking.

In the case of generating the neighboring cell information in which the wireless base station devices 101 are ranked, it is considered that the wireless base station device 101 uses the ranking in the neighboring cell information when determining a handover destination for the wireless terminal device 202. That is, when determining a handover destination for each wireless terminal device 202, a wireless base station device 101 as a handover destination is selected in accordance with the ranking in the neighboring cell information.

Alternatively the wireless base station device 101A notifies the wireless terminal device 202 of neighboring cell information indicating N (N: an integer not smaller than 1) wireless base station devices from the highest rank among the ranked wireless band station devices.

In a case where the number of wireless base station devices registerable in the neighboring cell information to be notified to the wireless terminal device 202 is limited to two, the wireless base station device 101A notifies the wireless terminal device 202a of neighboring cell information indicating, for example, the cell ID 2222 (wireless base station device 101B) and the cell ID 3333 (wireless base station device 101C).

However, a cell detected by the wireless terminal device 202, i.e., a wireless base station device 101 whose transmission radio signal is measurable by the wireless terminal device 202, can be basically a target to which the wireless terminal device 202 moves. Therefore, in the configuration of the generating neighboring cell information for each wireless terminal device 202, it is preferable that all the wireless base station devices 101 detected by the wireless terminal device 202 are registered in the neighboring cell information.

FIG. 104 is a diagram illustrating an example of total neighboring cell information generated by the wireless base station device.

With reference to FIG. 104, the neighboring cell information generation unit 12 generates total neighboring cell information including one or a plurality of wireless base station devices 101 which are indicated by each of the neighboring cell information generated for each wireless terminal device 202.

Specifically, the wireless base station device 101A generates, as total neighboring cell information, neighboring cell information indicating the cell ID 2222 (wireless base station device 101B), the cell ID 3333 (wireless base station device 101C), the cell ID 4444 (wireless base station device 101D), and the cell ID 5555 (wireless base station device 101E).

[Notification Of Neighboring Cell Information]

As described above, the wireless base station device 101 performs optimization of the neighboring cell information in association with obtainment of the various kinds of information. The wireless base station device 101 needs to notify the wireless terminal device 202 of the optimized neighboring cell information. That is, the neighboring cell information transmission unit 13 in the wireless base station device 101 transmits the neighboring cell information for each wireless terminal device 202, which has been generated by the neighboring cell information generation unit 12, to the corresponding wireless terminal device 202. For example, the following three notification methods are considered.

Figure 105:
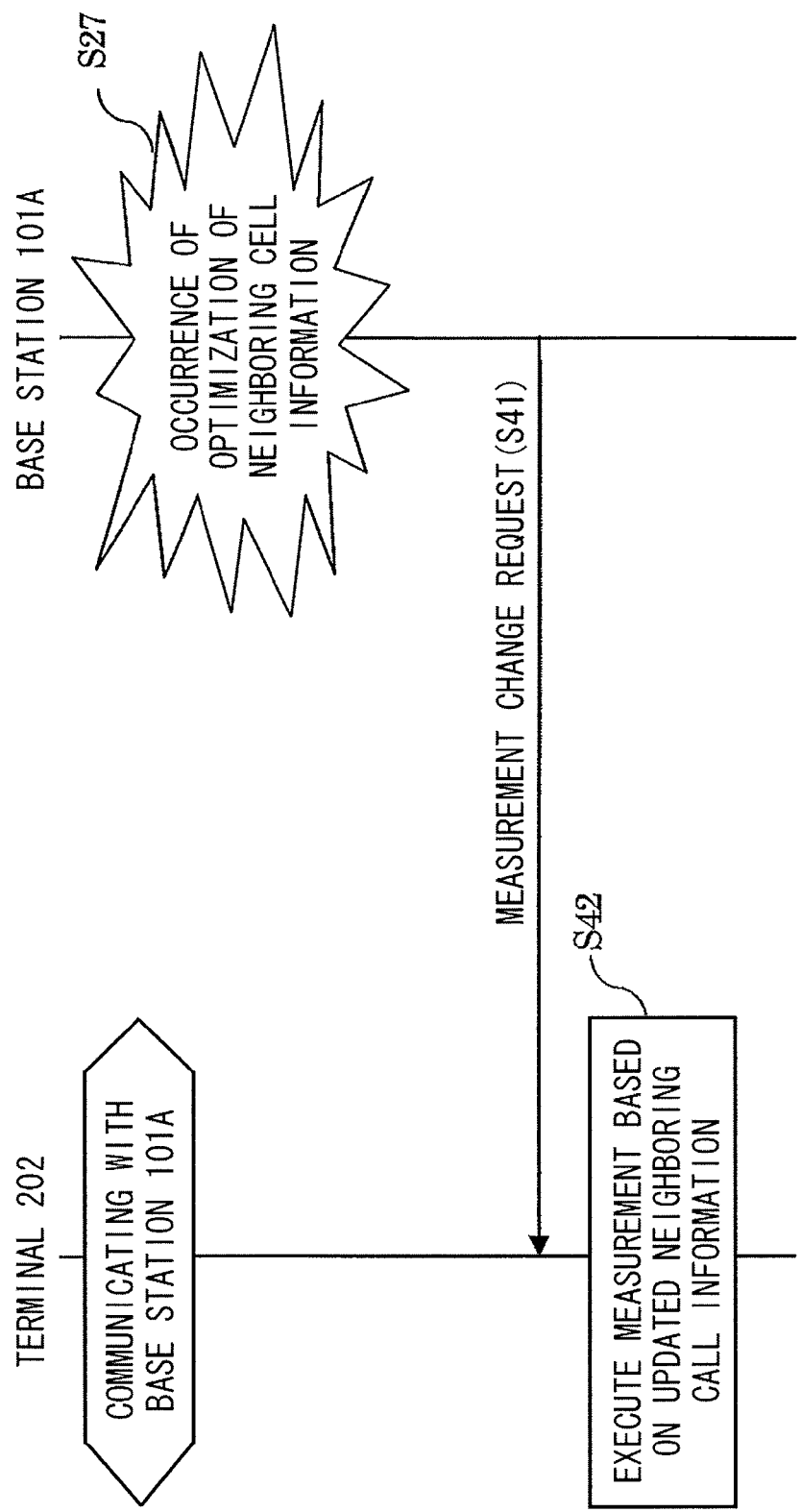
FIG. 105 is a diagram illustrating an example of a method in which a wireless base station device notifies wireless terminal devices of neighboring cell information, in the wireless communication system according to the first embodiment of the present invention (Chapter 4).

FIG. 105 is a diagram illustrating an example of a method in which a wireless base station device notifies a wireless terminal device of neighboring cell information, in the wireless communication system according to the first embodiment of the present invention.

With reference to FIG. 105, the wireless base station device 101A notifies a wireless terminal device 202 communicating with the wireless base station device 101A of updating of the neighboring cell information, by using a measurement change request.

More specifically, when optimization of neighboring cell information occurs (step S27), the wireless base station device 101A includes the updated neighboring cell information in the measurement change request, and transmits the measurement change request to the wireless terminal device 202 (step S41).

Next, the wireless terminal device 202 changes the neighboring cell information held therein to the neighboring cell information included in the measurement change request received from the wireless base station device 101A, and measures the reception levels of the radio signals transmitted from the wireless base station devices 101 shown in the changed neighboring cell information (step S42).

Figure 106:
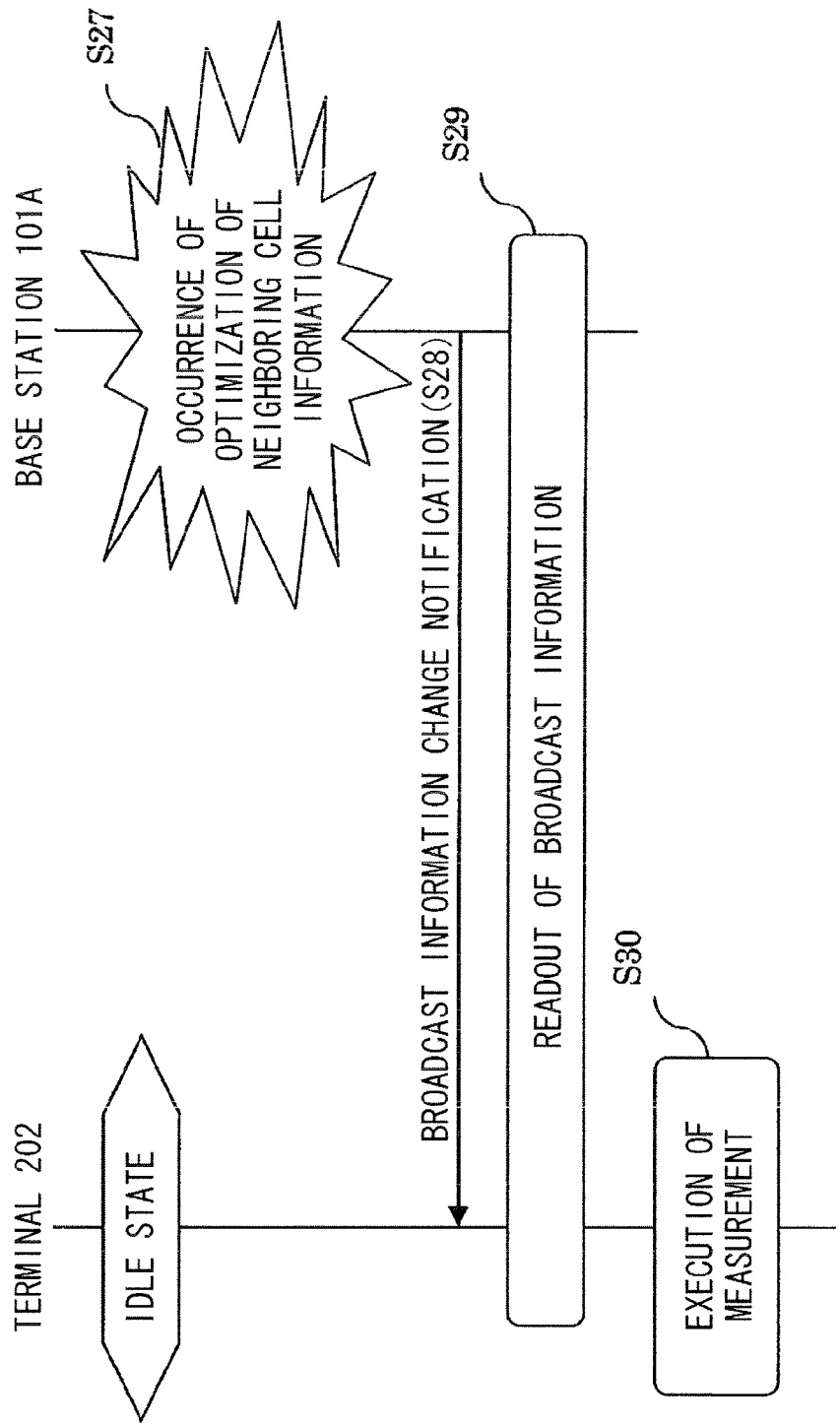
FIG. 106 is a diagram illustrating an example of a method in which a wireless base station device notifies wireless terminal devices of total neighboring cell information, in the wireless communication system according to the first embodiment of the present invention (Chapter 4).

FIG. 106 is a diagram illustrating an example of a method in which a wireless base station device notifies wireless terminal devices of total neighboring cell information, in the wireless communication system according to the first embodiment of the present invention.

The neighboring cell information transmission unit 13 broadcasts the total neighboring cell information to a plurality of wireless terminal device 202 communicable with the target base station. Further, the neighboring cell information transmission unit 13 notifies wireless terminal devices 202 which are not registered in the target base station of the total neighboring cell information.

Specifically, with reference to FIG. 106, the wireless base station device 101A includes the total neighboring cell information in broadcast information, and notifies wireless terminal devices 202 in the idle states, i.e., which are not during phone call or data communication of the broadcast information. In this case, by using a broadcast information change notification, the wireless base station device 101A notifies each wireless terminal final device 202 that the total neighboring cell information has been updated.

More specifically, when optimization of the total neighboring cell information occurs (step S27), the wireless base station device 101A broadcasts the broadcast information change notification to the wireless terminal devices 202 existing in the femto cell FCA (step S28).

Next, the wireless base station device 101A broadcasts the broadcast information including the updated total neighboring cell information to the wireless terminal devices 202 existing in the femto cell FCA. Upon receiving the broadcast information change notification, each wireless terminal device 202 reads the total neighboring cell information from the broadcast information transmitted from the wireless base station device 101A, and updates the neighboring cell information held therein to the read total neighboring cell information (step S29).

Next, the wireless terminal device 202 measures, autonomously or upon receiving a measurement start request from the wireless base station device 101A, the reception levels of the radio signals transmitted from the wireless base station devices 101 indicated in the updated neighboring cell information (step S30).

As a method of notifying the non-member wireless terminal devices 202 of the total neighboring cell information, the wireless base station device 101A may broadcast the total neighboring cell information to the non-member wireless terminal devices 202 as shown in FIG. 106. Alternatively, the wireless base station device 101A may individually notify each of the non-member wireless terminal devices 202 of the total neighboring cell information as shown in FIG. 105.

By the way, in a mobile communication system, based on neighboring cell information in which one or a plurality of wireless base station devices are registered, a wireless terminal device measures, autonomously or in accordance with an indication from a wireless base station device, the reception powers of the radio signals transmitted from the wireless base station devices registered in the neighboring cell information, and then notifies the wireless base station device of the measurement result. In this case, if a wireless base station device that is not suitable as a handover destination is registered in the neighboring cell information, the wireless terminal device performs an unnecessary measurement operation, and unnecessary handover occurs.

Specifically, considering a case where a femto base station is installed in a home and a plurality of users communicate with the femto base station in their own rooms, the neighboring cells in the rooms of the respective users may be different from each other. That is, in the communication systems as shown in FIG. 95 and FIG. 96, the communicable wireless base station device 101 varies among the wireless terminal devices 202. For example, even if the wireless terminal device 202a is instructed to measure the wireless base station device 101D, since the wireless terminal device 202a cannot detect the wireless base station device 101D, measurement of the wireless base station device 101D by the wireless terminal device 202a ends up in vain.

In contrast, in the wireless communication system according to the first embodiment of the present invention, the neighboring cell information generation unit 12 generates, for each wireless terminal device 202, neighboring cell information indicating one or a plurality of wireless base station devices 101 located in the neighborhood of the target base station, among a plurality of wireless base station devices 101 other than the target base station. Specifically, for example, when the wireless terminal devices 202 are instructed to perform measurement for handover, the neighboring cell information to be notified from the wireless base station device 101 is varied among the wireless terminal devices 202.

This configuration allows generation of appropriate neighboring cell information in accordance with the communication environment that varies among the wireless terminal devices 202. Specifically, it is possible to reduce unnecessary measurement operations by the wireless terminal devices 202, that is, it is possible to reduce the number of times each wireless terminal device 202 performs measurement of a cell whose presence cannot be detected by the wireless terminal device 202. Further, it is possible to reduce unnecessary handover operations by the wireless terminal devices 202.

Therefore, in the wireless communication system according to the first embodiment of the present invention, it is possible to achieve highly-efficient operation in the wireless communication system by generating appropriate neighboring cell information.

Further, in the wireless communication system according to the first embodiment of the present invention, the various information acquisition unit 11 acquires information for generating neighboring cell information, for each wireless terminal device 202, based on information provided from at least either of the wireless terminal devices 202 or the wireless base station devices 101. Then, the neighboring cell information generation unit 12 generates neighboring cell information, for each wireless terminal device 202, based on the information for each wireless terminal device 202, which has been acquired by the various information acquisition unit 11.

This configuration allows automatic optimization of the neighboring cell information regardless of movement and power on/off of each femto base station. Therefore, the efficiency of operation in the wireless communication system 301 can be enhanced without manpower assistance. Further, since the neighboring cell information is automatically optimized, a special installation process for each wireless base station device 101 is not needed, thereby reducing the time and cost required for installing the wireless base station device 101.

Further, in the wireless communication system according to the first embodiment of the present invention, the various information acquisition unit 11 acquires, for each wireless terminal device 202, measurement information indicating the result of measurement in which the wireless terminal device 202 has measured the radio signals transmitted from the plurality of wireless base station devices 101 other than the target base station, based on information from the wireless terminal device 202.

By acquiring, as information for generating neighboring cell information, the measurement information indicating the result of measurement in which the wireless terminal device 202 has actually measured the radio signals tranmitted from the wireless base station devices 101, it is possible to appropriately generate neighboring cell information for each wireless terminal device 202.

Further, in the wireless communication system according to the first embodiment of the present invention, the various information acquisition unit 11 acquires, for each wireless terminal device 202, handover information indicating the handover operation history of the wireless terminal device

202, based on information provided from at least either of the wireless terminal device 202 or the wireless base station devices 101.

In this way, by acquiring the handover information indicating the handover operation history of the wireless terminal device 202 as information for generating neighboring cell information, it is possible to appropriately generate neighboring cell information for each wireless terminal device 202.

Further, in the wireless communication system according to the first embodiment of the present invention, the neighboring cell information transmission unit 13 broadcasts the total neighboring cell information to a plurality of wireless terminal devices 202 communicable with the target base station.

In this configuration, the common neighboring cell information can be notified to specific wireless terminal devices 202 as well as other wireless terminal devices 202 in the wireless communication system 301, thereby achieving further improvement in efficiency of operation in the wireless communication system.

Further, in the wireless communication system according to the first embodiment of the present invention, the neighboring cell information transmission unit 13 transmits the total neighboring cell information to the wireless terminal devices 202 which are not registered in the target base station.

In this configuration, a wireless base station device 101 operating in the hybrid mode or the closed access mode is allowed to notify the member wireless terminal devices 202 as well as the non-member wireless terminal devices 202 of the common neighboring cell information, thereby achieving further improvement in the efficiency of operation in the wireless communication system.

Further, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

At least any of the plurality of wireless base station device 101 in the wireless communication system according to the first embodiment of the present invention is a femto base station.

In this way, by generating appropriate neighboring cell information in the wireless communication system in which wireless base station devices are frequently moved and powered on/off, it is possible to obtain more remarkable effect of achieving highly-efficient operation in the wireless communication system.

If configuration of a femto base station is automatically performed by using the technique described in Patent Literature 1, all femto base stations located in the neighborhood of the femto base station are regarded as neighboring cells and registered in the neighboring cell information as candidates for a handover destination. Therefore, even a femto base station that is not essentially suitable as a handover destination, such as a femto base station located across a wall from a wireless terminal device, might be registered in the neighboring cell information.

In contrast, in the wireless communication system according to the first embodiment of the present invention, the neighboring cell information generation unit 12 generates, for each wireless terminal device 202, neighboring cell information indicating one or a plurality of wireless base station devices 101 to be candidate(s) for a handover destination of a wireless terminal device 202 communicating with the target base station, among the plurality of wireless base station devices 101 other than the target base station, based on the information acquired by the various information acquisition unit 11.

This configuration causes the handover operation in the femto cell of the installed wireless base station device 101 to be in the optimum state. Further, by performing optimization of the neighboring cell information, the number of neighboring cells to be candidates for a handover destination of the wireless terminal device 202 during communication can be reduced, thereby avoiding occurrence of unnecessary handover.

Further, in the wireless communication system according to the first embodiment of the present invention, the neighboring cell information generation unit 12 generates, for each wireless terminal device 202, neighboring cell information indicating one or a plurality of wireless base station devices 101 to be the target(s) for measurement by the wireless terminal device 202, among the plurality of wireless base station devices 101 other than the target base station.

In this way, by performing optimization of the neighboring cell information, the number of neighboring cells to be the targets of measurement by the wireless terminal device 202 is reduced, thereby preventing the wireless terminal device 202 from performing unnecessary measurement operation.

Further, in the wireless communication system according to the first embodiment of the present invention, the neighboring cell information generation unit 12 generates, for each wireless terminal device 202, neighboring cell information indicating one or a plurality of wireless base station devices 101 which transmit radio signal(s) whose reception level(s) are to be measured by the wireless terminal device 202, among the plurality of wireless base station devices 101 other than the target base station.

In this way, by performing optimization of the neighboring cell information, the number of neighboring cells to be the targets of reception level measurement by the wireless terminal device 202 can be reduced, thereby preventing the wireless terminal device 202 from performing unnecessary measurement operation. In particular, the power consumption of the wireless terminal device 202 in the idle state can be reduced, resulting in remarkable effect.

Further, in the wireless communication system according to the first embodiment of the present invention, the neighboring cell information generation unit 12 generates, for each wireless terminal device 202, neighboring cell information indicating one or a plurality of wireless base station devices 101 which transmit radio signal(s) whose reception level(s) are to be measured by a wireless terminal device 202 in the idle state, i.e., which is not communicating with the target base station, among the plurality of wireless base station devices 101 other than the target base station.

This configuration reduces the number of neighboring cells to be the targets of periodical power measurement which is instructed by the broadcast information or the like from the wireless base station device 101, thereby preventing the wireless terminal device 202 from performing unnecessary measurement operation.

Further, in the wireless communication system according to the first embodiment of the present invention, the wireless base station device 101 solely performs optimization of neighboring cell information. That is, the wireless base station device 101 is provided with the neighboring cell processing device according to the first embodiment of the present invention.

This configuration eliminates the need to optimize the neighboring cell information of each wireless base station device 101 by the host device in the core network, thereby achieving dispersion of processing load in the wireless communication system 301, and reduction in the communication traffic between the wireless base station device 101 and the host device.

In the wireless communication system according to the first embodiment of the present invention, the neighboring cell information generation unit 12 generates the total neighboring cell information including one or a plurality of wireless base station devices 101 which are indicated by each of the generated neighboring cell information generated for each of the wireless terminal devices 202. Specifically, the neighboring cell information generation unit 12 generates the total neighboring cell information including all the wireless base station devices 101 registered in the neighboring cell information shown in FIG. 102 and the neighboring cell information shown in FIG. 103, i.e., the total neighboring cell information in which the wireless base station devices 101 in the respective pieces of neighboring cell information are ORed. However, the present invention is not limited to this configuration.

The neighboring cell information generation unit 12 may generate total neighboring cell information to be notified to a plurality of wireless terminal devices 202, which indicates one or a plurality of wireless base station devices 101 located in the neighborhood of the target base station among the plurality of wireless base station devices 101 other than the target base station, in addition to the neighboring cell information for each wireless terminal device 202. In this way, by using a variety of neighboring cell information, further improvement in the efficiency of operation in the wireless communication system can be achieved.

Further, if the neighboring cell information generation unit 12 is configured to generate the total neighboring cell information based on the neighboring cell information generated for each wireless terminal device 202, the neighboring cell information generation unit 12 can appropriately generate the neighboring cell information to be notified to other wireless terminal devices 202 in the wireless communication system 301 in addition to specific wireless terminal device 202, thereby achieving further improvement in the efficiency of operation in the wireless communication system.

Specifically, the neighboring cell information generation unit 12 may generate total neighboring cell information in which the wireless base station devices 101 common between the wireless base station devices 101 registered in the neighboring cell information shown in FIG. 102 and the wireless base station devices 101 registered in the neighboring cell information shown in FIG. 103 are registered, that is, total neighboring cell information in which the wireless base station devices 101 in the respective pieces of neighboring cell information are ANDed.

However, by adopting the configuration of taking "OR", it is possible to avoid the situation that when there is no cell that can be commonly recognized by the respective wireless terminal devices 202 existing in the respective rooms in the building 51, the number of wireless base station devices 101 to be registered in the neighboring cell information for broadcast and the neighboring cell information to be notified to the unregistered wireless terminal devices 202 becomes zero.

Further, in the wireless base station device according to the first embodiment of the present invention, the neighboring cell information generation unit 12 generates the initial neighboring cell information, based on the result of measurement in which the wireless terminal device 202 communicating with the target base station has measured, in all frequencies, the reception levels of the radio signals transmitted from the wireless base station devices 101 other than the target base station. However, the present invention is not limited thereto. The present invention is applicable to not only the configuration in which all the transmission frequencies of the wireless base station devices 101 in the wireless communication system 301 are measured but also the configuration in which a plurality of frequencies corresponding to part of the transmission frequencies are measured.

Further, in the wireless communication system according to the first embodiment of the present invention, a wireless base station device 101 has the initiative to select a wireless base station device 101 to be a communication partner of a wireless terminal device 202. However, the present invention is not limited thereto. A wireless terminal device 202 may have the initiative to select a wireless base station device 101 to be a communication partner of the wireless terminal device 202.

Further, in the first embodiment of the present invention, the handover operation of wireless terminal devices is specifically described. However, the present invention is applicable to not only handover that is an inter-base-station movement (inter-cell movement) operation performed by a wireless terminal device communicating with a wireless base station device but also an inter-base-station movement (inter-cell movement) operation performed by a wireless terminal device in the idle state. That is, the present invention is applicable to the configurations and operations in which "handover" is replaced with "movement" in the first embodiment of the present invention.

Hereinafter, a description will be given of another embodiment of the present invention with reference to figures. In the figures, the same or corresponding components are given the same reference characters and are not repeatedly described.

<Embodiment 2>

A second embodiment relates to a wireless communication system in which the criterion for registration of wireless base station devices in the neighboring cell information is changed from that of the wireless communication system of the first embodiment. The wireless communication system of the second embodiment is identical to the wireless communication system of the first embodiment except the matters described below.

In a wireless base station device according to the second embodiment of the present invention, the various information acquisition unit 11 acquires attribute information from broadcast information or the like that is regularly or irregularly transmitted from other wireless base station devices 101, and stores the attribute information in a storage unit (not shown). Based on the attribute information acquired by the various information acquisition unit 11, the neighboring cell information generation unit 12 generates, for each wireless terminal device 202, neighboring cell information indicating one or a plurality of wireless base station devices 101 located in the neighborhood of the target base station, among a plurality of wireless base station devices 101 other than the target base station.

When a wireless base station device 101 operates in the closed access mode or the hybrid mode, the wireless base station device 101 belongs to a set CSG (Closed Subscriber Group), that is, a CSG ID is set in the wireless base station device 101. The wireless base station device 101 allows wireless terminal devices 202 which belong to the same CSG, that is, which have the same CSG ID, as that of the wireless base station device 101 to communicate with the wireless base station device 101.

Accordingly, if the priorities of the wireless base station devices are considered in terms of radio resources which are likely to be used by a wireless terminal device 202, the priority ranking is as follows: (1) a femto base station that operates in the closed access mode, and for which the wireless terminal device 202 is a member (i.e., the wireless terminal device 202 has the same CSG ID as the femto base station); (2) a femto base station that operates in the hybrid mode, and for which the wireless terminal device 202 is a member; (3) a macro base station; (4) a femto base station that operates in the open access mode; and (5) a femto base station that operates in the hybrid mode, and for which the wireless terminal device 202 is a non-member (i.e., the wireless terminal device 202 has a CSG ID different from that of the femto base station).

In the wireless base station device 101, the CSG IDs of the neighboring wireless base station devices 101 have been known by such as broadcast information provided from other wireless base station devices 101. Then, the wireless base station device 101 individually applies neighboring cell information to each of wireless terminal devices 202 having the same CSG ID as the wireless base station device 101, for example, the wireless base station device 101 individually uses the neighboring cell information in a measurement request to each wireless terminal device 202, or in search for a handover destination.

Specifically, the various information acquisition unit 11 acquires attribute information indicating the access mode (any of the open access mode, the closed access mode, and the hybrid mode) in which each of the plurality of wireless base station devices 101 other than the target base station operates, and indicating the CSGs to which the wireless terminal devices 202 and the plurality of wireless base station devices 101 other than the target base station belong.

Then, the neighboring cell information generation unit 12 generates neighboring cell information for each wireless terminal device 202, based on the access mode (any of the open access mode, the closed access mode, and the hybrid mode) in which each wireless base station device 101 operates, and on match/mismatch between the CSGs to which the wireless terminal devices 202 belong and the CSGs to which the wireless base station devices 101 belong.

With respect to a femto base station which operates in the closed access mode and for which a wireless terminal device 202 is a non-member, the wireless terminal device 202 cannot access the femto base station, and therefore, this femto base station is eliminated from the corresponding neighboring cell information. That is, the neighboring cell information generation unit 12 generates neighboring cell information in which at least the wireless base station device 101 which operates in the closed access mode and belongs to a CSG different from the CSG of the corresponding wireless terminal device 202 is eliminated from the plurality of wireless base station devices 101 other than the target base station.

Next, neighboring cell information for each wireless terminal device 202 will be specifically described. It is assumed that the CSG ID of a wireless terminal device 202*a* is 8888, and the CSG ID of a wireless terminal device 202*b* is 7777.

FIG. 107 is a diagram illustrating an example of neighboring cell information generated by a wireless base station device. The access modes and the CSG IDs of the respective wireless base station devices are identical to those of the communication system according to the first embodiment of the present invention.

With reference to FIG. 107, the wireless base station device 101A generates neighboring cell information for the wireless terminal device 202*b*. That is, when the wireless base station device 101A as the target base station operates in the hybrid mode, the neighboring cell information generation unit 12 generates neighboring cell information for each of the wireless terminal devices 202 registered in the target base station.

In the configuration of generating neighboring cell information for each of the wireless terminal devices which are members of the wireless base station device 101A, since the CSG IDs of the member wireless terminal devices are already known in the wireless base station device 101A, it is possible to easily generate neighboring cell information for each wireless terminal device. Further, by generating neighboring cell information for a wireless terminal device owned by a registered user, the power consumption of the wireless terminal device can be reduced, and thus appropriate communication services can be provided.

Specifically, the wireless base station device 101A generates, as neighboring cell information for the wireless terminal device 202*b*, neighboring cell information indicating the cell ID 2222 (wireless base station device 101B) and the cell ID 4444 (wireless base station device 101D).

Since the wireless terminal device 202*b* is a non-member for the wireless base station device 101E, the wireless base station device 101E is eliminated from the neighboring cell information for the wireless terminal device 202*b*.

Likewise, in a case where the target base station operates in the closed access mode, the neighboring cell information generation unit 12 may generate neighboring cell information for each of the wireless terminal devices 202 registered in the target base station.

Also in this case, in the configuration of generating neighboring cell information for each of the wireless terminal devices which are members of the wireless base station device 101A, since the CSG IDs of the member wireless terminal devices are already known in the wireless base station device 101A, it is possible to easily generate neighboring cell information for each wireless terminal device. Further, by generating neighboring cell information for a wireless terminal device owned by a registered user, the power consumption of the wireless terminal device 202 can be reduced, and thus appropriate communication services can be provided.

FIG. 108 is a diagram illustrating an example of neighboring cell information generated by a wireless base station device.

With reference to FIG. 108, the wireless base station device 101A generates, as neighboring cell information for the wireless terminal device 202*a*, neighboring cell information indicating the cell ID 5555 (wireless base station device 101E), the cell ID 2222 (wireless base station device 101B), and the cell ID 3333 (wireless base station device 101C).

In this way, the neighboring cell information generation unit 12 may generate the neighboring cell information for the wireless terminal device 202*a* which is a non-member for the wireless base station device 101A as the target base station.

In the neighboring cell information shown in FIGS. 107 and 108, the wireless base station devices 101 are ranked in accordance with the above-described priority ranking (1) to (4).

Further, the power measurement indication unit 14 instructs the wireless terminal device 202 registered in the target base station to perform all-frequency search, i.e., to measure, in all frequencies, the reception levels of the radio signals transmitted from the wireless base station devices 101 other than the target base station.

That is, in the case where the wireless base station device 101A is a femto base station and operates in the hybrid mode or the closed access mode, the wireless base station device 101A instructs the registered wireless terminal device 202 to measure, in all frequencies, the reception levels of the radio signals transmitted from the other wireless base station devices 101.

Then, the various information acquisition unit 11 acquires, for each wireless terminal device 202, measurement information indicating the result of all-frequency search.

In this way, by generating the neighboring cell information using the result of all-frequency search, appropriate neighboring cell information can be promptly established, and thereby highly-efficient operation in the wireless communication system 301 can be promptly realized. Further, by instructing the wireless terminal device 202 as a member to perform all-frequency search, information for generating neighboring cell information can be acquired efficiently.

FIG. 109 is a diagram illustrating an example of total neighboring cell information generated by a wireless base station device.

With reference to FIG. 109, the wireless base station device 101A generates, as total neighboring cell information, neighboring cell information indicating the cell ID 2222 (wireless base station device 101B), the cell ID 3333 (wireless base station device 101C), the cell ID 4444 (wireless base station device 101D), and the cell ID 5555 (wireless base station device 101E).

As described above, in the wireless communication system according to the second embodiment of the present invention, the various information acquisition unit 11 acquires the attribute information indicating the access mode (any of the open access mode, the closed access mode, and the hybrid mode) in which each of the plurality of wireless base station devices 101 other than the target base station operates, and indicating the CSGs to which the wireless terminal devices 202 and the plurality of wireless base station devices 101 other than the target base station belong. Then, the neighboring cell information generation unit 12 generates neighboring cell information for each wireless terminal device 202, based on the access mode (any of the open access mode, the closed access mode, and the hybrid mode) in which each of the wireless base station devices 101 operates, and the match/mismatch between the CSG to which the wireless terminal devices 202 belong and the CSGs to which the wireless base station devices 101 belong.

As described above, by acquiring, as information for generating neighboring cell information, the attribute information indicating the access modes and the CSG IDs of the respective wireless base station devices 101, it is possible to appropriately generate neighboring cell information for each wireless terminal device 202.

Further, in the wireless communication system according to the second embodiment of the present invention, the neighboring cell information generation unit 12 generates neighboring cell information for each wireless terminal device 202, in which at least the wireless base station device 101 which operates in the closed access mode and belongs to a CSG different from the CSG of the corresponding wireless terminal device 202 is eliminated from among the plurality of wireless base station devices 101 other than the target base station.

This configuration allows appropriate elimination of a wireless base station device 101 which is a radio resource that the wireless terminal devices 202 cannot use, from the neighboring cell information.

In the wireless communication system according to the first embodiment of the present invention, a wireless base station device 101 acquires attribute information of the wireless base station device 101, based on information from other wireless base station devices 101. However, the present invention is not limited thereto. If a wireless terminal device 202 is allowed to acquire the attribute of a wireless base station device 101 based on broadcast information or the like provided from the wireless base station device 101, the wireless terminal device 202 may notify the target base station of the acquired attribute, and the target base station may acquire attribute information of other wireless base station devices 101 based on this information.

Since other components and operations of the wireless communication system of the second embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 3>

A third embodiment relates to a wireless communication system in which, instead of a wireless base station device, a gateway device serves as a neighboring cell processing device, in contrast to the wireless communication systems according to the first and second embodiments. The wireless communication system of the third embodiment is identical to the wireless communication systems of the first and second embodiments except the matters described below.

Figure 110:
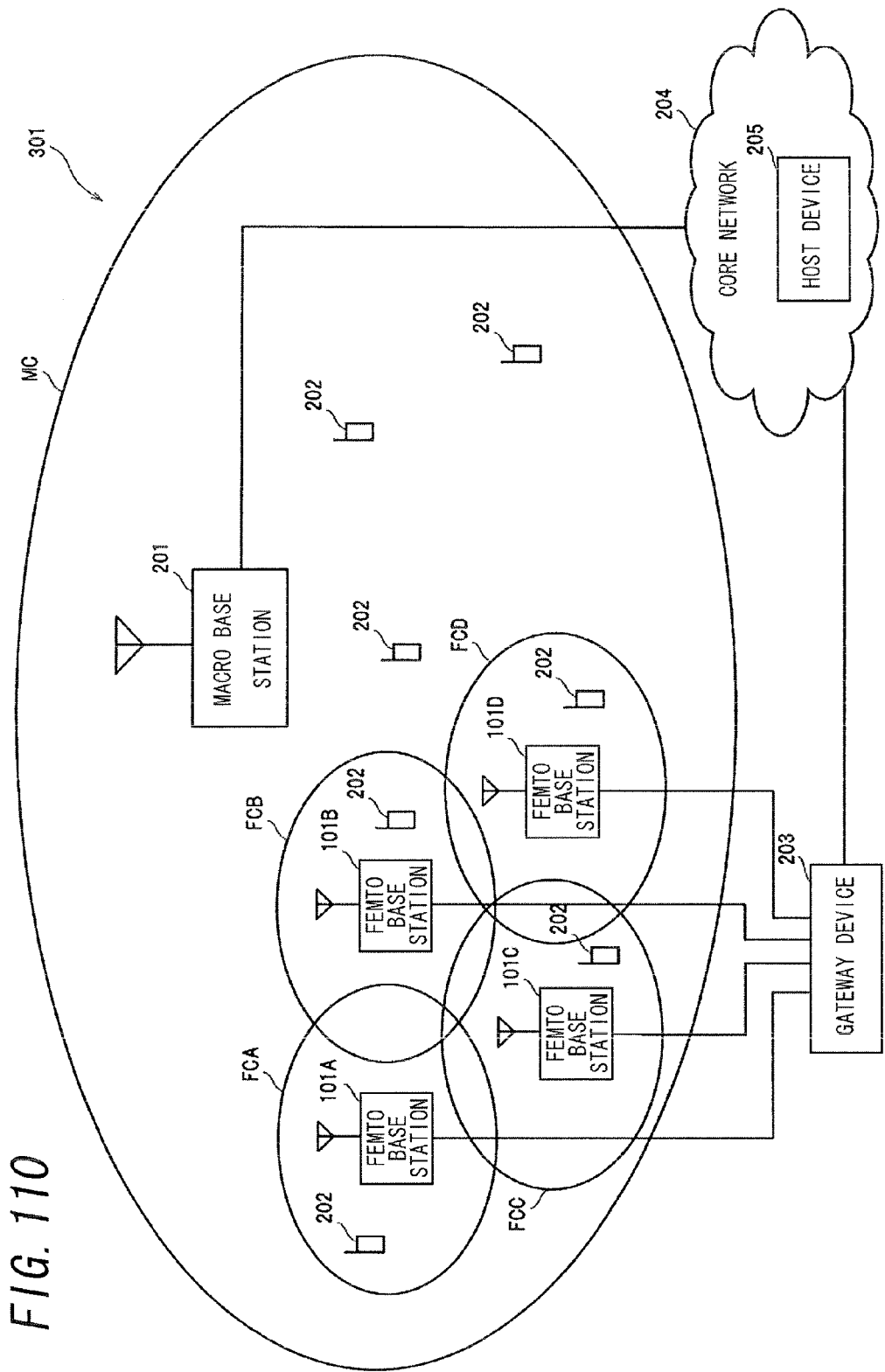
FIG. 110 is a diagram illustrating the configuration of a wireless communication system according to a third embodiment of the present invention (Chapter 4).

FIG. 110 is a diagram illustrating the configuration of the wireless communication system according to the third embodiment of the present invention.

With reference to FIG. 110, the wireless communication system 302 includes wireless base station devices 101A, 101B, 101C, 101D, and 101E, a gateway device 203, and a host device 205.

In the wireless communication system 302, as in the wireless communication system 301, the wireless base station devices 101A, 101C, 101D, and 101E are femto base stations, and the wireless base station device 101B is a macro base station.

Hereinafter, each of the wireless base station devices 101A, 101C, 101D, and 101E is sometimes referred to as a femto base station 101. Although one macro base station and four femto base stations are representatively shown in FIG. 110, less or more macro base stations and femto base stations may be provided.

The gateway device 203 performs, for example, a process of relaying various kinds of communication data transmitted between each of the wireless base station devices 101A, 101C, 101D, and 101E, and the host device 205 in the core network 204.

Figure 111:
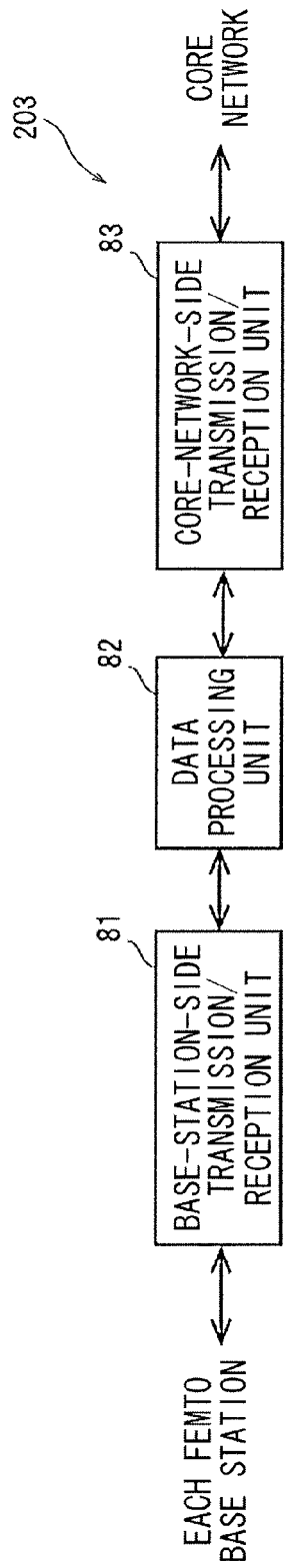
FIG. 111 is a diagram illustrating the configuration of a gateway device according to the third embodiment of the present invention (Chapter 4).

FIG. 111 is a diagram illustrating the configuration of the gateway device according to the third embodiment of the present invention.

With reference to FIG. 111, the gateway device 203 includes a base-station-side transmission/reception unit 81, a data processing unit 82, and a core-network-side transmission/reception unit 83.

The base-station-side transmission/reception unit 81 transmits communication data provided from the data processing unit 82 to each femto base station 101, and outputs communication data received from each femto base station 101 to the data processing unit 82.

The data processing unit 82 performs various kinds of processing on the communication data provided from the base-station-side transmission/reception unit 81, and outputs the processed communication data to the core-network-side transmission/reception unit 83. Further, the data processing unit 82 performs various kinds of processing on the communication data provided from the core-network-side transmission/reception unit 83, and outputs the processed communication data to the base-station-side transmission/reception unit 81.

The core-network-side transmission/reception unit 83 outputs the communication data provided from the data processing unit 82 to the host device 205 in the core network 204, and outputs communication data received from the host device 205 in the core network 204 to the data processing unit 82.

In the wireless communication system according to the third embodiment of the present invention, the gateway device 203 monitors the subordinate femto base stations, and optimizes neighboring cell information.

Figure 112:
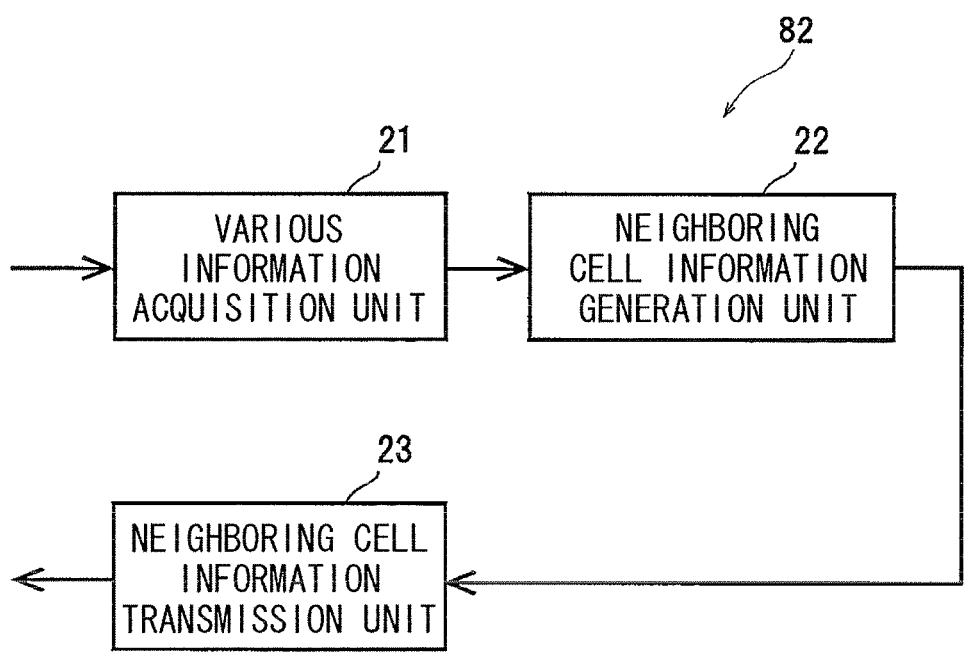
FIG. 112 is a diagram illustrating the configuration of a data processing unit in the gateway device according to the third embodiment of the present invention (Chapter 4).

FIG. 112 is a diagram illustrating the configuration of the data processing unit in the gateway device according to the third embodiment of the present invention.

With reference to FIG. 112, the data processing unit 82 includes a various information acquisition unit 21, a neighboring cell information generation unit 22, and a neighboring cell information transmission unit 23.

The various information acquisition unit 21 acquires various kinds of information required for generation of neighboring cell information, based on information provided from each femto base station 101.

Based on the various kinds of information acquired by the various information acquisition unit 21, the neighboring cell information generation unit 22 generates, for each wireless terminal device 202, neighboring cell information indicating one or a plurality of wireless base station devices located in the neighborhood of a target femto base station, among a plurality of femto base stations other than the target femto base station, in the wireless communication system 302.

The neighboring cell information transmission unit 23 transmits the neighboring cell information for each wireless terminal device 202, which has been generated by the neighboring cell information generation unit 22, to the target femto base station. The neighboring cell information for each wireless terminal device 202 is notified by the target base station to the corresponding wireless terminal device 202.

The content of a method of generating neighboring cell information by the neighboring cell information generation unit 22 is identical to, for example, the method of generating neighboring cell information by the neighboring cell information generation unit 12 according to the first or second embodiment of the present invention.

Figure 113:
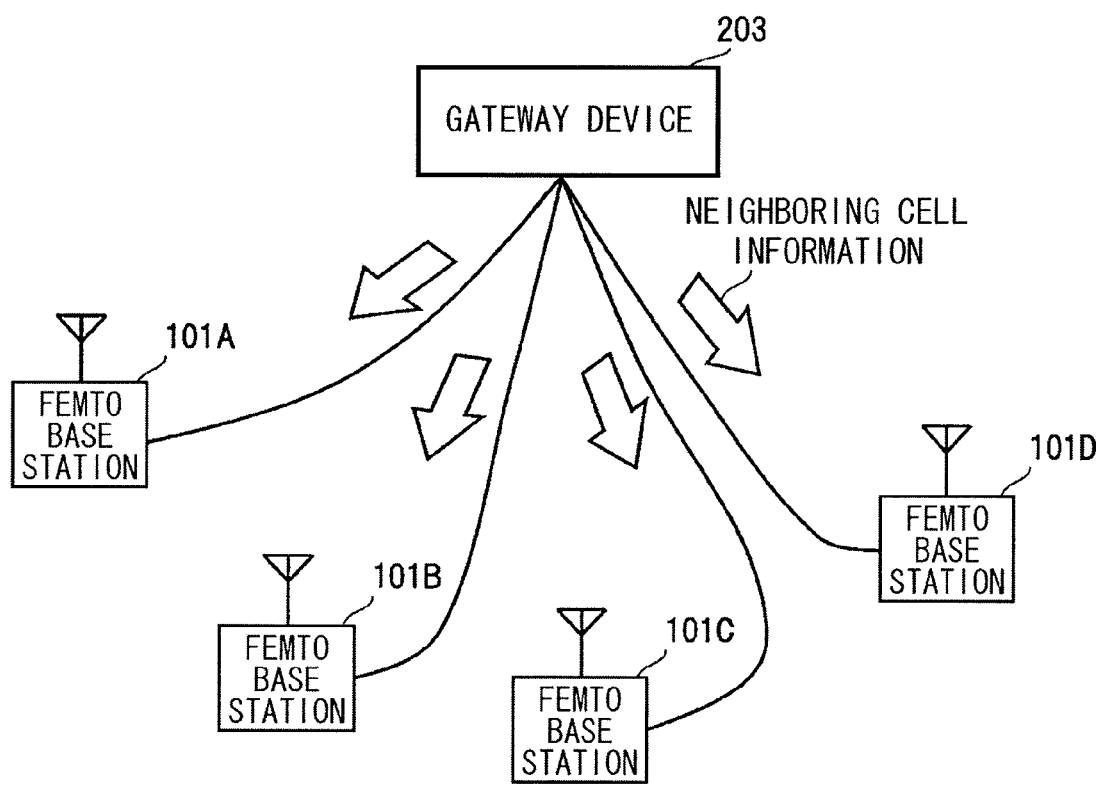
FIG. 113 is a diagram illustrating a method in which the gateway device according to the third embodiment of the present invention (Chapter 4) notifies neighboring cell information.

FIG. 113 is a diagram illustrating a method in which the gateway device according to the third embodiment of the present invention notifies neighboring cell information.

With reference to FIG. 113, the gateway device 203 notifies the femto base stations 101A, 101C, 101D, and 101E of the corresponding neighboring cell information.

Although the gateway device according to the third embodiment of the present invention is provided separately from the wireless base station devices, the present invention is not limited thereto. The gateway device 203 may be included in at least one of the wireless base station devices in the wireless communication system 302. In this case, the wireless base station device equipped with the gateway device 203 acquires various kinds of information, based on information provided from wireless terminal devices 202 existing in its own cell and information provided from other wireless base station devices. Then, the gateway device 203 notifies the wireless terminal devices 202 existing in its cell and the other femto base stations of the generated neighboring cell information.

Further, in the wireless communication systems according to the first to third embodiments of the present invention, the neighboring cell information generation unit may generate the neighboring cell information, based on a combination of measurement information indicating the measurement result of the radio signals transmitted from the wireless base station devices, handover information indicating the handover operation history of the wireless terminal devices, and attribute information indicating the attributes of the wireless base station devices.

Further, in the first and second embodiments of the present invention, instead of the wireless base station device 101, the host device 205 may serves as the neighboring cell processing device, like the gateway device according to the third embodiment of the present invention.

Since other components and operations of the wireless communication system of the third embodiment are identical to those of the wireless communication systems of the first and second embodiments, repeated description is not necessary.

When a wireless base station device has a plurality of sectors, that is, when one cell is divided into a plurality of sectors, one sector may be treated as one wireless base station device in neighboring cell information. The present invention is also applicable to such a case.

The embodiments disclosed in Chapter 4 are to be considered in all respects as illustrative and not restrictive. The scope of the present invention is indicated by the appended claims rather than by the foregoing meaning, and all changes which come within the meaning and range of equivalency of the claims are therefore intended to be embraced therein.

Further, the reference characters used in Chapter 4 are exclusively used in Chapter 4, and are not related to the reference characters in other chapters.

Description of the Reference Characters
11, 21 various information acquisition unit
12, 22 neighboring cell information generation unit
13, 23 neighboring cell information transmission unit
14 power measurement indication unit
81 base-station-side transmission/reception unit
82 data processing unit
83 core-network-side transmission/reception unit
91 antenna
92 circulator
93 wireless reception unit
94 wireless transmission unit
95 signal processing unit
96 reception signal processing unit
97 transmission signal processing unit
101, 101A, 101B, 101C, 101D wireless base station device
202 wireless terminal device
203 gateway device
205 host device
301, 302 wireless communication system
FCA, FCC, FCD, FCE femto cell
MCB macro cell <<Chapter 5>>

Hereinafter, embodiments of the present invention will be described with reference to the drawings. In Chapter 5, the same or corresponding components are given the same reference characters, and are not repeatedly described.

<Embodiment 1>

A wireless base station device notifies wireless terminal devices of information relating to its own cell and neighboring cells, i.e., the frequency of its radio signal, IDs (identifications) of neighboring cells, and the like. Based on the information provided from the wireless base station device, each wireless terminal device detects and measures the neighboring cells. Based on the measurement result, the wireless terminal device starts to move to a neighboring cell. Here, "movement" of a wireless terminal device means "handover", and "selection" of a cell through which a wireless terminal device in the idle state will start communication, i.e., phone call or data communication.

For example, when a wireless terminal device is communicating with a wireless base station device, a destination of the wireless terminal device is determined by the wireless base station device or a host device in a core network. When a wireless terminal device is not communicating with a wireless base station device, a destination of the wireless terminal device is determined by the wireless terminal device.

In 3GPP (Third Generation Partnership Project) SPEC TS22.220, a femto cell and its access modes are described as follows. That is, a femto base station is a CPE (Customer Premise Equipment) that connects a wireless terminal device over a wireless interface to a mobile communication carrier network by using an IP backhaul.

Further, a femto base station in the closed access mode provides services to only its associated CSG (Closed Subscriber Group) members. A femto base station in the hybrid mode provides services to its associated CSG members and to non-CSG members. A femto base station in open access mode operates as a normal base station.

Such a definition based on 3GPP may be applied to the wireless communication system according to the first embodiment of the present invention.

Further, the following definition may be applied in combination with or separately from the above definition.

A macro base station is a wireless base station device under the control of a telecommunication carrier, with which wireless base station devices that subscribe to the telecommunication carrier is communicable. Further, it is considered that a macro base station is basically not powered off.

On the other hand, a femto base station is a wireless base station device which is mainly installed in a personal or corporate building, and is likely to be moved or powered off depending on user's circumstances.

FIG. 114 is a diagram illustrating the relationship between the access modes of a femto base station according to the first embodiment of the present invention, and wireless terminal devices that are allowed to access the femto base stations.

With reference to FIG. 114, the femto base station according to the first embodiment of the present invention has the three access modes. Specifically, in the closed access mode, only registered wireless terminal devices are allowed to access the femto base station. In the open access mode, all wireless terminal devices are allowed to access the femto base station, and therefore, the femto base station is identical to a normal macro base station. In the hybrid mode, all wireless terminal devices are allowed to access the femto base station. In the hybrid mode, however, members, i.e., registered wireless terminal devices, may be treated preferentially over non-members, i.e., unregistered wireless terminal devices, in communication resource allocation, accounting, and the like.

That is, the femto base station according to the first embodiment of the present invention is configurable to operate in any of the following access modes: the open access mode in which all wireless terminal devices are allowed to access the femto base station; the closed access mode in which wireless terminal devices can be registered and only the registered wireless terminal devices are allowed to access the femto base station; and the hybrid mode in which wireless terminal devices can be registered and both the registered wireless ten iinal devices and unregistered wireless terminal devices are allowed to access the femto base station.

[Configuration and Fundamental Operation]

Figure 115:
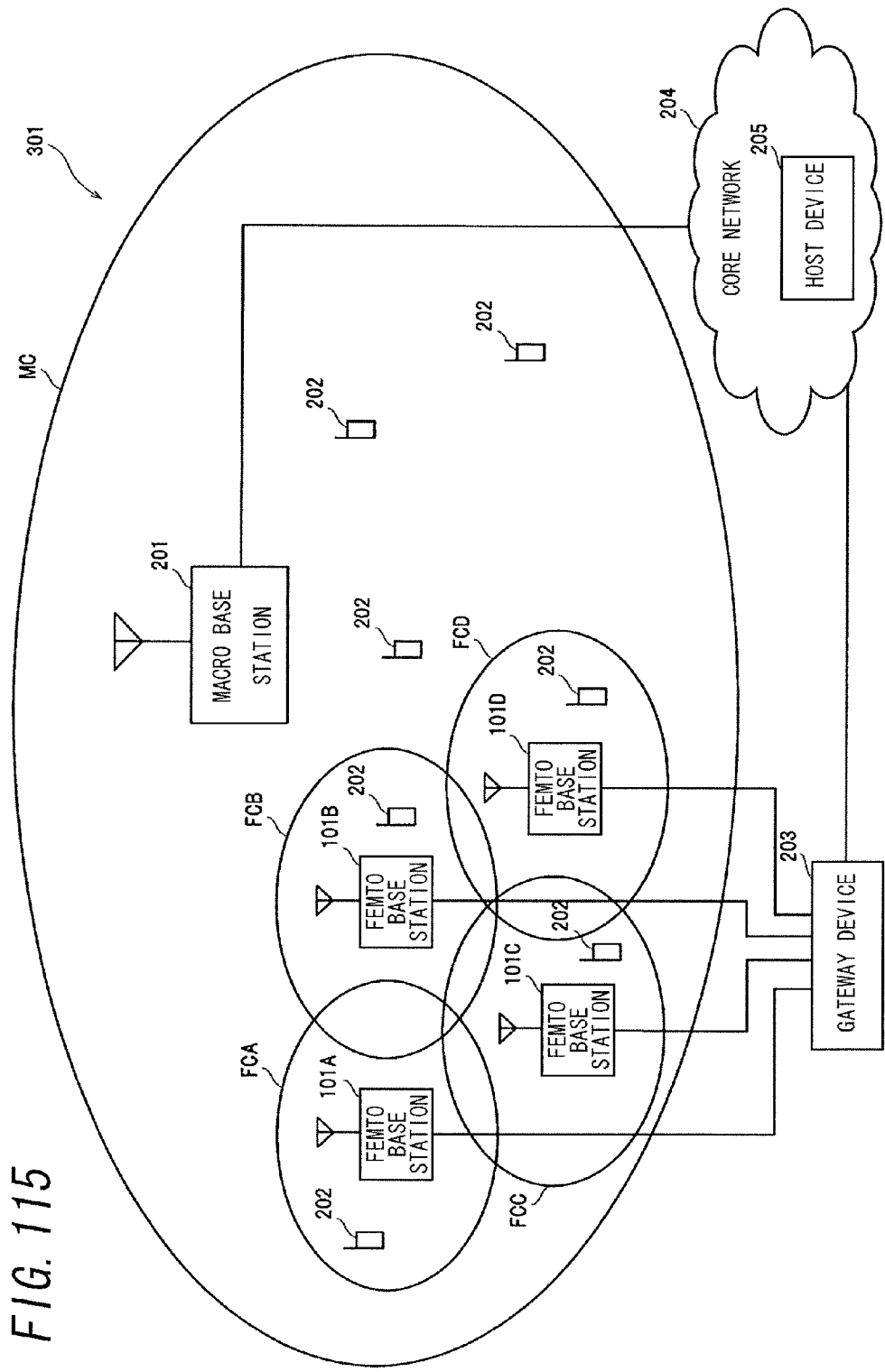
FIG. 115 is a diagram illustrating an example of arrangement of wireless base station devices in a wireless communication system according to the first embodiment of the present invention (Chapter 5).

FIG. 115 is a diagram illustrating an example of arrangement of wireless base station devices in the wireless communication system according to a first embodiment of the present invention.

With reference to FIG. 115, a wireless communication system 301 is a mobile communication system based on LTE (Long Term Evolution) standardized by, for example, 3GPP, and includes a macro base station 201, femto base stations (wireless base station devices) 101A, 101B, 101C, and 101D, a gateway device 203, and a host device 205.

The macro base station 201 forms a macro cell MC having a radius of several kilometers. The femto base stations 101A, 101B, 101C, and 101D form femto cells FCA, FCB, FCC, and FCD, respectively, each having a radius of several tens of meters.

It is assumed that a plurality of femto base stations exist in the macro cell formed by the macro base station 201.

The macro base station 201 transmits/receives radio signals to/from wireless terminal devices 202 existing in the macro cell MC, and thus communicates with the wireless terminal devices 202.

The femto base stations 101A, 101B, 101C, and 101D are installed in places such as homes and underground malls, and are allowed to communicate with wireless terminal devices 202 existing in the femto cells FCA, FCB, FCC, and FCD, respectively, by transmitting/receiving radio signals to/from the wireless terminal devices 202.

The gateway device 203 performs, for example, a process of relaying various kinds of communication data transmitted between each of the femto base stations 101A, 101B, 101C, and 101D, and the host device 205 in the core network 204.

The host device 205 manages information of the entirety of the wireless communication system 301. For example, the host device 205 acquires and stores information of each wireless base station device in the wireless communication system 301.

In the wireless communication system according to the first embodiment of the present invention, the macro base station 201 operates as a neighboring cell processing device. That is, the macro base station 201 solely performs optimization of neighboring cell information.

Hereinafter, each of the femto base stations 101A, 101B, 101C, and 101D is sometimes referred to as a femto base station 101. Although one macro base station and four femto base stations are representatively shown in FIG. 115, less or more macro base stations and femto base stations may be provided.

Figure 116:
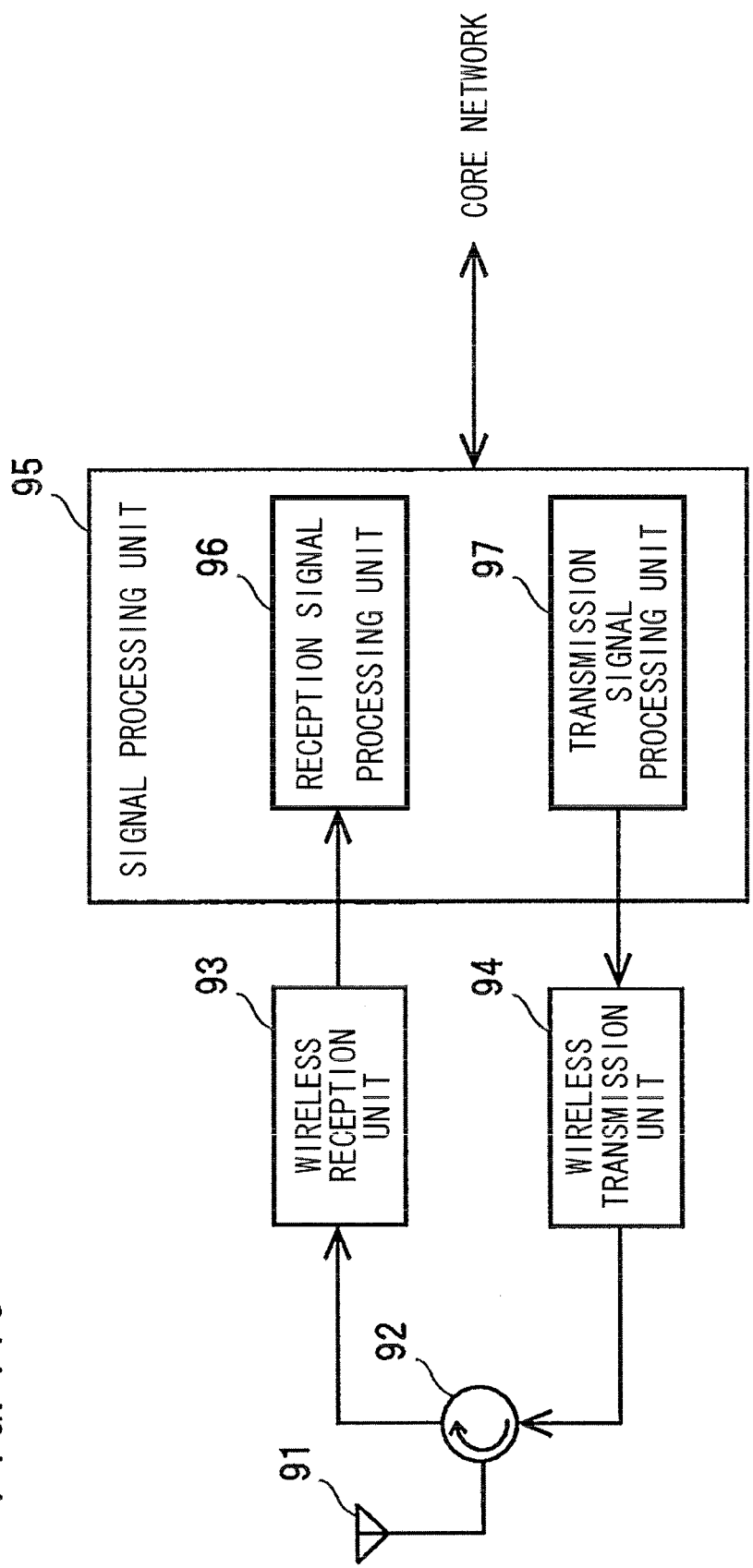
FIG. 116 is a diagram illustrating the configuration of a macro base station according to the first embodiment of the present invention (Chapter 5).

FIG. 116 is a diagram illustrating the configuration of the macro base station according to the first embodiment of the present invention. The configuration of the femto base station 101 is identical to, for example, the macro base station 201.

With reference to FIG. 116, the macro base station 201 includes an antenna 91, a circulator 92, a wireless reception unit 93, a wireless transmission unit 94, and a signal processing unit 95. The signal processing unit 95 includes a reception signal processing unit 96 and a transmission signal processing unit 97. The signal processing unit 95 is implemented by a CPU (Central Processing Unit), a DSP (Digital Signal Processor), or the like.

The circulator 92 outputs a radio signal transmitted from the wireless terminal device 202 and received by the antenna 91, to the wireless reception unit 93, and outputs a radio signal provided from the wireless transmission unit 94, to the antenna 91.

The wireless reception unit 93 frequency-converts the radio signal provided from the circulator 92 into a base band signal or an IF (Intermediate Frequency) signal, converts the frequency-converted signal into a digital signal, and outputs the digital signal to the reception signal processing unit 96.

The reception signal processing unit 96 subjects the digital signal provided from the wireless reception unit 93 to signal processing such as reverse spreading in CDMA (Code Division Multiple Access), converts a part or the entirety of the processed digital signal into a predetermined frame format, and outputs the resultant signal to the host device 205 in the core network 204.

The transmission signal processing unit 97 converts communication data received from the host device 205 in the core network 204 into a predetermined frame format, or generates communication data, and subjects the converted or generated communication data to signal processing such as IFFT (Inverse Fast Fourier Transform) in OFDM (Orthogonal Frequency Division Multiplex), and then outputs a digital signal obtained by the signal processing to the wireless transmission unit 94.

The wireless transmission unit 94 converts the digital signal provided from the transmission signal processing unit 97 into an analog signal, frequency-converts the analog signal into a radio signal, and outputs the radio signal to the circulator 92.

Figure 117:
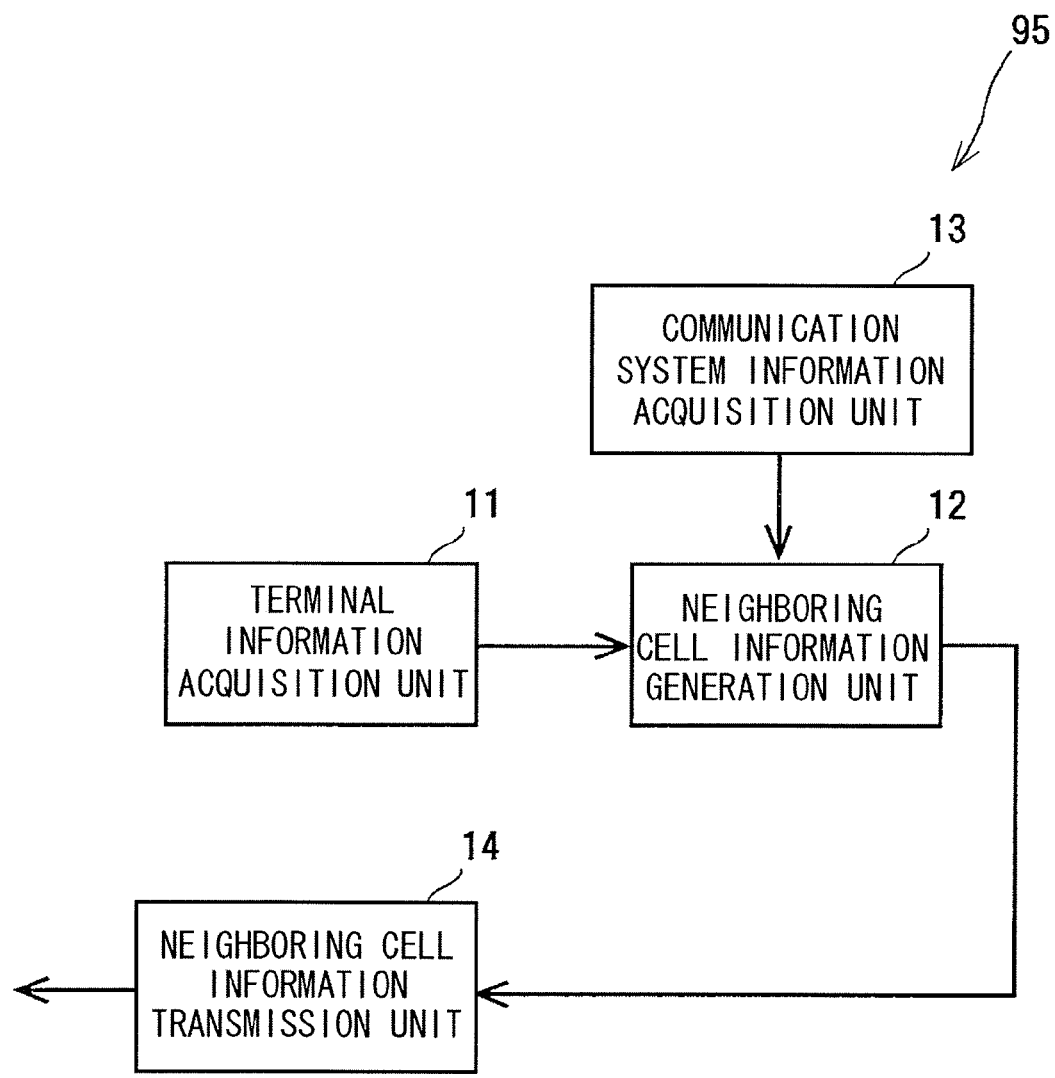
FIG. 117 is a diagram illustrating the configuration of a signal processing unit in the macro base station according to the first embodiment of the present invention (Chapter 5).

FIG. 117 is a diagram illustrating the configuration of the signal processing unit in the macro base station according to the first embodiment of the present invention.

With reference to FIG. 117, the signal processing unit 95 includes a terminal information acquisition unit 11, a neighboring cell information generation unit 12, a communication system information acquisition unit 13, and a neighboring cell information transmission unit 14. The neighboring cell information transmission unit 14 is included in the transmission signal processing unit 97 shown in FIG. 116.

The terminal information acquisition unit 11 acquires identification information of a wireless terminal device 202 communicating with the macro base station 201.

The communication system information acquisition unit 13 acquires, from the host device 205 in the core network 204, communication system information indicating the correspondence relationships among the macro base station 201, one or a plurality of femto base stations 101 located in the neighborhood of the macro base station 201, and wireless terminal devices 202 which are members of the femto base stations 101.

Based on the communication system information acquired by the communication system information acquisition unit 13 and the identification information acquired by the terminal information acquisition unit 11, the neighboring cell information generation unit 12 generates neighboring cell information indicating one or a plurality of wireless base station devices with which a wireless terminal device 202 that is communicating with a wireless base station device to which the neighboring cell information is to be given (hereinafter also referred to as "target base station") is communicable, among a plurality of wireless base station devices other than the target base station, in the wireless communication system 301. That is, the neighboring cell information generation unit 12 generates the neighboring cell information for each wireless terminal device 202 communicating with the target base station. In the wireless communication system according to the first embodiment of the present invention, the target base station is the macro base station 201.

For example, the neighboring cell information generation unit 12 generates neighboring cell information indicating one or a plurality of wireless base station devices to be candidate(s) for a handover destination of the wireless terminal device 202 communicating with the target base station.

The neighboring cell information transmission unit 14 transmits the neighboring cell information generated by the neighboring cell information generation unit 12 to the corresponding wireless terminal device 202 communicating with the macro base station 201.

[Operation]

Next, a description will be given of the operation of the wireless base station device according to the first embodiment of the present invention to generate neighboring cell information.

FIG. 118 is a diagram illustrating an example of communication system information in the wireless communication system according to the first embodiment of the present invention.

In the wireless communication system 301, it is assumed that the cell ID of the macro base station 201 is 1111, the cell IDs of the femto base stations 101A, 101B, 101C, and 101D are 111, 222, 333, and 444, respectively, and the IDs of the wireless terminal devices 202A and 202B communicating with the macro base station 201 are 123 and 345, respectively.

With reference to FIG. 118, the following communication system configuration is shown in the communication system information.

Specifically, the femto base stations 101A, 101B, 101C, and 101D are located in the neighborhood of the macro base station 201.

The femto base station 101A is powered on, and in the closed access mode. The wireless terminal device 202A (ID=123) which is a member exists in the macro cell MC foamed by the macro base station 201, and a wireless terminal device 202 (ID=234) which is a member does not exist in the macro cell MC.

Further, the femto base station 101B is powered off, and in the closed access mode. The wireless terminal device 202A (ID=123) which is a member exists in the macro cell MC formed by the macro base station 201, and the wireless terminal device 202B (ID=345) which is a member exists in the macro cell MC.

The femto base station 101C is powered on, and in the open access mode.

The femto base station 101D is powered on, and in the closed access mode. The wireless terminal device 202B (ID=345) which is a member exists in the macro cell MC formed by the macro base station 201, and the wireless terminal device 202 (ID=567) which is a member does not exist in the macro cell MC.

"A wireless terminal device 202 exists in a cell" means that the wireless terminal device 202 selects, as a communication destination, a wireless base station device that forms the cell, and is communicable with the wireless base station device.

In a case where neighboring cell information which is common to the wireless terminal devices 202 communicable with the macro base station 201 is simply generated based on the communication system information as shown in FIG. 118, it is considered to generate neighboring cell information indicating, for example, the femto base stations 101A, 101B, 101C, and 101D (i.e., the cell IDs 111, 222, 333, and 444).

In contrast, in the wireless communication system according to the first embodiment of the present invention, the neighboring cell information is optimized as follows.

That is, the neighboring cell information generation unit 12 generates neighboring cell information in which at least the powered-off wireless base station device is eliminated from the plurality of wireless base station devices other than the target base station. Further, the neighboring cell information generation unit 12 generates neighboring cell information in which at least the wireless base station device which operates in the closed access mode and whose corresponding wireless terminal device 202 is not registered is eliminated from among the plurality of wireless base station devices other than the target base station.

FIG. 119 is a diagram illustrating an example of neighboring cell information generated by a macro base station in the wireless communication system according to the first embodiment of the present invention. FIG. 119 illustrates neighboring cell information for the wireless terminal device 202A which is any of the wireless terminal devices 202 shown in FIG. 115.

With reference to FIG. 119, the neighboring cell information generation unit 12 generates, as neighboring cell information to be notified to the wireless terminal device 202A communicating with the macro base station 201, neighboring cell information in which the powered-off femto base station 101B, and the femto base station 101D in the closed access mode, for which the wireless terminal device 202A is not a member, are eliminated from the respective femto base stations 101 shown in the communication system information of FIG. 118.

That is, the cell IDs 111 and 333 are registered in the neighboring cell information for the wireless terminal device 202A. The cell ID 111 indicates the femto base station 101A in the closed access mode, which is powered on and for which the wireless terminal device 202A is a member. The cell ID 333 indicates the femto base station 101C which is powered on, and operates in the open access mode.

FIG. 120 is a diagram illustrating an example of neighboring cell information generated by a macro base station in the wireless communication system according to the first embodiment of the present invention. FIG. 120 indicates neighboring cell information for the wireless terminal device 202B which is any of the wireless terminal devices 202 shown in FIG. 115 other than the wireless terminal device 202A.

With reference to FIG. 120, the neighboring cell information generation unit 12 generates, as neighboring cell information to be notified to the wireless terminal device 202B communicating with the macro base station 201, neighboring cell information in which the powered-off femto base station 101B, and the femto base station 101A in the closed access mode, for which the wireless terminal device 202B is not a member, are eliminated from the respective femto base stations 101 shown in the communication system information of FIG. 118.

That is, the cell IDs 333 and 444 are registered in the neighboring cell information for the wireless terminal device 202B. The cell ID 333 indicates the femto base station 101C which is powered on and operates in the open access mode. The cell ID 444 indicates the femto base station 101D in the closed access mode, which is powered on and for which the wireless terminal device 202B is a member.

In this way, the neighboring cell information generation unit 12 optimizes the neighboring cell information for each wireless terminal device 202. Two cell IDs are registered in each of the neighboring cell information for the wireless terminal device 202A and the neighboring cell information for the wireless terminal device 2028.

Figure 121:
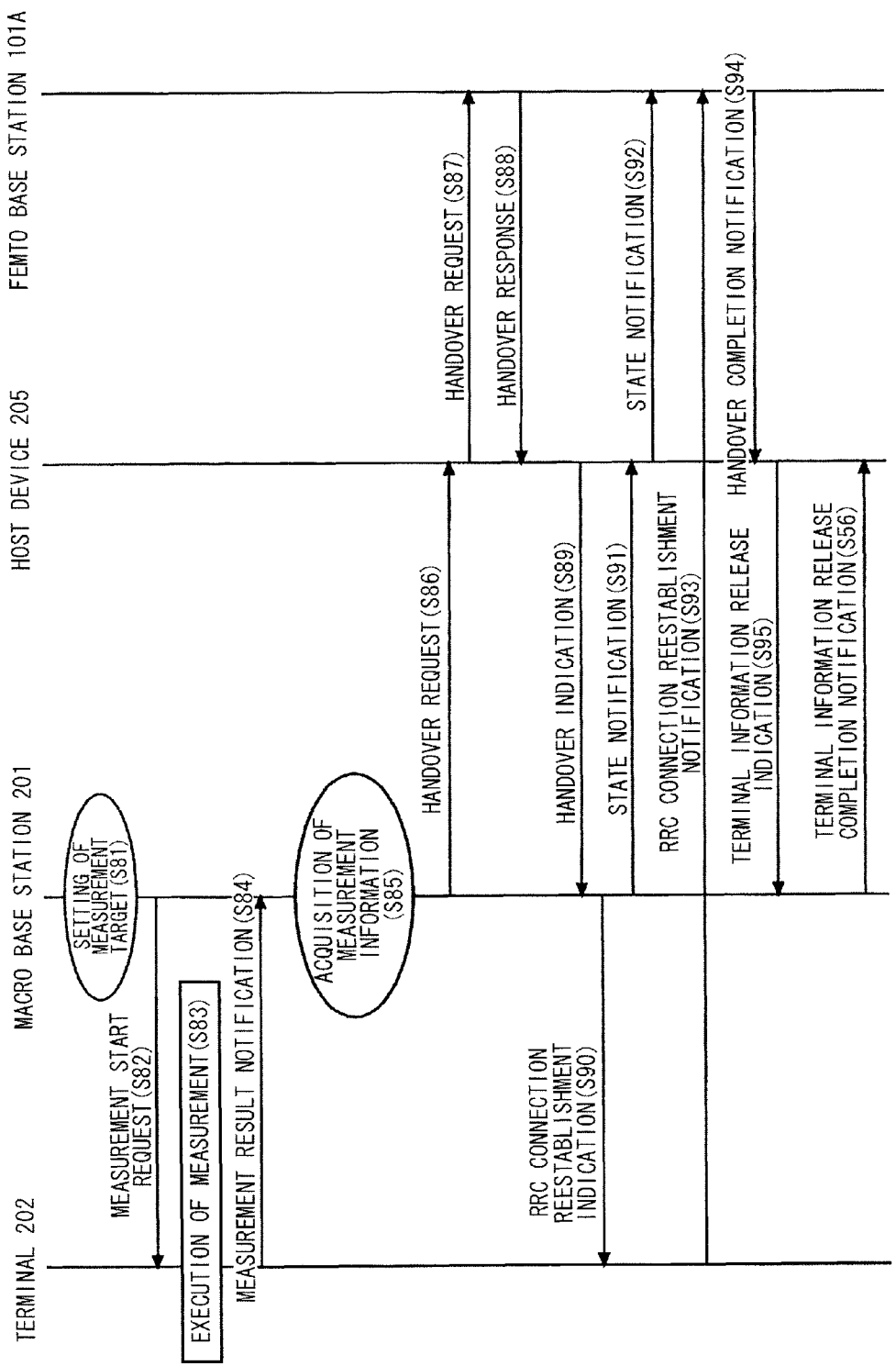

FIG. 121 is a diagram illustrating an example of a sequence of a handover operation in the wireless communication system according to the first embodiment of the present invention.

With reference to FIG. 121, firstly, the macro base station 201 sets frequencies to be measured by the wireless terminal device 202A communicating with the macro base station 201, and cells to be measured, i.e., other wireless base station devices that transmit radio signals of the frequencies (step S81).

Next, the macro base station 201 transmits, to the wireless terminal device 202A, a measurement start request that causes the wireless terminal device 202A to measure reception levels of the radio signals transmitted from the other wireless base station devices. The measurement start request includes information, i.e., the cell IDs, of the wireless base station devices as the measurement targets. For example, this information is the neighboring cell information for the wireless terminal device 202A shown in FIG. 119. Further, the measurement start request includes the transmission frequencies of the respective wireless base station devices 101 (step S82).

Upon receiving the measurement start request from the macro base station 201, the wireless terminal device 202A measures, in the frequencies indicated by the received measurement start request, the reception levels of the radio signals transmitted from the wireless base station devices indicated by the measurement start request (step S83).

Next, the wireless terminal device 202A transmits a measurement result notification indicating the measured reception levels to the macro base station 201. For example, the wireless terminal device 202A periodically performs measurement of reception levels. When the communication state with the macro base station 201 is deteriorated or when the communication state with any of the wireless base station devices other than the macro base station 201 is improved, the wireless terminal device 202A transmits the measurement result notification to the macro base station 201 (step S84).

Next, based on the measurement result notification received from the wireless terminal device 202A, the macro base station 201 acquires measurement information indicating the measurement result for each cell ID, and stores the measurement information in a storage unit (not shown) (step S85).

If the wireless terminal device 202A detects a cell which is not notified from the macro base station 201, the wireless terminal device 202A may include the measurement result of this cell in the measurement result notification to be notified to the macro base station 201.

Further, by instructing measurement for all available frequencies in the wireless communication system 301, the macro base station 201 can cause the wireless terminal device 202A to perform detection and power measurement of neighboring cells for all the frequencies.

Next, based on the measurement result notification received from the wireless terminal device 202A, the macro base station 201 determines whether or not the wireless terminal device 202A should perform handover. Upon determining that the wireless terminal device 202A should perform handover, the macro base station 201 determines, for example, the femto base station 101A as a handover destination with reference to the neighboring cell information for the wireless terminal device 202A shown in FIG. 119, and transmits a handover request indicating the femto base station 101A to the host device 205 in the core network 204 (step S86). When the macro base station 201 determines a handover destination based on the measurement result notification received from the wireless terminal device 202A, the operation of referring to the neighboring cell information is not needed.

In the wireless communication system according to the first embodiment of the present invention, "handover" means that a wireless base station device which is a communication partner of a wireless terminal device 202 during phone call or data communication is changed to another femto base station.

Upon receiving the handover request from the macro base station 201, the host device 205 transmits the handover request to the femto base station 101A (step S87).

Upon receiving the handover request from the host device 205, the femto base station 101A transmits a handover response to the handover request, to the host device 205 (step S88).

Upon receiving the handover response from the femto base station 101A, the host device 205 transmits a handover indication to the macro base station 201 (step S89).

Upon receiving the handover response from the femto base station 101A, the host station 201 transmits an RRC connection reestablishment indication (RRC connection reconstruction indication or RRC connection establishment indication) to the wireless terminal device 202A (step S90).

Then, the macro base station 201 transmits a status notification indicating its own communication status and the like, to the host device 205 (step S91).

Upon receiving the status notification from the macro base station 201, the host device 205 transmits a status notification indicating the content of communication with the wireless terminal device 202A and the like, to the femto base station 101A (step S92).

When an RRC connection is established between the wireless terminal device 202A and the femto base station device 101A, the wireless terminal device 202A transmits an RRC connection establishment notification to the femto base station 101A (step S93). The RRC (Radio Resource Control) connection is a process that causes the wireless terminal device 202A to start communication with the macro base station 201.

Upon receiving the RRC connection establishment notification from the wireless terminal device 202A, the femto base station 101A transmits a handover completion notification to the host device 205 (step S94).

Upon receiving the handover completion notification from the femto base station 101A, the host device 205 transmits a terminal information release indication to the macro base station 201 (step S95).

Upon receiving the terminal information release indication from the host device 205, the macro base station 201 releases information relating to the wireless terminal device 202A, and transmits a terminal information release completion notification to the host device 205 (step S96).

[Notification of Neighboring Cell Information]

The macro base station 201 performs generation and updating of neighboring cell information in association with start of communication with a new wireless terminal device 202 or updating of the communication system information. The macro base station 201 needs to notify the corresponding wireless terminal device 202 of the generated or updated neighboring cell information. That is, the neighboring cell information transmission unit 14 in the macro base station 201 transmits the neighboring cell information generated by the neighboring cell information generation unit 12 to the corresponding wireless terminal device 202 which is communicating with the macro base station 201 as the target base station. In this case, the following two notification methods are considered.

Figure 122:
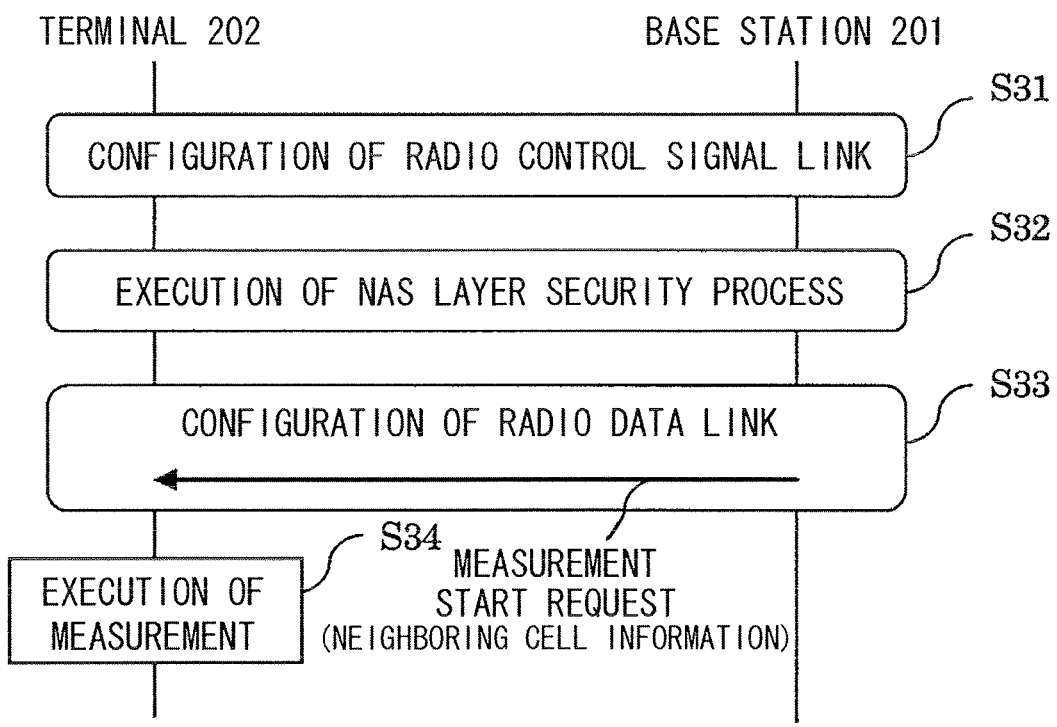

FIG. 122 is a diagram illustrating an example of a method in which a wireless base station device notifies a wireless terminal device of neighboring cell information, in the wireless communication system according to the first embodiment of the present invention.

With reference to FIG. 122, for example, in LTE, the macro base station 201 notifies a wireless terminal device 202 that performs an RRC connection establishing process, of the neighboring cell information, when the macro base station 201 configures a radio data link.

More specifically, firstly, configuration of radio control signal link, i.e., various control processes in advance of transmission/reception of communication data such as IP (Internet Protocol) packets, is performed between the wireless terminal device 202 and the macro base station 201 (step S31).

Next, a security process for a NAS (Non-Access Stratum) layer, i.e., transmission/reception of information required for encryption of communication, is performed between the wireless terminal device 202 and the macro base station 201 (step S32). For example, in LTE, the wireless terminal device 202 transmits/receives information to/from the host device 205 in the core network 204, and the macro base station 201 relays the information.

Next, configuration of radio data link is performed between the wireless terminal device 202 and the macro base station 201, and thereafter, communication data such as IP packets are transmitted/received between the wireless terminal device 202 and the macro base station 201. Further, the macro base station 201 transmits, to the wireless terminal device 202, a measurement start request that causes the wireless terminal device 202 to measure the reception levels of radio signals transmitted from other wireless base station devices (step S33). For example, in LTE, the measurement start request is included in a radio data link configuration request transmitted from the macro base station 201 to the wireless terminal device 202. The neighboring cell information is included in the measurement start request.

Upon receiving the measurement start request from the macro base station 201, the wireless terminal device 202 updates the neighboring cell information held therein to the newly informed neighboring cell information, and measures the reception levels of the radio signals transmitted from the wireless base station devices indicated in the updated neighboring cell information (step S34).

Figure 123:
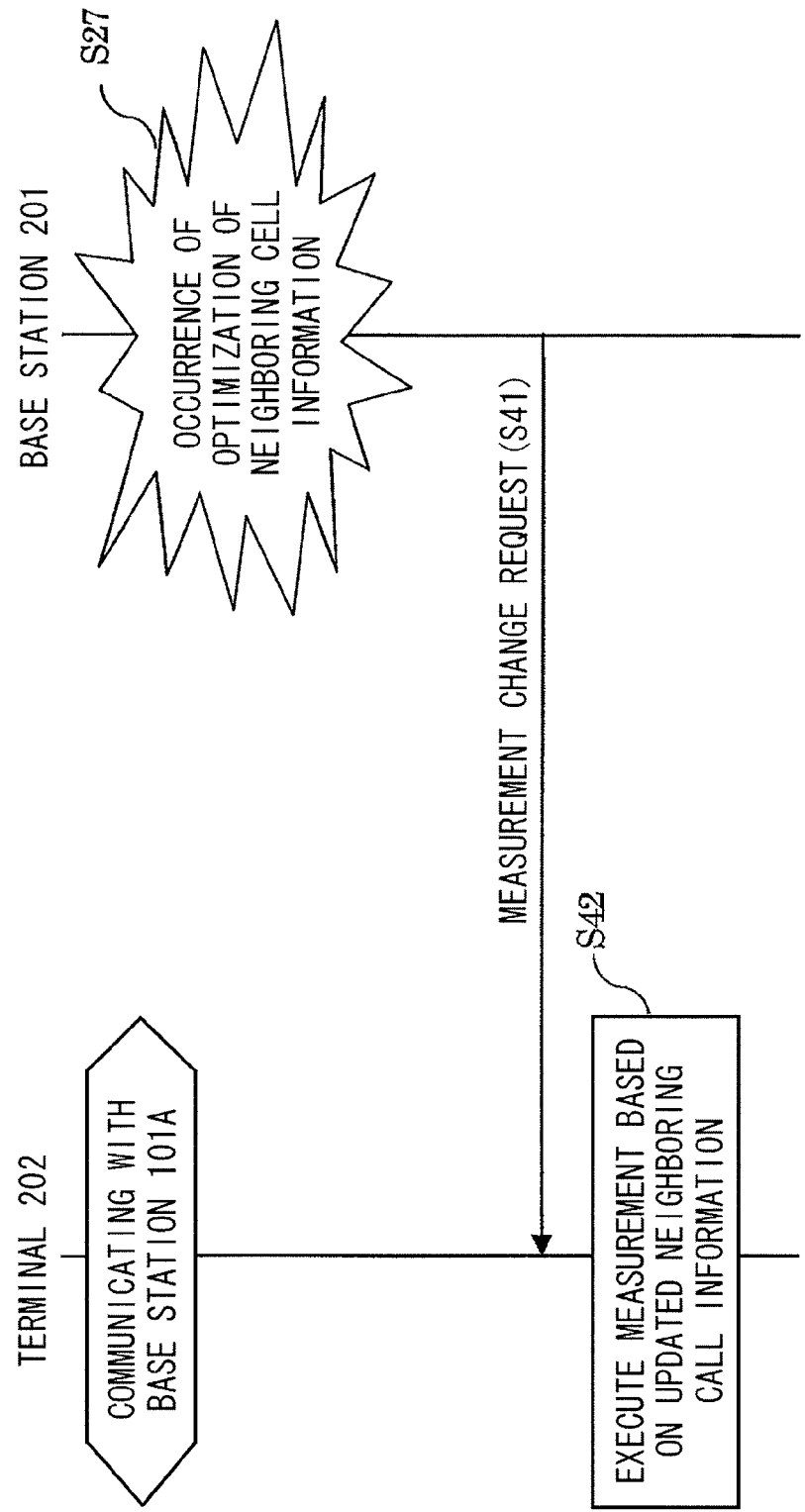

FIG. 123 is a diagram illustrating an example of a method in which a wireless base station device notifies a wireless terminal device of neighboring cell information, in the wireless communication system according to the first embodiment of the present invention.

With reference to FIG. 123, the macro base station 201 notifies the wireless terminal device 202 communicating with the macro base station 201 of updating of the neighboring cell information, by using a measurement change request.

More specifically, when optimization of the neighboring cell information occurs (step S27), the macro base station 201 includes the updated neighboring cell information in the measurement change request, and transmits the measurement change request to the wireless terminal device 202 (step S41).

Then, the wireless terminal device 202 changes the neighboring cell information held therein to the neighboring cell information included in the measurement change request received from the macro base station 201, and measures the reception levels of the radio signals transmitted from the wireless base station devices indicated in the changed neighboring cell information (step S42).

[Generation of Communication System Information]

The communication system information shown in FIG. 118 is information indicating the correspondence relationships among the macro base station 201, the femto base stations 101, and the wireless terminal devices 202. In the wireless communication system according to the first embodiment of the present invention, such communication system information is generated as follows.

Firstly, in order to acquire information indicating association of each femto base station 101 with wireless terminal devices 202, i.e., indicating each femto base station 101 and wireless terminal devices 202 which are allowed to access the femto base station 101, there are, for example, three methods as follows: (1) a method of acquiring such information in a wireless terminal device 202; (2) a method of acquiring such information in a femto base station 101; and (3) a method of acquiring such information in the host device 205.

In the method (1), for example, in LTE, each wireless terminal device 202 recognizes a CSG to which it belongs, i.e., its own CSG ID, and accesses a femto base station 101 having the same CSG ID. The CSG ID is broadcast from the femto base station 101. Thereby, the host device 205 acquires information indicating the correspondence relationship between the femto base station 101 and the wireless terminal device 202 via the femto base station 101.

For example, the wireless terminal device 202 recognizes the CSG to which it belongs, i.e., its own CSG ID, by that the user of the wireless terminal device 202 inputs the ID number of the accessible femto base station 101.

In the method (2), a user who installs a femto base station 101 inputs, in the femto base station 101, the ID number of each wireless terminal device 202 which is allowed to access the femto base station 101, i.e., which is to be a member of the femto base station 101. Thereby, the host device 205 acquires information indicating the correspondence relationship between the femto base station 101 and the wireless terminal device 202 via the femto base station 101.

In the method (3), a user who installs a femto base station 101 informs the ID number of the femto base station 101 and the ID number of each wireless terminal device 202 which is allowed to access the femto base station 101, i.e., which is to be a member of the femto base station 101, to a mobile telecommunications carrier at the time of purchase, or after purchase via a website or the like. Thereby, the host device 205 acquires information indicating the correspondence relationship between the femto base station 101 and the wireless terminal device 202 via the mobile telecommunications carrier. Thus, in LTE, the host device 205 holds a list of the wireless terminal devices 202 which are allowed to access the femto base station 101.

Next, in order to acquire information indicating association of a macro base station 201 with a femto base station 101, i.e., indicating a macro base station 201 which forms a macro cell including a part or the entirety of a femto cell formed by a femto base station 101, there are, for example, three methods as follows: (A) a method of acquiring such information via the femto base station 101; (B) a method of acquiring such information by using positional information of the femto base station 101; and (C) a method of acquiring such information by using measurement information.

In the method (A), communication system information is generated based on identification information of a wireless base station device which is other than a target base station and has detected the target base station, and identification information of the target base station, which are notified from the wireless base station device.

Specifically, for example, a sniffer function of a femto base station 101 is used. That is, a femto base station 101 receives a radio signal from a macro base station 201, and refers to broadcast information included in the received radio signal, thereby detecting the macro base station 201 which forms a macro cell including a part or the entirety of a femto cell formed by the femto base station 101.

In a situation where a plurality of other femto base stations 101 are located in close vicinity of the femto base station 101, these other femto base stations 101 are also detected. In this case, if the detected femto base stations 101 operate in the closed access mode or the hybrid mode, these femto base stations 101 can be distinguished from the macro base station 201 by referring to the CSG IDs or the like indicated in broadcast information from the femto base stations 101. However, in many cases, determination as to whether a detected wireless base station device is a femto base station or a macro base station 201 is performed by the mobile telecommunications carrier, without the necessity of using the CSG IDs.

In the method (B), communication system information is generated based on identification information of a target base station which is acquired based on positional information indicating the installation location of a wireless base station device other than the target base station, and on identification information of the wireless base station device corresponding to the positional information.

Specifically, if a femto base station 101 is allowed to specify its present location by using a GPS (Global Positioning System) or the like, the host device 205 acquires information of a macro base station 201 which is geographically close to the femto base station 101, based on the positional information of the femto base station 101.

Considering a case where a femto base station 101 installed indoors cannot use a GPS, the following method may be adopted instead of, or in combination with, the method using a GPS. That is, a user who installs a femto base station 101 notifies the mobile telecommunications carrier of the installation location of the femto base station 101, at the time of purchase, or after purchase via a website or the like. Thereby, the host device 205 acquires the positional information of the femto base station 101 via the mobile telecommunications carrier, and thereby acquires information of a macro base station 201 which is geographically close to the femto base station 101.

In the method (C), when installing a femto base station 101, the mobile telecommunications carrier measures the radio wave condition to specify a macro base station 201 which is geographically close to the femto base station 101. Thereby, the host device 205 acquires information of the macro base station 201 via the mobile telecommunications carrier.

Alternatively, a wireless terminal device 202 located in the neighborhood of the femto base station 101 measures a radio signal from each wireless base station device, and detects a macro base station 201 based on the result of measurement, and then notifies the femto base station 101 of identification information of the detected macro base station 201. Thereby, the host device 205 acquires information of the macro base station 201 via the femto base station 101.

In the wireless communication system according to the first embodiment of the present invention, it is possible to generate communication system information by combining any of the methods (1) to (3) with any of the methods (A) to (C).

[Obtainment of Power State]

In the wireless communication system according to the first embodiment of the present invention, information of the power states of femto base stations 101 in the communication system information is acquired as follows.

That is, when a wireless terminal device 202 goes into a macro cell formed by a macro base station 201, the macro base station 201 includes a femto base station 101 which allows access of the wireless terminal device 202, in neighboring cell information for the wireless terminal device 202, and then notifies the wireless terminal device 202 of the neighboring cell information. At this time, by considering the power state of the femto base station 101 to be included in the neighboring cell information, more appropriate neighboring cell information can be generated.

By managing the power state of the femto base station 101, for example, the connection state of the femto base station 101 to the host device 205, by using the following methods (α) and (β), it is possible to prevent a powered-off femto base station 101 from being included in neighboring cell information.

In the method (α), when a new wireless terminal device 202 starts communication with the target base station, the neighboring cell information generation unit 12 acquires power information indicating whether one or a plurality of wireless base station devices with which the new wireless terminal device 202 is communicable are powered on or off. Then, the neighboring cell information generation unit 12 generates, as neighboring cell information for the new wireless terminal device 202, neighboring cell information in which at least the powered-off wireless base station devices are eliminated.

Specifically, when the wireless terminal device 202 goes into the macro cell formed by the macro base station 201, the macro base station 201 confirms the power state of the femto base station 101 which allows access of the wireless terminal device 202, before including the femto base station 101 in the neighboring cell information for the wireless terminal device 202. If the femto base station 101 is powered off, for example, when the host device 205 cannot detect the femto base station 101, the femto base station 101 is not included in the neighboring cell information for the wireless terminal device 202.

In the method (β), communication system information is generated based on power information indicating whether a wireless base station device other than the target base station is powered on or off, which is notified by the wireless base station device.

Specifically, when a femto base station 101 is powered on, the femto base station 101 notifies the host device 205 that it is powered on. Further, when a femto base station 101 is powered off, the femto base station 101 notifies the host device 205 that it is powered off.

Thereby, the host device 205 can manage the power states of the subordinate femto base stations 101.

The communication system information may be generated based on power information indicating that a wireless base station device other than the base station device is being powered on, which is periodically notified from the wireless base station device.

Specifically, while a femto base station 101 is being powered on, the femto base station 101 may periodically notify the host device 205 that it is being powered on. Thereby, the host device 205 is allowed to detect power-off of the femto base station 101 due to abnormality such as plug disconnect or LAN (Local Area Network) cable disconnect.

Next, a description will be given of a more specific example of a method of acquiring the power states of base stations in the communication system information. Hereinafter, each of a femto base station 101 and a macro base station 201 is simply referred to as a base station.

Firstly, a description will be given of a method of notifying the power state of a base station by using an X2 interface which is a logical inter-base-station interface in LTE. Base stations exchange communication data based on the X2 interface via, for example, the gateway device 203 or the host device 205, thereby exchanging various kinds of information with each other via the X2 interface.

In the wireless communication system 301, a certain base station A notifies another base station B of its power state transition via the X2 interface.

More specifically, when the base station A is started up, i.e., when it transits from the power-off state to the power-on state, or when the base station A is ended, i.e., when it transits from the power-on state to the power-off state, the base station A transmits a power transition notification message to the base station B which establishes an X2 interface with the base station A, thereby notifying the base station B of the power state transition.

FIG. 124 is a diagram illustrating an example of a power transition notification message in the wireless communication system according to the first embodiment of the present invention.

With reference to FIG. 124, the power transition notification message is a message indicating that a base station is started up, i.e., transits from the power-off state to the power-on state, or that the base station is ended, i.e., transits from the power-on state to the power-off state. Further, in the wireless communication system 301, a base station A which generates neighboring cell information may transmit a power state notification request message to another base station B which establishes an X2 interface with the base station A to inquire about the power state of the base station B. When the base station B is in the power-off state, the base station A has no response from the base station B, and thereby determines that the base station B is in the power-off state.

FIG. 125 is a diagram illustrating an example of a power state notification request message in the wireless communication system according to the first embodiment of the present invention.

With reference to FIG. 125, the power state notification request message is, for example, a message indicating whether a power state notification request is present or not.

If the base station B in the power-on state receives the power state notification request message as described above, the base station B transmits a power state notification message to a base station A to notify the base station A of its power state.

FIG. 126 is a diagram illustrating an example of a power state notification message in the wireless communication system according to the first embodiment of the present invention.

With reference to FIG. 126, the power state notification message is a message indicating, for example, that a base station is started up, i.e., transits from the power-off state to the power-on state, or that the base station is ended, i.e., transmits from the power-on state to the power-off state, or that the base station is in the power-on state, or that the base station is in the power-off state.

When the base station B receives the power state notification request message as described above, the base station B may transmit the following power state notification message to the base station A to notify the base station A of, in addition to its power state, its current load status, and the number of connected terminals, i.e., the number of wireless terminal devices 202 communicating with the base station B.

FIG. 127 is a diagram illustrating another example of a power state notification message in the wireless communication system according to the first embodiment of the present invention.

With reference to FIG. 127, the power state notification message is a message indicating, in addition to the power state of a base station, the load status ("high", "medium", or "low"), and the number of wireless terminal devices 202 performing phone calls via the base station.

Each base station may transmit/receive each of the above-described messages, solely or together with other messages based on the X2 interface.

When the load of the base station is great, or when the number of terminals connected to the base station reaches the maximum number of connectable terminals, the base station cannot communicate with a new wireless terminal device. If such a base station that is not suitable as a handover destination is registered in neighboring cell information, the base station causes a wireless terminal device to perform unnecessary measurement operation, and unnecessary handover occurs, resulting in waste of battery power of the wireless terminal device.

So, in the wireless communication system according to the first embodiment of the present invention, by adopting a configuration in which a base station notifies, in advance, another base station of its power state, its load status, and the number of terminals connected thereto, it is possible to avoid unnecessary measurement operation and handover operation.

Next, a description will be given of a method of notifying the power state of a base station by using an S1 interface which is a logical interface between base stations and telecommunications carrier network in LTE.

Base stations exchange communication data based on the S1 interface with the host device 205 which is, for example, an MME, thereby exchanging various kinds of information with each other via the S1 interface.

In the wireless communication system 301, a base station A notifies the MME 205 of its power state transition via the S1 interface.

When the base station A is started up, i.e., transits from the power-off state to the power-on state, or when it is ended, i.e., transits from the power-on state to the power-off state, the base station A transmits a power state notification message to the MME 205, thereby notifying the MME 205 of the power state transition.

FIG. 128 is a diagram illustrating an example of a power state notification message in the wireless communication system according to the first embodiment of the present invention.

With reference to FIG. 128, the power state notification message is a message indicating, for example, a transmission source base station identifier such as a cell global ID, a transmission destination base station list which is a list of identifiers such as cell global IDs of transmission destination base stations, and the power state indicating that a base station is started up, i.e., transits from the power-off state to the power-on state, or that the base station is ended, i.e., transmits from the power-on state to the power-off state.

A symbol ">" in FIG. 128 and subsequent figures means that information with this symbol is a member of the list or the like that is shown above the information.

Specifically, FIG. 128 shows that an aggregation of transmission destination base station identifiers is the transmission destination base station list, that is, a plurality of transmission destination base station identifiers are members of the transmission destination base station list.

Upon receiving such a power state notification message from the base station A, the MME 205 transmits the power state notification message to the respective base stations B listed in the transmission destination base station list via the S1 interface.

In some cases, the MME 205 may determine destinations of the power state notification message. For example, when no base station identifiers are listed in the transmission destination base station list, the MME 205 determines destinations of the power state notification message.

Further, in the wireless communication system 301, the base station A which generates neighboring cell information may transmit a power state notification request message to the MME 205 to inquire about the power states of other base stations B.

FIG. 129 is a diagram illustrating an example of a power state notification request message in the wireless communication system according to the first embodiment of the present invention.

With reference to FIG. 129, the power state notification request message is a message indicating, for example, a transmission source base station identifier such as a cell global ID, a transmission destination base station list which is a list of identifiers such as cell global IDs of transmission destination base stations, and presence/absence of a power state notification request.

Upon receiving such a power state notification request message from the base station A, the MME 205 transmits the power state notification request message to the respective base stations B listed in the transmission destination base station list via the S1 interface.

In some cases, the MME 205 may determine destinations of the power state notification request message. For example, when no base station identifiers are listed in the transmission destination base station list, the MME 205 determines destinations of the power state notification request message.

When a base station B is in the power-off state, the MME 205 receives no response from the base station B, and thereby determines that the base station B is in the power-off state.

When a base station B in the power-on state receives the above-described power state notification request message, the base station B transmits the power state notification message to the base station A to notify the base station A of its power state via the MME 205.

FIG. 130 is a diagram illustrating an example of a power state notification message in the wireless communication system according to the first embodiment of the present invention.

With reference to FIG. 130, the power state notification message is a message indicating, for example, a transmission source base station identifier such as a cell global ID, transmission destination base station identifiers such as cell global IDs, and information indicating that a base station is started up, i.e., transmits from the power-off state to the power-on state, or that the base station is ended, i.e., transmits from the power-on state to the power-off state, or that the base station is in the power-on state, or that the base station is in the power-off state.

Upon receiving such a power state notification message from a base station B, the MME 205 transmits the power state notification message to base stations A listed in the transmission destination base station list via the S1 interface.

When a base station B receives the power state notification request message as described above, the base station B may transmit the following power state notification message to the MME 205 to notify a base station A of, in addition to its power state, its current load status, and the number of connected terminals, i.e., the number of wireless terminal devices 202 communicating with the base station B, via the MME 205.

FIG. 131 is a diagram illustrating another example of a power state notification message in the wireless communication system according to the first embodiment of the present invention.

With reference to FIG. 131, the power state notification message is a message indicating, for example, the load status ("high", "medium", or "low") of the base station, and the number of wireless terminal devices 202 communicating with each other via the base station, in addition to a transmission source base station identifier, transmission destination base station identifiers, and the power state of the base station.

Each base station may transmit/receive each of the above-described messages solely or together with other messages based on the S1 interface.

Alternatively, the MME 205 may have a database in which the states of the respective base stations are registered, and manage the power states of the respective base stations. In this case, if a base station A makes an inquiry to the MME 205, the MME 205 transmits a base station power state notification message to the base station A to notify the base station A of the power states and the like of other base stations B.

FIG. 132 is a diagram illustrating another example of a base station power state notification message in the wireless communication system according to the first embodiment of the present invention.

With reference to FIG. 132, the base station power state notification message is a message indicating, for each base station, a base station identifier such as a cell global ID; the power state indicating that the base station is started up, i.e., transits from the power-off state to the power-on state, or that the base station is ended, i.e., transmits from the power-on state to the power-off state, or that the base station is in the power-on state, or that the base station is in the power-off state; the load status ("high", "medium", or "low") of the base station, and the number of wireless terminal devices 202 communicating with each other via the base station.

By the way, purchasers of femto base stations are allowed to independently determine where to install the femto base stations. Therefore, in a wireless communication system in which femto base stations are installed, the femto base stations are likely to be moved or powered on/off. For this reason, it is difficult for a wireless base station device around which femto base stations exist to generate appropriate neighboring cell information.

For example, based on the neighboring cell information, a wireless terminal device measures the reception powers from the femto base stations registered in the neighboring cell information, autonomously or upon receiving an indication from a femto base station, and notifies the femto base station of the measurement result. In this case, if a femto base station that is not suitable as a handover destination, such as a femto base station in the closed access mode, for which the wireless terminal device is not registered, or a powered-off femto base station, is registered in the neighboring cell information, the wireless terminal device performs unnecessary measurement, and unnecessary handover occurs.

As the number of installed femto base stations 101 increases and thereby the number of femto base stations registered in the neighboring cell information increases, the transmission frequency band of the macro base station 201 for transmitting the neighboring cell information increases, and the transmission time also increases, which causes an increase in interference to other wireless base station devices and other wireless terminal devices 202 in the neighborhood of the macro base station 201. Further, also in a wireless terminal device 202 which receives the neighboring cell information, the amount of data to be received is increased, and thereby power consumption is increased.

Meanwhile, if the number of wireless base station devices registered in neighboring cell information is simply reduced, there is a possibility that a wireless terminal device 202 cannot appropriately perform handover or the like.

In contrast, in the wireless communication system according to the first embodiment of the present invention, the neighboring cell information generation unit 12 generates, for each wireless terminal device 202 communicating with the target base station, neighboring cell information indicating one or a plurality of wireless base station devices with which the wireless terminal device 202 communicating with the target base station is communicable, among the plurality of wireless base station devices other than the target base station. Then, the neighboring cell information transmission unit 14 transmits the neighboring cell information generated by the neighboring cell information generation unit 12 to the corresponding wireless terminal device 202.

By generating the neighboring cell information for each wireless terminal device 202 communicating with the target base station such that wireless base station devices with which the wireless terminal device 202 is communicable are included in the neighboring cell information, it is possible to prevent the wireless terminal device 202 from performing unnecessary measurement operation, and reduce occurrence of unnecessary handover. Further, since unsuitable wireless base station devices are not included in the neighboring cell information, the transmission frequency band of the macro base station 201 for transmitting the neighboring cell information is prevented from increasing, and the transmission time is reduced, thereby reducing interference to other wireless base station devices and other wireless terminal devices 202 in the neighborhood of the target base station. Furthermore, the wireless terminal device 202, when receiving the neighboring cell information, need not receive a large amount of data, thereby avoiding an increase in power consumption. Moreover, inappropriate reduction in the number of wireless base station devices to be included in the neighboring cell information is avoided, thereby allowing the wireless terminal device 202 to perform appropriate handover or the like.

Further, since the neighboring cell information can be automatically optimized regardless of movement and power on/off of each femto base station, the efficiency of operation in the wireless communication system 301 can be enhanced without manpower assistance. Further, since the neighboring cell information is automatically optimized, a special installation process for each wireless base station device is not needed, thereby reducing the time and cost required for installing the wireless base station device.

Accordingly, in the wireless communication system according to the first embodiment of the present invention, generation of appropriate neighboring cell information realizes highly-efficient operation in the wireless communication system.

Further, in the wireless communication system according to the first embodiment of the present invention, the neighboring cell information generation unit 12 generates the neighboring cell information in which at least the powered-off wireless base station device is eliminated from among the plurality of wireless base station devices other than the target base station.

In this way, in the wireless communication system according to the first embodiment of the present invention, power on/off of each femto base station 101 is adopted as a criterion for registration of the femto base station 101 in the neighboring cell information. That is, by eliminating the powered-off femto base station 101 from the neighboring cell information, the femto base station 101 with which each wireless terminal device 202 is surely not communicable can be eliminated from the neighboring cell information, thereby preventing the wireless terminal device 202 from performing unnecessary handover operation and measurement operation.

Further, in the wireless communication system according to the first embodiment of the present invention, the neighboring cell information generation unit 12 generates the neighboring cell information in which at least the wireless base station device which operates in the closed access mode and in which a corresponding wireless terminal device 202 is not registered is eliminated from the plurality of wireless base station devices other than the target base station.

In this way, in the wireless communication system according to the first embodiment of the present invention, whether or not a wireless terminal device 202 is allowed to access a femto base station 101 is adopted as a criterion for registration of the femto base station 101 in the neighboring cell information. That is, by eliminating, from the neighboring cell information, a femto base station 101 which does not allow access of a wireless terminal device 202, the femto base station 101 with which the wireless terminal device 202 is not communicable can be eliminated from the neighboring cell information, thereby preventing the wireless terminal device 202 from performing unnecessary handover operation and measurement operation.

Further, in the wireless communication system according to the first embodiment of the present invention, the communication system information acquisition unit 13 acquires communication system information indicating the correspondence relationships between one or a plurality of wireless base station devices located in the neighborhood of the target base station and one or a plurality of wireless terminal devices 202 communicable with the one or the plurality of wireless base station devices. Then, the neighboring cell information generation unit 12 generates neighboring cell information, based on the communication system information acquired by the communication system information acquisition unit 13.

This configuration allows generation of appropriate neighboring cell information based on the configuration of the wireless communication system 301.

Further, in the wireless communication system according to the first embodiment of the present invention, communication system information is generated based on identification information of a wireless base station device which is other than a target base station and has detected the target base station, and identification information of the target base station, which are notified by the wireless base station device.

This configuration allows construction of appropriate communication system information, thereby realizing further improvement in the efficiency of operation in the wireless communication system 301.

Further, in the wireless communication system according to the first embodiment of the present invention, communication system information is generated based on identification information of a target base station which is acquired based on positional information indicating the installation location of a wireless base station device other than the target base station, and on identification information of the wireless base station device corresponding to the positional information.

This configuration allows construction of appropriate communication system information, thereby achieving further improvement in the efficiency of operation in the wireless communication system 301.

Further, in the wireless communication system according to the first embodiment of the present invention, when a new wireless terminal device 202 starts to communicate with the target base station, the neighboring cell information generation unit 12 acquires power information indicating whether one or a plurality of wireless base station devices with which the new wireless terminal device 202 is communicable powered on or off. Then, the neighboring cell information generation unit 12 generates, as neighboring cell information for the new wireless terminal device 202, neighboring cell information in which at least the powered-off wireless base station device is eliminated.

In this way, by acquiring the latest power state of a femto base station 101 and then determining whether or not the femto base station 101 should be registered in neighboring cell information, it is possible to generate appropriate neighboring cell information.

Further, in the wireless communication system according to the first embodiment of the present invention, communication system information is generated based on power information indicating whether a wireless base station device other than the target base station is powered on or off, which is notified by the wireless base station device.

This configuration allows reflection of the power state of a femto base station 101 in the communication system information, thereby generating appropriate neighboring cell information.

Further, in the wireless communication system according to the first embodiment of the present invention, communication system information is generated based on power information indicating that a wireless base station device other than the target base station is being powered on, which is periodically notified by the wireless base station device.

This configuration allows reflection of the power state of a femto base station 101 in the communication system information, thereby generating appropriate neighboring cell information. Further, it is possible to detect that a femto base station 101 is powered off due to occurrence of abnormality.

Further, in the wireless communication system according to the first embodiment of the present invention, the communication system information acquisition unit 13 acquires communication system information from the host device 205 in which information of each of wireless base station devices in the wireless communication system 301 is stored.

In this way, in the configuration in which each wireless base station device acquires the communication system information from the from the host device 205 which manages the information of the entire wireless communication system 301, it is possible to perform efficient generation of neighboring cell information in the entire wireless communication system 301.

If configuration of a femto base station is automatically performed by using the technique described in Patent Literature 1, all femto base stations located in the neighborhood of the femto base station are regarded as neighboring cells and registered in the neighboring cell information as candidates for a handover destination. Therefore, even a femto base station that is not essentially suitable as a handover destination, such as a femto base station located across a wall from a wireless terminal device, might be registered in the neighboring cell information.

In contrast, in the wireless communication system according to the first embodiment of the present invention, the neighboring cell information generation unit 12 generates neighboring cell information indicating one or a plurality of wireless base station devices to be candidate(s) for a handover destination of a wireless terminal device 202 communicating with the target base station, among the plurality of wireless base station devices 101 other than the target base station.

This configuration causes the handover operation in the femto cell of the installed wireless base station device. Further, by performing optimization of the neighboring cell information, the number of neighboring cells to be candidates for a destination of movement of a wireless terminal device 202 during communication can be reduced, thereby avoiding occurrence of unnecessary movement operation.

Further, in the wireless communication system according to the first embodiment of the present invention, the neighboring cell information generation unit 12 generates neighboring cell information indicating one or a plurality of wireless base station devices to be the target(s) for measurement by a wireless terminal device 202, among a plurality of wireless base station devices other than the target base station.

By performing optimization of neighboring cell information in this way, the number of neighboring cells to be the targets of measurement by a wireless terminal device 202 can be reduced, thereby preventing the wireless terminal device 202 from performing unnecessary measurement operation.

Further, in the wireless communication system according to the first embodiment of the present invention, the neighboring cell information generation unit 12 generates neighboring cell information indicating one or a plurality of wireless base station devices which transmit radio signal(s) whose reception level(s) are to be measured by a wireless terminal device 202, among a plurality of wireless base station devices other than the target base station.

By performing optimization of neighboring cell information in this way, the number of neighboring cells to be the targets of reception level measurement by a wireless terminal device 202 can be reduced, thereby preventing the wireless terminal device 202 from performing unnecessary measurement operation.

Further, in the wireless communication system according to the first embodiment of the present invention, at least any of the plurality of wireless base station devices other than a target wireless base station is a femto base station.

In this way, by generating appropriate neighboring cell information in a wireless base station device around which a femto base station is located, which femto base station is often powered on/off and moved, and is allowed to set access limitation, it is possible to obtain more remarkable effect of achieving highly-efficient operation in the wireless communication system.

Further, in the wireless communication system according to the first embodiment of the present invention, the macro base station 201 solely performs optimization of neighboring cell information. That is, the macro base station 201 (wireless base station device) is provided with the neighboring cell processing device according to the first embodiment of the present invention.

This configuration eliminates the need to optimize the neighboring cell information of each wireless base station device by the host device 205 in the core network 204, thereby achieving dispersion of processing load in the wireless communication system 301, and reduction in the communication traffic between the wireless base station device and the host device.

Further, in the wireless communication system according to the first embodiment of the present invention, the power transition notification message (data structure) shown in FIG. 124 and the power state notification messages (data structures) shown in FIGS. 126 and 127 are notified among base stations, and include power state data indicating the power states of the base stations.

This configuration allows the base stations to notify their power states by using, for example, a logical inter-base-station interface, thereby contributing to generation of appropriate neighboring cell information.

Further, in the wireless communication system according to the first embodiment of the present invention, as described with reference to FIGS. 128, 130, and 131, the power state notification message (data structure) is notified between one or a plurality of base stations and the host device 205 communicable with the respective base stations, and includes transmission source base station identification data indicating identification information of a base station as an information transmission source, and power state data indicating the power state of the base station as the information transmission source.

This configuration allows the base stations to notify their power states via the host device, by using a logical interface between base stations and telecommunications carrier-network, thereby contributing to generation of appropriate neighboring cell information.

Further, in the wireless communication system according to the first embodiment of the present invention, as described with reference to FIG. 132, the base station power state notification message (data structure) is notified from the host device 205 communicable with one or a plurality of base stations to the respective base stations, and includes base station identification data indicating identification information of each base station, and power state data indicating the power state of the base station corresponding to the identification information.

This configuration allows notification of the power states from the host device 205 to the base stations, thereby contributing to generation of appropriate neighboring cell information.

Further, in the wireless communication system according to the first embodiment of the present invention, the power state data indicates whether a base station transmits from the power-on state to the power-off state, or transmits from the power-off state to the power-on state, like the power transition notification message shown in FIG. 124, the power state notification messages shown in FIGS. 126 to 128, 130, and 131, and the base station power state notification message shown in FIG. 132.

This configuration allows, when transition of the power state of a base station occurs, another base station to acquire information relating to this transition.

Further, in the wireless communication system according to the first embodiment of the present invention, the power state data indicates whether a base station is in the power-on state or in the power-off state, like the power state notification messages (data structures) shown in FIGS. 126, 127, 130, and 131, and the base station power state notification message (data structure) shown in FIG. 132.

This configuration allows, for example, periodical obtainment of the power state of a certain base station.

Further, in the wireless communication system according to the first embodiment of the present invention, the power state notification messages (data structures) shown in FIGS. 127 and 131 and the base station power state notification message (data structure) shown in FIG. 132 each include load status data indicating the load status of a base station, and number-of-communicating-terminals data indicating the number of wireless terminal devices 202 communicating with the base station.

This configuration allows a base station to notify another base station of the power state, its load status, and the number of terminals connected thereto, in advance, thereby avoiding unnecessary measurement operation and handover operation. As long as each of these messages indicates at least one of the load status data and the number-of-communicating-terminals data, the message has the effect of avoiding unnecessary measurement operation and handover operation.

Further, in the wireless communication system according to the first embodiment of the present invention, as described with reference to FIG. 125, the power state notification request message (data structure) is notified among base stations, and includes the power station notification request data that requests a base station to notify its power state.

This configuration allows a base station to autonomously request another base station to notify the power state, thereby contributing to generation of appropriate neighboring cell information.

Further, in the wireless communication system according to the first embodiment of the present invention, as described with reference to FIG. 129, the power state notification request message (data structure) is notified between one or a plurality of base stations and the host device 205 communicable with the respective base stations, and includes the transmission source base station identification data indicating identification information of a base station as an information transmission source, and the power state notification request data requesting another base station to notify its power state.

This configuration allows a base station to autonomously request another base station to notify the power state via the host device 205, thereby contributing to generation of appropriate neighboring cell information.

Further, in the wireless communication system according to the first embodiment of the present invention, the power state notification messages (data structures) shown in FIGS. 128, 130, and 131 and the power state notification request message (data structure) shown in FIG. 129 each include transmission destination base station identification data that indicates identification information of one or a plurality of base stations as transmission destinations of information.

In this configuration, the host device 205 need not determine the destinations of the messages, thereby reducing the processing load in the host device 205.

In the wireless communication system according to the first embodiment of the present invention, only femto base stations 101 are registered in the neighboring cell information generated by the macro base station 201. However, the present invention is not limited thereto. When a plurality of macro base stations are located in a wireless communication system, neighboring cell information generated by a macro base station may have, registered therein, other macro base stations.

Further, in the wireless communication system according to the first embodiment of the present invention, the macro base station 201 generates neighboring cell information. However, the present invention is not limited thereto. A femto base station 101 may generate neighboring cell information.

In the wireless communication system according to the first embodiment of the present invention, the communication system information acquisition unit 13 in the macro base station 201 acquires the communication system information from the host device 205. However, the present invention is not limited thereto. The communication system information acquisition unit 13 in the macro base station 201 may generate communication system information by itself.

Further, in the wireless communication system according to the first embodiment of the present invention, a wireless base station device has the initiative to select a wireless base station device 101 to be a communication partner of a wireless terminal device 202. However, the present invention is not limited thereto. A wireless terminal device 202 may have the initiative to select a wireless base station device to be a communication partner of the wireless terminal device 202.

Further, in the wireless communication system according to the first embodiment of the present invention, each of the power state notification messages shown in FIGS. 126, 127, 130 and 131 and the base station power state notification message shown in FIG. 132 is a message indicating that a base station is started up, i.e., transmits from the power-off state to the power-on state, or that the base station is ended, i.e., transmits from the power-on state to the power-off state, or that the base station is in the power-on state, or that the base station is in the power-off state. However, the present invention is not limited thereto. Each of these messages may be a message which does not indicate the power state transition but simply indicates that a base station is in the power-on state or that the base station is in the power-off state.

Next, another embodiment of the present invention will be described with reference to figures. In the figures, the same or corresponding components are given the same reference characters and are not repeatedly described.

<Embodiment 2>

A second embodiment relates to a wireless communication system in which neighboring cell information is broadcast, in contrast to the wireless communication system according to the first embodiment. The wireless communication system of the second embodiment is identical to the wireless communication system of the first embodiment except the matters described below.

FIG. 133 is a diagram illustrating the configuration of a signal processing unit in a macro base station according to the second embodiment of the present invention.

With reference to FIG. 133, the signal processing unit in the macro base station 201 includes a neighboring cell information generation unit 32, a communication system information acquisition unit 13, and a neighboring cell information transmission unit 34.

Based on communication system information acquired by the communication system information acquisition unit 13, the neighboring cell information generation unit 32 generates neighboring cell information to be broadcast to wireless terminal devices 202 which exist in the macro cell MC, and are in the idle states, i.e., are not communicating with the macro base station 201.

The neighboring cell information transmission unit 34 broadcasts the neighboring cell information generated by the neighboring cell information generation unit 32 to wireless terminal devices 202 communicable with the macro base station 201 which is a target base station.

FIG. 134 is a diagram illustrating an example of neighboring cell information generated by a macro base station in the wireless communication system according to the second embodiment of the present invention.

With reference to FIG. 134, based on the communication system information shown in FIG. 118, the neighboring cell information generation unit 32 generates neighboring cell information indicating the powered-on femto base stations 101A, 101C, and 101D, i.e., the cell IDs 111, 333, and 444, as neighboring cell information to be broadcast to the wireless terminal devices 202 which are in the idle states, i.e., are not communicating with the macro base station 201.

This configuration prevents the wireless terminal devices in the idle states from performing unnecessary measurement operation on the powered-off femto base stations 101.

FIG. 135 is a flowchart illustrating the process steps when the macro base station according to the second embodiment of the present invention updates the neighboring cell information.

With reference to FIG. 135, the neighboring cell information generation unit 32 stands by until the communication system information is updated by the communication system information acquisition unit 13 and the updating of the communication system information causes the necessity of updating the neighboring cell information (NO in step S1, NO in step S2).

When the communication system information is updated (YES in step S1) and the updating of the communication system information causes the necessity of updating the neighboring cell information (YES in step S2), the neighboring cell information generation unit 32 determines whether or not the number of cells in the updated neighboring cell information exceeds a predetermined value (step S3).

Upon determining that the number of cells in the updated neighboring cell information does not exceed the predetermined value (NO in step S3), the neighboring cell information generation unit 32 adds a new cell ID in the neighboring cell information. Then, the neighboring cell information transmission unit 34 broadcasts the neighboring cell information updated by the neighboring cell information generation unit 32 to the wireless terminal devices 202 communicable with the macro base station 201 (step S4).

On the other hand, when determining that the number of cells in the updated neighboring cell information exceeds the predetermined value (YES in step S3), the neighboring cell information generation unit 32 does not add a new cell ID in the neighboring cell information, and generates another information to be broadcast to the wireless terminal devices 202 communicating with the macro base station 201. That is, in the case where one or a plurality of new wireless base station devices are to be added to the neighboring cell information and the addition of the one or the plurality of new wireless base station devices may cause the number of wireless base station devices in the neighboring cell information to exceed the predetermined value, the neighboring cell information generation unit 32 does not add the one or the plurality of new wireless base station devices in the neighboring cell information. Then, the neighboring cell information generation unit 32 generates auxiliary neighboring cell information indicating the new cell IDs which are not added in the neighboring cell information.

Then, the neighboring cell information transmission unit 34 transmits the auxiliary neighboring cell information generated by the neighboring cell information generation unit 32 to the wireless terminal devices 202 communicable with the macro base station 201 (step S5).

In step S5, among a plurality of cell IDs to be newly added, only the cell IDs of femto base stations 101 with which a wireless terminal device 202 is communicable may be included in the auxiliary neighboring cell information to be notified to the wireless terminal device 202. Alternatively, all the plurality of cell IDs to be newly added may be included in the auxiliary neighboring cell information to be notified to the wireless terminal device 202.

That is, when the neighboring cell information generation unit 32 does not add one or a plurality of new wireless base station devices in the neighboring cell information, the neighboring cell information transmission unit 34 notifies a wireless terminal device 202 which is communicating with the target base station and is communicable with part or all of the one or the plurality of new wireless base station devices, of part or all of the one or the plurality of new wireless base station devices, as information other than the neighboring cell information.

FIG. 136 is a flowchart illustrating the process steps in which the macro base station according to the second embodiment of the present invention updates the neighboring cell information.

With reference to FIG. 136, the operations in steps S11 to S14 are identical to the operations in steps S1 to S4 shown in FIG. 135, respectively.

When it is determined that the number of cells in the updated neighboring cell information exceeds the predetermined value if the neighboring cell information is updated (YES in step S13), the neighboring cell information generation unit 32 eliminates, from the cells registered in the neighboring cell information, cell(s) having no members among the wireless terminal devices 202 existing in the range of the macro base station 201.

Specifically, in the case where one or a plurality of new wireless base station devices are to be added in the neighboring cell information and the addition of the one or the plurality of new wireless base station devices may cause the number of wireless base station devices in the neighboring cell information to exceed the predetermined value, the neighboring cell information generation unit 32 eliminates, from one or a plurality of wireless base station devices indicated in the neighboring cell information, wireless base station device(s) with which none of the wireless terminal devices 202 communicable with the target base station is allowed to communicate. Then, the neighboring cell information generation unit 32 adds the one or the plurality of new wireless base station devices in the neighboring cell information after the elimination.

Then, the neighboring cell information transmission unit 34 broadcasts the neighboring cell information updated by the neighboring cell information generation unit 32 (step S16).

FIG. 137 is a diagram illustrating an example of a method in which a wireless base station device notifies wireless terminal devices of neighboring cell information, in the wireless communication system according to the second embodiment of the present invention.

With reference to FIG. 137, the macro base station 201 includes neighboring cell information in broadcast information, and notifies wireless terminal devices 202 in the idle states, i.e., which are not during phone call and data communication, of the broadcast information. In this case, the macro base station 201 notifies the wireless terminal devices 202 that the neighboring cell information has been updated, by using a broadcast information change notification.

More specifically, when optimization of the neighboring cell information occurs (step S27), the macro base station 201 broadcasts the broadcast information change notification to the wireless terminal devices 202 existing in the macro cell MC (step S28).

Next, the macro base station 201 broadcasts the broadcast information including the updated neighboring cell information to the wireless terminal devices 202 existing in the macro cell MC. Upon receiving the broadcast information change notification, each wireless terminal device 202 reads the neighboring cell information out of the broadcast information transmitted from the macro base station 201, and updates the neighboring cell information stored therein to the read neighboring cell information (step S29).

Next, the wireless terminal device 202 receives a measurement start request autonomously or from the macro base station 201, and measures the reception levels of the radio signals transmitted from the wireless base station devices indicated in the updated neighboring cell information (step S30).

Generally, there is an upper limit for the number of cell IDs registerable in neighboring cell information. Therefore, if a large number of femto base stations 101 or macro base stations 201 are installed in the wireless communication system 301, there is a possibility that all the cell IDs thereof cannot be registered in the neighboring cell information, which might make it difficult for each wireless terminal device 202 to perform appropriate measurement operation and handover operation.

In contrast, in the wireless communication system according to the second embodiment of the present invention, in the case where one or a plurality of new wireless base station devices are to be added in the neighboring cell information and the addition of the one or the plurality of new wireless base station devices may cause the number of wireless base station devices in the neighboring cell information to exceed a predetermined value, the neighboring cell information generation unit 32 does not add the one or the plurality of new wireless base station devices. When the neighboring cell information generation unit 32 does not add the one or the plurality of new wireless base station devices in the neighboring cell information, the neighboring cell information transmission unit 34 notifies each wireless terminal device 202 which is communicating with the target base station and is communicable with part or all of the one or the plurality of new wireless base station devices, of part or all of the one or the plurality of new wireless base station devices, as another information different from the neighboring cell information.

In this configuration, each wireless terminal device 202 communicating with the macro base station 201 can be notified of, as neighboring cells, a sufficient number of wireless base station devices which are suitable as measurement targets and handover targets, thereby improving the efficiency of operation in the wireless communication system.

Further, in the wireless communication system according to the second embodiment of the present invention, in case where on or a plurality of new wireless base station devices are to be added in neighboring cell information and the addition of the one or the plurality of new wireless base station devices may cause the number of wireless base station devices in the neighboring cell information to exceed a predetermined value, the neighboring cell information generation unit 32 eliminates, from one or a plurality of wireless base station devices indicated in the neighboring cell information, wireless base station device(s) with which none of the wireless terminal devices 202 communicable with the target base station are allowed to communicate. Then, the neighboring cell information generation unit 32 adds the one or the plurality of new wireless base station devices in the neighboring cell information after the elimination.

In this configuration, each wireless terminal device 202 communicable with the macro base station 201 can be notified of, as neighboring cells, a sufficient number of wireless base station devices which are suitable as measurement targets and handover targets, thereby improving the efficiency of operation in the wireless communication system.

Further, in the wireless communication system according to the second embodiment of the present invention, the neighboring cell information generation unit 32 generates neighboring cell information indicating, among the plurality of wireless base station devices other than the target base station, one or a plurality of wireless base station devices which transmit radio signal(s) whose reception level(s) are to be measured by the wireless terminal devices 202 in the idle states, i.e., which are not communicating with the target base station.

This configuration reduces the number of neighboring cells to be the targets of periodical power measurement instructed by such as broadcast information provided from each wireless base station device, thereby preventing the wireless terminal device 202 from performing unnecessary measurement operation. In particular, the power consumption of the wireless terminal devices 202 in the idle states can be reduced, thereby achieving remarkable effect.

In the wireless communication system according to the second embodiment of the present invention, only femto base stations 101 are registered in the neighboring cell information generated by the macro base station 201. However, the present invention is not limited thereto. If a plurality of macro base stations are installed in the wireless communication system, neighboring cell information generated by a macro base station may have, registered therein, other macro base stations.

Further, in the wireless communication system according to the second embodiment of the present invention, the macro base station 201 generates neighboring cell information. However, the present invention is not limited thereto. A femto base station 101 may generate neighboring cell information.

Further, in the wireless communication system according to the second embodiment of the present invention, if the number of cells in the updated neighboring cell information exceeds a predetermined value, the processes shown in step S5 in FIG. 135 and step S15 in FIG. 136 are performed. However, the present invention is not limited thereto. If the number of cells exceeds the predetermined value, not only when the neighboring cell information is updated but when initial neighboring cell information is generated, the processes shown in step S5 in FIG. 135 and step S15 in FIG. 136 may be performed.

Since other components and operations of the wireless communication system of the second embodiment are identical to those of the wireless communication system of the first embodiment, repeated description is not necessary.

Hereinafter, a description will be given of another embodiment of the present invention with reference to figures. In the figures, the same or corresponding components are given the same reference characters and are not repeatedly described.

<Embodiment 3>

A third embodiment relates to a wireless communication system in which, instead of a wireless base station device, a host device serves as a neighboring cell processing device, in contrast to the wireless communication system according to the first embodiment. The wireless communication system of the third embodiment is identical to the wireless communication system of the first embodiment except the matters described below.

FIG. 138 is a diagram illustrating the configuration of a host device according to the third embodiment of the present invention.

With reference to FIG. 138, the host device 250 includes a base-station-side transmission/reception unit 81, and a data processing unit 82.

The base-station-side transmission/reception unit 81 transmits communication data provided from the data processing unit 82 to a macro base station 201 and each femto base station 101, and outputs communication data provided from the macro base station 201 and each femto base station 101 to the data processing unit 82.

In the wireless communication system according to the third embodiment of the present invention, the host device 205 monitors the subordinate macro base stations and femto base stations, and optimizes neighboring cell information.

FIG. 139 is a diagram illustrating the configuration of the data processing unit in the host device according to the third embodiment of the present invention.

With reference to FIG. 139, the data processing unit 82 includes a terminal information acquisition unit 21, a neighboring cell information generation unit 22, a communication system information generation unit 23, and a neighboring cell information transmission unit 24.

The terminal information acquisition unit 21 acquires, from a target base station, identification information of each wireless terminal device 202 communicating with the target base station.

The communication system information generation unit 23 generates communication system information indicating the correspondence relationships among the macro base station 201, one or a plurality of femto base stations 101 located in the neighborhood of the macro base station 201, and wireless terminal devices 202 which are members of the femto base stations 101.

Based on the communication system information generated by the communication system information generation unit 23 and the identification information acquired by the terminal information acquisition unit 21, the neighboring cell information generation unit 22 generates neighboring cell information indicating one or a plurality of wireless base station devices with which the wireless terminal devices 202 communicating the target base station are communicable, among a plurality of wireless base station devices other than the target base station, in the wireless communication system 301. Specifically, the neighboring cell information generation unit 22 generates the neighboring cell information for each of the wireless terminal devices 202 communicating with the target base station. In the wireless communication system according to the third embodiment of the present invention, the target base station is any of the macro base station 201, the femto base station 101A, the femto base station 101B, the femto base station 101C, and the femto base station 101D.

The neighboring cell information transmission unit 24 transmits the neighboring cell information generated by the neighboring cell information generation unit 22 to the target base station.

Then, the target base station transmits the neighboring cell information received from the neighboring cell information transmission unit 24 in the host device 205, to the corresponding wireless terminal device 202 communicating with the target base station.

The content of the method of generating neighboring cell information by the neighboring cell information generation unit 22 is identical to, for example, the method of generating neighboring cell information by the neighboring cell information generation unit 12 according to the first embodiment of the present invention.

Since other components and operations of the wireless communication system of the third embodiment are identical to those of the wireless communication system of the first embodiment, repeated description is not necessary.

Further, in the second embodiment of the present invention, instead of the macro base station 201, the host device 205 may serves as a neighboring cell processing device, like the host device according to the third embodiment of the present invention. In this case, the neighboring cell information transmission unit in the host device 205 transmits, to the target base station, the neighboring cell information for the target base station, which is generated by the neighboring cell information generation unit.

When a wireless base station device has a plurality of sectors, that is, when one cell is divided into a plurality of sectors, one sector may be treated as one wireless base station device in neighboring cell information. The present invention is also applicable to such a case.

Further, in the first to third embodiments of the present invention, the handover operation of wireless terminal devices is specifically described. However, the present invention is applicable to not only "handover" that is an inter-base-station movement (inter-cell movement) operation performed by a wireless terminal device communicating with a wireless base station device but also an inter-base-station movement (inter-cell movement) operation performed by a wireless terminal device in the idle state. That is, the present invention is applicable to the configurations and operations in which "handover" is replaced with "movement", in the first to third embodiments of the present invention.

The embodiments disclosed in Chapter 5 are to be considered in all respects as illustrative and not restrictive. The scope of the present invention is indicated by the appended claims rather than by the foregoing meaning, and all changes which come within the meaning and range of equivalency of the claims are therefore intended to be embraced therein.

Further, the reference characters used in Chapter 5 are exclusively used in Chapter 5, and are not related to the reference characters in other chapters.

Description of the Reference Characters
11, 21 terminal information acquisition unit
12, 22 neighboring cell information generation unit
13 communication system information acquisition unit
14, 24 neighboring cell information transmission unit
23 communication system information generation unit
81 base-station-side transmission/reception unit
82 data processing unit
91 antenna
92 circulator
93 wireless reception unit
94 wireless transmission unit
95 signal processing unit
96 reception signal processing unit
97 transmission signal processing unit
101A, 101B, 101C, 101D femto base station
201 macro base station
202 wireless terminal device
203 gateway device
205 host device
301 wireless communication system
FCA, FCB, FCC, FCD femto cell
MC macro cell

The invention claimed is:

1. A neighboring cell processing device in a communication system in which wireless terminal devices are communicable with a plurality of wireless base station devices by performing movement operation, the neighboring cell processing device comprising:
   a movement information acquisition unit for acquiring movement information indicating a movement operation history of the wireless terminal devices, based on information from at least either of the wireless terminal devices or the wireless base station devices;
   a neighboring cell information generation unit for generating, based on the movement information acquired by the movement information acquisition unit, neighboring cell information indicating one or a plurality of wireless base station devices located in the neighborhood of a target wireless base station device, among a plurality of wireless base station devices other than the target wireless base station device; and
   a neighboring cell information transmission unit for transmitting the neighboring cell information generated by the neighboring cell information generation unit, to the target wireless base station device or to wireless terminal devices communicable with the target wireless base station device, wherein
   with respect to a first wireless base station device and a second wireless base station device among the plurality of wireless base station devices other than the target wireless base station device, the movement information acquisition unit acquires, when a wireless terminal device moves between the target wireless base station device and the second wireless base station device via the first wireless base station device, movement information indicating a sojourn time from when the wireless terminal device moves to the first wireless base station device to when the wireless terminal device moves to the target wireless base station device or the second wireless base station device.

2. The neighboring cell processing device according to claim 1, wherein the neighboring cell information generation unit generates the neighboring cell information in which at least the first wireless base station device corresponding to a sojourn time indicated in the movement information, which is equal to or shorter than a predetermined value, is eliminated from among the plurality of wireless base station devices other than the target base station device.

3. The neighboring cell processing device according to claim 1, wherein the neighboring cell information generation unit ranks the plurality of wireless base station devices other than the target wireless base station device, based on the movement information acquired by the movement information acquisition unit, and in the ranking, a wireless base station device corresponding to a relatively long sojourn time indicated in the movement information is ranked higher than a wireless base station device corresponding to a relatively short sojourn time indicated in the movement information.

4. The neighboring cell processing device according to claim 1, wherein
with respect to a first wireless base station device and a plurality of second wireless base station devices other than the first wireless base station device among the plurality of wireless base station devices other than the target wireless base station device, the movement information acquisition unit acquires, when a wireless terminal device moves between the target wireless base station device and each of the second wireless base station devices via the first wireless base station device, movement information indicating sojourn times from when the wireless terminal device moves to the first wireless base station device to when the wireless base station device moves to the target wireless base station device and the second wireless base station devices, respectively.

5. The neighboring cell processing device according to claim 4, wherein the neighboring cell information generation unit generates the neighboring cell information in which at least the first wireless base station device corresponding to a sojourn time indicated in the movement information, which is equal to or shorter than a predetermined value with respect to all the second wireless base station devices, is eliminated from among the plurality of wireless base station devices other than the target wireless base station device.

6. The neighboring cell processing device according to claim 1, wherein the movement information acquisition unit further acquires movement information indicating whether or not a wireless terminal device communicating with the target wireless base station device is communicable with the second wireless base station devices.

7. The neighboring cell processing device according to claim 6, wherein the neighboring cell information generation unit generates the neighboring cell information in which at least the first wireless base station device is eliminated from among the plurality of wireless base station devices other than the target wireless base station device, the first wireless base station device corresponding to a sojourn time indicated in the movement information, which is equal to or shorter than a predetermined value, and being in a case where a wireless terminal device communicating with the target wireless base station device is communicable with the second wireless base station devices.

8. The neighboring cell processing device according to claim 1, wherein
the neighboring cell information generation unit ranks the plurality of wireless base station devices other than the target wireless base station device, based on the measurement information acquired by the measurement information acquisition unit, and generates neighboring cell information based on a result of the ranking, and
the neighboring cell information generation unit generates initial neighboring cell information, based on a result of measurement in which a wireless terminal device communicating with the target wireless base station device has measured, in a plurality of frequencies, the reception levels of the radio signals transmitted from the wireless base station devices other than the target wireless base station device.

9. The neighboring cell processing device according to claim 8, further including:
a power measurement indication unit for, in a case where the target wireless base station device operates in a hybrid mode in which the wireless terminal devices are registerable and both the registered wireless terminal devices and unregistered wireless terminal devices are allowed to access the target wireless base station device, instructing the unregistered wireless terminal devices to measure, in the plurality of frequencies, the reception levels of the radio signals transmitted from the wireless base station devices other than the target wireless base station device.

10. The neighboring cell processing device according to claim 8, further including:
a power measurement indication unit for, in a case where the target wireless base station device operates in a hybrid mode in which the wireless terminal devices are registerable and both the registered wireless terminal devices and unregistered wireless terminal devices are allowed to access the target wireless base station device, instructing the registered wireless terminal devices to measure, in the plurality of frequencies, the reception levels of the radio signals transmitted from the wireless base station devices other than the target wireless base station device.

11. The neighboring cell processing device according to claim 1, wherein
in a case where the target wireless base station device operates in a hybrid mode in which the wireless terminal devices are registerable and both the registered wireless terminal devices and unregistered wireless terminal devices are allowed to access the target wireless base station device, the neighboring cell information generation unit weights the measurement information of the registered wireless terminal devices and the measurement information of the unregistered wireless terminal devices, and generates the neighboring cell information based on a result of the weighting.

12. The neighboring cell processing device according to claim 1, wherein,
at least any of the plurality of wireless base station devices in the communication system is a femto base station.

13. A wireless base station device including the neighboring cell processing device according to claim 1.

14. A neighboring cell processing method in a communication system in which wireless terminal devices are communicable with a plurality of wireless base station devices by performing movement operation, the neighboring cell processing method comprising the steps of:
- acquiring movement information indicating a movement operation history of the wireless terminal devices, based on information from at least either of the wireless terminal devices or the wireless base station devices;
- generating, based on the movement information acquired by the movement information acquisition unit, neighboring cell information indicating one or a plurality of wireless base station devices located in the neighborhood of a target wireless base station device, among a plurality of wireless base station devices other than the target wireless base station device; and
- transmitting the neighboring cell information generated by the neighboring cell information generation unit, to the target wireless base station device or to wireless terminal devices communicable with the target wireless base station device, wherein
- in the movement information acquisition step, with respect to a first wireless base station device and a second wireless base station device among the plurality of wireless base station devices other than the target wireless base station device, when a wireless terminal device moves between the target wireless base station device and the second wireless base station device via the first wireless base station device, movement information is acquired, which indicates a sojourn time from when the wireless terminal device moves to the first wireless base station device to when the wireless terminal device moves to the target wireless base station device or the second wireless base station device.

15. A communication system including a plurality of wireless base station devices with which wireless terminal devices are communicable by performing movement operation, and a neighboring cell processing device which acquires information from at least either of the wireless terminal devices or the wireless base station devices, wherein
the neighboring cell processing device comprises:
- a movement information acquisition unit for acquiring movement information indicating a movement operation history of the wireless terminal devices, based on information from at least either of the wireless terminal devices or the wireless base station devices;
- a neighboring cell information generation unit for generating, based on the movement information acquired by the movement information acquisition unit, neighboring cell information indicating one or a plurality of wireless base station devices located in the neighborhood of a target wireless base station device, among a plurality of wireless base station devices other than the target wireless base station device; and
- a neighboring cell information transmission unit for transmitting the neighboring cell information generated by the neighboring cell information generation unit, to the target wireless base station device or to wireless terminal devices communicable with the target wireless base station device, wherein
- with respect to a first wireless base station device and a second wireless base station device among the plurality of wireless base station devices other than the target wireless base station device, the movement information acquisition unit acquires, when a wireless terminal device moves between the target wireless base station device and the second wireless base station device via the first wireless base station device, movement information indicating a sojourn time from when the wireless terminal device moves to the first wireless base station device to when the wireless terminal device moves to the target wireless base station device or the second wireless base station device.

* * * * *